(12) United States Patent
Jensen et al.

(10) Patent No.: US 11,814,461 B2
(45) Date of Patent: Nov. 14, 2023

(54) PROCESS FOR PREPARING CATALYSTS AND CATALYST COMPOSITIONS

(71) Applicant: Formosa Plastics Corporation, U.S.A., Livingston, NJ (US)

(72) Inventors: Michael D Jensen, Palacios, TX (US); Kevin Chung, Port Lavaca, TX (US); Daoyong Wang, Victoria, TX (US); Wei-Chun Shih, Lawrenceville, NJ (US); Guangxue Xu, Port Lavaca, TX (US); Chih-Jian Chen, Port Lavaca, TX (US); Charles R. Johnson, II, Port Lavaca, TX (US); Mary Lou Cowen, Port Lavaca, TX (US)

(73) Assignee: FORMOSA PLASTICS CORPORATION, U.S.A., Livingston, NJ (US)

( * ) Notice: Subject to any disclaimer, the term of this patent is extended or adjusted under 35 U.S.C. 154(b) by 0 days.

(21) Appl. No.: 18/184,376

(22) Filed: Mar. 15, 2023

(65) Prior Publication Data
US 2023/0242683 A1 Aug. 3, 2023

Related U.S. Application Data

(63) Continuation of application No. 17/659,790, filed on Apr. 19, 2022, now Pat. No. 11,634,513, which is a
(Continued)

(51) Int. Cl.
*C08F 4/02* (2006.01)
*C08F 4/6592* (2006.01)
(Continued)

(52) U.S. Cl.
CPC ............ *C08F 4/65916* (2013.01); *C08F 2/01* (2013.01); *C08F 2/34* (2013.01); *C08F 4/02* (2013.01);
(Continued)

(58) Field of Classification Search
CPC ....... C08F 4/02; C08F 4/65916; C08F 210/16
See application file for complete search history.

(56) References Cited

U.S. PATENT DOCUMENTS

| 2,196,016 A | 4/1940 | Huehn et al. |
|---|---|---|
| 3,242,099 A | 3/1966 | Manyik et al. |

(Continued)

FOREIGN PATENT DOCUMENTS

WO 2016183006 A1 11/2016

OTHER PUBLICATIONS

Written Opinion, PCT/US2020/015217, dated Jan. 21, 2022 (8 pp.).
(Continued)

*Primary Examiner* — Caixia Lu
(74) *Attorney, Agent, or Firm* — Eversheds Sutherland (US) LLP

(57) ABSTRACT

Disclosed are support-activators and catalyst compositions comprising the support-activators for polymerizing olefins in which the support-activator includes clay heteroadduct, prepare from a colloidal phyllosilicate such as a colloidal smectite clay, which is chemically-modified with a heterocoagulation agent. By limiting the amount of heterocoagulation reagent relative to the colloidal smectite clay as described herein, the smectite heteroadduct support-activator is a porous and amorphous solid which can be readily isolated from the resulting slurry by a conventional filtration process, and which can activate metallocenes and related catalysts toward olefin polymerization. Related compositions and processes are disclosed.

63 Claims, 10 Drawing Sheets

Related U.S. Application Data continuation of application No. 16/773,489, filed on Jan. 27, 2020, now Pat. No. 11,339,229.

(51) Int. Cl.

| | | |
|---|---|---|
| *C08F 210/16* | (2006.01) | |
| *C08F 4/659* | (2006.01) | |
| *C08F 2/01* | (2006.01) | |
| *C08F 2/34* | (2006.01) | |
| *C08F 10/06* | (2006.01) | |
| *C08F 110/02* | (2006.01) | |

(52) U.S. Cl.
CPC ...... *C08F 4/65912* (2013.01); *C08F 4/65927* (2013.01); *C08F 10/06* (2013.01); *C08F 110/02* (2013.01); *C08F 2410/01* (2013.01)

(56) References Cited

U.S. PATENT DOCUMENTS

| | | |
|---|---|---|
| 3,962,135 A | 6/1976 | Alafanda |
| 4,176,090 A | 11/1979 | Vaughan et al. |
| 4,248,739 A | 2/1981 | Vaughan et al. |
| 4,367,163 A | 1/1983 | Pinnavaia et al. |
| 4,637,992 A | 1/1987 | Lewis et al. |
| 4,794,096 A | 12/1988 | Ewen |
| 4,808,561 A | 2/1989 | Welborn, Jr. |
| 4,939,217 A | 7/1990 | Stricklen |
| 5,059,568 A | 10/1991 | McCauley |
| 5,191,132 A | 3/1993 | Patsidis et al. |
| 5,202,295 A | 4/1993 | McCauley |
| 5,210,352 A | 5/1993 | Alt et al. |
| 5,347,026 A | 9/1994 | Patsidis et al. |
| 5,360,775 A | 11/1994 | Suda et al. |
| 5,399,636 A | 3/1995 | Alt et al. |
| 5,401,817 A | 3/1995 | Palackal et al. |
| 5,420,320 A | 5/1995 | Zenk et al. |
| 5,436,305 A | 7/1995 | Alt et al. |
| 5,451,649 A | 9/1995 | Zenk et al. |
| 5,480,848 A | 1/1996 | Geerts |
| 5,496,781 A | 3/1996 | Geerts et al. |
| 5,498,581 A | 3/1996 | Welch et al. |
| 5,534,057 A | 7/1996 | Harrison et al. |
| 5,541,272 A | 7/1996 | Schmid et al. |
| 5,554,795 A | 9/1996 | Frey et al. |
| 5,563,284 A | 10/1996 | Frey et al. |
| 5,565,592 A | 10/1996 | Patsidis et al. |
| 5,571,880 A | 11/1996 | Alt et al. |
| 5,576,259 A | 11/1996 | Hasegawa et al. |
| 5,594,078 A | 1/1997 | Welch et al. |
| 5,616,672 A | 4/1997 | O'Brien |
| 5,631,203 A | 5/1997 | Welch et al. |
| 5,631,335 A | 5/1997 | Alt et al. |
| 5,654,454 A | 8/1997 | Peifer et al. |
| 5,668,230 A | 9/1997 | Schertl et al. |
| 5,705,478 A | 1/1998 | Boime |
| 5,705,579 A | 1/1998 | Hawley et al. |
| 5,741,947 A | 4/1998 | Wolf et al. |
| 5,753,577 A | 5/1998 | Hamura et al. |
| 5,807,938 A | 9/1998 | Kaneko et al. |
| 5,919,983 A | 7/1999 | Rosen et al. |
| 5,973,084 A | 10/1999 | Suga et al. |
| 6,107,230 A | 8/2000 | McDaniel et al. |
| 6,531,552 B2 | 3/2003 | Nakano et al. |
| 6,559,090 B1 | 5/2003 | Shih et al. |
| 6,632,894 B1 | 10/2003 | McDaniel et al. |
| 6,653,416 B2 | 11/2003 | McDaniel et al. |
| 6,677,411 B2 | 1/2004 | Uchino et al. |
| 6,833,338 B2 | 12/2004 | McDaniel et al. |
| 6,943,224 B2 | 9/2005 | Shih |
| 6,984,603 B2 | 1/2006 | McDaniel et al. |
| 6,992,032 B2 | 1/2006 | McDaniel et al. |
| 7,041,753 B2 | 5/2006 | McDaniel et al. |
| 7,220,695 B2 | 5/2007 | Casty et al. |
| 8,642,499 B2 | 2/2014 | Cheng et al. |
| 9,045,504 B2 | 6/2015 | Gao et al. |
| 9,163,100 B2 | 10/2015 | Wassenaar |
| 9,616,412 B2 | 4/2017 | Goswamee et al. |
| 9,670,296 B2 | 6/2017 | McDaniel et al. |
| 9,751,961 B2 | 9/2017 | Murase et al. |
| 2011/0135796 A1 | 6/2011 | Chang |
| 2017/0342175 A1 | 11/2017 | Hagadorn et al. |
| 2018/0142047 A1 | 5/2018 | Jensen et al. |
| 2018/0142048 A1 | 5/2018 | Jensen et al. |

OTHER PUBLICATIONS

International Search Report and Written Opinion, PCT/US2020/015217, dated Sep. 25, 2020 (15 pp.).

Reysen S., et al., Influence of pH on the aluminum speciation in freeze-dried poly(hydrooxo aluminum) intercalated bentonites:, Applied Clay Science, Elseiver, Amsterdam, NL, vol. 33, No. 3-4, Jul. 7, 2006 (9 pp.).

Kline, W.E., et al., "Dissolution of Silicate Minerals by Hydrofluoric Acid," Industrial & Engineering Chemistry Fundamentals, 1981, 20(2), 155-161 (7 pp.).

Oades, J.M., "Interactions of Polycations of Aluminum and Iron with Clays," Clay and Clay Minerals, 1984, 32(1), 49-57 (9 pp.).

Goldberg, S., et al., "Effect of Saturating Cation, pH, and Aluminum and Iron Oxide on the Flocculation of Kaolinite and Montmorillonite," Clay and Clay Minerals, 1987, 35(3), 220-207 (8 pp.).

Gu, B., et al., "Adsorption of Hydroxy-Al Polycations and Destabilization of Illite and Montmorillonite Suspensions," Clay and Clay Minerals, 1990, 38(5), 493-500 (8 pp.).

Tsvetkov, F., et al., "Cross-Linked Hydroxy-A1-Montmorillonite as a Stationary Phase in Liquid Chromatography," Clay and Clay Minerals, 1990, 38(4), 380-390 (11 pp.).

Schoonheydt, R.A., et al., "The Al Pillaring of Clays, Part II, Pillaring with [Al13O4(OH)24(H2O)12]7+," Clay and Clay Minerals 1994, 42(5), 518-525 (8 pp.).

Komadel, P., et al., "Effect of Non-Swelling Layers on the Dissolution of Reduced-Charge Montmorillonite in Hydrocholoric Acid," Clay Minerals, 1996, 31, 333-345 (13 pp.).

Abend, S., et al., "Stabilization of Emulsions by Heterocoagulation of Clay Minerals and Layered Double Hydroxides," Colloid Polym. Sci. 1998, 276, 730-737 (8 pp.).

Thomas, S.M., et al., "Effects of Synthesis Conditions on the Thermal Stability of a Texas Montmorillonite Expanded with [Al13O4(OH)24(H2O)12]7+ Cations," Clay and Clay Minerals, 2000, 48(2), 304-308 (5 pp.).

Duran, J.D.G., et al., "Rheological and Electrokinetic Properties of Sodium Montmorillonite Suspensions," Journal of Colloid and Interface Science, 2000, 229, 107-117 (11 pp.).

Perry, C.C., et al., "The Systematic Study of Aluminum Speciation in Medium Concentrated Aqueous Solutions," Journal of Inorganic Biochemistry, 2001, 87, 115-124 (10 pp.).

Mialane, P., et al., [e-PMo12O36(OH)4{La(H2O)4}4]5+: The First e-PMo12O40 Keggin Ion and its Association with the Two-Electron-Reduced a-PMo12O40 Isomer, Angew. Chem. Int. Ed. 2002, 41, 2398-2401 (4 pp.).

Okada, K., et al., "Selectic Acid Leaching of Talc," Clay Science, 2003, 12, 159-165 (7 pp.).

Vlasova, M., et al., "Structural-Phase Transformations in Bentonite After Acid Treatment," Science of Sintering, 2003, 35, 155-166 (12 pp.).

Cornell, R.M., et al., "The Iron Oxides: Structure, Properties, Reactions, Occurences and Uses," Wiley-VCH GmbH & Co. KGaA, 2003 (137 pp.).

Dudkin, B.N., et al., "Application of Mechanochemical Treatment to Disintegration of Kaolinite with Sulphuric Acid," Chemistry for Sustainable Development, 2004, 12, 327-330 (4 pp.).

Finevich, V.P., et al., "Composite Nanomaterials on the Basis of Acid-Activated Montmorillonites," Russian Journal of General Chemistry 2007, 77(12), 2265-2271 (7 pp.).

Covarrubias, C., et al., "Ethylene Polymerization Using Dealuminated ZSM-2 Zeolite Nanocrystals as an Active Metallocene Catalyst Support," Applied Catalysis A: General, 2008, 347, 223-233 (11 pp.).

(56) References Cited

OTHER PUBLICATIONS

Morodome, S., et al., "Swelling Behavior of Na- and Ca-Montmorillonite up to 150 by In Situ X-ray Diffraction Experiments," Clay and Clay Minerals, 2009, 57(2), 150-160 (11 pp.).

Lagaly, G., "Colloids," 2012, Wiley-VCH Verlag GmbH & Co. KGaA, Weinheim, DOI: 10.1002/14356007.a07-341.pub2, 519-535 (37 pp.).

Simunekova, M., et al., "Tetradecanuclear Lanthanide-Vanadium 'Nanochocolates": Catalytically-Active Cationic Heteropolyoxovanadium Clusters, RSC Adv. 2013, 3, 6299-6304 (6 pp.).

Kooli, F., "Pillared Montmorillontes from Unusual Antiperspirant Aqueous Solutions: Characterization and Catalytic Tests," Microporous and Mesoporous Materials; 2013, 167, 228-236 (9 pp.).

Fernandez, M., et al., "Effects of Thermal and Mechanical Treatments on Montmorillonite Homoionized with Mono- and Polyvalent Cations: Insight Into the Surface and Structural Changes," Colloids and Surfaces A: Physicochemical and Engineering Aspects, 2013, 423, 1-10 (10 pp.).

Bibi, I., et al., "Dissolution Kinetics of Soil Clays in Sulfuric Acid Solutions: Ionic Strength and Temperature Effects," Applied Geochemistry, 2014, 51, 170-183 (14 pp.).

Bibi, I., et al., "Dissolution Kinetics of Kaolinite, Illite and Montmorillonite Under Acid-Sulfate Conditions: A Comparative Study", prepared for Clay Minerals, Chapter 4 (manuscript accessed at https://ses.library.usyd.edu.au/bitstream/handle/2123/8647/Chapter%204_Dissolution%20of%20illite,%20kaolinite,%20montmorillonite.pdf?sequence=5) and also at https://pdfs.semanticscholar.org/6836/3c9c293dfd4255f9ad88678e1770c63384d3.pdf (35 pp.).

Tayano, T., et al., "Study of Different Montmorillonites as "Support-Activators" for Metallocene-Catalyzed Propylene Polymerization," Clay Science, 2016, 20, 49-58 (10 pp.).

Tayano T., et al., "Locating the Active Sites of Metallocene Catalysts Supported on Acid-Treated Montmorillonite," Journal of Molecular Catalysis A: Chemical, 2016, 420, 228-236 (9 pp.).

Cerbelaud, M., "Heteroaggregation of Ceramic Colloids in Suspensions," Advances in Physics: X, 2017, vol. 2, 35-53 (20 pp.).

Tayano, T., et al., Effect of Acid Treatment of Montmorillonite on "Support-Activator" Performance to Support Metallocene for Propylene Polymerization Catalyst, Macromolecular Reaction Engineering, 2017(11), 1600017 (13 pp.).

Abdelbagi, M.E.M., et al., "1,2-Bis(Dimethylsilyl)Phenylidene Bridged Zirconocene and Hafnocene Dichloride Complexes as Precatalysts for Ethylene Polymerization," Journal of Organometallic Chemistry, 2017, 11, 010 (abstract only) (3 pp.).

Bertella, F., "Scale up Pillaring: A Study of the Parameters that Influence the Process," Materials, 2017, 10, 712, 1-12 (12 pp.).

Soni, V.K., et al., "On the Investigation of Acid and Surfactant Modification of Natural Clay for Photocatalytic Water Remediation," Journal of Material Science, 2018, 53, 10095-10110 (16 pp.).

PROCESS FOR PREPARING CATALYSTS AND CATALYST COMPOSITIONS

CROSS REFERENCE TO RELATED APPLICATIONS

This application is a continuation of U.S. patent application Ser. No. 17/659,790, filed Apr. 19, 2022, which is a continuation of U.S. patent application Ser. No. 16/773,489, filed Jan. 27, 2020, now U.S. Pat. No. 11,339,229, each of which is incorporated herein by reference in its entirety.

TECHNICAL FIELD OF THE DISCLOSURE

This disclosure relates to catalyst compositions including support-activators for producing polyethylene and processes for preparing and using the same.

BACKGROUND OF THE DISCLOSURE

Compounds such as methylaluminoxane (MAO) and arylboranes are commonly employed as metallocene catalyst activators or co-catalysts for the polymerization of olefins. Industrial-scale manufacture of polyolefin resins can employ gas phase or slurry reactor platforms rather than solution phase conditions, therefore heterogeneous catalyst systems are used for these polymerization systems. The preparation and use of these heterogeneous polymerization catalysts can be complicated and expensive. For example, when treating an inorganic metal oxide support such as silica or alumina with a catalyst, further use of co-catalysts or activators such as MAO and arylboranes are often required, which can be time-intensive and expensive. The synthesis of MAO and arylboranes themselves is atom inefficient, requiring multiple steps and inert conditions, which can increase the costs of using such activators.

Various support-activators have been investigated to attempt to reduce the high costs of aluminoxanes, arylboranes, and other costly activators or co-catalysts. For example, U.S. Pat. Nos. 6,107,230 and 9,670,296 to McDaniel et al. address utilizing derivatives of amorphous alumina and silica-alumina as both support and co-catalyst for providing metallocene polymerization activity. U.S. Pat. Nos. 6,632,894 and 7,041,753 also to McDaniel et al. describe the use of clay minerals in a sol-gel matrix, which can serve as a support-activator for metallocenes, but which themselves can be costly to manufacture. Other approaches are seen in the use of chemically-modified clay minerals, such as seen in the work of Suga et al. in U.S. Pat. No. 5,973,084, Nikano et al. in U.S. Pat. No. 6,531,552, Murase et al. in U.S. Pat. No. 9,751,961, and McCauley in U.S. Pat. No. 5,202,295. These approaches includes process limitations such as low catalyst recovery yield, an excessive number of preparative steps, difficulty in separating the modified clay mineral, or narrow preparation conditions under which the clay can be successfully modified and isolated.

Therefore, there remains a need to improve the ease and economy of preparing support-activators. This need is evident when chemically-modified clay support-activators of sufficient activity are desired for producing metallocene-based polyolefins, such as high clarity film resins. It would be desirable to develop clay-based support-activators which eliminate the need for aluminoxanes and other costly activators, which are convenient and economical to prepare and recover in high yield, and/or which exhibit relatively high activity with polymerization catalysts such as metallocene compounds.

SUMMARY OF THE DISCLOSURE

Aspects of this disclosure provide new support-activators and processes for their preparation, new catalyst compositions comprising the support-activators, methods for making the catalyst compositions, and processes for polymerizing olefins. In an aspect, the chemically-modified clay support-activators can readily activate metallocene compounds toward polymerization of olefins, and they are surprisingly easy and cost-effective to prepare and recover in high yield. In particular, the processes and the support-activators of this disclosure can largely avoid the previous difficulties in isolating chemically-modified clay support-activators, for example, from clay particle digestion and leaching of the octahedral alumina layer of the clay into solution during the activation process, which makes standard filtration extremely difficult as the clay particles decrease in size.

It has been unexpectedly discovered that when a colloidal smectite clay, such as a dioctahedral smectite clay, is contacted in a liquid carrier (also termed a "diluent") with a heterocoagulation reagent comprising at least one cationic polymetallate, and when the heterocoagulation reagent is used in an amount relative to the colloidal smectite clay within a specific range, a support-activator comprising an isolated smectite heteroadduct can be synthesized. By limiting the amount of heterocoagulation reagent relative to the colloidal smectite clay as described herein, the smectite heteroadduct, also termed a heterocoagulated smectite, can be easily isolated from the resulting slurry by a conventional filtration process. The isolation process has often been difficult with previous chemically-modified clay support-activators, where filtration may require days, or multiple washing and centrifugation steps may be required. Moreover, the smectite heteroadduct support-activator isolated in accordance with this disclosure can be used with few or no washing steps, further enhancing the usefulness, ease, and economy of preparation and use.

The smectite heteroadducts prepared in this manner, which can be used in combination with co-catalysts such as alkyl aluminum compound, afford very active support-activators for metallocene olefin polymerizations, particularly when compared to traditional MAO-$SiO_2$ or borane-derived support-activators. The heterocoagulation agents used in this process can be very inexpensive and can be used with co-catalysts such as alkyl aluminum compounds, which can also be very inexpensive as compared to aluminoxane and borane-based activators.

Furthermore, the isolation of the smectite heteroadducts can be effected using a conventional filtration, without the need for centrifugation or high dilution of reaction mixtures, and without extensive washing of the solid thus obtained. This process provides the solid clay heteroadduct exhibiting better activity than the corresponding untreated clay, and comparable or better activity than the more difficult-to-prepare pillared clay supports, thereby fulfilling a need.

Moreover, unlike the pillared clays, the heterocoagulated clay materials of this disclosure are amorphous solids. The preparation of the heterocoagulated clay provides a three-dimensional structure, but one which is a non-pillared and non-crystalline and amorphous. While not intending to be bound by theory, it is believed that the regular crystalline structure of the starting smectite is not simply expanded upon contact with the cationic polymetallates, but rather disrupted upon preparation of the clay heteroadducts, to provide a non-crystalline, non-layered amorphous material.

Accordingly, in one aspect, this disclosure provides a support-activator comprising an isolated smectite heteroadduct, the smectite heteroadduct comprising the contact product in a liquid carrier of [1] a colloidal smectite clay and [2] a heterocoagulation reagent comprising at least one cationic polymetallate and in an amount sufficient to provide a slurry of the smectite heteroadduct having a zeta potential in a range of from about positive 25 mV (+25 millivolts) to about negative 25 mV (−25 millivolts).

This disclosure also provides, in another aspect, a method of making a support-activator comprising a smectite heteroadduct, the method comprising:
a) providing a colloidal smectite clay;
b) contacting in a liquid carrier the colloidal smectite clay with a heterocoagulation reagent comprising at least one cationic polymetallate and in an amount sufficient to provide a slurry of a smectite heteroadduct having a zeta potential in a range of from about positive 25 mV (millivolts) to about negative 25 mV; and
c) isolating the smectite heteroadduct from the slurry.

According to a further aspect, this disclosure provides a catalyst composition for olefin polymerization, the catalyst composition comprising:
a) at least one metallocene compound;
b) optionally, at least one co-catalyst; and
c) at least one support-activator comprising a calcined smectite heteroadduct, the smectite heteroadduct comprising the contact product of [1] a colloidal smectite clay and [2] a heterocoagulation reagent comprising at least one cationic polymetallate in a liquid carrier and in an amount sufficient to provide a slurry of the smectite heteroadduct having a zeta potential in a range of from about positive 25 mV (millivolts) to about negative 25 mV.

This disclosure also provides, in another aspect, a method of making an olefin polymerization catalyst, the method comprising contacting in any order:
a) at least one metallocene compound;
b) optionally, at least one co-catalyst; and
c) at least one support-activator comprising a calcined smectite heteroadduct, the smectite heteroadduct comprising the contact product of [1] a colloidal smectite clay and [2] a heterocoagulation reagent comprising at least one cationic polymetallate in a liquid carrier and in an amount sufficient to provide a slurry of the smectite heteroadduct having a zeta potential in a range of from about positive 25 mV (millivolts) to about negative 25 mV.

In an aspect, for example, the optional co-catalyst can be an alkylating agent which may or may not be required for initiating efficient olefin polymerization depending upon the particular metallocene compound used to make the olefin polymerization catalyst.

In a further aspect, there is provided a process for polymerizing olefins, the process comprising contacting at least one olefin monomer and a catalyst composition under polymerization conditions to form a polyolefin, wherein the catalyst composition comprises:
a) at least one metallocene compound;
b) optionally, at least one co-catalyst; and
c) at least one support-activator comprising a calcined smectite heteroadduct, the smectite heteroadduct comprising the contact product of [1] a colloidal smectite clay and [2] a heterocoagulation reagent comprising at least one cationic polymetallate in a liquid carrier and in an amount sufficient to provide a slurry of the smectite heteroadduct having a zeta potential in a range of from about positive 25 mV (+25 millivolts) to about negative 25 mV (−25 millivolts).

These and other aspects, features, and embodiments of the compositions including the support-activator and the catalyst compositions, the methods of making the compositions, and the polymerization processes and associated methods are more fully described in the Detailed Description, the Figures, the Examples, and the claims which are provided herein.

BRIEF DESCRIPTION OF THE FIGURES

FIG. 4 illustrates a zeta potential titration for the addition of a 2.5 wt. % aqueous solution of aluminum chlorhydrate (ACH; measured density of 1.075 g/mL) into a 0.62 wt. % Volclay® HPM-20 bentonite aqueous dispersion, plotting the measured zeta potential versus the Al content (mmol Al/g clay). The titrant amount indicates the cumulative mmol of aluminum of the aqueous ACH solution added.

DETAILED DESCRIPTION OF THE DISCLOSURE

Figure 1:
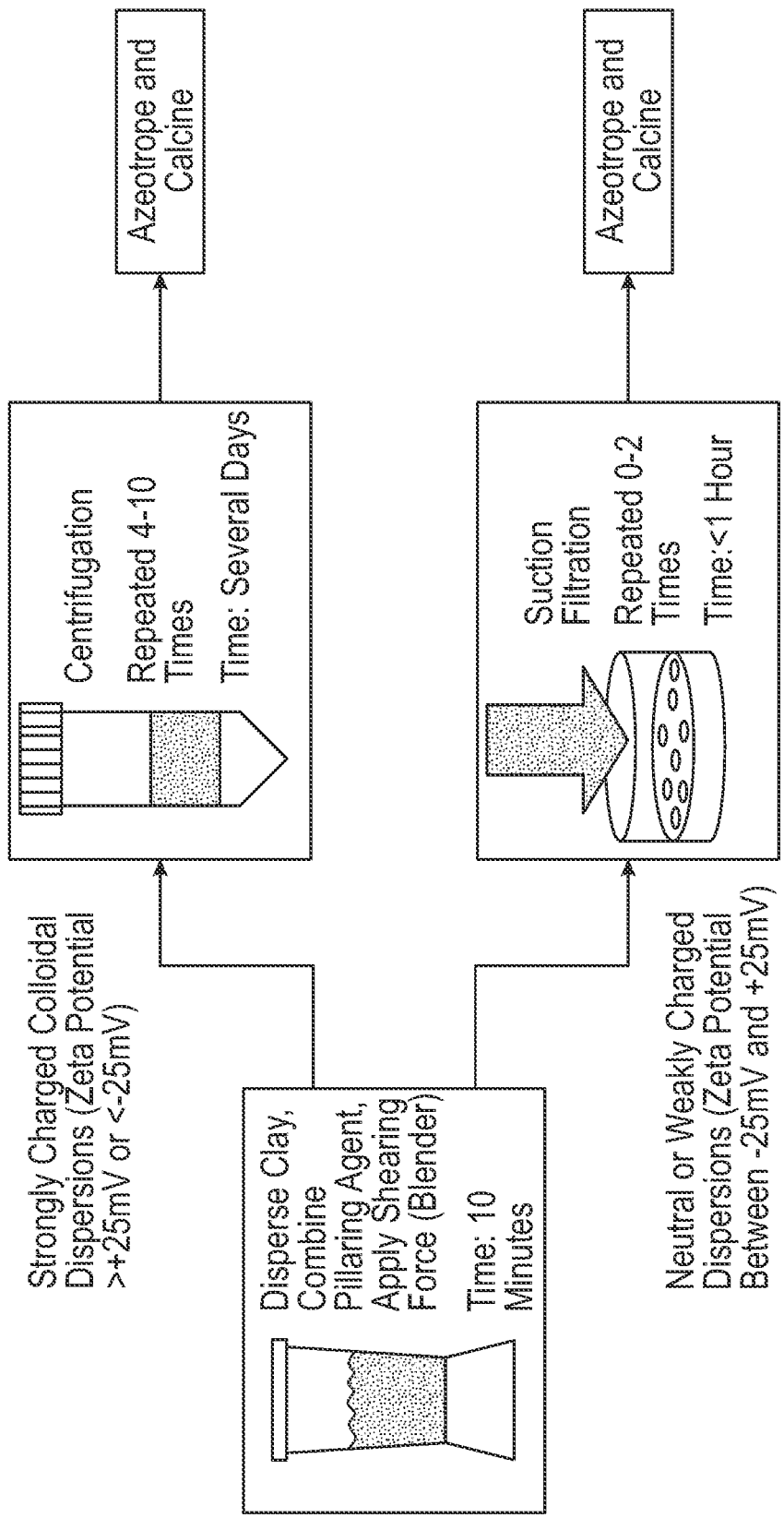
FIG. 1 provides a schematic representation of an aspect of this disclosure, illustrating a method to prepare, wash, and isolate the support-activator comprising a calcined smectite heteroadduct of this disclosure, and contrasts this process with the method to prepare, wash, and isolate a pillared clay.

In order to more clearly define the terms and phrases used herein, the following definitions are provided. To the extent that any definition or usage provided by any document incorporated herein by reference conflicts with the definition or usage provided herein, the definition or usage provided herein controls.

A. Definitions and Explanation of Terms

Polymetallate. The term "polymetallate", and similar terms such as "polyoxometallate", are used interchangeably in this disclosure to refer to the water-soluble polyatomic cations that include two or more metal atoms (for example, aluminum, silicon, titanium, zirconium, or other metals) along with at least one bridging ligand between metals such as oxo, hydroxy and/or halide ligands. The specific ligands can depend upon the precursor and other factors, such as the process for generating the polymetallate, the solution pH, and the like. For example, the polymetallates of this disclosure can be hydrous metal oxides, hydrous metal oxyhydroxides, and the like, including combinations thereof. Bridging ligands such as oxo ligands which bridge two or more metals can occur in these species, however, polymetallates can also include terminal oxo, hydroxyl, and/or halide ligands.

While many known polymetallate species are anionic, and the suffix "-ate" is often used to reflect an anionic species, the polymetallate (polyoxometallate) species used according to this disclosure are cationic. These materials may be referred to as compounds, species, or compositions, but the person of ordinary skill in the art will understand that polymetallate compositions can contain multiple species in a suitable carrier such as in aqueous solution, depending upon, for example, the solution pH, the concentration, the starting precursor from which the polymetallate is generated in aqueous solution, and the like. For clarity and convenience, these multiple species are referred to collectively as "polymetallates" or "polyoxometallates", regardless of whether the compositions include or consist primarily of cationic polyoxometallates, polyhydroxymetallates, polyoxohydroxymetallate, or species that include other ligands such as halides, or mixtures of compounds. Examples of polymetallates include but are not limited to polyaluminum oxyhydroxychlorides, aluminum chlorhydrate, polyaluminum chloride, or aluminum sesquichlorohydrate compositions, which can include linear, cyclic or cluster compounds. These compositions are referred to collectively as polymetallates, although the term "polymetallate" or "polyoxometallate" are also used to described a composition substantially comprising a single species.

Both isopolymetallates, which contain a single type of metal, and heteropolymetallates, which contain more than one type of metal (or electropositive atoms such as phosphorus) are included in the general terms polymetallate or polyoxometallate. For example, aluminum polymetallates such as provided by aluminum chlorhydrate (ACH) or polyaluminum chloride (PAC) are exemplary of a isopolymetallate. In a further example, the polymetallates of this disclosure can be prepared from a first metal oxide which is subsequently treated with a second metal oxide, a metal halide, a metal oxyhalide, or a combination thereof in an amount sufficient to provide a colloidal suspension of a heteropolymetallate. For example, the first metal oxide can comprise silica, alumina, zirconia and the like, including fumed silica, alumina, or zirconia, and the second metal oxide, the metal halide, or the metal oxyhalide can be obtained from an aqueous solution or suspension of the metal oxide, hydroxide, oxyhalide, or halide, such as $ZrOCl_2$, ZnO, $NbOCl_3$, $B(OH)_3$, $AlCl_3$, or a combination thereof. Therefore, when different metals are employed in this preparation, the resulting species is considered a heteropolymetallate. Both isopolymetallates and heteropolymetallates may be referred to as simply "polymetallates".

In a further aspect, the polymetallates according to this disclosure can be non-alkylating toward transition metal compounds such as metallocene compounds. That is, the subject polymetallates can be absent direct metal-carbon bonds as would be found in aluminoxanes or other organometallic species.

The size and number or metal ions in the polymetallate species can vary considerably, and as such, polymetallates can be considered to encompass both oligomeric or polymeric species. When describing the polymetallate as "comprising", "consisting of", "consisting essentially of", or being "selected from" specified materials such as polyaluminum chloride or aluminum sesquichlorohydrate, it should be understood that the polymetallate species which form when these materials are contacted with water or aqueous base and the like are being described according to the precursor from which they are generated. Therefore, for convenience and for definiteness and clarity pursuant to 35 U.S.C. § 112, the polymetallates may be described herein according to the precursor materials or compositions from which the cationic polymetallates are generated to provide the heterocoagulation reagent.

In an aspect, the polymetallate according to this disclosure can be at least one aluminum polymetallate. Examples include, but are not limited to, aluminum chlorhydrate (ACH), also termed aluminum chlorohydrate, which encompasses multiple water soluble aluminum species, usually considered as having the general formula $Al_nCl_{3n-m}(OH)_m$. These polymetallate species can be referred to as aluminum oxyhydroxychloride compounds or compositions. Another polymetallate that can be used according to this disclosure is polyaluminum chloride (PAC), which is also not a single species, but a collection of multiple aluminum polymeric species which can include linear, cyclic, or cluster compounds, examples of which can contain from 2 to about 30 aluminum atoms, oxo, chloride, and hydroxyl groups. Other examples of aluminum polymetallates include, but are not limited to, compounds having the general formula $[Al_mO_n(OH)_xCl_y]\cdot zH_2O$ such as aluminum sequichlorohydrate, and cluster-type species such as Keggin ions, for example, $[AlO_4Al_{12}(OH)_{24}(H_2O)_{12}]^{7+}\cdot 7[Cl]^-$, sometimes referred to as "$Al_{13}$-mer" polycation. Polyaluminum chloride (PAC), for example, can be produced by combining aqueous hydroxide with $AlCl_3$, and the resulting mixture of aluminum species has a range of basicities. Aluminum chlorhydrate (ACH) is generally considered the most basic, and polyaluminum chloride (PAC) being less basic.

The clay heteroadduct or clay heterocoagulate according to this disclosure include the contact product of [1] a colloidal smectite clay, such as a dioctahedral smectite clay, and [2] a heterocoagulation reagent comprising at least one cationic polymetallate in a liquid carrier such as an aqueous carrier, in which the amount used is sufficient to provide a slurry of the smectite heteroadduct having a zeta potential in a range of from about +25 mV to about −25 mV. Once isolated, the smectite heteroadduct can be heated and dried and calcined to form the support-activator as described herein. Upon calcining, additional reaction of the polymetallate which was initially intercalated into or associated with the smectite may occur, for example, water may be driven off the intercalated polymetallate and additional oxo groups may be formed. In this aspect, the term "polyoxometallate" may be particularly useful to illuminate the calcined product. Regardless, the terms "polymetallate" and "polyoxometallate" are used interchangeably to describe the composition used to contact the colloidal smectite.

The polymetallates of this disclosure may also be termed "polycations" and can include both homopolycations and heteropolycations, depending upon whether the polycation includes a single type of metal or more than one type of metal. For example, hydrotalcite is $[Mg6Al2(OH)16]CO3\cdot 4H2O$ which is a heteropolycation according to this disclosure.

Other examples of polymetallates, which are provided as exemplary only, include the ε-Keggin cations [ε-PMo12O36(OH)4{Ln(H2O)4}4]5+, wherein Ln can be La, Ce, Nd, or Sm. See, for example, Angew. Chem., Int. Ed. 2002, 41, 2398. Other examples include the lanthanide-containing cationic heteropolyoxovanadium clusters having the general formula [Ln2V12O32(H2O)8{Cl}]Cl, wherein Ln can be Eu, Gd, Dy, Tb, Ho, or Er. See, for example, RSC Adv. 2013, 3, 6299-6304.

Finally, reference to "at least one" cationic polymetallate is used to refer to one or more sources of the cationic polymetallate being used in preparation of the heterocoagulation reagent. That is, even when a single source of the cationic polymetallate is used in preparing the heterocoagulation reagent in aqueous solution, and multiple species may result, these multiple species can be collectively referred to as a single or single type of cationic polymetallate. Therefore, reference to multiple or more than one cationic polymetallate is intended to refer to one or more precursor compositions or sources of the cationic polymetallate being used to prepare the heterocoagulation reagent.

Heterocoagulation reagent. The terms "heterocoagulation reagent", "heterocoagulation agent", and the like are used herein to describe a composition comprising any positively charged oligomeric or polymeric metal oxide containing species, existing in solution, or as a colloidal suspension which, when combined with a colloidal clay dispersion in an appropriate ratio, forms a readily filterable solid (as defined herein). "Heterocoagulation reagent" can be used interchangeably with the terms "polymetallate" or "polyoxometallate" to refer to any positively charged oligomeric or polymeric metal oxide containing species that function to form a clay heteroadduct. Therefore, "heterocoagulation reagent" emphasizes that the composition comprising one or more cationic polymetallate species in a liquid carrier, when used in an amount sufficient to provide a slurry having a zeta potential in a range of from about +25 mV to about −25 mV when contacted with a colloidal smectite clay, forms a readily filterable solid. "Heterocoagulation" is a term in the art described by Lagaly in Ullmann's Encyclopedia of Chemistry 2012. Within the context of this disclosure, "heterocoagulation" is defined as the process by which negatively charged colloidal clay particles are combined with positively charged species of a heterocoagulation reagent to form a readily filterable solid, unless otherwise specified. Heterocoagulation is also sometimes referred to in the art and herein as heteroaggregation, such as described by Cerbelaud et al. *Advances in Physics: X,* 2017, vol. 2, 35-53.

Heteroadduct or heterocoagulate. The clay heteroadduct or clay heterocoagulate, and similar terms such as "heterocoagulated clay" or "smectite heteroadduct" and the like refer to the contact product obtained from combining the heterocoagulation reagent and the colloidal clay. That is, the agglomerate formed by the attraction of negatively charged colloidal clay particles with positively charged species in the heterocoagulation reagent is referred to as a "heteroadduct". Reference is made to Wu Cheng et al. in U.S. Pat. No. 8,642,499, which is incorporated herein by reference. In one aspect, these terms refer to the "readily filterable" contact product of a heterocoagulation reagent and a colloidal clay, as defined herein. These terms are used to distinguish the readily filterable heterocoagulate from the contact product of a heterocoagulation reagent and a colloidal clay which are combined in a ratio that provides a product is not readily filterable, for example, the product formed when following a pillared clay synthesis recipe. In the case of a pillared clay recipe, the contact product is not easily filterable and centrifugation is generally required in order to isolate the pillared clay product.

When describing the formation of a heterocoagulated clay using an aluminum-containing heterocoagulation reagent, and unless specified otherwise, the ratio of the pillaring reagent such as an aluminoxychloride (also termed a heterocoagulation reagent) to clay is expressed as mm (also mmol or millimoles) Al/g clay, indicating the number of millimoles of Al in the pillaring or heterocoagulation agent versus the grams of clay. Reference is made to Gu et al., *Clay and clay minerals,* 1990, 38(5), 493-500, which is incorporated herein by reference. Unless specified otherwise, when the pillaring or aluminoxychloride heterocoagulation reagent exists as a soluble solution, the millimoles Al are calculated based on the Al weight percent or wt. % $Al_2O_3$ content provided by the manufacturer. Alternatively and unless specified otherwise, when starting with a solid form of a pillaring or heterocoagulation reagent, that is to be dispersed in a solution, the millimoles of Al are determined by the weight used in the recipe and the empirical formula provided by the manufacturer.

Readily Filterable. The terms "readily filterable", "readily filtered", "easily filterable", "easily filtered or separated" and the like are used herein to describe a composition according to this disclosure in which the solids in a mixture containing a liquid phase can be separated by filtration from the liquid phase without resorting to centrifugation, ultra-centrifugation, or dilute solutions of less than about 2 wt. % solids, long settling times followed by decanting the liquid away from solids, and other such techniques. The terms are generally used herein to describe the clay heteroadduct that is the contact product of a colloidal smectite clay and a heterocoagulation reagent under certain conditions according to this disclosure, which does not require isolation by centrifugation, high dilution and settling or sedimentation tanks, or ultrafiltration. Thus, a readily filterable clay heteroadduct can be isolated or separated in good yield in a matter of minutes or less, or time periods of less than about one hour, from the soluble salts and byproducts of the synthesis, by passing a slurry comprising the heteroadduct through conventional filtering materials, such as sintered glass, metal or ceramic frits, paper, natural or synthetic matte-fiber and the like, under gravity or vacuum filtration conditions.

This disclosure provides some specific experimental and quantitative methods by which filterability can be assessed. For example, specific methods of quantifying filterability of the heteroadduct slurry are provided which demonstrate that the slurry can be considered readily filterable or readily filtered when prepared according to the methods of this disclosure. Colloids or suspensions as described by Lagaly in *Ulmmann's Encyclopedia of Chemistry* 2012, that require long sedimentation times or ultrafiltration are not considered to be "filterable" in the context of this disclosure. The readily filterable suspensions or slurries of this disclosure can afford clear filtrates upon filtration, while "non-readily-filterable" suspensions which take substantially longer to filter can contain particulate matter that is observable as a cloudy or non-clear filtrate to the naked eye, indicative of colloidal clay dispersions. When the support-activator according to this disclosure is prepared to provide a slurry of the smectite heteroadduct having a zeta potential near the upper (positive) boundary of about +25 mV (millivolts) or near the lower (negative) boundary of about −25 mV, upon filtration of the heteroadduct, some cloudiness can be observed in the filtrate, which dimishes as the smectite heteroadduct is prepared using ratios of colloidal smectite clay and heterocoagulation reagent that provide a slurry having a zeta potential closer to or approaching 0 mV.

Colloid. The term "colloid", "colloidal clay", "colloidal solution", "colloidal suspension" and similar terms are used as defined by Gerhard Lagaly in *Ullmannn's Encyclopedia of Industrial Chemistry,* in the chapter entitled "Colloids", which published 15 Jan. 2007. These terms are used interchangeably.

Catalyst composition and catalyst system. Terms such as "catalyst composition," "catalyst mixture," "catalyst system," and the like are used to represent the combination of recited components which ultimately form, or are used to form, the active catalyst according to this disclosure. The use of these terms does not depend upon any specific contacting steps, order of contacting, whether any reaction may occur between or among the components, or any product which may form from any contact of any or all of the recited components. The use of these terms also does not depend upon the nature of the active catalytic site, or the fate of any co-catalyst, the metallocene compound(s), or support-activator, after contacting or combining any of these components in any order. Therefore, these and similar terms encompass the combination of initial recited components or starting components of the catalyst composition, as well as any product(s) which may result from contacting these initial recited starting components, regardless of whether the catalyst composition is heterogeneous or homogenous or includes soluble and insoluble components. The terms "catalyst" and "catalyst system" or "catalyst composition" may be used interchangeably, and such use will be apparent to the skilled person from the context of the disclosure.

Catalyst activity. Unless otherwise specified, the terms "activity", "catalyst activity", "catalyst composition activity" and the like refer to the polymerization activity of a catalyst composition comprising a dried or calcined clay heteroadduct as disclosed herein, which is typically expressed as weight of polymer polymerized per weight of catalyst clay support-activator only, absent any transition metal catalyst components such as a metallocene compound, any co-catalyst such as an organoaluminum compound, or any co-activators such as an aluminoxane, per hour of polymerization. In other words, the weight of polymer produced divided by the weight of calcined clay heteroadduct per hour, in units of g/g/hr (grams per gram per hour).

Activity of a reference or comparative catalyst composition refers to the polymerization activity of a catalyst composition comprising a comparative catalyst composition and is based upon the weight of a comparative ion-exchanged or pillared clay or weight of the clay component by itself that is used to prepare clay heteroadducts. Terms such as "increased activity" or "improved activity" describe the activity of a catalyst composition according to this disclosure which is greater than the activity of a comparative catalyst composition that uses the same catalyst components such as metallocene compound and co-catalyst, except that the comparative catalyst composition utilizes a different support-activator or activator generally, such as a pillared clay, or the clay component used in the catalytic reaction is not a heterocoagulated clay. For example, the increased or improved activity according to this disclosure includes an activity based upon the calcined clay heteroadduct greater than or equal to about 300 grams of polyethylene polymer per gram of calcined heterocoagulated clay per hour (g/g/hr), using a standard set of ethylene homopolymerization conditions. In this aspect, the standard set of ethylene homopolymerization conditions include the following. A 2 L stainless steel reactor equipped with a marine type impeller is set at about 500 rpm, and the slurry polymerization conditions include 1 L of purified isobutane diluent, 90° C. polymerization temperature, 450 total psi ethylene pressure, typically 30 or 60 minute run length, metallocene catalyst composition comprising (1-Bu-3-MeCp)$_2$ZrCl$_2$ with triethylaluminum (TEAL) co-catalyst, optionally using the metallocene as a stock solution which contained the TEAL, which is charged in an amount to provide a metallocene-to-clay ratio of about 7×10$^{-5}$ mmol metallocene/mg calcined clay. Generally one alkyl aluminum cocatalyst was used in the polymerization runs and usually was selected from TEAL or triisobutylaluminum (TIBAL).

Contact product. The term "contact product" is used herein to describe compositions wherein the components are combined together or "contacted" in any order, unless a specific order is stated or required or implied by the context of the disclosure, in any manner, and for any length of time. Although "contact product" can include reaction products, it is not required for the respective components to react with one another, and this term is used regardless of any reaction which may or may not occur upon contacting the recited components. To form a contact product, for example, the recited components can be contacted by blending or mixing or the components can be contacted by adding the components in any order or simultaneously into a liquid carrier. Further, the contacting of any components can occur in the presence or absence of any other component of the compositions described herein, unless otherwise stated or required or implied by the context in which the term is used. Combining or contacting the recited components or any additional materials can be carried out by any suitable method. Therefore, the term "contact product" includes mixtures, blends, solutions, slurries, reaction products, and the like, or combinations thereof. Similarly, the term "contacting" is used herein to refer to materials which may be blended, mixed, slurried, dissolved, reacted, treated, or otherwise contacted in some manner.

Pore diameter (pore size). Nitrogen adsorption/desorption measurements were used to determine pore size and pore volume distributions using the BJH method. Based upon the International Union of Pure and Applied Chemistry (IUPAC) system for classifying porous materials (see Pure & Appl. Chem., 1994, 66, 1739-1758), and Klobes et al., National Institute of Standards and Technology Special Publication 960-17, pore sizes are defined as follows. "Micropore" and "microporous" as used herein refers to pores present in catalysts or catalyst supports produced according to processes of the disclosure having a diameter of less than 20 Å. "Mesopore" and "mesoporous" as used herein refers to pores present in catalysts or catalyst supports produced according to processes of the present disclosure having a diameter in a range of from 20 Å to less than 500 Å (that is from 2 nm to <50 nm). "Macropore" and "macroporous" as used herein refers to pores present in catalysts or catalyst supports produced according to processes of the present disclosure having a diameter equal to or greater than 500 Å (50 nm).

Each of the above definitions of micropore, mesopore and macropore are considered distinct and non-overlapping, such that pores are not counted twice when summing up percentages or values in a distribution of pore sizes (pore diameter distribution) for any given sample.

"d50" means the median pore diameter as measured by porosimetry. Thus, "d50" corresponds to the median pore diameter calculated based on pore size distribution and is the pore diameter above which half of the pores have a larger diameter. The d50 values reported herein are based on nitrogen desorption using the well-known calculation method described by E. P. Barrett, L. G. Joyner and P. P. Halenda ("BJH"), "The Determination of Pore Volume and Area Distributions in Porous Substances. I. Computations from Nitrogen Isotherms," *J. Am. Chem. Soc.*, 1951, 73 (1), pp 373-380.

The "median pore diameter" (MPD) can be calculated based upon, for example, volume, surface area or based on pore size distribution data. Median pore diameter calculated by volume means the pore diameter above which half of the total pore volume exists. Median pore diameter calculated by surface area means that pore diameter above which half of the total pore surface area exists. Similarly, median pore diameter calculated based on pore size distribution means the pore diameter above which half of the pores have a larger diameter according to the pore size distribution determined as described elsewhere herein, for example, through derivation from nitrogen adsorption-desorption isotherms.

Transition metal catalyst. A "transition metal catalyst" refers to a transition metal compound or composition which can function as, or be transformed into, an active olefin polymerization catalyst when contacted with the support-activator of this disclosure, either in its current form or when contacted with a co-catalyst which is capable of transferring or imparting a polymerization-activatable ligand to the transition metal catalyst. The use of the term "catalyst" is not intended to reflect any specific mechanism or that the "transition metal catalyst" itself represents an active site for catalytic polymerization when it is activated or when it has been imparted with a polymerization-activatable ligand. The transition metal catalyst is described according to the transition metal compound or compounds used in the process for preparing a polymerization catalyst, and can include metallocene compounds and defined herein, and related compounds.

Co-catalyst. A "co-catalyst" is used herein to refer to a chemical reagent, compound, or composition which is capable of imparting a ligand to the metallocene which can initiate polymerization when the metallocene is otherwise activated with the support-activator. In other words, the "co-catalyst" is used herein to refer to a chemical reagent, compound, or composition which is capable of providing a polymerization-activatable ligand to a metallocene compound. Polymerization-activatable ligands include, but are not limited to, hydrocarbyl groups such as alkyls such as methyl or ethyl, aryls and substituted aryls such as phenyl or tolyl, substituted alkyls such as benzyl or trimethylsilylmethyl (—CH$_2$SiM$_3$), hydride, silyl and substituted groups such as trimethylsilyl, and the like. Therefore, in an aspect, a co-catalyst can be an alkylating agent, a hydriding agent, a silylating agent, and the like. There are no limitations as to the mechanism by which the co-catalyst provides a polymerization-activatable ligand to the metallocene compound. For example, the co-catalyst can engage in a metathesis reactions to exchange an exchangeable ligand such as a halide or alkoxide on the metallocene compound with a polymerization-activatable/initiating ligand such as methyl or hydride. In an aspect, the co-catalyst is an optional component of the catalyst composition, for example, when the metallocene compounds already includes a polymerization-activatable/initiating ligand such as methyl or hydride. In another aspect, and as understood by the person skilled in the art, even when the metallocene compound includes a polymerization-activatable ligand, a co-catalyst can be used for other purposes, such as to scavenge moisture from the polymerization reactor or process. According to a further aspect and as the context requires or allows, the term "co-catalyst" may refer to an "activator" or may be used interchangeably with "co-catalyst" as explained herein.

Activator. An "activator", as used herein, refers generally to a substance that is capable of converting a metallocene component into an active catalyst system which can polymerize olefins, and is intended to be independent of the mechanism by which such activation occurs. An "activator" can convert the contact product of a metallocene component and a component that provides an activatable ligand (such as an alkyl or a hydride) to the metallocene, for example, when the metallocene compound does not already comprise such a ligand, into a catalyst system which can polymerize olefins. This term is used regardless of the actual activating mechanism. Illustrative activators can include, but are not limited to a support-activator, aluminoxanes, organoboron or organoborate compounds, ionizing compounds such as ionizing ionic compounds, and the like. Aluminoxanes, organoboron or organoborate compounds, and ionizing compounds may be referred to as "activators" or "co-activators" when used in a catalyst composition in which a support-activator is present, but the catalyst composition is supplemented by one or more aluminoxane, organoboron, organoborate, ionizing compounds, or other co-activators.

Support-Activator. The term "support-activator" as used herein, refers to an activator in a solid form, such as ion-exchanged-clays, protic-acid-treated clays, or pillared clays, and similar insoluble supports which also function as activators. When the support-activator is combined with a metallocene with an activatable ligand or optionally with a metallocene and a co-catalyst which can provide an activatable ligand, provides a catalyst system which can polymerize olefins.

Ion-exchanged clay. The term "ion-exchanged clay" as used herein is understood by the person skilled in the art as a clay (also referred to as a "monoionic" or "monocationic" clay) in which the exchangeable ions of a naturally-occurring or synthetic clay have been replaced by or exchanged with another selected ion or ions. Ion exchange can occur by treatment of the naturally-occurring or synthetic clay with a source of the selected cation, usually from concentrated ionic solutions such as 2 N aqueous solutions of the cation, including through multiple exchange steps, for example, three exchange steps. The exchanged clay can be subsequently washed several times with deionized water to remove excess ions produced by the treatment process, for example as described in Sanchez, et al., *Colloids and Surfaces A: Physicochemical and Engineering Aspects*, 2013, 423, 1-10, and Kawamura et al., *Clay and Clay Minerals*, 2009, 57(2), 150-160. Generally, centrifugation is used to isolate the clay from solution between ion treatments and washings.

Metallocene compound. The term "metallocene" or "metallocene compound" as used herein, describes a transition metal or lanthanide metal compound comprising at least one substituted or unsubstituted cycloalkadienyl-type ligand or alkadienyl-type ligand, including heteroatom analogs thereof, regardless of the specific bonding mode, for example, regardless of whether the cycloalkadienyl-type ligand or alkadienyl-type ligand are bonded to the metal in an $\eta^5$-, $\eta^3$-, or $\eta^1$-bonding mode, and regardless of whether more than one of these bonding modes is accessible by such ligands. In this disclosure, the term "metallocene" is also used to refer to a compound comprising at least one pi-bonded allyl-type ligand in which the $\eta^3$-allyl is not part of a cycloalkadienyl-type or alkadienyl-type ligand, which can be used as the transition metal compound component of the catalyst composition described herein. Therefore, "metallocene" includes compounds with substituted or unsubstituted $\eta^3$ to $\eta^5$-cycloalkadienyl-type and $\eta^3$ to $\eta^5$-alkadienyl-type ligands, $\eta^3$-allyl-type ligands, including heteroatom analogs thereof, and including but not limited to cyclopentadienyl ligands, indenyl ligands, fluorenyl ligands, $\eta^3$-allyl ligands, pentadienyl ligands, boratabenzenyl ligands, 1,2-azaborolyl ligands, 1,2-diaza-3,5-diborolyl ligands, substituted analogs thereof, and partially saturated analogs thereof. Partially saturated analogs include compounds comprising partially saturated $\eta^5$-cycloalkadienyl-type ligands, examples of which include but are not limited to tetrahydroindenyl, tetrahydrofluorenyl, octahydrofluorenyl, partially saturated indenyl, partially saturated fluorenyl, substituted analogs thereof, and the like. In some contexts, the metallocene is referred to simply as the "catalyst," in much the same way the term "co-catalyst" is used herein to refer to, for example, an organoaluminum compound. Therefore, a metallocene ligand can be considered in this disclosure to include at least one substituted or at one unsubstituted cyclopentadienyl, indenyl, fluorenyl, tetrahydroindenyl, tetrahydrofluorenyl, octahydrofluorenyl, pentadienyl, allyl, boratabenzenyl, 1,2-azaborolyl, or 1,2-diaza-3,5-diborolyl ligand, including substituted analogs thereof. For example, any substituent can be selected independently from a halide, a $C_1$-$C_{20}$ hydrocarbyl, a $C_1$-$C_{20}$ heterohydrocarbyl, a $C_1$-$C_{20}$ organoheteryl, a fused $C_4$-$C_{12}$ carbocyclic moiety, or a fused $C_4$-$C_{11}$ heterocyclic moiety having at least one heteroatom selected independently from nitrogen, oxygen, sulfur, or phosphorus.

Organoaluminum compounds and organoboron compounds. The terms organoaluminum compound and an organoboron compounds as used herein include neutral compounds such as $AlMe_3$ and $BEt_3$ and also include anionic complexes such as $LiAlMe_4$, $LiAlH_4$, $NaBH_4$, and $LiBEt_4$, and the like. Thus, unless otherwise specified, hydride compounds of aluminum and boron are include in the definitions of organoaluminum and organoboron compounds, respectively, whether the compound is neutral or anionic.

Pillared clay. In this disclosure, a "pillared clay" is defined as a clay species in which ordered layers with basal spacing are substantially greater than 9 Å to 13 Å. When a powder clay sample is analyzed using an X-ray diffraction apparatus capable of scanning 2θ angles of 2° or greater, species containing such pillared ordering are typically observed to possess a substantial peak at 2θ values between 2° to 9°. These are typically prepared by introduction of a pillaring agent, for example, an oxygen-containing inorganic cation such as an oxygen-containing cation of lanthanum, aluminum, or iron. Aluminum pillared clays are often prepared by contacting the pillaring agent with the clay in an amount ranging from about 5 mmol Al/g clay or 6 mmol Al/g clay, up to about 30 mmol Al/g clay. Typical pillared clay preparations may contrast with preparations of the support-activator according to this disclosure, in which the support-activator disclosed herein can be prepared using less than or equal to about 2.0 mmol Al/g clay, less than or equal to about 1.7 mmol Al/g clay, less than or equal to about 1.5 mmol Al/g clay, less than or equal to about 1.3 mmol Al/g clay, or less than or equal to about 1.2 mmol Al/g clay, but greater than about 0.75 mmol Al/g clay, or greater than about 1.0 mmol Al/g clay. Therefore, in an aspect, the pillaring agent used to form a pillared clay can be selected from the same heterocoagulation reagents used to form the heterocoagulated clay of this disclosure. As explained herein, even during the preparation of the smectite heteroadducts as disclosed herein, some pillared clay species may be formed.

Intercalated. The terms "intercalated" or "intercalation" are terms of the art which indicate insertion of a material into the interlayers of a clay substrate. The terms are used herein in the manner understood by the person of skill in the art, and as described in U.S. Pat. No. 4,637,992, unless otherwise noted.

Basal spacing. The term "basal spacing", "basal d001 spacing", or "d001 spacing" when used in the context of smectite clays such as montmorillonite, refers to the distance, usually expressed in angstroms or nanometers, between similar faces of adjacent layers in the clay structure. Thus, for example, in the 2:1 family of smectite clays, including montmorillonite, the basal distance is the distance from the top of a tetrahedral sheet to the top of the next tetrahedral sheet of an adjacent 2:1 layer and including the intervening octahedral sheet, with or without modification or pillaring. Basal spacing values are measured using X-ray diffraction analysis (XRD) of the d001 plane. Natural montmorillonite as found for example in bentonite, has a basal spacing range of from about 12 Å to about 15 Å. (See, for example, Fifth National Conference on Clays and Clay Minerals, National Academy of Sciences, National Research Council, Publication 566, 1958: Proceedings of the Conference: "Heterogeneity In Montmorillonite", J. L. McAtee, Jr., pp. 279-88 and Table 1 at p. 282.) The XRD test method for determining basal spacing is described in: Pillared Clays and Pillared Layered Solids, R. A. Schoonheydt et al., *Pure Appl. Chem.*, 71(12), 2367-2371, (1999); and U.S. Pat. No. 5,202,295 (McCauley) at column 27, lines 22-43.

Zeta potential. The term "zeta potential" as used herein refers to the difference in electrical potential between the juncture of the Stern layer (a layer of firmly-attached counterions which forms to neutralize the surface charge of a colloidal particle) and diffuse layer (a cloud of loosely attached ions residing farther from the particle surface than the Stern layer), and the bulk solution or slurry. This property is expressed in units of voltage, for example millivolts (mV). Zeta potential can be derived by quantifying the "Electrokinetic Sonic Amplitude Effect" (ESA), which is the generation of ultrasound waves as a result of applying an electric potential across a colloidal suspension, as described in U.S. Pat. No. 5,616,872, which is incorporated herein by reference.

Hydrocarbyl group. As used herein, the term "hydrocarbyl" group is used according to the art-recognized IUPAC definition, as a univalent, linear, branched, or cyclic group formed by removing a single hydrogen atom from a parent hydrocarbon compound. Unless otherwise specified, a hydrocarbyl group can be aliphatic or aromatic; saturated or unsaturated; and can include linear, cyclic, branched, and/or fused ring structures; unless any of these are otherwise specifically excluded. See IUPAC *Compendium of Chemical Terminology*, $2^{nd}$ Ed (1997) at 190. Examples of hydrocarbyl groups include, but are not limited to, aryl, alkyl, cycloalkyl, alkenyl, cycloalkenyl, cycloalkadienyl, alkynyl, aralkyl, aralkenyl, and aralkynyl groups and the like.

Heterohydrocarbyl group. The term "heterohydrocarbyl" group is used in this disclosure to encompass a univalent, linear, branched, or cyclic group, formed by removing a single hydrogen atom from a carbon atom of a parent "heterohydrocarbon" molecule in which at least one carbon atom is replaced by a heteroatom. The parent heterohydrocarbon can be aliphatic or aromatic. Examples of "heterohydrocarbyl" groups include halide-substituted, nitrogen-substituted, phosphorus-substituted, silicon-substituted, oxygen-substituted, and sulfur-substituted hydrocarbyl groups in which a hydrogen has been removed form a carbon atom to generate a free valence. Examples of heterohydrocarbyl groups include, but are not limited to, —CH2OCH3, —CH2SPh, —CH2NHCH3, —CH2CH3NMe2, —CH2SiMe3, —CMe2SiMe3, —CH2(C6H4-4-OMe), —CH2(C6H4-4-NHMe), —CH2(C6H4-4-PPh2), —CH2CH3PEt2, —CH2Cl, —CH2(2,6-C6H3Cl2), and the like.

Heterohydrocarbyl encompasses both heteroaliphatic groups (including saturated and unsaturated groups) and heteroaromatic groups. Therefore, heteroatom-substituted vinylic groups, heteroatom-substituted alkenyl groups, heteroatom-substituted dienyl groups, and the like are all encompassed by heterohydrocarbyl groups.

Organoheteryl group. The term "organoheteryl" group is also used in accordance with its art-recognized IUPAC definition, as univalent group containing carbon, which is thus organic, but which has its free valence at an atom other than carbon. See IUPAC *Compendium of Chemical Terminology*, $2^{nd}$ Ed (1997) at 284. An organoheteryl group can be linear, branched, or cyclic, and includes such common groups as alkoxy, aryloxy, organothio (or organylthio), organogermanium (or organylgermanium), acetamido, acetonylacetanato, alkylamido, dialkylamido, arylamide, diarylamido, trimethylsilyl, and the like. Groups such as —OMe, —OPh, —S(tolyl), —NHMe, —NMe$_2$, —N(aryl)$_2$, —SiMe$_3$, —PPh$_2$, —O$_3$S(C$_6$H$_4$)Me, —OCF$_2$CF$_3$, —O$_2$C (alkyl), —O$_2$C(aryl), —N(alkyl)CO(alkyl), —N(aryl)CO (aryl), —N(alkyl)C(O)N(alkyl)$_2$, hexafluoroacetonylacetanato, and the like.

Organyl group. An organyl group is used in this disclosure in accordance with the IUPAC definition to refer to any organic substituent group, regardless of functional type, having one free valence at a carbon atom, e.g. CH$_3$CH$_2$—, ClCH$_2$C—, CH$_3$C(=O)—, 4-pyridylmethyl, and the like. An organyl group can be linear, branched, or cyclic, and the term "organyl" may be used in conjunction with other terms, as in organylthio- (for example, MeS—) and organyloxy.

Heterocyclyl group. The IUPAC Compendium compares organyl groups to other groups such as heterocyclyl groups and organoheteryl groups. These terms are set out in the IUPAC *Compendium of Chemical Terminology*, $2^{nd}$ Ed (1997) as follows, which demonstrates the convention to associate the "-yl" suffix on the portion of the molecule or group that bears the valence from the missing hydrogen. Thus, heterocyclyl groups are defined as univalent groups formed by removing a hydrogen atom from any ring atom of a heterocyclic compound. For example, both a piperidin-1-yl group and a piperidin-2-yl group shown below, wherein the lines drawn from the nitrogen atom or carbon atom represent an open valence and not a methyl group, are heterocyclyl groups.

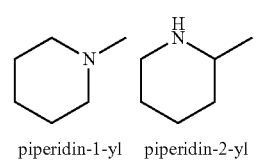

piperidin-1-yl   piperidin-2-yl

However, the piperidin-1-yl group is also considered an organoheteryl group, whereas the piperidin-2-yl group is also considered a heterohydrocarbyl group. Thus, the valence of a "heterocyclyl" can occur on any appropriate cyclic atom, whereas the valence of a "organoheteryl"

occurs on a heteroatom and the valence of a heterohydrocarbyl occurs on a carbon atom.

Hydrocarbylene group and hydrocarbylidene group. A "hydrocarbylene" group is also defined according to its ordinary and customary meaning, as set out in the IUPAC *Compendium of Chemical Terminology*, 2$^{nd}$ Ed (1997), as a divalent group formed by removing two hydrogen atoms from a hydrocarbon, the free valencies of which are not engaged in a double bond. Examples of hydrocarbylene groups include, for example, 1,2-phenylene, 1,3-phenylene, 1,3-propandiyl (—CH2CH2CH2-), cyclopentylidene (=CC4H8), or methylene which is bridging (—CH2-) and does not form a double bond. A hydrocarbylene group in which the free valencies are not engaged in a double bond is distinguished from a hydrocarbylidene group such as an alkylidene group.

A "hydrocarbylidene" group is a divalent group formed from a hydrocarbon by removing two hydrogen atoms from the same carbon atom, the free valencies of which are part of a double bond. An alkylidene group is an exemplary hydrocarbylidene and is defined as a divalent group formed from an alkane by removing two hydrogen atoms from the same carbon atom, the free valencies of which are part of a double bond. Examples of alkylidene groups such as =CHMe, CHEt, =CMe$_2$, =CHPh, or methylene in which the methylene carbon forms a double bond (=CH$_2$).

Heterohydrocarbylene group and heterohydrocarbylidene group. The term "heterohydrocarbylene" group, by analogy to hydrocarbylene group, is used to refer to a divalent group formed by removing two hydrogen atoms from a parent heterohydrocarbon molecule, the free valencies of which are not engaged in a double bond. The hydrogen atoms can be removed from two carbon atoms, two heteroatoms, or one carbon and one heteroatom, such that the free valencies are not engaged in a double bond. Examples of "heterohydrocarbylidene" groups include but are not limited to —CH2OCH2-, —CH2NPhCH2-, —SiMe2(1,2-C6H4) SiMe2-, —CMe2SiMe2-, —CH2NCMe3-, —CH2CH2PMe-, —CH2[1,2-C6H3(4-OMe)]CH2-, -and the like.

By analogy to a hydrocarbylidene, a "heterohydrocarbylidene" group is a divalent group formed from a heterohydrocarbon by removing two hydrogen atoms from the same carbon atom, the free valencies of which are part of a double bond. Examples of heterohydrocarbylidene groups include, but are not limited to groups such as =CHNMe$_2$, =CHOPh, =CMeNMeCH$_2$Ph, =CHSiMe$_3$, =CHCH$_2$Cl, and the like.

Halide and halogen. The terms "halide" and "halogen" are used herein to refer to the ions or atoms of fluorine, chlorine, bromine, or iodine, individually or in any combination, as the context and chemistry allows or dictates. These terms may be used interchangeably regardless of charge or the bonding mode of these atoms.

Polymer. The term "polymer" is used herein generically to include olefin homopolymers, copolymers, terpolymers, and so forth. A copolymer is derived from an olefin monomer and one olefin comonomer, while a terpolymer is derived from an olefin monomer and two olefin comonomers. Accordingly, "polymer" encompasses copolymers, terpolymers, and the like, derived from any olefin monomer and comonomer(s) disclosed herein. Similarly, an ethylene polymer would include ethylene homopolymers, ethylene copolymers, ethylene terpolymers, and so forth. Therefore, an olefin copolymer, such as an ethylene copolymer, can be derived from ethylene and a comonomer, such as propylene, 1-butene, 1-hexene, or 1-octene. If the monomer and comonomer were ethylene and 1-hexene, respectively, the resulting polymer would be categorized an as ethylene/1-hexene copolymer. In like manner, the term "polymerization" includes homopolymerization, copolymerization, terpolymerization, and so forth. For example, a copolymerization process includes contacting one olefin monomer such as ethylene and one olefin comonomer such as 1-hexene to produce a copolymer. Well-known abbreviations for polyolefin types, such as "HDPE" for high density polyethylene, may be used herein.

When the context allows or requires, the term "polymer" is used herein to refer to inorganic compositions used in the preparation and formation of pillars in modified clays. For example, pillars are known to be formed in smectite clays based on the use of a polymeric cationic hydroxy metal complexes of metals such as aluminum, zirconium, and/or titanium, such as aluminum chlorohydroxide complexes (also known as "chlorhydrate" or "chlorhydrol"). Inorganic copolymers comprising such complexes are also known. See, for example, U.S. Pat. Nos. 4,176,090 and 4,248,739. Furthermore, unless otherwise expressly stated, the term polymer is not limited by molecular weight and therefore encompasses both lower molecular weight polymers, sometimes referred to as oligomers, as well as higher molecular weight polymers.

Procatalyst. The term "procatalyst" as used herein means a compound that is capable of polymerizing, oligomerizing or hydrogenating olefins when activated by an aluminoxane, borane, borate or other acidic activator, whether a Lewis acid or a Brønsted acid, or when activated by a support-activator as disclosed herein.

Additional Explanations of Terms. The following additional explanations of terms are provided to fully disclosed aspects of the disclosure and claims.

Unless specified otherwise or unless the context requires otherwise, the chemical formulas for the polymetallates used as heterocoagulation agents disclosed herein are empirical formulas. Therefore, formulas such as (Al,Mg)2Si4O10 (OH)2(H2O)8 are empirical polymetallate formulas which can be considered to encompass oligomeric or polymeric species, and formulas such as FeOx(OH)y(H2O)z]n+ also can be considered to encompass oligomers or polymers in which the variable subscripts are not required to be integers.

Several types of numerical ranges are disclosed herein, including but not limited to, numerical ranges of a number of atoms, basal spacings, weight ratios, molar ratios, percentages, temperatures, and so forth. When disclosing or claiming a range of any type, Applicant's intent is to disclose or claim individually each possible number that such a range could reasonably encompass, consistent with the written description and the context, and including the end points of the range and any sub-ranges and combinations of sub-ranges encompassed therein. For example, when the Applicant discloses or claims a chemical moiety that has a certain number of carbon atoms, such as a C$_1$ to C$_{12}$ (or C$_1$ to C$_{12}$) alkyl group, or in alternative language having from 1 to 12 carbon atoms, the Applicant's intent is to refer to a moiety that can be selected independently from an alkyl group having 1, 2, 3, 4, 5, 6, 7, 8, 9, 10, 11, or 12 carbon atoms, as well as any range between these two numbers (for example, a C1 to C6 alkyl group), and also including any combination of ranges between these two numbers (for example, a C2 to C4 and C6 to C8 alkyl group). Applicants reserve the right to proviso out or exclude any individual members of any such range or group, including any sub-ranges or combinations of sub-ranges within the group, that can be claimed according to a range or in any similar manner, if for any reason Applicants choose to claim less than the full measure of the disclosure, for example, to account for a reference that Applicants may be unaware of at the time of the filing of the application.

In another aspect, any range of numbers recited in the specification or claims, such as that representing a particular set of properties, units of measure, conditions, physical states or percentages, is intended to literally incorporate expressly herein by reference or otherwise, any number falling within such range, including any subset of numbers within any range so recited. For example, whenever a numerical range with a lower limit, RL, and an upper limit RU, is disclosed, any number R falling within the range is specifically disclosed. In particular, the following numbers R within the range are specifically disclosed:

$$R=RL+k(RU-RL),$$

wherein k is a variable ranging from 1% to 100% with a 1% increment, e.g., k is 1%, 2%, 3%, 4%, 5% . . . 50%, 51%, 52% . . . 0.95%, 96%, 97%, 98%, 99%, or 100%. Moreover, any numerical range represented by any two values of R, as calculated above is also specifically disclosed.

For any particular compound disclosed herein, any general or specific structure presented also encompasses all conformational isomers, regioisomers, and stereoisomers that may arise from a particular set of substituents, unless stated otherwise. Similarly, unless stated otherwise, the general or specific structure also encompasses all enantiomers, diastereomers, and other optical isomers whether in enantiomeric or racemic forms, as well as mixtures of stereoisomers, as would be recognized by a skilled artisan.

Unless otherwise stated, values or ranges may be expressed in this disclosure using the term "about", for example, "about" a stated value, greater than or less than "about" a stated value, or in a range of from "about" one value to "about" another value. When such values or ranges are expressed, other embodiments disclosed include the specific recited value, a range between specific recited values, and other values close to the specific recited value. In an aspect, use of the term "about" means±15% of the stated value, ±10% of the stated value, 5% of the stated value, or +3% of the stated value. For example, when the term "about" is used as a modifier for, or in conjunction with, a variable, characteristic or condition, it is intended to convey that the numbers, ranges, characteristics and conditions disclosed herein are sufficiently flexible that practice of this disclosure by those skilled in the art using temperatures, rates, times, concentrations, amounts, contents, properties such as basal spacing, size, including pore size, pore volume, surface area, and the like that are somewhat outside of the stated range or different from a single stated value, may achieve the desired results as described in the application, such as the preparation of porous catalyst carrier particles having defined characteristics and their use in preparing active olefin polymerization catalysts and olefin polymerization processes using such catalysts.

The terms "a," "an," "the", and the like (such as "this") are intended to include plural alternatives such as at least one, unless otherwise specified. For example, the disclosures of "a support-activator," "an organoaluminum compound," or "a metallocene compound" are meant to encompass one, or mixtures or combinations of more than one, catalyst support-activator, organoaluminum compound, or metallocene compound, respectively.

The term "comprising" and variations thereof such as "comprises", "comprised of", "having", "including," and the like, as recited in transitional phrases or the specification, are inclusive and open-ended and do not exclude additional, unrecited elements or method steps. The transitional phrase "consisting of" and variations thereof exclude any element, step, or ingredient not specified in the claim. The transitional phrase "consists essentially of" limits the scope of the claim to the specified components or steps and those that do not materially affect the basic and novel characteristics of the claimed invention. Unless otherwise indicated, describing a compound or composition as "consisting essentially of" should not be construed as "comprising," as this phrase is intended to describe the recited component that includes materials which do not significantly alter composition or method to which the term is applied. For example, a precursor or catalyst component can consist essentially of a material which can include impurities commonly present in a commercially produced sample of the material when prepared by a certain procedure. When a claim includes different features and/or feature classes (for example, a method step, feedstock features, and/or product features, among other possibilities), the transitional terms comprising, consisting essentially of, and consisting of apply only to feature class to which is utilized and it is possible to have different transitional terms or phrases utilized with different features within a claim. For example a method can comprise several recited steps (and other non-recited steps) but utilize a catalyst system preparation consisting of specific or alternatively consisting essentially of specific steps but utilize a catalyst system comprising recited components and other non-recited components. When compositions and processes are described in terms of "comprising" various components or steps, the compositions and processes can also "consist essentially of" or "consist of" the various components or process steps.

Unless otherwise defined with respect to a specific property, characteristic or variable, the terms "substantial" and "substantially" as applied to any criteria such as a property, characteristic or variable, means to meet the stated criteria in sufficient measure that one skilled in the art would understand that the benefit to be achieved, or the condition or property value desired is met. For example, the term "substantially" may be used when describing a metallocene catalyst or catalyst system which is substantially free of or substantially absent an aluminoxane, a borate activator, a protic-acid-treated clay, or a pillared clay. In other words, the terms "substantial" and "substantially" serves reasonably to describe the subject matter so that its scope will be understood by persons skilled in the relevant art and to distinguish the claimed subject matter from any prior art. In one aspect, "substantially free" can be used to describe a composition in which none of the recited component the composition is substantially free of was added to the composition, and only impurity amounts such as amounts derived from the purity limits of the other components or generated as a byproduct are present. In a further aspect, when a composition is said to be "substantially free" of a particular component, the composition may have less than 20 wt. % of the component, less than 15 wt. % of the component, less than 10 wt. % of the component, less than 5 wt. % of the component, less than 3 wt. % of the component, less than 2 wt. % of the component, less than 1 wt. % of the component, less than 0.5 wt. % of the component, or less than 0.1 wt. % of the component.

The terms "optionally", "optional" and the like with respect to a claim element are intended to mean that the subject element is required, or alternatively, is not required, and both alternatives are intended to be within the scope of the claim, and it is envisioned that the claim can encompass either or both alternatives.

References to the Periodic Table or groups of elements within the Periodic Table refer to the Periodic Table of the Elements, published by the International Union of Pure and Applied Chemistry (IUPAC), published on-line at http://old.iupac.org/reports/periodic_table/; version dated 19 Feb. 2010. Reference to a "group" or "groups" of the Periodic Table as reflected in the Periodic Table of Elements using the IUPAC system for numbering groups of elements as Groups 1-18. To the extent that any Group is identified by a Roman numeral according, for example, to the Periodic Table of the Elements as published in "Hawley's Condensed Chemical Dictionary" (2001) (the "CAS" system) it will further identify one or more element of that Group so as to avoid confusion and provide a cross-reference to the numerical IUPAC identifier.

Various patents, publications and documents are disclosed and referenced herein. Each reference cited in this disclosure is incorporated herein by reference in its entirety, whether a patent, a publication, or other document, and unless otherwise indicated.

References which may provide some background information related to this disclosure include, for example, U.S. Pat. Nos. 3,962,135; 4,367,163; 5,202,295; 5,360,775; 5,753,577; 5,973,084; 6,107,230; 6,531,552; 6,559,090; 6,632,894; 6,943,224; 7,041,753; 7,220,695; 9,751,961; and U.S. Patent Application Publication Nos. 2018/0142047 and 2018/0142048; each of which is incorporated by reference herein in its entirety. Additional publications which may provide some background information related to this disclosure include:

Gu, B.; Doner, H. E., *Clay and Clay Minerals*, 1991, 38(5), 493-500;
Covarrubias et al., *Applied Catalysis A: General*, 347(2), 15 Sep. 2008, 223-233;
Tayano et al., *Clay Science*, 2016, 20, 49-58;
Tayano et al., *Macromolecular Reaction Engineering*, 2017 (11), 201600017;
*Journal of Molecular Catalysis A: Chemical*, 2016, 420, 228-236;
*Clay Science*, 2016, 20, 49-58;
Finevich et al., *Russian Journal of General Chemistry* 2007, 77(12), 2265-2271;
Bibi, Singh, and Silvester, *Applied Geochemistry*, 2014, 51, 170-183;
Sharma et al., *Journal of Material Science*, 2018, 53, 10095-10110;
Okada et al., *Clay Science*, 2003, 12, 159-163;
Sucha et al., *Clay Minerals*, 1996, 31, 333-335;
Vlasova et al., *Science of Sintering*, 2003, 35, 155-166;
Kline and Fogler, *Industrial & Engineering Chemistry Fundamentals*, 1981, 20(2), 155-161;
Ocelli, *Clay and Clay Minerals*, 2000, 48(2), 304-308;
Kooli, *Microporous and Mesoporous Materials;* 2013, 167, 228-236;
Pergher and Bertella, *Materials*, 2017, 10, 712; and
Tsvetkov et al., *Clay and Clay Minerals*, 1990, 38(4), 380-390;
each of which is incorporated by reference herein in its entirety.

B. General Description

The support-activator of this disclosure can be formed by starting with a slurry of an expanding-type clay in a liquid carrier, such as smectite or dioctahedral smectite clay, and contacting the clay in the slurry with a heterocoagulation reagent, which comprises at least one cationic polymetallate made under the conditions specified herein. A heterocoagulated clay forms which can be isolated very conveniently by a filtration and subsequently dried and calcined, to provide a support-activator that is useful to support and activate metallocene catalyst toward olefin polymerization. Formation of the clay heteroadduct in good yield can be effected by controlling the ratio or amount of heterocoagulation reagent used relative to the clay, which is measured by a zeta potential measurement of the slurry in which the clay heteroadduct is formed. Thus, the clay heteroadduct comprises the contact product in a liquid carrier of [1] a smectite clay such as a colloidal smectite clay and [2] a heterocoagulation reagent comprising at least one cationic polymetallate and in an amount sufficient to provide a slurry of the resulting clay heteroadduct having a zeta potential in a range of from about positive 25 mV (millivolts) to about negative 25 mV.

When a smectite clay is contacted with a heterocoagulation reagent in a liquid carrier using a greater number of moles of cationic polymetallate per gram of clay than specified immediately above, such that the resulting slurry has a zeta potential greater than about +25 mV, which with a cationic polymetallate such as aluminum chlorhydrate (ACH) and colloidal smectite clay can occur when using a recipe of greater than about 2.3 mmol Al/g clay, greater than about 2.5 mmol Al/g clay, greater than about 2.7 mmol Al/g clay, or greater than about 3.0 mmol Al/g clay (millimoles of Al per gram of clay), large amounts of the corresponding pillared clay can form. While a slurry of the desired smectite heteroadduct can include some corresponding pillared clay as observed by powder X-ray diffraction (XRD), and formation of some pillared clay is secondary or incidental to the support-activator formation, a support-activator having too high a concentration of pillared clay as compared to the clay heteroadduct results in a loss of the ready filterability of the slurry, such that the ease of isolation of the support-activator is compromised. When a smectite clay is contacted with a heterocoagulation reagent in a liquid carrier using a smaller number of moles of cationic polymetallate per gram of clay, such that the resulting slurry has a zeta potential less than about −25 mV, which when using a cationic polymetallate aluminum chlorhydrate (ACH) and colloidal smectite clay can occur at less than about 0.5 mmol Al/g clay, less than about 0.6 mmol Al/g clay, or less than about 0.8 mmol Al/g clay, or in some cases, less than about 1.0 mmol Al/g clay (millimoles of Al per gram of clay), a small amount of the clay heteroadduct is formed and a substantial amount of the colloidal smectite clay remains.

It has also been unexpectedly discovered that, in contrast to pillared clay support-activators and similar clay-based activators used to support and activate metallocene catalysts, the clay heteroadduct support-activator of this disclosure can be used with few or no subsequent washing steps following isolation by filtration. That is, the isolated heteroadduct support-activator can be used directly in catalyst formation with a metallocene, and co-catalysts such as aluminum alkyls if desired, without extensive or time-consuming purification, washing, or other such purification stages commonly used in other clay-based supports. This advantage can provide a substantial economic advantage and enhanced ease of use when preparing olefin polymerization catalysts.

Accordingly, in one aspect, this disclosure provides a support-activator comprising an isolated smectite heteroadduct, the smectite heteroadduct comprising the contact product in a liquid carrier of [1] a colloidal smectite clay and [2] a heterocoagulation reagent comprising at least one cationic polymetallate and in an amount sufficient to provide a slurry of the smectite heteroadduct having a zeta potential in a range of from about positive 25 mV (millivolts) to about negative 25 mV.

This disclosure also provides, in another aspect, a method of making a support-activator comprising a smectite heteroadduct, the method comprising:
a) providing a colloidal smectite clay;
b) contacting in a liquid carrier the colloidal smectite clay with a heterocoagulation reagent comprising at least one cationic polymetallate and in an amount sufficient to provide a slurry of a smectite heteroadduct having a zeta potential in a range of from about positive 25 mV (millivolts) to about negative 25 mV.

This method can further comprise the step of c) isolating the smectite heteroadduct from the slurry.

According to a further aspect, this disclosure provides a catalyst composition for olefin polymerization, the catalyst composition comprising:
a) at least one transition metal catalyst, such as a metallocene compound;
b) optionally, at least one co-catalyst; and
c) at least one support-activator comprising a calcined smectite heteroadduct, the smectite heteroadduct comprising the contact product of [1] a colloidal smectite clay and [2] a heterocoagulation reagent comprising at least one cationic polymetallate in a liquid carrier and in an amount sufficient to provide a slurry of the smectite heteroadduct having a zeta potential in a range of from about positive 25 mV (millivolts) to about negative 25 mV.

In yet a further aspect, there is provided a method of making an olefin polymerization catalyst, the method comprising contacting in any order:
a) at least one transition metal catalyst, such as a metallocene compound;
b) optionally, at least one co-catalyst; and
c) at least one support-activator comprising a calcined smectite heteroadduct as described according to this disclosure.

Still another aspect of this disclosure is a process for polymerizing olefins comprising contacting at least one olefin monomer and a catalyst composition under polymerization conditions to form a polyolefin, wherein the catalyst composition comprises:
a) at least one transition metal catalyst, such as a metallocene compound;
b) optionally, at least one co-catalyst; and
c) at least one support-activator comprising a calcined smectite heteroadduct, as described herein.

Reference is made to the Examples, data, and Aspects of the Disclosure section of this written description in which detailed information of the various aspects and embodiments are set out for making and using the support-activator and catalyst compositions described herein. The following sections set out some specific details in the components used to prepare the catalyst compositions and using the catalyst compositions to polymerize olefins.

C. Colloidal Smectite Clays

In addition to the Definitions section, the following disclosure provides additional information related to the smectite clays.

An expanding-type clay, such as smectite or the 2:1 dioctahedral smectite clay, or a combination of expanding-type clays, can be used in the preparation of the support-activator described herein. These expanding-type clays may be described as phyllosilicates or phyllosilicate clays, because certain members of the clay minerals group of the phyllosilicates can be used. Suitable starting clays can include the layered, naturally occurring or synthetic smectites. Starting clays can also include the dioctahedral smectite clays. Further, suitable starting clays may also include clays such as montmorillonites, sauconites, nontronites, hectorites, beidellites, saponites, bentonites, or any combination thereof. Smectites are 2:1 layered clay minerals that carry a lattice charge and can expand when solvated with water and alcohols. Therefore, suitable starting clays can include, for example, the monocation exchanged, dioctahedral smectites, such as the lithium-exchanged clays, sodium-exchanged clays, or potassium-exchanged clays, or a combination thereof.

Water can also be coordinated to the layered clay structural units, either associated with the clay structure itself or coordinated to the cations as a hydration shell. When dehydrated, the 2:1 layered clays have a repeat distance or d001 basal spacing of from about 9 Å (Angstrom) to about 12 Å (Angstrom) in the powder X-Ray Diffraction (XRD); or alternatively, in a range of from about 10 Å (Angstrom) to about 12 Å (Angstrom) in the powder X-Ray Diffraction (XRD).

The layered smectite clays are termed 2:1 clays, because their structures are "sandwich" structures which include two outer sheets of tetrahedral silicate and an inner sheet of octahedral alumina which is sandwiched between the silica sheets. Therefore, these structures are also referred to as "TOT" (tetrahedral-octahedral-tetrahedral) structures. These sandwich structures are stacked one upon the other to yield a clay particle. This arrangement can provide a repeated structure about every nine and one-half angstroms (Å), as compared with the pillared or intercalated clays produced by the insertion of "pillars" of inorganic oxide material between these layers to provide a larger space between the natural clay layers.

In an aspect, the clay used to prepare the support-activator can be a colloidal smectite clay. Thus, the smectite clay can have an average particle size of less than about 10 m (microns), less than about 5 m, less than about 3 m, less than 2 m, or less than 1 μm, wherein the average particle size is greater than about 15 nm, greater than about 25 nm, greater than about 50 nm, or greater than about 75 nm. That is, any ranges of clay particle sizes between these recited numbers are disclosed. While clays that are unable to give colloidal suspensions can be used, these are less preferred than the colloidal clays.

In one aspect, the clay used to prepare the support-activator can be absent a bivalent or trivalent ion exchanged smectite, for example, Mg-exchanged or Al-ion exchanged montmorillonite which are described in U.S. Pat. No. 6,531,552. In another aspect, the clay used to prepare the support-activator can be absent mica or synthetic hectorite, as described in U.S. Pat. Nos. 6,531,552 and 5,973,084. In a further aspect, the clay used to prepare the support-activator can be absent a trioctahedral smectite or can be absent vermiculite.

In an aspect, the smectite clay can also comprise structural units characterized by the following formula:

$(M^AIV)_8(M^BVI)_pO_{20}(OH)_4$; wherein a) $M^AIV$ is a four-coordinate $Si^{4+}$, wherein the $Si^{4+}$ is optionally partially substituted by a four-coordinate cation that is not $Si^{4+}$ (for example, the cation that is not $Si^{4+}$ can be selected independently from $Al^{3+}$, $Fe^{3+}$, $P^{5+}$, $B^{3+}$, $Ge^{4+}$, $Be^{2+}$, $Sn^{4+}$, and the like);

b) $M^BVI$ is a six-coordinate $Al^{3+}$ or $Mg^{2+}$, wherein the $Al^{3+}$ or $Mg^{2+}$ is optionally partially substituted by a six-coordinate cation that is not $Al^{3+}$ or $Mg^{2+}$ (for example, the cation that is not $Al^{3+}$ or $Mg^{2+}$ can be selected independently from $Fe^{3+}$, $Fe^{2+}$, $Ni^{2+}$, $Co^{2+}$, $Li^+$, $Zn^{2+}$, $Mn^{2+}$, $Ca^{2+}$, $Be^{2+}$, and the like);

c) p is four for cations with a +3 formal charge, or p is 6 for cations with a +2 formal charge; and d) any charge deficiency that is created by the partial substitution of a cation that is not $Si^{4+}$ at $M^AIV$ and/or any charge deficiency that is created by the partial substitution of a cation that is not $Al^{3+}$ or $Mg^{2+}$ at $M^BVI$ is balanced by cations intercalated between structural units (for example, the cations intercalated between structural units can be selected from monocations, dications, trications, other multications, or any combination thereof.

The Examples, data, and Aspects of the Disclosure section provide additional detailed information of the various aspects and embodiments of the smectite clay.

D. Cationic Polymetallates Used for Heterocoagulation Reagents

In addition to the Definitions section and the Aspects of the Disclosure, the following additional information further describes the cationic polymetallates.

As explained in the Definitions section, the term "polymetallate", and similar terms such as "polyoxometallate" refer to the polyatomic cations that include two or more metals (for example, aluminum, silicon, titanium, zirconium, or other metals) along with at least one bridging ligand between metals such as oxo, hydroxy and/or halide ligands. For example, the polymetallates can be hydrous metal oxides, hydrous metal oxyhydroxides, and the like, and can include bridging ligands such as oxo ligands which bridge two or more metals can occur in these species, and can also include terminal oxo, hydroxyl, and/or halide ligands. While many polymetallate species are anionic, and the suffix "-ate" is often used to reflect an anionic species, the polymetallate (polyoxometallate) compounds used according to this disclosure are cationic.

The heterocoagulation reagents of this disclosure can be positively-charged species that when combined in the appropriate ratio with a colloidal suspension of clay form a coagulate which is readily filtered and easily washed. The positively charged species include soluble polyoxometallate, polyhydroxylmetallate and polyoxohydroxymetallate cations, and related cations partially halide substituted, such as polyaluminum oxyhydroxychlorides or aluminum chlorhydrate or polyaluminum chloride species that are linear, cyclic or cluster compounds. These compounds are referred to collectively as polymetallates. The latter aluminum compounds can contain from about 2 to about 30 aluminum atoms.

Useful heterocoagulation reagents also include any colloidal species that are characterized by a positive zeta potential when dispersed in an aqueous solvent or in a mixed aqueous and organic (for example, alcohol) solvent. For example, useful dispersions of the heterocoagulation reagents can exhibit greater than (>)+20 mV (positive 20 mV) zeta potential, greater than +25 mV zeta potential, or greater than +30 mV zeta potential. While the starting colloidal clay may include monovalent ions or species such as protons, lithium ions, sodium ions, or potassium ions, at least a portion, some, most, substantially all, or all of these ions are replaced by the heterocoagulation reagents during formation of the readily filterable clay heteroadduct. As discussed below, protons, lithium ions, sodium ions, or potassium ions and the like do not afford the filterability provided by the cationic polymetallates of this disclosure. This feature can be observed by the long filtration times that result when preparing and attempting to isolate the hydrochloric acid-treated support-activators, such as in Examples 40 and 41.

Further, unlike treatments that use strong, concentrated acids to leach Al ions from montmorillonite, the formation of the clay heteroadduct does not leach Al ions from the clay. When using aluminum-containing heterocoagulation reagents such as ACH or PAC, the aluminum content of the support-activator is actually increased over that of the starting clay, albeit in amounts far less than the aluminum content of the corresponding pillared clay.

In an aspect, the heterocoagulation reagent can comprise a colloidal suspension of boehmite (an aluminum oxide hydroxide) or a metal oxide such as a fumed metal oxide which affords a positive zeta potential (for example, fumed alumina). In another aspect, the heterocoagulation reagent can comprise a chemically-modified or chemically-treated metal oxide, for example an aluminum chlorhydrate-treated fumed silica, such that when in suspension, the chemically-treated metal oxide affords a positive zeta potential, as described below. In a further aspect, the heterocoagulation reagent may be generated by treating a metal oxide or metal oxide hydroxide and the like in a fluidized bed with reagents which will afford a positive zeta potential when the agent is dispersed in a suspension. The heterocoagulation agent can exhibit a positive value greater than +20 mV prior to combination with the phyllosilicate clay component.

In an aspect, the cationic polymetallate can include a first metal oxide which is chemically-treated with a second metal oxide, a metal halide, a metal oxyhalide, or a combination thereof in an amount sufficient to provide a colloidal suspension of the chemically-treated first metal oxide having a positive zeta potential, for example, a zeta potential of greater than positive 20 mV (millivolts). That is, the chemically-treated first metal oxide is the contact product of the first metal oxide with [1] a second metal oxide, that is, another different metal oxide, [2] a metal halide, [3] a metal oxyhalide, or [4] a combination thereof. For example, the first metal oxide which is chemically-treated can comprise fumed silica, fumed alumina, fumed silica-alumina, fumed magnesia, fumed zinc oxide, fumed titania, fumed zirconia, fumed ceria, and the like, or any combination thereof. The second metal oxide, the metal halide, or the metal oxyhalide can be obtained from an aqueous solution or suspension of a metal oxide, hydroxide, oxyhalide, or halide, such as $ZrOCl_2$, $ZnO$, $NbOCl_3$, $B(OH)_3$, $AlCl_3$, or a combination thereof. For example, treatment may consist of dispersing the fumed oxide in a solution of aluminum chlorhydrate. In the case of fumed silica, which in suspension may exhibit a negative zeta potential, after treatment with aluminum chlorhydrate the suspension of the chemically-treated fumed silica exhibits a positive zeta potential of greater than about +20 mV.

In another aspect, the cationic polymetallate composition can comprise or be selected from [1] fumed silica, fumed alumina, fumed silica-alumina, fumed magnesia, fumed zinc oxide, fumed titania, fumed zirconia, fumed ceria, or any combination thereof, which is chemically-treated with [2] polyaluminum chloride, aluminum chlorhydrate, aluminum sesquichlorohydrate, polyaluminum oxyhydroxychloride, or any combination thereof. For example, the cationic polymetallate composition can comprise or be selected from aluminum chlorhydrate-treated fumed silica, aluminum chlorhydrate-treated fumed alumina, aluminum chlorhydrate-treated fumed silica-alumina, or any combination thereof.

While not intending to be theory-bound, it is thought that the treated metal oxide may form a coreshell structure of a positively charged shell and negative core, or a continuous structure of intermixed negative and positive regions or atoms, such that the surface exhibits a positive zeta potential of greater than about +20 mV. Some fumed metal oxides, such as fumed alumina, may already exhibit a positive zeta potential before chemical treatment. Nevertheless, fumed metal oxides which possess no zeta potential, or a positive zeta potential less than about +20 mV, may also be chemically treated with species, such as aluminum chlorhydrate and the like, after which treatment, a colloidal suspension having a zeta potential greater than about +20 mV can be obtained.

In another aspect, the heterocoagulation reagent can include a mixture of metal oxides formed in the fuming process, or subsequent to the fuming process, that because of their composition, exhibits a positive zeta potential. An example of this type fumed oxide is fumed silica-alumina.

In another embodiment the heterocoagulation reagent may include any colloidal inorganic oxide particles such as described by Lewis, et al. in U.S. Pat. No. 4,637,992, which is incorporated herein by reference, such as colloidal ceria or colloidal zirconia or any positively charged colloidal metal oxide disclosed therein. In another aspect, the heterocoagulation reagent may comprise magnetite or ferrihydrite. For example, the cationic polymetallate can comprise or be selected from boehmite, fumed silica-alumina, colloidal ceria, colloidal zirconia, magnetite, ferrihydrite, any positively charged colloidal metal oxide, or any combination thereof.

In another aspect, the heterocoagulation reagents can include a cationic oligomeric or polymeric aluminum species in solution, such as aluminum chlorhydrate, also known as aluminum chlorhydrate (ACH), polyaluminum chloride (PAC), aluminum sesquichlorohydrate, or any combination or mixture thereof. For example, the cationic polymetallate heterocoagulation reagent can include or be selected from an aluminum species or any combinations of species having the empirical formula:

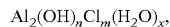

wherein n+m=6, and x is a number from 0 to about 4. In one aspect, the cationic polymetallate can comprises or can be selected from aluminum species having the formula $[AlO_4(Al_{12}(OH)_{24}(H_2O)_{20}]^{7+}$, which is the so-called "$Al_{13}$-mer" polycation and which is thought to be the precursor to $Al_{13}$ pillared clays.

When aluminum chlorhydrate is used as the heterocoagulation reagent or chemical treatment reagent for treating other metal oxides, aluminum chlorhydrate (ACH) solution or solid powder from commercial sources can be utilized. Aluminum chlorhydrate solutions may be referred to as polymeric cationic hydroxy aluminum complexes or aluminum chlorhydroxides, which refers to the polymers formed from a monomeric precursor having the general empirical formula $0.5[Al_2(OH)_5Cl(H_2O)_2]$. Preparation of aluminum chlorhydrate solution is described in U.S. Pat. Nos. 2,196,016 and 4,176,090, which are incorporated herein by reference, and can involve treating aluminum metal with hydrochloric acid in amounts which produce a composition having the formula indicated above.

Alternatively, the aluminum chlorhydrate solutions may be obtained using various sources of aluminum such as alumina ($Al_2O_3$), aluminum nitrate, aluminum chloride or other aluminum salts and treatment with acid or base. The numerous species that can be present in such solutions, including the tridecameric $[AlO_4(Al_{12}(OH)_{24}(H_2O)_{20}]^{7+}$ ($Al_{13}$-mer) polycation, are described in Perry and Shafran, *Journal of Inorganic Biochemistry*, 2001, 87, 115-124, which is incorporated herein by reference. The species disclosed in this study, either individually or in combination, which are present in such solutions can be used as cationic polymetallates for heterocoagulation of the smectite clay.

In one aspect, aqueous aluminum chlorhydrate solutions used according to this disclosure can have an aluminum content, calculated or expressed as the weight percent of $Al_2O_3$, in a range of from about 15 wt. % to about 55 wt. %, although more dilute concentrations can be used. Using more dilute solutions can be accompanied by adjusting other reaction conditions such as time and temperature, as will be appreciated by the person of ordinary skill in the art. Alternative aluminum concentrations in aqueous aluminum polymetallate solutions such as aqueous aluminum chlorhydrate solutions, expressed as the weight percent of $Al_2O_3$, can include: from about 0.1 wt. % to about 55 wt. % $Al_2O_3$; from about 0.5 wt. % to about 50 wt. % $Al_2O_3$; from about 1 wt. % to about 45 wt. % $Al_2O_3$; from about 2 wt. % to about 40 wt. % $Al_2O_3$; from about 3 wt. % to about 37 wt. % $Al_2O_3$; from about 4 wt. % to about 35 wt. % $Al_2O_3$; from about 5 wt. % to about 30 wt. % $Al_2O_3$; or from about 8 wt. % to about 25 wt. % $Al_2O_3$; each range including every individual concentration expressed in tenths (0.1) of a weight percentage encompassed therein, and including any subranges therein. For example, the recitation of from about 0.1 wt. % to about 30 wt. % $Al_2O_3$ includes the recitation of from 10.1 wt. % to about 26.5 wt. % $Al_2O_3$. When convenient, solid polymetallate aush as solid aluminum chlorhydrate can be used and added to the slurry of the colloidal clay when preparing the heterocoagulate. Therefore, the concentrations disclosed above are not limiting but rather exemplary.

In one aspect, the cationic polymetallate can comprise or can be selected from an oligomer prepared by copolymerizing (co-oligomerizing) soluble rare earth salts with a cationic metal complex of at least one additional metal selected from aluminum, zirconium, chromium, iron, or a combination thereof, according to U.S. Pat. No. 5,059,568, which is incorporated herein by reference, for example, where the at least one rare earth metal can be cerium, lanthanum, or a combination thereof. In an aspect, the heterocoagulation reagent can comprise an aqueous solution of lanthanides and $Al_{13}$ Keggin ions, such as described by McCauley in U.S. Pat. No. 5,059,568. However, the calcined clay-heteroadducts of the present disclosure prepared using the McCauley type polymetallates do not afford a uniform intercalated structure with basal spacings of greater than 13 Å (Angstroms). Though not wishing to be bound by theory, it is thought that this observation may result from the much smaller amount of Ce—Al heterocoagulation reagent-to-colloidal clay ratio used according to this disclosure. This smaller amount arises by the conditions of contacting the smectite clay and the heterocoagulation reagent in an amount sufficient to provide a slurry of the smectite heteroadduct having a zeta potential in a range of from about +25 mV (millivolts) to about −25 mV.

In further aspects, exemplary polymetallates of this disclosure can include: [1] the ε-Keggin cations $[\varepsilon\text{-PMo}_{12}O_{36}(OH)_4\{Ln(H_2O)_4\}_4]^{5+}$, wherein Ln can be La, Ce, Nd, or Sm; and [2] the lanthanide-containing cationic heteropolyoxovanadium clusters having the general formula $[Ln2V12O32(H2O)8\{Cl\}]Cl$, wherein Ln can be Eu, Gd, Dy, Tb, Ho, or Er.

In another aspect, the heterocoagulation agent may be a layered double hydroxide, such as a magnesium aluminum hydroxide nitrate as described by Abend et al., *Colloid Polym. Sci.* 1998, 276, 730-731, or synthetic hematite, hydrotalcite, or other positively charged layered double hydroxides, including but not limited to those described in U.S. Pat. No. 9,616,412, which are incorporated herein by reference. Thus, the cationic polymetallate used as a heterocoagulation reagent can be a layered double hydroxide or a mixed metal layered hydroxide. For example, the mixed metal layered hydroxide can be selected from a Ni—Al, Mg—Al, or Zn—Cr—Al type having a positive layer charge. In another aspect, the layered double hydroxide or mixed metal layered hydroxide can comprise or can be selected from magnesium aluminum hydroxide nitrate, magnesium aluminum hydroxide sulfate, magnesium aluminum hydroxide chloride, $Mg_x(Mg,Fe)_3(Si,Al)_4O_{10}(OH)_2(H_2O)_4$ (x is a number from 0 to 1, for example, about 0.33 for ferrosaponite), $(Al,Mg)_2Si_4O_{10}(OH)_2(H_2O)_8$, synthetic hematite, hydrozincite (basic zinc carbonate) $Zn_5(OH)_6(CO_3)_2$, hydrotalcite $[Mg_6Al_2(OH)_{16}]CO_3 \cdot 4H_2O$, tacovite $[Ni_6Al_2(OH)_6]CO_3 \cdot 4H_2O$, hydrocalumite $[Ca_2Al(OH)_6]OH \cdot 6H_2O$, magaldrate $[Mg_{10}Al_5(OH)_{31}](SO_4)_2 \cdot mH_2O$, pyroaurite $[Mg_6Fe_2(OH)_{16}]CO_3 \cdot 4.5H_2O$, ettringite $[Ca_6Al_2(OH)_{12}](SO_4)_3 \cdot 26H_2O$, or any combination thereof.

In still a further aspect, the heterocoagulation reagent can include aqueous solutions of Fe polycations, as described by Oades, *Clay and Clay Minerals*, 1984, 32(1), 49-57, or described by Cornell and Schwertmann in "The Iron Oxides: Structure, Properties, Reactions, Occurrences and Uses", 2003, Second Edition, Wiley VCH. The cationic polymetallate can comprise or can be selected from an iron polycation having an empirical formula $FeOx(OH)y(H_2O)z]n+$, wherein 2x+y is less than (<) 3, z is a number from 0 to about 4, and n is a number from 1 to 3.

The use of cations such as protons, lithium ions, sodium ions, or potassium ions and the like such as described in Example 40 and Example 41 do not afford clay heteroadducts as provided by the cationic polymetallates of this disclosure, for example, these acid-treated clays generally are not readily filterable. Though not wishing to be bound by theory, it is thought that monovalent ions such as protons from HCl or $H_2SO_4$ in aqueous solutions, such as described by Nakano et al. in U.S. Pat. No. 6,531,552 and references therein, which are incorporated herein by reference, cannot form stable, readily filterable heterocoagulated clay adducts whether using dilute or concentrated acid. Colloidal dispersions of smectite, such as bentonites or montmorillonites, have a permanent negative charge, and thus exhibit a permanent negative zeta potential even at low pH. Again, while not intending to be theory-bound, at the high acid concentrations of low pH (<3), colloidal dispersions of smectites become less negative, and may even approach a zeta potential of about negative 30 mV (−30 mV). (See Duran et al., *Journal of Colloid and Interface Science*, 2000, 229, p 107-117, which is incorporated herein by reference.) However, before the colloidal clay can approach or attain a neutralized or near-neutralized surface charge, it is thought that the clay structure itself is destroyed through peptization of the octahedral alumina layer. (See Tayano et al.; *Macromolecular Reaction Engineering*, 2017, 11, 201600017 and *Clay Science* 2016, 20, 49-58, each of which is incorporated herein by reference.) The leaching of the octahedral alumina layer from the TOT structure and the dissolution of clay into the strongly acidic solutions are described, for example, in: U.S. Pat. No. 3,962,135; Bibi, Singh, and Silvester, in "Dissolution kinetics of kaolinite, illite and montmorillonite under acid-sulfate conditions: a comparative study", prepared for *Clay Minerals*, Chapter 4 (manuscript accessed at https://ses.library.usyd.edu.au/bitstream/handle/2123/8647/Chapter %204_Dissolution%20of%20 illite,%20kaolinite, %20montmorillonite.pdf?sequence=5) and also at https://pdfs.semanticscholar.org/6836/3c9c293dfd4255f9ad88-678e1770c63384d3.pdf, and in Dudkin et al., *Chemistry for Sustainable Development*, 2004, 12, 327-330; and Okada, et al., *Clay Science*, 2003, 12, 159-165, each of which is incorporated herein by reference.

While not wishing to be bound by theory, it has been observed that the addition of other, non-proton monovalent cations such as lithium, sodium or potassium ions, by way of their respective salts, to a point where flocculation of colloidal smectite particles can occur is thought to be due to shielding and reduction of the columbic repulsion between smectite particles. The concentration of monocations at which coagulation occurs is termed the critical coagulation concentration, and the concentration of the monovalent cations required to achieve coagulation is generally significantly greater than the concentrations needed when using divalent or trivalent cations. Again, though not wishing to be bound by theory, the monovalent cation-clay product is difficult to filter and may require isolation by centrifugation, or high dilution and settling tanks. Without washing and removal of monovalent ion salts, the flocculated clay does not lead to metallocene-support-activator catalysts with sufficient practical activity. Furthermore, to the extent that simple ion intercalation, such as in sodium-exchanged montmorillonite or aluminum-exchanged montmorillonite, may be evident in the powder XRD of the calcined clay heteroadduct, these materials are thought to be arise as undesirable byproducts or result from incomplete reaction of the colloidal clay with the polymetallate.

In another aspect, the colloidal smectite clay can comprise or be selected from colloidal montmorillonite, such as Volclay® HPM-20 bentonite. The heterocoagulation reagent can comprise or be selected from aluminum chlorhydrate, polyaluminum chloride, or aluminum sesquichlorohydrate.

According to an aspect, the cationic polymetallate can comprises or be selected from a complex of Formula I or Formula II or any combination of complexes of Formula I or Formula II, according to the following formulas:

$$[M(II)_{1-x}M(III)_x(OH)_2]A_{x/n} \cdot m\, L \quad (I)$$

$$[LiAl_2(OH)_6]A_{1/n} \cdot m\, L \quad (II)$$

wherein:
M(II) is at least one divalent metal ion;
M(III) is at least one trivalent metal ion;
A is at least one inorganic anion;
L is an organic solvent or water;
n is the valence of the inorganic anion A or, in the case of a plurality of anions A, is their mean valence; and
x is a number from 0.1 to 1; and
m is a number from 0 to 10.

In this aspect: M(II) can be, for example, zinc, calcium, strontium, barium, iron, cobalt, nickel, cadmium, manganese, copper, or magnesium; independently, M(III) can be, for example, iron, chromium, manganese, bismuth, cerium, or aluminum; A can be, for example, hydrogencarbonate (bicarbonate), sulfate, nitrate, nitrite, phosphate, chloride, bromide, fluoride, hydroxide, or carbonate; n can be, for example, a number from 1 to 3; and L can be, for example, methanol, ethanol or isopropanol, or water. Further to this aspect, the cationic polymetallate can be selected from a complex of Formula I, wherein M(II) is magnesium, M(III) is aluminum, and A can be carbonate.

In an aspect, the cationic polymetallate can comprises polyaluminum chloride, aluminum chlorhydrate, aluminum sesquichlorohydrate, or polyaluminum oxyhydroxychloride, or a combination thereof. In a further aspect, the cationic polymetallate can include linear, cyclic or cluster aluminum compounds containing, for example, from 2-30 aluminum atoms. The ratio of millimoles (mmol) of aluminum (Al) in the polyaluminum chloride, aluminum chlorhydrate, aluminum sesquichlorohydrate, or polyaluminum oxyhydroxychloride to grams (g) of colloidal smectite clay in recipe for preparing the smectite heteroadduct can be in a range of, for example, from about 0.75 mmol Al/g clay to about 2.0 mmol Al/g clay, from about 0.8 mmol Al/g clay to about 1.9 mmol Al/g clay, from about 1.0 mmol Al/g clay to about 1.8 mmol Al/g clay, from about 1.1 mmol Al/g clay to about 1.8 mmol Al/g clay, or from about 1.1 mmol Al/g clay to about 1.7 mmol Al/g clay. Alternatively, the millimoles (mmol) of aluminum (Al) in the polyaluminum chloride, aluminum chlorhydrate, aluminum sesquichlorohydrate, or polyaluminum oxyhydroxychloride per grams (g) of colloidal smectite clay in recipe for preparing the smectite heteroadduct can be, for example, about 0.75 mmol Al/g clay, about 0.8 mmol Al/g clay, about 0.9 mmol Al/g clay, about 1.0 mmol Al/g clay, about 1.1 mmol Al/g clay, about 1.2 mmol Al/g clay, about 1.3 mmol Al/g clay, about 1.4 mmol Al/g clay, about 1.5 mmol Al/g clay, about 1.6 mmol Al/g clay, about 1.7 mmol Al/g clay, about 1.8 mmol Al/g clay, about 1.9 mmol Al/g clay, or about 2.0 mmol Al/g clay, including any ranges between any of these ratios or combinations of subranges therebetween.

In a further aspect, the ratio of millimoles (mmol) of aluminum (Al) in the polyaluminum chloride, aluminum chlorhydrate, aluminum sesquichlorohydrate, or polyaluminum oxyhydroxychloride to grams (g) of colloidal clay in the recipe to prepare the isolated or calcined smectite heteroadduct can be about 90% or less, about 80% or less, about 70% or less, about 60% or less, about 50% or less, about 45% or less, about 40% or less, or about 35% or less of a comparative ratio of millimoles of aluminum to grams of colloidal clay used for the preparation of a pillared clay using the same colloidal smectite clay and heterocoagulation reagent.

In this aspect, the ratio of aluminum regent to clay in a pillaring recipe is expressed in mmol Al/g clay, indicating the number of millimoles of Al in the aluminum chlorhydrate reagent versus the grams of clay in the recipe. Specifically, this ratio reflects the ratio employed in the synthesis recipe, not the ratio in the final pillared clay product. As an example, considering the $Al_{13}$-type Keggin ions as described by Ocelli, *Clay and Clay Minerals,* 2000, 48(2), 304-308, the amount of Al used in the pillared clay preparation is far in excess of the amount of Al that eventually is intercalated between the layers in the final pillared clay solid. The use of an excess of aluminum reagent is employed to provide a maximum of pillar content in the final product and obtain the desired porosity and surface area of the final calcined material. Kooli in *Microporous and Mesoporous Materials;* 2013, 167, 228-236 discloses that generally, about 6 mmol Al/gram of clay is needed in the recipe in order to optimize pillaring. In a more recent scale-up study and optimization of $Al_{13}$ Keggin ion-pillared clay, Pergher and Bertella in *Materials,* 2017, 10, 712, disclose that 15 mmol Al/g clay and dilute dispersions of about 1 wt. % clay are required for obtaining pillaring with the desired basal spacing and surface areas.

E. Preparation and Properties of the Clay Heteroadduct (Heterocoagulated Clay)

Unlike the pillared clays, the heterocoagulated clay of this disclosure are amorphous solids. Therefore, the preparation of the heterocoagulated clay provides a three-dimensional structure, but one which is a non-pillared and non-crystalline and amorphous. While not intending to be bound by theory, it is believed that the regular crystalline structure of the starting smectite is not simply expanded upon contact with the cationic polymetallates as described, but rather disrupted upon preparation of the clay heteroadducts to provide a non-crystalline, non-regular, non-layered amorphous material. Factors which can affect formation of an amorphous three-dimensional structure include reaction time, reaction temperature, purity of the starting clay and clay particle size, method of drying, and the like, which are readily determinable as described herein for each heterocoagulation reagent and clay system.

In the preparation of the clay heteroadduct, the heterocoagulation agent may be added to a slurry of the colloidal clay, the colloidal clay may be added to a slurry or solution of the heterocoagulation agent, or the heterocoagulation agent and colloidal clay may be added to a liquid carrier at the same time or during an overlapping time period. Alternatively, the heterocoagulation agent and colloidal clay may be added simultaneously to a heel of heteroadduct product, such as adding the heterocoagulation agent and clay as either a solid or a suspension, to a vessel or reactor containing water or a water-containing heel.

In an aspect, the liquid carrier in which the clay heteroadduct is prepared can be water or water-based, in which additional components can be added, such as an alcohol and/or at least one surfactant. Suitable surfactants can include anionic surfactants, cationic surfactants, or non-ionic surfactants. Specific examples of liquid carriers or "diluents" and specific examples of surfactants are provided in the Aspects of the Disclosure section.

As described, the ratio of heterocoagulation reagent to clay to be used in the recipe is defined as a ratio that affords a coagulated product mixture such as a slurry having a zeta potential in a range of from about positive (+)25 mV (millivolts) to about negative (−)25 mV. Therefore, the amount of heterocoagulation reagent added to a known sample of clay, that is, the ratio of cationic polymetallate (heterocoagulation reagent) to clay, is determined by titrating the clay with the heterocoagulation reagent. For example, when the heterocoagulation reagent comprises a cationic polymetallate of aluminum, the ratio of heterocoagulation reagent to clay can be reported in millimoles (mmol) of aluminum (Al) in the cationic aluminum polymetallate to grams (g) of clay. The actual amount of cationic polymetallate used in the formation of the clay heteroadduct, that is, the ratio of heterocoagulation reagent to clay may depend upon factors such as the degree of positive charge of the cationic polymetallate, the zeta potential of the clay, and the like. The heterocoagulation reagent and the clay are combined in a ratio such that the resulting slurry (dispersion) of the heterocoagulated clay which forms exhibits a zeta potential in a range of from about +25 mV to about −25 mV. Alternatively, the heterocoagulation reagent and the clay are combined in a ratio such that the resulting dispersion of the heterocoagulated clay which forms exhibits a zeta potential in a range of from about +22 mV to about −22 mV, from about +20 mV to about −20 mV, from about +18 mV to about −18 mV, from about +15 mV to about −15 mV, from about +10 mV to about −10 mV, from about +5 mV to about −5 mV, or about 0 mV.

Figure 2:
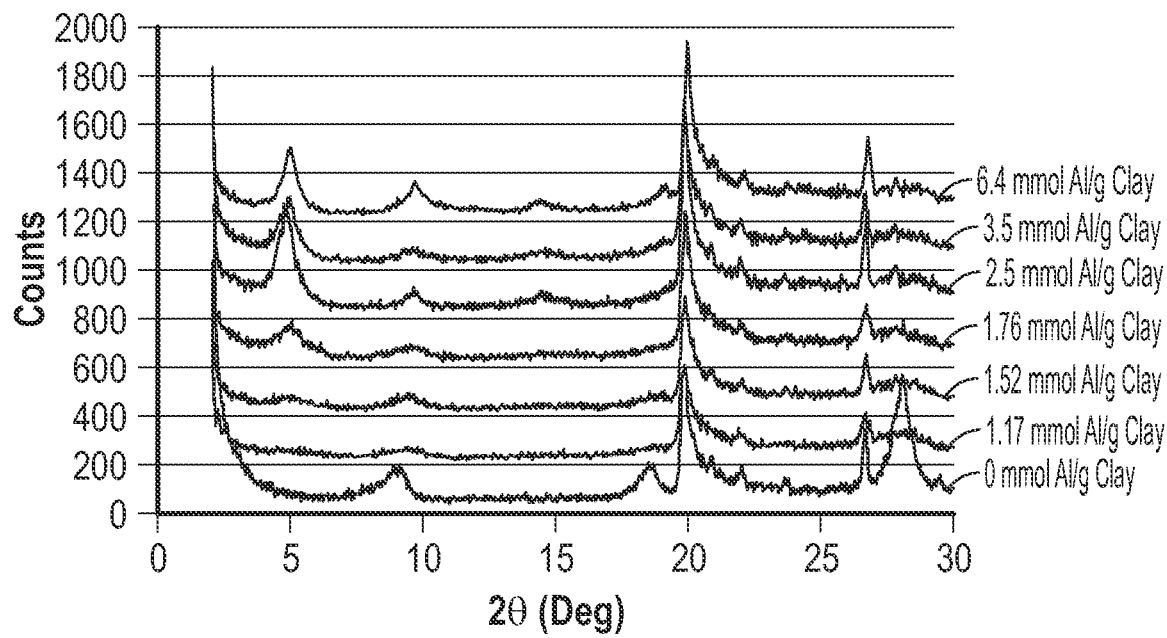
FIG. 2 provides a powder XRD (x-ray diffraction) pattern of a series of calcined products from combining aluminum chlorhydrate (ACH) and Volclay® HPM-20 montmorillonite. All of the samples were prepared according to the inventive methods according to the examples (see Examples 18, 20-21, and 23) except for the 6.4 mmol Al/g clay sample (top), representing typically prepared $Al_{13}$-pillared clay (comparative Example 5), and the starting clay itself at the 0 mmol Al/g clay sample (comparative Example 3).
Figure 3:
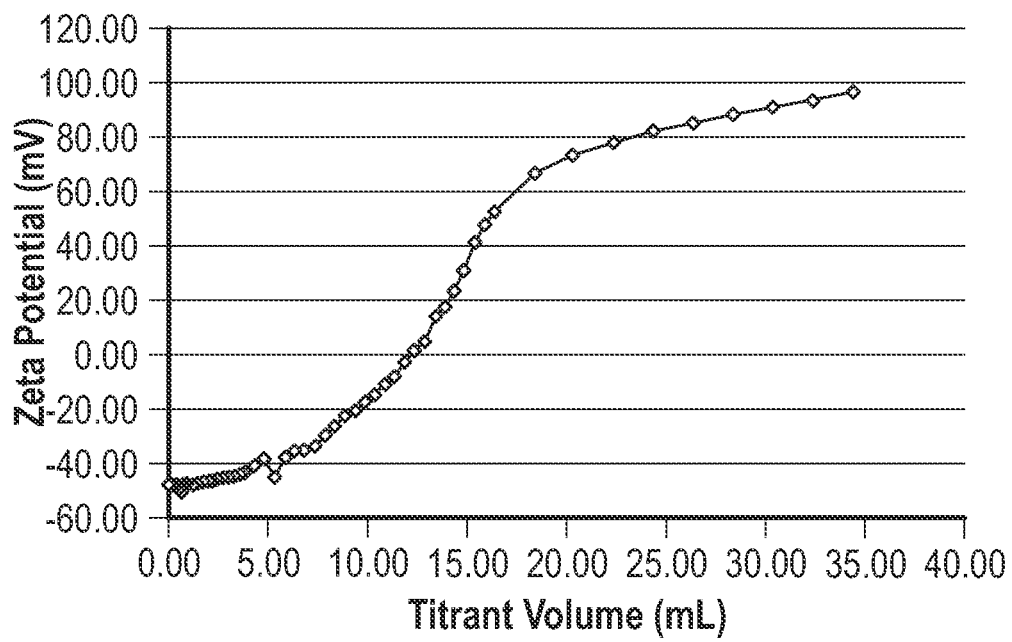
FIG. 3 illustrates a zeta potential titration for the volumetric addition of a 2.5 wt. % (weight percent) aqueous solution of aluminum chlorhydrate (ACH; measured density of 1.075 g/mL) into a 0.62 wt. % Volclay® HPM-20 bentonite aqueous dispersion, plotting the measured zeta potential versus the titrant volume (mL). The titration settings were 0.5 mL per titration point, followed by an equilibration delay of 30 seconds. The titrant volume indicates the cumulative volume of the aqueous aluminum chlorohydrate solution added. See also Table 4.
Figure 4:
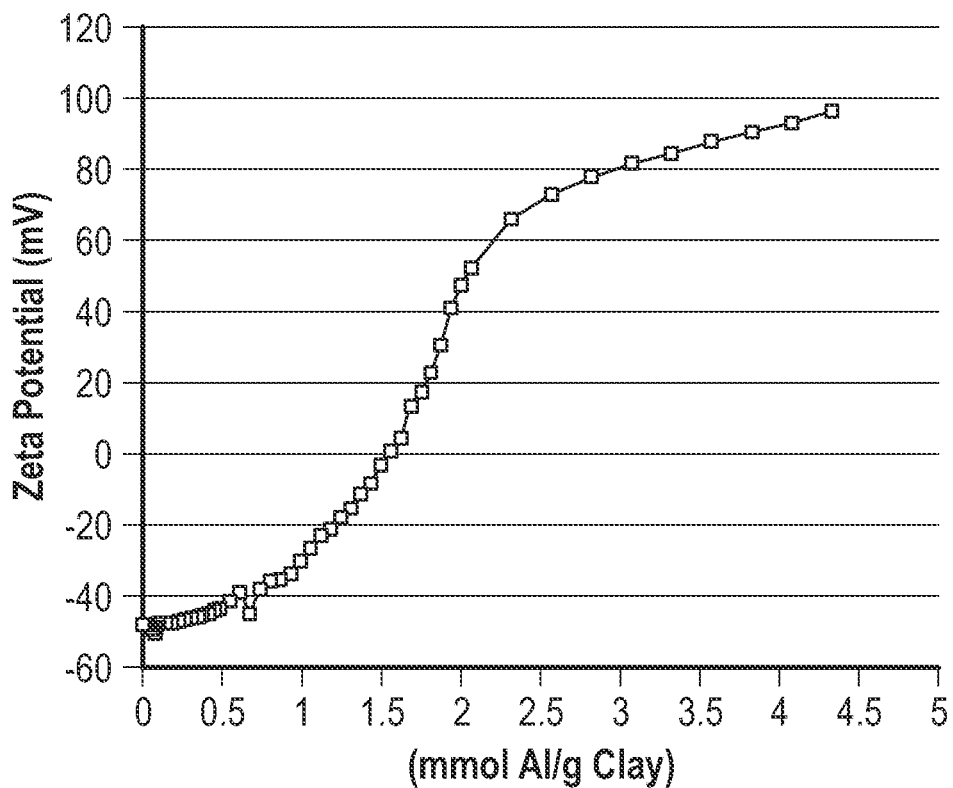
FIG. 4 shows the conversion of the FIG. 3 plot into a zeta potential versus a mass ratio of aluminum to clay. Specifically.

As described in the Examples, a Colloidal Dynamic Zetaprobe Analyzer™ was used for zeta potential measurements, including to dynamically track the evolving zeta potential during titrations of colloidal clay dispersions with cationic polymetallate titrants. Exemplary results from a zeta potential titration are illustrated in the Figures and described in the Examples, and data are presented for example in Table 4 through Table 6. For example, FIG. 3 plots the zeta potentials of a series of dispersions formed during the titration of Volclay® HPM-20 montmorillonite with aluminum chlorhydrate (ACH), plotting the cumulative titrant volume of the aqueous ACH solution added (x) versus zeta potential (mV, (y)) of the dispersion. Similarly, FIG. 4 plots the cumulative mmol Al/g clay versus zeta potential (mV) of the dispersion for the same titration. Samples of some of the solid products formed during this zeta potential titration of HPM-20 clay with ACH were collected, and FIG. 2 provides a powder XRD pattern of this series of calcined products collected from during this zeta potential titration of HPM-20 clay with ACH. As a result, the comparison and correlation of the mmol Al/g clay with the zeta potential and the filterability of the resulting products were examined, and from this analysis, it was unexpectedly discovered that when the clay and the heterocoagulation reagent comprising at least one cationic polymetallate were contacted in a liquid carrier in an amount or ratio that provides a slurry of the smectite heteroadduct having a zeta potential in a range of from about positive 25 mV (millivolts) to about negative 25 mV, the resulting product was readily filterable, could be used as a support-activator without washing or with minimal washing, and imparted high polymerization activity to the supported metallocene catalysts.

In synthetic reactions or titrations using a cationic polymetallate, calculating the ratio of the number of millimoles of metal atoms in the polymetallate per mass of clay provides a useful metric for comparisons across polymetallates. For example, in the zeta potential titrations using an aluminum cationic polymetallate as the heterocoagulation reagent, the ratio of the number of millimoles of aluminum per clay mass as shown in the FIG. 4 titration curve allows a more direct comparison of differing Al-containing heterocoagulation reagents. The derivation of this value is performed by obtaining the aluminum weight percent of the heterocoagulation agent, which is typically provided from the manufacturer either directly, or as an aluminum oxide (e.g. $Al_2O_3$) equivalent weight percent. In the latter case, the aluminum weight percent can be derived from multiplying the aluminum oxide weight percent by the weight proportion of aluminum in the empirical formula. From this aluminum weight percent, the molar amount of aluminum heterocoagulation reagent can be determined, and the molar aluminum/clay mass ratio can be obtained.

For example, FIG. 4 illustrates that one ratio of aluminum chlorhydrate (ACH) to Volclay® HPM-20 expressed in mmol Al/g of clay that falls within the desired zeta potential range is 1.76 mmol Al/g clay. The actual ratio may vary slightly depending on the lot, method of preparation, contamination or age of the aluminum chlorhydrate, and or the particular batch of Volclay® HPM-20. FIG. 2 presents the zeta potential titration of Volclay® HPM-20 from American Colloid Company with 22 wt. % aluminum chlorhydrate from GEO Specialty Chemicals. The mmol Al/g clay can thus be determined as the point at which the zeta potential of colloidal species in the mixture falls below +25 mV and above −25 mV, for example, between about +10 mV and −10 mV, providing a heterocoagulated solid that is readily isolated by conventional methods of filtration such as using filter paper, as described in detail hereinbelow. Thus, ready filtration of the resulting clay heteroadduct can be carried out with or without vacuum assistance, a belt filter, and the like.

The resulting dispersion of the heterocoagulated clay which forms exhibits a zeta potential in the disclosed range centered about zero, provides the readily isolable (readily filterable) heteroadduct. While not restricting the ranges of zeta potentials disclosed and claimed herein, and not wishing to be theory bound, when the amount of heterocoagulation reagent combined with the colloidal smectite (such as the dioctahedral smectites described herein) provides a particle dispersion of near zero zeta potential, such that the particles in the dispersion have little or no electrophoretic mobility, excellent yield and filterability of the clay heteroadduct can be obtained. This zero zeta potential point may be considered a nominal target ratio of cationic polymetallate to colloidal clay. Aspects of electrophoretic mobility are described in, for example, Gu, et al., Clay and clay minerals, 1990, 38(5), 493-500.

The experimentally derived ratio of heterocoagulation reagent (cationic polymetallate) to colloidal clay can be determined by providing a dispersion of the colloidal clay in water, adding the dispersion to a zeta potential measurement vessel, and measuring the initial zeta potential of the clay dispersion. A solution of the selected heterocoagulation agent is prepared and added to the dispersion in portions, with the zeta potential of the dispersion being measured after each addition. The ratio of cationic polymetallate to colloidal clay used to prepare the easily filterable clay heteroadduct is calculated by determining the ratio of heterocoagulation reagent needed to achieve zero or essentially zero zeta potential from the resultant zeta potential titration curve.

In a further aspect, when the zeta potential titration curve is not well defined or is discontinuous at or near zero potential (mV), extrapolation of the points closest to zero zeta potential may be used to estimate the crossover point at which the zeta potential curve crosses from a negative zeta potential to a positive zeta potential, thus describing the nominal target ratio. In another aspect, when the zeta potential titration curve is discontinuous near zero, and remains discontinuous at or near the bounds of zeta potential (for example, ±20 mV or ±25 mV), linear extrapolation between the points on the titration curve directly before and after the discontinuity may be used to estimate the heterocoagulation reagent to clay ratio useful to achieve the desired zeta potential. Examples of zeta probe (zeta potential) titrations and determinations of the nominal target ratios of heterocoagulation reagent to clay are provide in the figures and Examples section of the disclosure. For example, see FIG. 2 through FIG. 8, Example 8 through Example 12, and Example 38.

The ratio of mmol of aluminum (mmol Al) of aluminum chlorohydrate to grams of Volclay® HPM-20 colloidal montmorillonite used to prepare the clay heteroadducts can be significantly less, sometimes over an order of magnitude less, than the ratio of mmol Al/g clay used to prepare pillared HPM-20 clay with aluminum chlorhydrate. That is, using the same cationic polymetallate and colloidal clay, but using a mmol Al/g clay ratio which exceeds the range dictated by the zeta potential from about +25 mV to about −25 mV for the clay heteroadduct dispersion, pillared clays will form. Therefore, the ratio of cationic polymetallate to colloidal clay to form the clay heteroadducts of the present disclosure differs from that used in, for example, U.S. Patent Appl. Publication No. 2018/0142047 and 2018/0142048 to W.R. Grace, which employ lanthanide containing-Al-pillared clays as support-activators.

Conversely, when too low a ratio of heterocoagulation reagent to clay is used in the recipe in an attempt to make a clay heteroadduct, the ready filtration of the resulting contact product by conventional filtration means is not possible. This feature is illustrated in Example 19, where a recipe for 0.30 mmol Al/g clay using aluminum chlorhydrate (ACH) and HPM-20 clay to prepare the clay heteroadduct would, when derived from the zeta potential titration in FIG. 2, predict a zeta potential of −44 mV. Filtration of the resulting contact product was difficult and isolation and preparation of the sample required centrifugation to isolate the product. Products such as these may be referred to herein as a "heteroadduct" for convenience even though outside the zeta potential range for ready filterability. Similarly, in Example 26 where using a recipe for 0.30 mmol Al/g clay using powdered ALOXICOLL® 51P aluminum chlorhydrate (Parchem Fine and Specialty Chemicals) provided a contact product heteroadduct which was difficult to process and isolate, and centrifugation was required to isolate product.

The starting clay particles such as montmorillonite carry a permanent negative charge due to isomorphous substitution of ions into one of the "TOT" layers, for example, substitution of $Mg^{2+}$ for $Al^{3+}$ in the octahedral alumina layer which imparts a negative charge. Therefore, the starting clay forms a dispersion or suspension in water as the negatively-charged clay particles repel each other and are stabilized in the polar aqueous environment. Though not wishing to be bound by theory, the contact of cations such as the cationic polymetallates disclosed herein with the negatively-charged colloidal clays is thought to initially promote coagulation of the colloidal clay, through coulombic attraction of opposite charges and neutralization of the clay surfaces. This neutralization results in precipitation of the clay heteroadduct from the polar aqueous carrier as large agglomerated or coagulated particles which are readily filterable. As additional cationic polymetallate is added in excess to the coagulate composition, such as when preparing ion-exchanged, protic acid treated or pillared clays, some or all of the agglomerated surface may be "re-charged" as positively-charged species, and thereby become re-suspended in a polar carrier such as water. This re-suspension provides a dispersion of highly-charged species which are difficult-to-impossible to filter off and which plug the filter media. The clay heteroadducts of this disclosure are formed below these high ratios and thereby thought to avoid the re-charging and re-suspension of the clay heteroadduct. Thus, the near zero zeta potential surface of the clay heteroadducts provides a readily filterable product and coincidentally substantially avoids pillaring of the clays, and further avoids the uniformly intercalated clay structures of the pillared clay and of the starting clay. Surprisingly, even without pillaring, these structures, form thermally stabile, robust structures which can serve as very active support-activators for metallocenes.

In an aspect, FIG. 1 provides a schematic summary of the practical and desirable aspects of preparing neutral or weakly charged dispersions with a low magnitude, near zero, or zero zeta potential. Filtration of clay heteroadducts with these properties proceeds rapidly, and typically few sequential filtrations are required in order to generate a support with desirable surface area, porosity, and polymerization activity. In contrast, highly charged dispersions, like the type obtained from the preparation of pillared clays, are not readily filterable and must be processed using relatively more expensive and cumbersome methods to obtain a useful support-activator.

Also in contrast to other materials such as those described by Jensen et al. in U.S. Patent Appl. Publication Nos. 2018/0142047 and 2018/0142048 assigned to W.R. Grace, the clay heteroadduct of the present disclosure, after filtration and calcination at 300° C. or higher, can exhibit no, or substantially no d001 peak of 2 theta (2θ) less than 10 degrees in the powder XRD scan. This feature is illustrated in the examples of FIG. 2 which present the powder XRD (x-ray diffraction) patterns of a series of calcined products from combining aluminum chlorhydrate (ACH) and Volclay® HPM-20 montmorillonite, each sample differing by the amount of cationic polymetallate used to prepare the heterocoagulated clay. These samples were prepared according to the Examples 18, 20-21, 23 and 25, except as follows. The sample marked as derived from 6.4 mmol Al/g clay sample (top) represents a typical preparation of $Al_{13}$-pillared clay (see Example 5). The XRD of the starting clay itself (bottom) is marked as derived from 0 mmol Al/g clay sample (see Example 3).

Referring again to FIG. 2 and the Examples for the preparation of these samples, Example 12 through Example 30 provide the preparative methods for the formation of ACH-clay heteroadducts from 0 mmol Al/g clay to 6.4 mmol Al/g clay examined in this figure, including some comparative Examples. As the XRD patterns below about 10 degrees 2θ shown in FIG. 2 illustrate, there are two main peak changes as the proportion of cationic polymetallate is increased in the preparative recipe. Firstly, an XRD peak at about 9 degrees 2 theta (2θ) corresponding to the starting clay disappears, and a peak from about 9 degrees (2θ) to about 10 degrees (2θ) gradually grows in as the proportion of cationic polymetallate is increased. The disappearance of the 9 degrees (2θ) peak appears to indicate the course of the reaction to form the heterocoagulated clay which is largely amorphous, and the subsequent 9-10 degrees (2θ) peak likely represents simple ion intercalation, such as $Al^V$ ion intercalation, characterized by a smaller basal spacing than the initial ion exchanged clay. As even more polymetallate is added to the slurry, a peak grows in from about 4 degrees (2θ) to about 6 degrees (2θ), and tis peak represents the major product at 6.4 mmol Al/g clay. This 4-6 degrees (2θ) peak likely corresponds to the Keggin ion-intercalated pillared structure which forms as the concentration of added polymetallate increases. At the clay concentration of these experiments, which is not highly diluted (that is, not less than 1 wt. % clay), the 6.4 mmol Al/g clay product could not easily be isolated with simple filtration and instead had to be isolated and washed using multiple centrifugation and decanting steps. In addition, the starting clay colloidal clay as a comparative sample also could not be readily filtered.

In one aspect, when aluminum chlorhydrate (ACH) is the heterocoagulation reagent and Volclay® HPM-20 montmorillonite is the colloidal clay, the zeta potential data and XRD data indicated that the range of zeta potential of ±25 mV corresponds to a range of approximately 1 mmol Al/g clay to 1.8 mmol Al/g clay. Similarly, the range of zeta potential of ±15 mV in which the clay heteroadduct is less charged corresponds to a range of approximately 1.3 mmol Al/g clay to 1.7 mmol Al/g clay. These data also indicated that the zeta potential of 0 (zero) mV in which the clay heteroadduct is near zero charge corresponds to approximately 1.5 mmol Al/g clay. FIG. 2 demonstrates that, at 1.52 mmol Al/g clay, the powder XRD indicates little or virtually no pillaring (XRD pattern between 4.8 degrees (2θ) to 5.2 degrees (2θ)) and little or virtually no simple ion exchanged clay (XRD pattern between 9 degrees (2θ) and 10 degrees (2θ)) relative to the mineral impurities that exist in the starting colloidal clay in the range of 2 theta between 20-30 degrees 2θ.

Thought not wishing to be bound by theory, when using aluminum chlorhydrate and colloidal smectite, the near zero charge of the heteroadduct provided by the 1.5 mmol Al/g clay recipe corresponds to less than about half of the amount (ratio) of aluminum that may be actually incorporated into an $Al_{13}$-pillared smectite, and a much smaller fraction of the aluminum that is used in pillaring recipes. See, for example, Schoonheydt et al., *Clay and Clay Minerals* 1994, 42(5), 518-525, which describes this amount as approximately 3-4 mmol Al/g clay that is actually incorporated. As described above, the amount of heterocoagulation reagent that provides the zeta potential of 0 (zero) mV heteroadduct, which may be considered a preferred amount of about 1.5 mmol Al/g clay, is an order of magnitude less than the amount used for optimized pillaring recipes of 15 mmol Al/g clay. It was surprisingly discovered that the clay heteroadduct of this disclosure is characterized by the absence or substantial absence of a regularly intercalated, pillared structure, and yet the clay heteroadduct provides comparable and often greater activity as a metallocene support-activator than the pillared clays.

The clay heteroadduct of this disclosure is not the regularly intercalated, pillared structure such as described by Jensen et al. in U.S. Patent Appl. Publication Nos. 2018/0142047 and 2018/0142048. Specifically, the clay heteroadducts of this disclosure are not or are substantially not regularly complex-ion intercalated ("not regularly intercalated"), microporous catalytic components comprising layered, colloidal clay having a multiplicity of pillars interposed between the expanded molecular layers of the clay. Therefore, the clay heteroadducts of this disclosure are not regularly ordered, and there is no evidence of the consistent regularity imparted by consistent pillars and/or consistent intercalated layers of aluminum oxides or hydroxides, such as derived from an $Al_{13}$ Keggin ion or a lanthanide-centered poly-$Al_{13}$ pillar as in U.S. Patent Appl. Publication Nos. 2018/0142047 and 2018/0142048. However, especially in some examples that were multiply washed and filtered, powder XRD peaks indicative of some pillaring can be detected. For example, the XRD pattern of the 1.76 mmol Al/g clay sample corresponds approximately to a +23 mV zeta potential, but the intensity of the peak is substantially less than that of pillaring-type recipes, for example, using 6.4 mmol Al/g clay and greater.

Thus, in a further aspect, the calcined clay heteroadduct of this disclosure is absent the ordered domains as evidenced by the lack of XRD peaks between 0-12 degrees 2θ. This observation highlights one difference from the simple monoatomic ion exchange process or the complex polyatomic ion exchange processes by which sodium ions (for example, in a starting sodium montmorillonite) are exchanged for divalent, trivalent or multivalent ions which afford after drying, ordered and layered structures reflecting the size of the simple monoatomic ion or the size of the polyatomic ion such as the Al13 Keggin ion, or other pillared species as evidenced by the associated d001 basal spacing in the XRD.

In one aspect, the isolated clay heteroadducts are collected, for example by filtration, and they are not washed. In another aspect, the isolated clay heteroadducts are minimally washed, for example one time or two times with an appropriate washing liquid such as water, for example, just sufficient to provide some purification benefit. Though not wishing to be bound by theory, as described for example by Schoonheydt et al., Clay and Clay Minerals 1994, 42(5), 518-525, which is incorporated herein by reference, washing has been observed to facilitate pillaring. Therefore, washing to the extent that pillaring occurs appears to sacrifice the isolated desirable clay heteroadduct to form the undesired by-product pillared clay.

In another aspect of the disclosure and in further contrast with regularly intercalated, ion-exchanged clays such as those disclosed in Jensen et al. in U.S. Patent Appl. Publication Nos. 2018/0142047 and 2018/0142048, extensive washing of the solid clay heteroadduct of this disclosure until the wash water exhibits a negative $AgNO_3$ test (chloride test) is obtained is not necessary to impart high polymerization activity to the clay heteroadduct. In contrast, and without employing dilute solutions, a single filtration of immediate heteroadduct mixtures containing approximately 5 wt. % solids provides good polymerization activity in the final catalyst mixture. This feature is demonstrated, for example, in Examples 22, 24, 29-31, 33 and 35-36. For example, the difference in the preparation of the ACH-clay heteroadduct between Example 22 and Example 23 is whether the preparation of the product employed one filtration versus two filtrations, the later including a single wash between each filtration. Thus, in the Example 22 preparation of a clay heteroadduct employing a single filtration, the filtrate obtained from filtering the slurry was characterized by a conductivity of 1988 μS/cm. In contrast, the Example 23 preparation of a clay heteroadduct employing two filtrations with a wash between provided a filtrate which was characterized by a conductivity of 87 μS/cm, a difference of almost 23-fold. Yet the polymerization activities of catalysts prepared using these support-activators varied by only 10%, which the skilled person would recognize as within the range of variability bench-scale polymerization tests.

Similarly, the polymerization runs using the Example 24 versus Example 25 support-activators further point to the economically-beneficial aspects of the support-activators, where a single filtration of the clay heteroadduct versus two filtrations again affords essentially the same polymerization activity. Specifically, the catalyst formed from the single filtration support-activator exhibited an activity of 3581 g/g/h versus 3547 g/g/h observed for the catalyst formed from the double filtration support-activator. The conductivity of the slurry of the single filtration product (Example 24) had a conductivity of 1500 μS/cm and the final slurry of the double filtration product (Example 25) had a conductivity of 180 μS/cm. Therefore, it was unexpectedly discovered that extensive washing of the clay heteroadduct is not necessary for good polymerization activity (again in contrast to U.S. Patent Appl. Publication Nos. 2018/0142047 and 2018/0142048).

The samples produced using 1.52 mmol Al/g clay according to Example 28 (additional washing step) and Example 29 (single filtration) provided catalyst activities of 1404 g/g/h and 1513 g/g/h, respectively. In this comparison, the single filtration heteroadduct slurry of Example 29 having a conductivity of 1750 μS/cm actually provided a higher activity than the Example 28 sample which was washed and filtered twice after the initial filtration and having a slurry conductivity of 169 μS/cm. In another aspect and in further contrast to the support-activators of U.S. Patent Appl. Publication Nos. 2018/0142047 and 2018/0142048, it is not necessary to age the clay heteroadduct slurry of this disclosure for at least 10 days at room temperature or at elevated temperatures prior to isolation and use. Rather, the clay heteroadduct slurry of this disclosure can be immediately filtered and then dried or calcined, thus providing a far more efficient synthesis of the support-activator.

Formation of the heterocoagulation agent has not been found to be very temperature sensitive, in that the clay forms a heteroadduct with the heterocoagulation agent over a wide range of temperatures. For example, formation of the clay heteroadduct proceeds in a range of from about 20° C. to about 30° C., although temperatures ranging from almost 0° C. to the boiling point of the slurry containing the clay heteroadduct can be used.

The pH of the solution containing the heterocoagulation agent can be adjusted to provide for minimum zeta potential of the heterocoagulated product, which can be readily determined through experimentation as described by Goldberg, et al., *Clay and Clay Minerals*, 1987, 35, 220-270. The resulting heteroadducts isolated by this method also can be used with metallocenes for olefin polymerization. Further, this method to adjust the zeta potential may be used in such cases where the ratio of heterocoagulation agent to clay does not itself afford a zeta potential between and including the ±25 mV (or alternatively, ±22 mV, 20 mV, and the like) range disclosed herein. However, this pH adjustment method requires an additional step in the synthesis and isolation of the clay heteroadduct, and it has been observed that this method does not guarantee ready filterability or optimum final polymerization activity. Though not wishing to be bound by theory, it is believed that pH adjustment in such cases can lead to protonated or hydroxylated clays, heterocoagulation reagents, and/or clay heteroadducts, which can affect the properties and ultimate catalytic activity of the clay heteroadduct.

In another aspect, this disclosure provides for the removal of salts and minor amounts of non-coagulated, colloidal materials formed in the preparation of the heterocoagulated product. For example, soluble by-products, such as sodium chloride and the like, in addition to minor amounts of colloidal materials, are readily removed from the heterocoagulated product by washing with water followed by simple filtration of the heterocoagulated product. Washing can be accomplished by re-suspension of the isolated heterocoagulated product into water, by mechanical stirring or shaking to form a slurry, which can then be re-filtered. This method contrasts the pillaring processes that generally requires multiple washing and isolations steps using high speed centrifugation, decantation, changing pH of the pillaring agent-clay solution, or large dilution and settling tanks for isolation of the pillared clay product. Such additional steps add time and cost to the separating and washing a pillared or chemically-treated clay mineral adduct from impurities such as its starting components, nano- or micro-sized quartz, and other inorganic metal oxides. Conversely, filtration of the clay heteroadduct may be conducted batchwise through sintered glass frit, metal frit, common filter paper, felt or other filtration media, or continuously filtered using a moving belt filter. Filtration is practical because it is fast, for example, filtration can be completed in as little as one minute or even less, less than or equal to about 5 minutes, less than or equal to about 10 minutes, less than or equal to about 15 minutes, less than or equal to about 30 minutes, less than or equal to about 1 hour, less than or equal to about 2 hours, less than or equal to about 5 hours, less than or equal to about 8 hours, or less than or equal to about 24 hours.

The conductivity of the filtrate or slurry of the clay heteroadduct can be monitored using a commercially available conductance meter. In an aspect, when the concentration of the slurry is in a range of from about 1 wt. % to about 10 wt. % solids, from about 2.5 wt. % to about 10 wt. % solids, or from about 5 wt. % to about 10 wt. % solids, the clay heteroadduct slurry can be characterized by a conductivity in a range of from about 100 µS/cm (0.1 mS/cm) to about 50,000 µS/cm (50 mS/cm), from about 250 µS/cm to about 25,000 µS/cm, or from about 500 µS/cm to about 15,000 µS/cm, or alternatively from about 1,000 µS/cm (1 mS/cm) to about 10,000 µS/cm (10 mS/cm).

The heterocoagulated solid may be dried via azeotropic methods if desired, as carried out in some of the Examples. Azeotropic drying is believed to preserve pore volume and surface area during drying as compared to simply heating the heterocoagulated solid. For example, the filtered smectite heteroadduct may be re-suspended in a slurry with a solvent that will reduce the boiling point of water present in the heterocoagulated product. This water lost during drying may be characterized as free water or chemically-bound water. That is, water lost during drying can derive from free water which is located in the heteroadduct pores or on the external surface and chemically-bound water which is generated from dehydrating surface hydroxyls during the drying and calcining process. Various alcohols are useful as azeotroping agents including, but not limited to, 1-butanol, 1-hexanol, isopentanol, ethanol and the like, including any combinations thereof.

Freeze-drying, flash-drying, fluidized bed drying, or any combination thereof also can be used to remove water from the clay heteroadduct. These methods whether used alone or in combination during the removal of water may help to preserve pore volume and surface area during the drying process. In another aspect, spray drying of a suspension of the clay heteroadduct can be employed to control support-activator and supported catalyst particle morphology. For example, suspensions of the clay heteroadduct in aqueous solvent or organic solvents or in combinations of aqueous and organic solvents can be spray dried. Dry or wet milling and sieving may be employed to refine the heterocoagulated clay morphology, size and size distribution. These methods can be employed individually or in combination in order to achieve the desired support-activator particle morphology, particle size and particle size distribution of the clay-heteroadduct. Spray drying and/or sieving of the clay heteroadduct can be used, as can other methods known to those in the art for removing fines or larger particles that can be problematic in conveying or using the heteroadduct as a support-activator.

The heterocoagulated solid can be calcined or heated in a fluidized bed, for example, temperatures in a range of from about 100° C. to about 900° C. For example, the heterocoagulated smectite clay can be calcined or heated in a fluidized bed at temperatures ranging from about 100° C. to about 900° C., from about 200° C. to about 800° C., from about 250° C. to about 600° C., or from about 300° C. to about 500° C. Calcining can be conducted in the ambient atmosphere (air), for example, calcining can be carried out in dry air at temperature in a range of at least 110° C., for example, the temperature can be in a range of from about 200° C. to about 800° C., and for a time in the range of about 1 minute to about 100 hours. For example, the smectite heteroadduct can be calcined using any one of the following conditions: a) a temperature ranging from about 110° C. to about 600° C. and for a time period ranging from about 1 hour to about 10 hours; b) a temperature ranging from about 150° C. to about 500° C. and for a time period ranging from about 1.5 hours to about 8 hours; or c) a temperature ranging from about 200° C. to about 450° C. and for a time period ranging from about 2 hours to about 7 hours.

The clay heteroadduct may also be calcined at temperatures from about 225° C. to about 700° C. for a period of time in a range of about 1 hour to about 10 hours, most preferably, temperatures from about 250° C. to about 500° C. and a time in a range of about 1 hour to about 10 hours. Alternatively, calcining in air can be carried out at temperatures in a range of from 200° C. to 750° C., from 225° C. to 700° C., from 250° C. to 650° C., from 225° C. to 600° C., from 250° C. to 500° C., from 225° C. to 450° C., or from 200° C. to 400° C. As indicated, a calcining temperature selected from any single temperature or range of two temperatures, for example, temperatures separated by at least 10° C. (that is 10 Centigrade degrees) in the range of 110° C. to 800° C. can be used for developing final catalytic activity.

Thermal treatment such as calcining can be conducted in ambient atmosphere or under other such conditions which facilitate the removal of water, for example, calcining may be carried out in a carbon monoxide atmosphere. Use of such atmospheres may remove surface hydroxyls more efficiently at lower temperatures as compared to the temperatures used in an ambient air calcining process, thus preserving greater pore volume and surface area during dehydration of the surface. After calcining, the heterocoagulated product may be described as a continuous, non-crystalline combination of clay and inorganic oxide particles, which we refer to herein as an activator-support or support-activator.

The determination of the total porosities, pore volume distributions, and surface areas of the activator supports of this disclosure can be achieved through any method known in the art, for example, an analysis using nitrogen gas adsorption-desorption measurements. The adsorption isotherm or desorption isotherm plots the volume of gas (in this case, nitrogen) that either adsorbs onto, or desorbs from, the surface of an analyte (clay heteroadduct) as pressure is either increased or decreased, respectively, at a constant temperature. Isotherm data can be analyzed using the BJH method to determine total pore volume and generate a pore size distribution as described below, and isotherm data can be analyzed using the BET method to determine surface area.

Heterocoagulation of the smectite clay can provide activator supports that have substantial porosity and exhibit catalyst activation properties when combined with metallocenes or other organotransition metal compounds capable of polymerizing olefins. In one aspect, the calcined clay heteroadduct can exhibit a BJH porosity in a range of from about 0.2 cc/g to about 3.0 cc/g, from about 0.3 cc/g to about 2.5 cc/g, or from about 0.5 cc/g to about 1.8 cc/g. The calcined clay heteroadduct can also exhibit a BJH porosity of greater than or equal to 0.5 cc/g. Calcined clay heteroadducts having a porosity as low as about 0.2 cc/g can be used, for example, heteroadducts exhibiting a BJH porosity in a range of from about 0.2 cc/g to about 0.5 cc/g, but clay heteroadducts having a porosity of less than about 0.2 cc/g can exhibit lower polymerization activity, for example, <200 g PE/g support-activator/hr, when combined with metallocenes such as bis(1-butyl-3-methylcyclopentadienyl)zirconium dichloride) to make the catalyst system. In this disclosure, the term "g support-activator" refers to the grams of the calcined clay heteroadduct used to make the catalyst.

Figure 10:
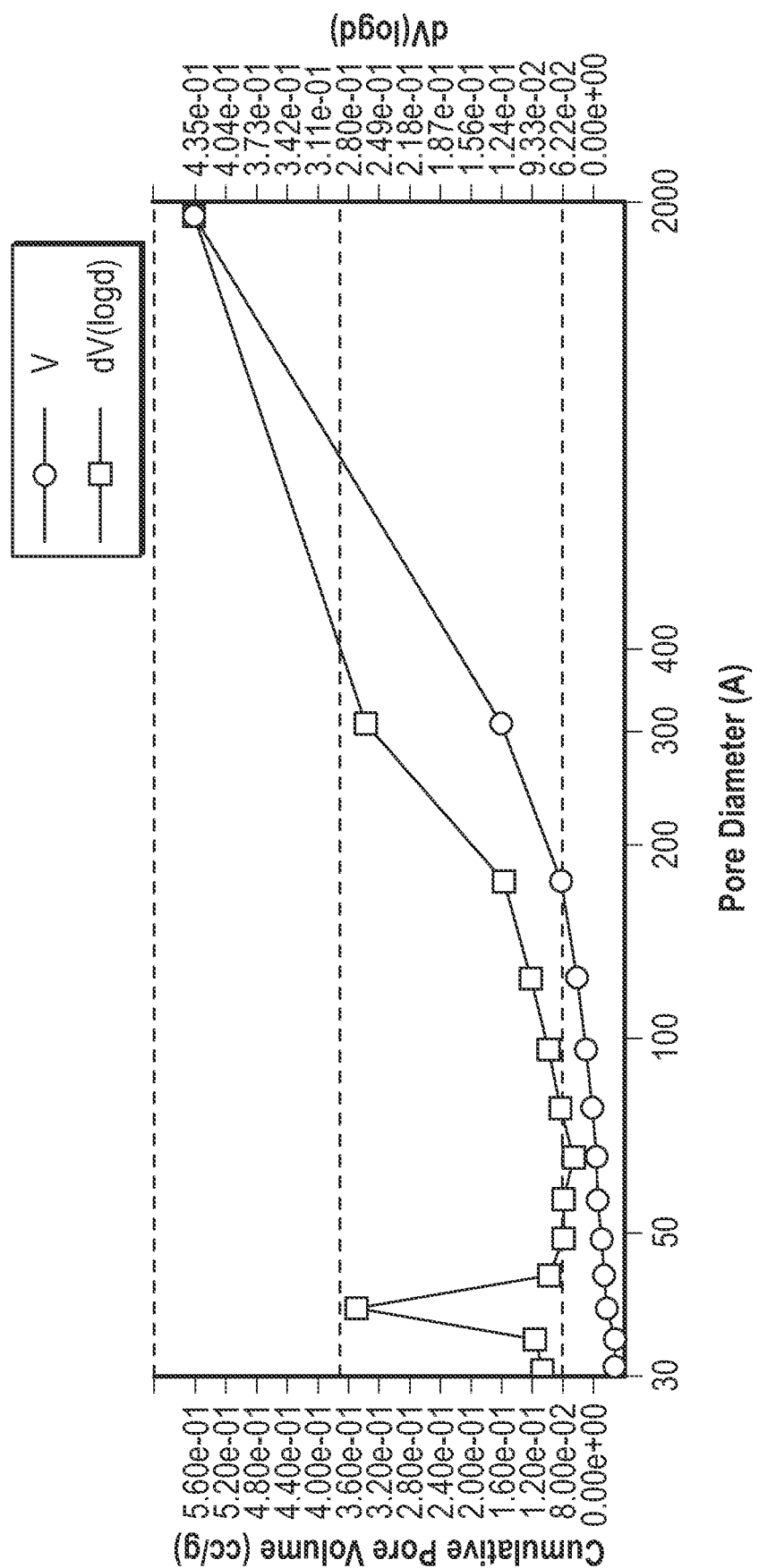
FIG. 10 shows the results of a nitrogen adsorption/desorption BJH (Barrett, Joyner, and Halenda) pore volume analysis of the aluminum chlorohydrate (ACH) heterocoagulated clay of Example 18, providing a plot of pore diameter (Angstrom, A) versus the cumulative pore volume (cubic centimeters per gram, cc/g) for the heteroadduct. The recipe for the preparation of this heteroadduct slurry used 1.76 mmol Al/g clay.
Figure 11:
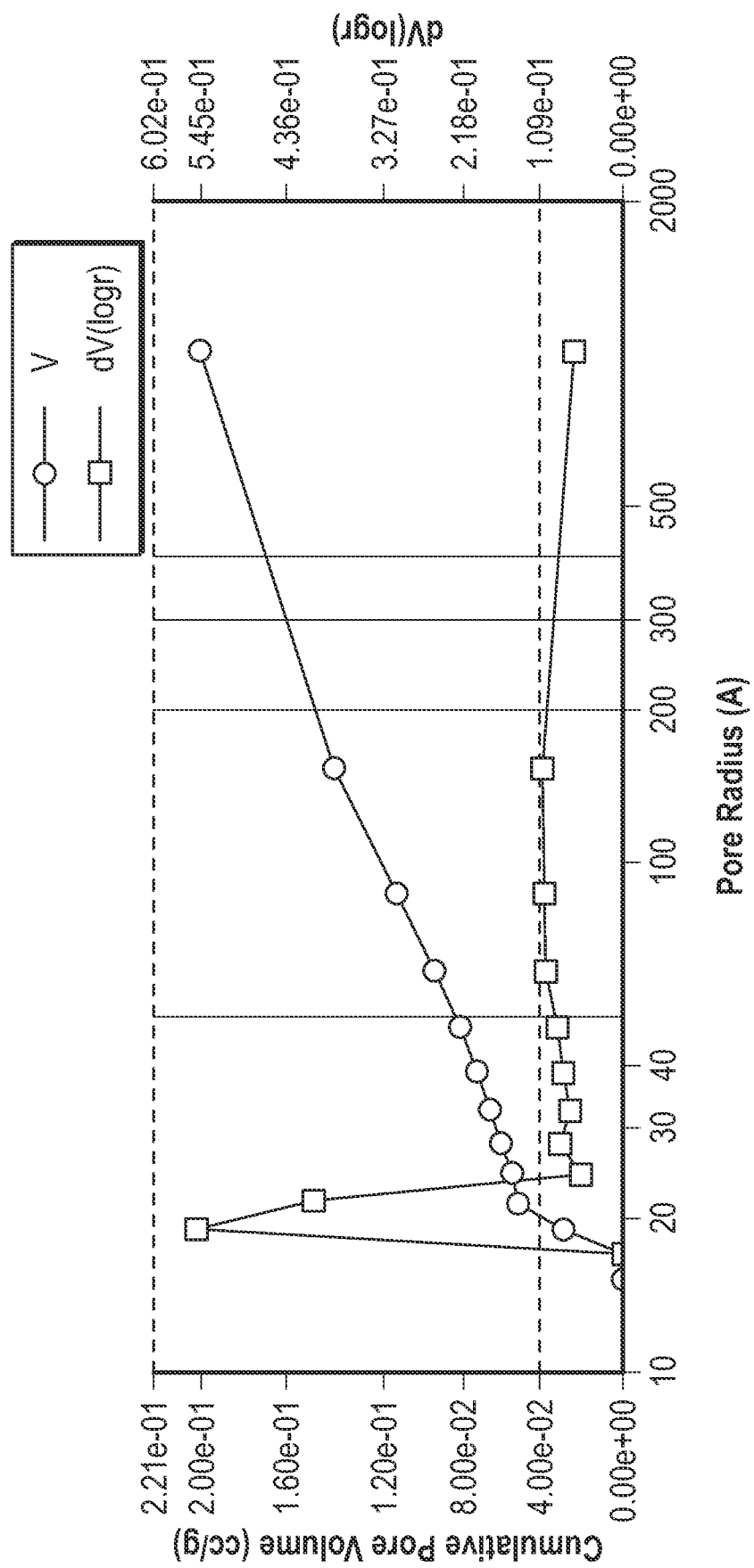
FIG. 11 provides the results of a nitrogen adsorption/desorption BJH pore volume analysis of a comparative sheared, then azeotroped, sample of Volclay® HPM-20 bentonite, but without further treatment, according to comparative Example 3 showing values for V3-10 nm that are greater than 55% of the cumulative pore volume V3-30 nm.
Figure 12:
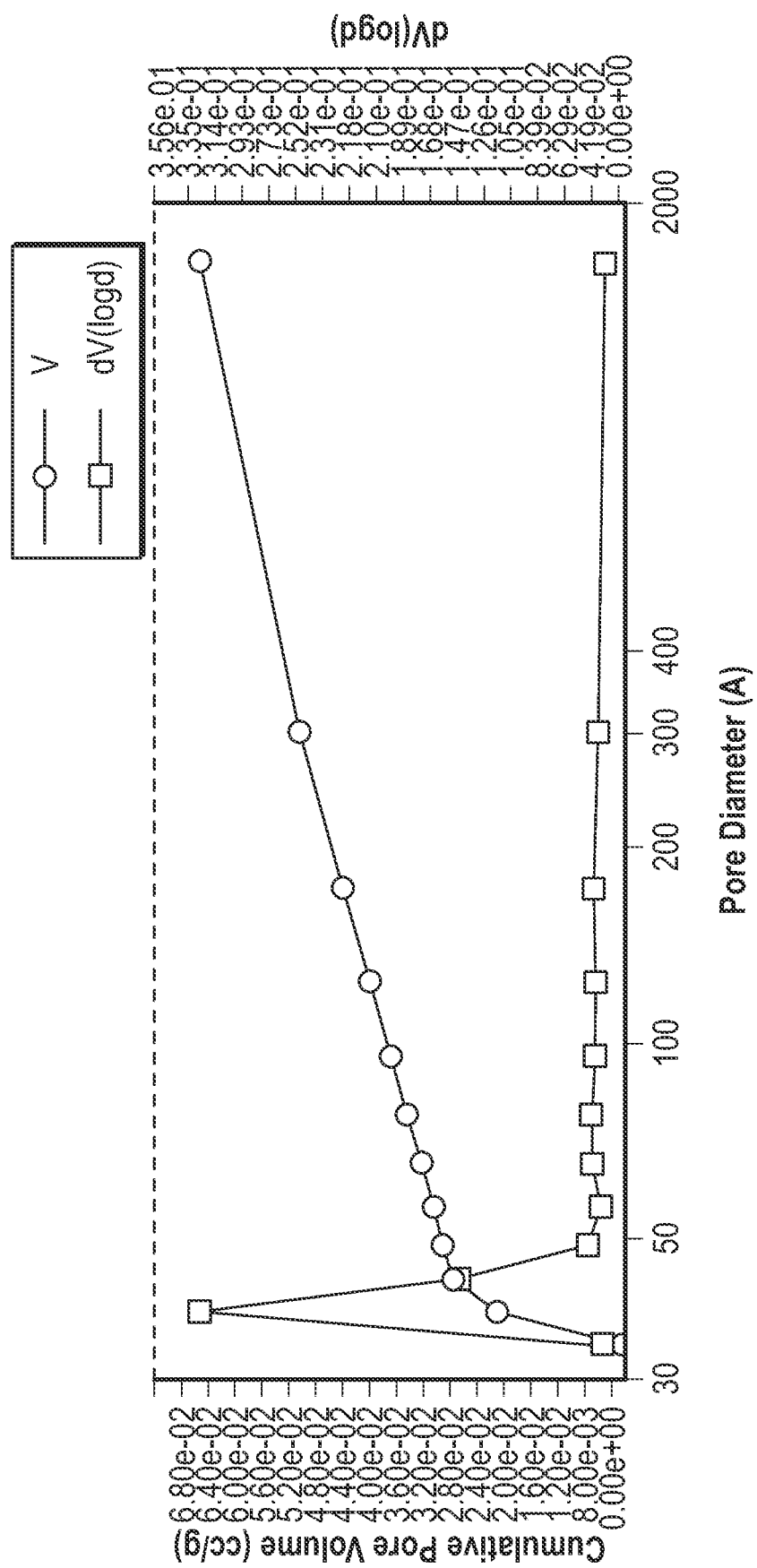
FIG. 12 shows the results of a nitrogen adsorption/desorption BJH pore volume analysis of an untreated sample of Volclay® HPM-20 bentonite which was suspended in water, evaporated, and calcined, but without further treatment according to comparative Example 1, showing values for $V_{3-10\,nm}$ that are greater than 55% of the cumulative pore volume $V_{3-30\,nm}$.

A comparison of the BJH porosities of clays and clay heteroadduct is presented in FIG. 10, FIG. 11, and FIG. 12. The BJH pore volume analysis of the starting montmorillonite which was calcined but otherwise non-azeotroped and untreated with a heterocoagulation agent is presented in FIG. 11 (Example 1). The pore volume analysis of the starting montmorillonite which was sheared, then azeotroped and calcined, but otherwise untreated with a heterocoagulation agent is presented in FIG. 12 (Example 3). Finally, the pore volume analysis of the aluminum chlorhydrate (ACH) heterocoagulated clay of Example 18 (1.76 mmol Al/g clay) is presented in FIG. 10. Thus, in the absence of a heterocoagulation reagent, calcined smectites such as bentonites can possess BJH porosities from about 0 cc/g to about 0.2 cc/g.

Cumulative pore volume between specific pore diameter bounds can be determined using the BJH method derived pore volume distribution. The cumulative pore volume between pore diameters of X nm (nanometers) and Y nm ($V_{X-Y nm}$), in which X nm is the lower bound of pore diameter, and Y is the upper bound of the pore diameter, is determined by subtracting from the total cumulative pore volume from pore diameters 0 nm to Y nm by the total cumulative pore volume from pore diameters 0 nm to X nm. In situations where the total cumulative pore volume for either the upper bound or lower bound of pore diameter is not available, this pore volume is estimated by linear interpolation between the two closest pore diameter points for which cumulative pore volume data is available.

In one aspect of the calcined clay heteroadduct, the combined or cumulative pore volume of pores between 3-10 nm diameter ($V_{3-10\ nm}$, or "small mesopores") can comprise less than 55% of the cumulative pore volume of pores between 3-30 nm ($V_{3-30\ nm}$). In a further aspect, $V_{3-10\ nm}$ can comprise less than 50% of the cumulative pore volume $V_{3-30\ nm}$, or alternatively, $V_{3-10\ nm}$ can comprise less than 40% of the cumulative pore volume $V_{3-30\ nm}$. This feature is illustrated by the data of FIG. 10, which sets out the BJH pore volume analysis of Example 18 smectite heteroadduct, in which the value of $V_{3-10\ nm}$ is about 0.33 ($V_{3-30\ nm}$). This pore volume analysis contrasts with BJH pore volume analysis of both the untreated, non-azeotroped clay (Example 1, FIG. 11) and those of the azeotroped clay (Example 3, FIG. 12), both of which are characterized by $V_{3-10\ nm}$ being greater than $0.55(V_{3-30\ nm})$.

These pore volume features of the clay heteroadduct of FIG. 10 of this disclosure contrast with the pore volume features of the acid-treated clays of Murase et al. in U.S. Pat. No. 9,751,961, which discloses that the sum of the volumes of pores having a diameter from 2 nm to 10 nm ($V_{2-10\ nm}$) accounts for 60% to 100% of the total volume of mesopores, that is, all pores from 2 nm to 50 nm. (See, FIG. 1 and Table 1 of U.S. Pat. No. 9,751,961). Specifically, Murase et al. discloses that the smaller mesopores from 2 nm to 10 nm make up the majority of the total mesopore volume (2 nm to 50 nm), where the total mesopore volume can be calculated, for example, by $V_{2-10\ nm}+V_{10-30\ nm}+V_{30-50\ nm}$. In contrast, the clay heteroadducts of this disclosure are characterized by the volume of the smaller mesopores $V_{3-10\ nm}$ that is exceeded by $V_{10-30\ nm}$ alone. While not wishing to be bound by theory, it is thought that the increased proportion of larger mesopores as a share of the total porosity in this disclosure facilitates diffusion and accessibility of the metallocene compound to the ionizing site on clay heteroadduct surface. This is thought to contrast with the smaller mesopores which may hinder or even preclude diffusion of the metallocene to surfaces containing the ionizing sites, particularly for metallocenes with a radius of gyration that exceeds the smallest end of the mesopore diameter.

Additionally, as shown for example by Uchino et al. in U.S. Pat. No. 6,677,411, pore size distributions determined by the BJH method may be depicted by plotting dV(log D) vs. pore diameter. The diameter showing the highest value of this function can be represented by the term $D_M$ and is considered the most frequently appearing pore diameter. That is, $D_M$ is the diameter corresponding to the point with the highest value of DV(log D) in the region between 30 Å and 500 Å pore diameter. The ordinate value of $D_M$, which is the maximum value, is represented by the term $D_{VM}$. In one aspect, this logarithmic differential pore volume distribution typically possesses a local maximum between about 30 Å and about 40 Å (Angstroms). This local maximum intensity also may be the global maximum $D_{VM}$. In an aspect, the intensity at $D_{VM}$ can be at most about 200% of the intensity of the maximum value of dV(log D) between 200 Å and 500 Å. Alternatively, the intensity at $D_{VM}$ can be at most about 120% of the intensity of the maximum value of dV(log D) between 200 Å and 500 Å. Alternatively, still, the intensity at $D_{VM}$ can be at most about 100% of the intensity of the maximum value of dV(log D) between 200 Å and 500 Å. In another aspect, the maximum value of dV(log D) between 200 Å and 500 Å exceeds all values of dV(log D) between 30 Å and 200 Å. This contrasts to, for example, the acid treated clays of Uchino et al. in U.S. Pat. No. 6,677,411, which is incorporated by reference herein, in which the maximum $D_{VM}$ values observed in the logarithmic differential pore size distributions of the desirable embodiments possess associated diameters $D_M$ between 60 Å and 200 Å.

Similarly, the treated clay activators described by Casty et al. in U.S. Pat. No. 7,220,695 define a preferred embodiment in which the diameter $D_M$ showing maximum $D_{VM}$ value resides between 60 Å and 200 Å (Angstroms). In contrast, the most frequently appearing pore diameter DM of the clay heteroadducts of this disclosure resides either in the range of from 30 Å to 40 Å or in the range from 200 Å to 500 Å.

Further, the differential logarithmic pore volume distributions in U.S. Pat. No. 6,677,411 demonstrate substantially lower intensities in the 200 Å and 500 Å range compared to the 60 Å to 200 Å range. The maximum value of dV(log D) in the 200 Å and 500 Å range is typically less than 10% that of the maximum value of dV(log D) in the 60 Å and 200 Å range. In contrast, the clay heteroadducts of this disclosure can provide a maximum value of dV(log D) in the 200 Å and 500 Å range, which is typically greater than 100% that of the maximum value of dV(log D) in the 60 Å and 200 Å range. Though not wishing to be bound by theory, the presence of a larger share of the bigger mesopores in the clay heteroadducts of this disclosure is thought to be desirable due to greater ease of metallocene diffusion to ionizing sites of the support-activator.

F. Filterability of the Smectite Heteroadduct

The clay heteroadducts prepared in slurry form within the zeta potential range according to this disclosure unexpectedly exhibited an improved ease of isolation as compared to the analogous pillared clays prepared using the same smectite clay and heterocoagulation reagent. Specifically, the clay heteroadducts could be readily isolated by filtration, unlike the pillared clays. This enhanced filterability was observed and quantified by, for example, comparing the settling rate of slurries of a clay heteroadduct versus the settling rate of an analogous pillared clay prepared using the same clay and a slurry containing identical amounts of the clay.

A slurry settling rate comparison between a pillared clay and a heterocoagulated clay, each prepared with a 5 wt. % aqueous dispersion of HPM-20 clay, is set out in Table 1. Each slurry was prepared as described in the referenced Examples and added to a graduated cylinder, and the settling rate was measured over time by the observed volume of the substantially clear layer which is absent the cloudiness of visible colloidal particles at the top of the slurry. In this comparison, the settling rate of the heterocoagulated clay was significantly faster, for example, 5-fold faster on a volume basis. While not wishing to be bound by theory, it is thought that the increased particle size of the heterocoagulated clay dispersion having a zeta potential in a relatively narrow range around 0 mV, for example in a range of about ±10 mV, favors flocculation relative to pillared clay particles, which in contrast tend to remain dispersed.

TABLE 1

Slurry settling rate comparison between a pillared clay and a heterocoagulated clay, each prepared with a 2.5 wt. % aqueous dispersion of HPM-20 clay

| Example | Support type (mmol Al/g clay) | Settling volume (mL) | Settling time (h) |
|---|---|---|---|
| 43 | Pillared clay (5.7 mmol Al/g clay) | 3 mL | 95 h |
| 42 | Hetereocoagulated clay (1.52 mmol Al/g clay) | 15 mL | 95 h |

Accordingly, one method by which the filterability of the heterocoagulated clay slurries may be assessed as being "readily filterable" is by examining the settling rate of the slurry as compared with the settling rate of pillared clay slurries. In one aspect, a composition such as the clay heteroadduct is readily or easily filterable if the settling rate (as explained herein) of a 2.5 wt. % of the aqueous heteroadduct slurry is 3 times, 3.5 times, 4 times, 4.5 times, 5 times, 6 times, 7 times, 8 times, 9 times, or 10 times greater or more, than the settling rate of a 2.5 wt. % of the aqueous pillared clay slurry prepared using the same colloidal smectite clay, the same heterocoagulation reagent, and the same liquid carrier, wherein the settling rates are compared at about 12 hours, about 18 hours, about 24 hours, about 30 hours, about 36 hours, about 48 hours, about 72 hours, about 95 hours, about 96 hours, or about 100 hours, or more from the start of the settling test.

An additional demonstration of filterability was observed by quantifying the filtration rate or filtration speed of the clay slurries, as illustrated in Table 2. When a pillared clay slurry and a heterocoagulated clay slurry each using 5 g of clay were prepared to a total mass of 250 g and filtered, the heterocoagulated clay slurry filtered quickly and the filtrate water rapidly separated, whereas the filtration speed was over 80% slower for the pillared clay slurry. Again, while not wishing to be bound by theory, it is thought that the increased particle size of the flocculated heterocoagulated clay allows facile separation of the heterocoagulated clay particles and water, whereas the smaller particle size of the pillared clay leads to obstruction of the filter paper and slow separation, requiring much longer filtration time and sequential filtrations because of the need to replace the obstructed filter, for a preparative scale isolation of the pillared clay.

TABLE 2

Filtration rate comparison between a pillared clay slurry and a heterocoagulated clay slurry, each prepared with a 2.0 wt. % aqueous dispersion of HPM-20 clay

| Example | Support type (mmol Al/g clay) | Filtrate at 10 minutes (g) | Filtrate at 20 minutes (g) | Total filtrate at 20 minutes, after 96 hr standing (g) | Filtrate solids (initial clay + ACH solid weight) (g) |
|---|---|---|---|---|---|
| 45 | Pillared clay (5.7 mmol Al/g clay) | — | 39 | 206 | 1.4 (8.1) |
| 44 | Hetereocoagulate clay (1.52 mmol Al/g clay) | 224 | — | — | 0.2 (5.8) |

Therefore in an aspect, this disclosure provides other methods of quantifying filterability of the heteroadduct slurry demonstrates that the slurry can be considered readily filterable and readily filtered. In one aspect, a composition such as the clay heteroadduct is readily or easily filterable if the slurry is characterized by the following filtration behavior:

[a] when a 2.0 wt. % aqueous heteroadduct slurry is filtered within a time period of 0 hours to 2 hours after the contacting step b) (that is, after initial formation of the heteroadduct slurry), the proportion of a filtrate obtained at a filtration time of 10 minutes using either vacuum filtration or gravity filtration, based upon the weight of the liquid carrier in the slurry of the smectite heteroadduct is in a range of (1) from about 50% to about 100% by weight of the liquid carrier in the slurry before filtration, that is, of the initial slurry water weight (2) from about 60% to about 100% by weight of the liquid carrier in the slurry, (3) from about 70% to about 100% by weight of the liquid carrier in the slurry, or (4) from about 80% to about 100% by weight of the liquid carrier in the slurry before filtration; and

[b] the filtrate from the heteroadduct slurry, when evaporated, yields solids comprising less than 20%, less than 15%, or less than 10% of the initial combined weight of clay and heterocoagulation agent.

The feature of performing the filtration with 0 to 2 hours after the initial formation is specified because some non-heteroadduct slurries including some pillared clay slurry compositions can be filtered more easily after the slurry is allowed an initial settling period of several days.

In the Examples used to produce the Table 2 data, the heteroadduct slurry and the pillared clay slurry were filtered using a 20 micron filter within several minutes after the contacting step between the colloidal clay and the polymetallate. Essentially all of the water from the heteroadduct slurry had been filtered off at the 10 minute mark after initiating the vacuum filtration, while essentially none of the water from the pillared clay slurry had been filtered off at 10 minutes after initiating vacuum filtration. By assessing "readily filterable" using the combination of the two features recited above, it is not necessary to specify either the filter spacings (for example, 20 m) or whether the filtration was conducted by a gravity filtration or vacuum filtration. That is, a filter having a specified opening size can be easily identified by the person of ordinary skill, for example the 20 m filter used in the examples, which allows the clay heteroadduct to meet both of these criteria, but no filter size will allow the pillared clay to meet both of these criteria.

As an example of applying this "readily filterable" test, if a filter having too large of openings between the filter media is used, such that the pillared clay filtration meets the requirement of part [a] of the criteria above, it will fail part [b] and will not be considered readily filterable. The clay heteroadduct will also fail part [b] when using such a large filter size, but reducing the filter size (for example, to about 20 m) will allow the clay heteroadduct to meet both criteria [a] and [b], whereas the pillared clay will fail part [a] when reducing the filter size, because the filter will clog and little or no liquid carrier will be filtered through.

Similarly, either gravity or vacuum filtration can be used in the "readily filterable" test because at the point in time at which the measurements of the filtrates is specified (10 minutes after initiating the filtration), a proper filter size can be easily identified by the person of ordinary skill which will allow the clay heteroadduct to meet both criteria [a] and [b], whereas the pillared clay will fail at least one of criteria [a] and [b].

In another aspect, another method of quantifying filterability is as follows. A composition such as the clay heteroadduct can be considered readily filterable or readily filtered if the slurry is characterized by the following filtration behavior:

[a] when a 2.0 wt. % aqueous heteroadduct slurry is filtered within a time period of 0 hours to 2 hours after the contacting step b) to provide a first filtrate, the weight ratio of a second filtrate to the first filtrate is less than 0.25, less than 0.20, less than 0.10, less than 0.15, less than 0.10, less than 0.5, or about 0.0, wherein the second filtrate is obtained from filtration of a 2.0 wt. % slurry of a pillared clay prepared using the colloidal smectite clay, the heterocoagulation reagent, and the liquid carrier, and wherein the weight of the first filtrate and the weight of the second filtrate are measured after identical filtration times of 5 minutes, 10 minutes or 15 minutes; and

[b] the filtrate from the heteroadduct slurry, when evaporated, yields solids comprising less than 20%, less than 15%, or less than 10% of the initial combined weight of clay and heterocoagulation agent.

Therefore, this test compares the filtrates collected from slurries of the heteroadduct versus the pillared clay, whereas the prior test compares the filtrate collected from a slurry of the heteroadduct versus the aqueous carrier in the initial slurry.

G. Metallocene Compounds

The calcined clay heteroadduct can be used as a substrate or catalyst support-activator for one or more suitable polymerization catalyst precursors such as metallocenes, other organometallic compounds, and/or organoaluminum compounds and the like, or other catalyst components in order to prepare an olefin polymerization catalyst composition. Therefore, in one aspect, when a clay heteroadduct is prepared as disclosed herein and combined with an organo-main group metal, such as alkylaluminum compounds and group 4 organotransition metal compound such as a metallocene, an active olefin polymerization catalyst or catalyst system is provided.

The support-activator of this disclosure can be used with metallocene compounds (also referred to herein as metallocene catalysts) and co-catalysts such as organoaluminum compounds, the resulting composition exhibits catalytic polymerization activity in the absence or substantial absence of an ion-exchanged, protic-acid-treated, or pillared clay, or aluminoxane or borate activators. Previously, activators such as aluminoxane or borate activators have been thought of as necessary in order to achieve polymerization catalytic activity with metallocene or single site or coordination catalyst systems. However, the combination of heteroadduct support-activator, metallocene, and co-catalyst such as aluminum alkyl compound if desired to impart an activatable alkyl ligand to the metallocene provides an active catalyst with the need for other activators such as aluminoxane or borate activators.

Metallocene compounds are well-understood in the art, and the skilled person will recognize that any metallocene can be used with the support-activator described in this disclosure, including for example, both non-bridged (non-ansa) metallocene compounds or bridged (ansa) metallocene compounds, or combinations thereof. Therefore, one, two, or more metallocene compounds can be used with the clay heteroadduct support-activators of this disclosure.

In one aspect, the metallocene can be a metallocene comprising a group 3 to group 6 transition metal or a metallocene comprising a lanthanide metal or a combination of more than one metallocene. For example, the metallocene can comprise a group 4 transition metal (titanium, zirconium, or hafnium). In a further aspect, the metallocene compound can comprises, consists of, consists essentially of, or is selected from a compound or a combination of compounds, each independently having the formula:

$(X^1)(X^2)(X^3)(X^4)M$, wherein a) M is selected from titanium, zirconium, or hafnium;
b) $X^1$ is selected from a substituted or an unsubstituted cyclopentadienyl, indenyl, fluorenyl, pentadienyl, allyl, boratabenzenyl, 1,2-azaborolyl, or 1,2-diaza-3,5-diborolyl, wherein any substituent is selected independently from a halide, a $C_1$-$C_{20}$ hydrocarbyl, a $C_1$-$C_{20}$ heterohydrocarbyl, a $C_1$-$C_{20}$ organoheteryl, a fused $C_4$-$C_{12}$ carbocyclic moiety, or a fused $C_4$-$C_{11}$ heterocyclic moiety having at least one heteroatom selected independently from nitrogen, oxygen, sulfur, or phosphorus;
c) $X^2$ is selected from: [1] a substituted or an unsubstituted cyclopentadienyl, indenyl, fluorenyl, pentadienyl, or allyl, wherein any substituent is selected independently from a halide, a $C_1$-$C_{20}$ hydrocarbyl, a $C_1$-$C_{20}$ heterohydrocarbyl, or a $C_1$-$C_{20}$ organoheteryl; or [2] a halide, a hydride, a $C_1$-$C_{20}$ hydrocarbyl, a $C_1$-$C_{20}$ heterohydrocarbyl, a $C_1$-$C_{20}$ organoheteryl, a fused $C_4$-$C_{12}$ carbocyclic moiety, or a fused $C_4$-$C_{11}$ heterocyclic moiety having at least one heteroatom selected independently from nitrogen, oxygen, sulfur, or phosphorus;
d) wherein $X^1$ and $X^2$ are optionally bridged by at least one linker substituent having from 2 to 4 bridging atoms selected independently from C, Si, N, P, or B, wherein each available non-bridging valence of each bridging atom is unsubstituted (bonded to H) or substituted, wherein any substituent is selected independently from, a halide, a $C_1$-$C_{20}$ hydrocarbyl, a $C_1$-$C_{20}$ heterohydrocarbyl, or a $C_1$-$C_{20}$ organoheteryl, and wherein any hydrocarbyl, heterohydrocarbyl, or organoheteryl substituent can form a saturated or unsaturated cyclic structure with a bridging atom or with $X^1$ or $X^2$;
e) [1] $X^3$ and $X^4$ are selected independently from a halide, a hydride, a $C_1$-$C_{20}$ hydrocarbyl, a $C_1$-$C_{20}$ heterohydrocarbyl, or a $C_1$-$C_{20}$ organoheteryl; [2] $[GX^A_k X^B_{4-k}]$, wherein G is B or Al, k is a number from 1 to 4, and $X^A$ in each occurrence is selected independently from H or a halide, and $X^B$ in each occurrence is selected independently from a $C_1$-$C_{12}$ hydrocarbyl, a $C_1$-$C_{12}$ heterohydrocarbyl, a $C_1$-$C_{12}$ organoheteryl; [3] $X^3$ and $X^4$ together are a $C_4$-$C_{20}$ polyene; or [4] $X^3$ and $X^4$ together with M form a substituted or an unsubstituted, saturated or unsaturated $C_3$-$C_6$ metallacycle moiety, wherein any substituent on the metallacycle moiety is selected independently from a halide, a $C_1$-$C_{20}$ hydrocarbyl, a $C_1$-$C_{20}$ heterohydrocarbyl, or a $C_1$-$C_{20}$ organoheteryl.

According to a further aspect, if desired, $X^1$ and $X^2$ can be bridged by a linker substituent selected from:
a) >$EX^5_2$, -$EX^5_2EX^5_2$—, -$EX^5_2EX^5EX^5_2$—, or >C=$CX^5_2$, wherein E in each occurrence is independently selected from C or Si;
b) —$BX^5$—, —$NX^5$—, or —$PX^5$—; or
c) [—$SiX^5_2(1,2$-$C_6H_4)SiX^5_2$—], [—$CX^5_2(1,2$-$C_6H4)CX^5_2$—], [—$SiX^5_2(1,2$-$C_6H_4)CX^5_2$—], [—$SiX^5_2(1,2$-$C_2H_2)SiX^5_2$—], [—$CX^5_2(1,2$-$C_6H_4)CX^5_2$—], or [—$SiX^5_2(1,2$-$C_6H_4)CX^5_2$—];
wherein $X^5$ in each occurrence is selected independently from H, a halide, a $C_1$-$C_{20}$ hydrocarbyl, a $C_1$-$C_{20}$ heterohydrocarbyl, or a $C_1$-$C_{20}$ organoheteryl;
and wherein any $X^5$ substituents selected from hydrocarbyl, heterohydrocarbyl, or organoheteryl substituent can form a saturated or unsaturated cyclic structure with a bridging atom, another $X^5$ substituent, $X^1$, or $X^2$.

Examples of suitable linker substituents which can bridge $X^1$ and $X^2$ include $C_1$-$C_{20}$ hydrocarbylene group, a $C_1$-$C_{20}$ hydrocarbylidene group, a $C_1$-$C_{20}$ heterohydrocarbyl group, a $C_1$-$C_{20}$ heterohydrocarbylidene group, a $C_1$-$C_{20}$ heterohydrocarbylene group, or a $C_1$-$C_{20}$ heterohydrocarbylidene group. For example, $X^1$ and $X^2$ can be bridged by at least one substituent having the formula >$EX^5_2$, -$EX^5_2EX^5_2$—, or —$BX^5$—, wherein E is independently C or Si, $X^5$ in each occurrence is selected independently from a halide, a $C_1$-$C_{20}$ aliphatic group, a $C_6$-$C_{20}$ aromatic group, a $C_1$-$C_{20}$ heteroaliphatic group, a $C_4$-$C_{20}$ heteroaromatic group, or a $C_1$-$C_{20}$ organoheteryl group.

The Aspects section of this disclosure recites additional description and selections regarding linking moieties between $X^1$ and $X^2$, regarding $X^5$, and regarding specific linker substituents or $X^5$ substituents.

The Aspects section of this disclosure also recites additional description and selections for X1 and X2, including specific substituents on X1 and X2.

The Aspects section of this disclosure also recites additional description and selections for X3 and X4, including specific substituents on X3 and X4.

The Aspects section of this disclosure also provides some specific examples of metallocene compounds that are useful in combination with the support-activator of this disclosure.

Metallocene compounds are understood by the person skilled in the art, who will recognize and appreciate the methods of making and using the metallocene in olefin polymerization catalyst systems. Many metallocenes and processes to make metallocenes and organotransition metal compounds are known in the art, such as disclosed in U.S. Pat. Nos. 4,939,217; 5,210,352; 5,436,305; 5,401,817; 5,631,335, 5,571,880; 5,191,132; 5,480,848; 5,399,636; 5,565,592; 5,347,026; 5,594,078; 5,498,581; 5,496,781; 5,563,284; 5,554,795; 5,420,320; 5,451,649; 5,541,272; 5,705,478; 5,631,203; 5,654,454; 5,705,579; 5,668,230; 9,045,504; and 9,163,100, and U.S. Patent Application Publication No. 2017/0342175, the entire disclosures of which are incorporated herein by reference.

H. Co-Catalysts

According to one aspect, this disclosure provides a catalyst composition for olefin polymerization, the catalyst composition comprising: a) at least one metallocene compound; b) optionally, at least one co-catalyst; and c) at least one support-activator as described herein. The co-catalyst includes compounds such as a trialkyl aluminum which are thought to impart a ligand to the metallocene which can initiate polymerization when the metallocene is otherwise activated with the support-activator. The co-catalyst may be considered optional, for example, in scenarios in which the metallocene may already include a polymerization-activatable/initiating ligand such as methyl or hydride. It will be understood that even when the metallocene compound includes such as a polymerization-activatable/initiating ligand, a co-catalyst can be used for other purposes, such as to scavenge moisture from the polymerization reactor or process. Thus, the co-catalyst can comprise or be selected from, for example, an alkylating agent, a hydriding agent, or a silylating agent. The metallocene compound, the support-activator, and the co-catalyst can be contacted in any order.

The co-catalyst can comprises or can be selected from an organoaluminum compound, an organoboron compound, an organozinc compound, an organomagnesium compound, an organolithium compound, or any combination thereof. The Aspects section of this disclosure recites additional description and selections for each of the organoaluminum compound, organoboron compound, organozinc compound, organomagnesium compound, and organolithium compound.

In an aspect, for example, the co-catalyst can comprise, consists of, consist essentially of, or be selected from at least one organoaluminum compound which can independently have the formula Al(XA)n(XB)m, Mx[AlXA4], Al(XC)n (XD)3-n, Mx[AlXC4], that is, can be neutral molecular compounds or ionic compounds/salts of aluminum, wherein each of the variables of these formulas is defined in the Aspects section of this disclosure. For example, the co-catalyst can comprise, consists of, consist essentially of, or be selected from trimethylaluminum, triethylaluminum (TEA), tripropylaluminum, tributylaluminum, trihexylaluminum, trioctylaluminum, ethyl-(3-alkylcyclopentadiyl)aluminum, diethylaluminum ethoxide, diisobutylaluminum hydride, triisobutylaluminum (TIBAL), diethylaluminum chloride, ethyl-(3-alkylcyclopentadiyl)aluminum, and the like, including any combination thereof.

In another aspect, for example, the co-catalyst can comprise, consists of, consist essentially of, or be selected from at least one organoboron compound which can independently have the formula $B(XE)_q(X^F)_{3-q}$ or $M^p[BXE_4]$, that is, can be neutral molecular compounds or ionic compounds/salts of boron, wherein each of the variables of these formulas is defined in the Aspects section of this disclosure. For example, the co-catalyst can comprise, consists of, consist essentially of, or be selected from trimethylboron, triethylboron, tripropylboron, tributylboron, trihexylboron, trioctylboron, diethylboron ethoxide, diisobutylboron hydride, triisobutylboron, diethylboron chloride, di-3-pinanylborane, pinacolborane, catecholborane, lithium borohydride, lithium triethylborohydride, and the like, including a Lewis base adduct thereof, or any combination or mixture thereof. In another aspect, the co-catalyst can comprise or can be a halogenated organoboron compound, for example a fluorinated organoboron compound, examples of which include tris(pentafluorophenyl)boron, tris[3,5-bis(trifluoromethyl)phenyl]boron, N,N-dimethylanilinium tetrakis(pentafluorophenyl)borate, triphenylcarbenium tetrakis (pentafluorophenyl)borate, lithium tetrakis-(pentafluorophenyl)borate, N,N-dimethylanilinium tetrakis [3,5-bis(trifluoro-methyl)phenyl]borate, triphenylcarbenium tetrakis[3,5-bis(trifluoromethyl)-phenyl]borate, and any combination or mixture thereof.

In yet another aspect, for example, the co-catalyst can comprise, consists of, consist essentially of, or be selected from at least one organozinc or organomagnesium compound which can independently have the formula $M^C(X^G)_r(X^H)_{2-r}$, wherein each of the variables of this formula is defined in the Aspects section of this disclosure. For example, the co-catalyst can comprise, consists of, consist essentially of, or be selected from dimethylzinc, diethylzinc, diisopropylzinc, dicyclohexylzinc, diphenylzinc, butylethylmagnesium, dibutylmagnesium, n-butyl-sec-butylmagnesium, dicyclopentadienylmagnesium, ethylmagnesium chloride, butylmagnesium chloride, and the like, including any combination thereof.

In yet another aspect, for example, the co-catalyst can comprise, consists of, consist essentially of, or be selected from at least one organolithium compound which can independently have the formula $Li(X^J)$, wherein each of the variables of the formula(s) are defined in the Aspects section of this disclosure. For example, the co-catalyst can comprise, consists of, consist essentially of, or be selected from methyllithium, ethyllithium, propyllithium, butyllithium (including n-butyllithium and t-butyllithium), hexyllithium, iso-butyllithium, and the like, or any combination thereof.

I. Optional Co-Activators

In an aspect, other activators in addition to the calcined smectite heteroadduct activator support can be used in the catalyst compositions of this disclosure if desired. These are referred to as co-activators, and examples of optional co-activators include but are not limited to an ion-exchanged clay, a protic-acid-treated clay, a pillared clay, an aluminoxane, a borate activator, an aluminate activator, an ionizing ionic compound, a solid oxide treated with an electron withdrawing anion, or any combination thereof.

The Aspects section of this disclosure recites additional description and selections for each of these optional co-activators.

Aluminoxanes. Aluminoxanes (also referred to as poly (hydrocarbyl aluminum oxides) or organoaluminoxanes) can be used to contact the other catalyst components, for example, in any solvent which is substantially inert to the reactants, intermediates, and products of the activation step such as a saturated hydrocarbon solvent or a solvent such as toluene. The catalyst composition formed in this manner may be isolated if desired or the catalyst composition may be introduced into the polymerization reactor without being isolated.

As understood by the skilled artisan, aluminoxanes are oligomeric, wherein the aluminoxane compound can comprise linear structures, cyclic, or cage structures, or mixtures thereof. For example, cyclic aluminoxane compounds having the formula $(R—Al—O)_n$, wherein R can be a linear or branched alkyl having from 1 to about 12 carbon atoms, and n can be an integer from 3 to about 12. The $(AlRO)_n$ moiety also constitutes the repeating unit in a linear aluminoxane, for example, having the formula: $R(R—Al—O)_nAlR_2$, wherein R can be a linear or branched alkyl having from 1 to about 12 carbon atoms, and n can be an integer from 1 to about 75. For example, the R group can be a linear or branched $C_1$-$C_8$ alkyl such as methyl, ethyl, propyl, butyl, pentyl, hexyl, heptyl, or octyl, and wherein n can represent an integer from 1 to about 50. Depending upon how the organoaluminoxane is prepared, stored, and used, the value of n may be variable within a single sample of aluminoxane, and such a combination or population of organoaluminoxane species is usually present in any sample.

Organoaluminoxanes can be prepared by various procedures known in the art, for example, organoaluminoxane preparations are disclosed in U.S. Pat. Nos. 3,242,099 and 4,808,561, each of which is incorporated by reference herein, in its entirety. In one aspect, an aluminoxane may be prepared by reacting water which is present in an inert organic solvent with an aluminum alkyl compound such as $AlR_3$ to form the desired organoaluminoxane compound. Alternatively, organoaluminoxanes may be prepared by reacting an aluminum alkyl compound such as $AlR_3$ with a hydrated salt, such as hydrated copper sulfate, in an inert organic solvent.

In one embodiment, the aluminoxane compound can be methylaluminoxane, ethylaluminoxane, n-propylaluminoxane, iso-propyl-aluminoxane, n-butylaluminoxane, t-butylaluminoxane, sec-butylaluminoxane, iso-butylaluminoxane, 1-pentylaluminoxane, 2-pentylaluminoxane, 3-pentyl-aluminoxane, iso-pentylaluminoxane, neopentylaluminoxane, or combinations thereof. In an aspect, methyl aluminoxane (MAO), ethyl aluminoxane (EAO), or isobutyl aluminoxane (IBAO) can be used as optional co-catalysts, and these aluminoxanes can be prepared from trimethylaluminum, triethylaluminum, or triisobutylaluminum, respectively. These compounds can be complex compositions, and are sometimes referred to as poly(methyl aluminum oxide), poly(ethyl aluminum oxide), and poly(isobutyl aluminum oxide), respectively. In another aspect, aluminoxanes can be used in combination with a trialkylaluminium, such as disclosed in U.S. Pat. No. 4,794,096, which is herein incorporated by reference in its entirety.

In preparing a catalyst composition comprising optional aluminoxane, the molar ratio of the aluminum present in the aluminoxane to the metallocene compound(s) in the composition can be lower than the typical molar ratio that would be used in the absence of the support-activator of the present disclosure. In the absence of support-activators of this disclosure, aluminoxane amounts can be, for example, from about 1:10 moles Al/moles metallocene (mol Al/mol metallocene) to about 100,000:1 mol Al/mol metallocene or from about 5:1 mol Al/mol metallocene to about 15,000:1 mol Al/mol metallocene. When used in combination with the disclosed support-activators, the relative amounts of aluminoxane can be reduced. For example, the amount of optional aluminoxane added to a polymerization zone can be less than the previous typical amount within a range of about 0.01 mg/L to about 1000 mg/L, from about 0.1 mg/L to about 100 mg/L, or from about 1 mg/L to about 50 mg/L. Alternatively, aluminoxane can be used in an amount typically used in the prior art, but with the additional use of a support-activator of the present disclosure in order to obtain further advantages for such a combination.

Organoboron compounds. The catalyst compositions of this disclosure can also comprise an optional organoboron co-activator if desired, in addition to the recited components (support-activator, metallocene, and optional co-catalyst). In one aspect, the organoboron compound can comprise or be selected form neutral boron compounds, borate salts, or combinations thereof. For example, the organoboron compounds can comprise or be selected from a fluoroorgano boron compound, a fluoroorgano borate compound, or a combination thereof, and any such fluorinated compounds known in the art can be utilized.

Thus, the term fluoroorgano boron compound is used herein to refer to the neutral compounds of the form $BY_3$, and the term fluoroorgano borate compound is used herein to refer to the monoanionic salts of a fluoroorgano boron compound of the form $[cation]^+[BY_4]^-$, where Y represents a fluorinated organic group. For convenience, fluoroorgano boron and fluoroorgano borate compounds are typically referred to collectively by organoboron compounds, or by either name as the context requires.

In an aspect, examples of fluoroorgano boron compounds that can be used as co-activators include, but are not limited to, tris(pentafluorophenyl)boron, tris[3,5-bis(trifluoromethyl)phenyl]boron, and the like, including mixtures thereof. Examples of fluoroorgano borate compounds that can be used as optional co-activators include, but are not limited to, fluorinated aryl borates such as, N,N-dimethylanilinium tetrakis-(pentafluorophenyl)borate, triphenylcarbenium tetrakis(pentafluorophenyl)borate, lithium tetrakis-(pentafluorophenyl)borate, N,N-dimethylanilinium tetrakis [3,5-bis(trifluoro-methyl)phenyl]borate, triphenylcarbenium tetrakis[3,5-bis(trifluoromethyl)-phenyl]borate, and the like, including mixtures thereof.

The Aspects section of this disclosure recites additional description and selections for the optional fluoroorgano boron and fluoroorgano borate compound co-activators.

Although not intending to be bound by theory, these fluoroorgano borate and fluoroorgano boron compounds are thought to form weakly-coordinating anions when combined with metallocene compounds, as disclosed in U.S. Pat. No. 5,919,983, which is incorporated herein by reference in its entirety.

Generally, any amount of organoboron compound can be utilized as an optional co-activator. For example, in one aspect, the molar ratio of the organoboron compound to the metallocene compound in the composition can be from about 0.1:1 mole of organoboron or organoborate compound per mole of metallocene (mol/mol) to about 10:1 mol/mol, or from about 0.5 mol/mol to about 10 mol/mol (mole of organoboron or organoborate compound per mole of metallocene), or alternatively in a range of from about 0.8 mol/mol to about 5 mol/mol (mole of organoboron or organoborate compound per mole of metallocene). However, it will be appreciated that the amount can be reduced or adjusted downward in the presence of a clay-heteroadduct support-activator.

Ionizing compounds. In a further aspect, the optional co-activators which can be used in addition to the recited components of the catalyst compositions of this disclosure can comprise or can be selected from ionizing compounds. Examples of ionizing compound are disclosed in U.S. Pat. Nos. 5,576,259 and 5,807,938, each of which is incorporated herein by reference, in its entirety.

The Aspects section of this disclosure recites additional description and selections for the optional ionizing compound co-activators.

The term ionizing compound is term of art and refers to a compound, particularly an ionic compound, which can function to enhance activity of the catalyst composition. In one aspect, the fluoroorgano borate compounds described herein as optional organoboron co-activators can also be considered and function as ionizing compound co-activators. However, the scope of the ionizing compounds is broader than the fluoroorgano borate compounds, as compounds such as fluoroorgano aluminate are encompassed by ionizing compounds.

While not intending to be bound by theory, it is believed that the ionizing compounds may be capable of interacting or reacting with the metallocene compound and converting the metallocene into a cationic or an incipient cationic metallocene compound, which activates the metallocene to polymerization activity. Again, while not intending to be bound by theory, it is believed that the ionizing compound may function by completely or partially extracting an anionic ligand from the metallocene, particularly a non-cycloalkadienyl ligand or non-alkadienyl ligand such as ($X^3$) or ($X^4$) of the metallocene formula $(X^1)(X^2)(X^3)(X^4)M$ disclosed herein, to form a cationic or incipient cationic metallocene. However, the ionizing compound can function as an activator (co-activator) regardless of any mechanism by which it functions. For example, the ionizing compound may ionize the metallocene, abstract an $X^3$ or $X^4$ ligand in a fashion as to form an ion pair, weakens the metal-$X^3$ or metal-$X^4$ bond, or simply coordinate to an X3 or $X^4$ ligand, or any other mechanisms by which activation may occur. Further, it is not necessary that the ionizing compound activate (co-activate) the metallocene only, as the activation function of the ionizing compound is evident in the enhanced activity of catalyst composition as a whole, as compared to a catalyst composition containing catalyst composition that does not comprise any ionizing compound.

Examples of ionizing compounds include, but are not limited to, the list of compounds presented in the Aspects section of this disclosure.

Optional Support-Activators. In a further aspect, the optional co-activators which can be used in addition to the recited components of the catalyst compositions of this disclosure can comprise or can be selected from other support-activators, sometimes termed activator-supports, which when used in the catalyst compositions described herein are termed co-activator-supports. Examples of optional co-activator-supports are disclosed in U.S. Pat. Nos. 6,107,230; 6,653,416; 6,992,032; 6,984,603; 6,833,338; and 9,670,296 each of which is incorporated herein by reference, in its entirety.

For example, the optional co-activator-support may comprise or be selected from silica, alumina, silica-alumina, or silica-coated alumina which is treated with at least one electron-withdrawing anion. For example, the silica-coated alumina can have a weight ratio of alumina-to-silica in a range of from about 1:1 to about 100:1, or from about 2:1 to about 20:1, in this aspect. The at least one electron-withdrawing anion can comprise or be selected from fluoride, chloride, bromide, phosphate, triflate, bisulfate, sulfate, and the like, or combinations thereof.

In an aspect, the optional co-activator-supports can be selected from, for example, fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, and the like, any of which or any combinations of which can be employed in catalyst compositions disclosed herein. Alternatively, or additionally, the co-activator-support can comprise or be selected from solid oxides treated with an electron withdrawing anion such as fluorided silica-alumina, or sulfated alumina and the like.

Examples of co-activator-supports can include, but are not limited to, those listed in the Aspects section of this disclosure.

J. Preparation of Catalyst Compositions

In the catalyst system the relative concentration or ratio of metallocene such as a group 4 metallocene of the formula $(X^1)(X^2)(X^3)(X^4)M$ to the calcined clay heteroadduct can be expressed as moles of M (metal) per grams of calcined clay heteroadduct (mol M/g heteroadduct). In one aspect, it has been found that the ratio of moles of M per grams of calcined clay heteroadduct can be in a range of from about 0.025 mol M/g heteroadduct to about 0.000000005 mol M/g heteroadduct. In another aspect, the moles of M per grams of calcined clay heteroadduct can be used in a range of from about 0.0005 mol M/g heteroadduct to about 0.00000005 mol M/g heteroadduct, or alternatively, from about 0.0001 mol M/g heteroadduct to 0.000001 mol M/g heteroadduct. As in all ranges disclosed herein, these recited ranges include the end points as well as intermediate values and subranges within the recited range. These ratios reflect the catalyst recipe, that is, these ratios are based on the amount of the components combined to give the catalyst composition, regardless of what the ratio may be in the final catalyst.

In the catalyst system the relative concentration or ratio of co-catalyst to the calcined clay heteroadduct can be expressed as moles of co-catalyst (for example, organoaluminum compound) per grams of calcined clay heteroadduct (mol co-catalyst/g heteroadduct). In one aspect, it has been found that the ratio of moles of co-catalyst such as an organoaluminum compound per grams of calcined clay heteroadduct can be in a range of from about 0.5 mol co-catalyst/g heteroadduct to about 0.000005 mol co-catalyst/g heteroadduct. In another aspect, the ratio of moles of co-catalyst per grams of calcined clay heteroadduct that can be used is in a range of from about 0.1 mol co-catalyst/g heteroadduct to about 0.00001 mol co-catalyst/g heteroadduct, or alternatively, from about 0.01 mol co-catalyst/g heteroadduct to about 0.0001 mol co-catalyst/g heteroadduct.

Catalyst compositions can be produced by contacting the transition metal compound such as a metallocene, the calcined clay heteroadduct, and the co-catalyst such as an organoaluminum compound under suitable conditions. Contacting can occur in any number of ways, for example by blending, by contact in a carrier liquid, by feeding each component into a reactor separately or in any order or combination. For example, various combinations of the components or compounds can be contacted with one another before being further contacted in a reactor with the remaining compound(s) or component(s). Alternatively, all three components or compounds can be contacted together before being introduced into a reactor. Regarding the additional optional components which can be used in the catalyst system disclosed herein, such as co-activators, ionizing ionic compounds, and the like, contacting steps using these optional components can occur in any way and in any order.

In one aspect, the catalyst composition can be prepared by first contacting a transition metal compound such as a metallocene, with a co-catalyst such as an organoaluminum compound, for a time period of from about 1 minute to about 24 hours, or alternatively from about 1 minute to about 1 hour, at a contact temperature that can range from about 10° C. to about 200° C., alternatively from about 12° C. to about 100° C., alternatively from about 15° C. to about 80° C., or alternatively from about 20° C. to about 80° C., to form a first mixture, and this first mixture can then be contacted with a calcined clay heteroadduct to form the catalyst composition.

In another aspect, the metallocene, the co-catalyst such as an organoaluminum compound, and the calcined clay heteroadduct can be pre-contacted before being introduced into a reactor. For example, the pre-contacting step may occur over a time period of from about 1 minute to about 6 months. In one aspect, for example, the pre-contacting step may occur over a time period of from about 1 minute to about 1 week at a temperature from about 10° C. to about 200° C. or from about 20° C. to about 80° C., to provide the active catalyst composition. Further, any subset of the final catalyst components also can be pre-contacted in one or more pre-contacting steps, each with its own pre-contacting time period.

After pre-contacting any or all of the catalyst system components, the catalyst composition can be said to comprise post-contacted components. For example, a catalyst composition can comprise a post-contacted metallocene, a post-contacted co-catalyst such as an organoaluminum compound, and a post-contacted calcined clay heterodduct component. It is not uncommon in the field of catalyst technology that the specific and detailed nature of the active catalytic site and the specific nature and fate of each component used to make the active catalyst are not precisely known. While not intending to be bound by theory, the majority of the weight of the catalyst composition based upon the relative weights of the individual components can be thought of as comprising the post-contacted calcined clay heteroadduct. Because the nature of the active site and post-contacted components are not precisely known, the catalyst composition may simply be described according to its components or referred to as comprising post-contacted compounds or components.

The polymerization activity of the catalyst composition can be expressed as the weight of polymer polymerized per weight of support-activator comprising the calcined smectite heteroadduct, per unit of time, for example, gram polymer/gram (calcined) support-activator/hour (g/g/hr). That is, activity can be calculated on the basis of the support-activator alone, absent any metallocene or co-catalyst components. This measurement allows comparisons of the various activator supports, including with other activators, where the metallocene, co-catalyst, and other conditions are the same or substantially the same. The activity values disclosed in the Examples were measured under slurry polymerization conditions, using isobutane as the diluent, unless otherwise specified, and with a polymerization temperature of from about 50° C. to about 150° C., (for example at a temperature of 90° C.), and using a combined ethylene and isobutane pressure in a range of from about 300 psi to about 800 psi, for example 450 psi for the total combined ethylene and isobutane. Activity data are reported as the weight of polymer produced divided by the weight of calcined clay heteroadduct per hour.

Catalyst activity can be a function of the metallocene and the calcined clay heteroadduct, as well as other components and conditions. Under the conditions explained above, the activity based on the weight of the calcined clay heteroadduct can be greater than about 1,000 grams of polyethylene polymer per gram of calcined clay heteroadduct per hour (g PE/g heteroadduct/hr, or simply, g/g/hr). In another aspect, the activity based on the weight of the calcined clay heteroadduct can be greater than about 2000 g/g/hr, greater than about 4,000 g/g/hr, greater than about 6,000 g/g/hr, greater than about 8,000 g/g/hr, greater than about 10,000 g/g/hr, greater than about 15,000 g/g/hr, greater than about 25,000 g/g/hr, or greater than about 50,000 g/g/hr. The upper limit for each of these activities can be about 70,000 g/g/hr, such that the activities can range from greater than these disclosed values, and less than about 75,000 g/g/hr.

For example, in an aspect and using the conditions described herein, the activator supports can have a polymerization activity of about 500 g/g/hr, about 750 g/g/hr, about 1,000 g/g/hr, about 1,250 g/g/hr, about 1,500 g/g/hr, 1,750 g/g/hr, about 2,000 g/g/hr, about 2,500 g/g/hr, about 3,500 g/g/hr, about 5,000 g/g/hr, about 7,500 g/g/hr, about 10,000 g/g/hr, about 12,500 g/g/hr, about 15,000 g/g/hr, about 17,500 g/g/hr, about 20,000 g/g/hr, about 25,000 g/g/hr, about 30,000 g/g/hr, about 35,000 g/g/hr, about 40,000 g/g/hr, about 50,000 g/g/hr, about 60,000 g/g/hr, about 70,000 g/g/hr, or about 75,000 g/g/hr, including any ranges between these values. The higher values of polymerization activity can be associated with clay supports having extremely site densities, and these activity values also can be metallocene dependent. Therefore, by applying the teachings herein, activity levels can be achieved that are in a range between two of the recited values recited, for example, activity levels can be obtained in the range of 500-75,000 g/g/hr, in the range as well as intermediate values and ranges such as 1,000-50,000 g/g/hr, 2,000-40,000 g/g/hr, or 2,500-20,000 g/g/hr. The activities of the Examples and in the data tables were measured under slurry homopolymerization conditions, using isobutane as the diluent, and with a polymerization temperature of 90° C., and a combined ethylene and isobutane pressure of 450 total psi and (1-n-butyl-3-methyl-cyclopentadienyl)$_2$ZrCl$_2$ and triethylaluminum catalyst composition unless otherwise noted.

In one aspect, no aluminoxane such as methyl aluminoxane was needed to activate the metallocene and form the catalyst composition. Methyl aluminoxane (MAO) is an expensive activator compound which can greatly increase the polymer production costs. Further, in another aspect, no organoboron compound or ionizing compound, such as borate compounds, were required to in order to activate the metallocene and form the catalyst composition. Further, ion-exchanged, protic-acid-treated or pillared clays, which require similarly multi-step preparations which increase costs, were also not required to activate the metallocene and form the catalyst composition. Therefore, an active heterogeneous catalyst composition can be easily and inexpensively produced and used for polymerizing olefin monomers including comonomers if desired in the absence of any aluminoxane compounds, boron compounds or borate compounds, ion-exchanged-, protic-acid-treated- or pillared-clays. Although MAO or other aluminoxanes, boron or borate compounds, ion-exchanged-clays, protic-acid-treated-clays, or pillared-clays are not required in the disclosed catalyst systems, these compounds can be used in reduced amounts or typical amounts according to other aspects of the disclosure.

K. Polyolefins and Polymerization Processes

In an aspect, this disclosure describes a process of contacting at least one olefin monomer and the disclosed catalyst composition to produce at least one polymer (polyolefin). The term "polymer" is used herein to include homopolymers, copolymers of two olefin monomers, and polymers of more than two olefin monomers such as terpolymers. For convenience, polymers of two or more than two olefin monomers are referred to as simply copolymers. Thus, the catalyst composition can be used to polymerize at least one monomer to produce a homopolymer or a copolymer.

In an aspect, homopolymers are comprised of monomer residues which have from 2 to about 20 carbon atoms per molecule, preferably 2 to about 10 carbon atoms per molecule. The olefin monomer can comprise or be selected from ethylene, propylene, 1-butene, 3-methyl-1-butene, 1-pentene, 3-methyl-1-pentene, 4-methyl-1-pentene, 1-hexene, 3-ethyl-1-hexene, 1-heptene, 1-octene, 1-nonene, 1-decene, and mixtures thereof. In one aspect, homopolymers of ethylene, homopolymers of propylene, and homopolymers of other olefins are encompassed by this disclosure. In another aspect, copolymers of ethylene and at least one comonomer and less commonly, copolymers of two non-ethylene copolymers, are encompassed by this disclosure.

When a copolymer is desired, each monomer may have from about 2 to about 20 carbon atoms per molecule. Comonomers of ethylene can include, but are not limited to, aliphatic 1-olefins having from 3 to 20 carbon atoms per molecule, such as, for example, propylene, 1-butene, 1-pentene, 4-methyl-1-pentene, 1-hexene, 1-octene, styrene, vinylcyclohexane and other olefins, and conjugated or non-conjugated diolefins such as 1,3-butadiene, isoprene, piperylene, 2,3-dimethyl-1,3-butadiene, 1,4-pentadiene, 1,7-hexadiene, and other such diolefins and mixtures thereof. In a further aspect, ethylene can be copolymerized with at least one comonomer comprising or selected from 1-butene, 4-methyl-1-pentene, 1-hexene, 1-octene, or 1-decene. An amount of comonomer can be introduced into a reactor zone which is sufficient to produce a copolymer that can incorporate from about 0.01 wt. % to about 10 wt. % comonomer or even beyond this range, based upon the total weight of the monomer and comonomer in the copolymer; alternatively, from about 0.01 wt. % to about 5 wt. % comonomer; alternatively still, from about 0.1 wt. % to about 4 wt. % comonomer; or alternatively still, any amount of comonomer can be introduced into a reactor zone that provides a desired copolymer.

Typically, the catalyst composition can be used to homopolymerize ethylene, or propylene, or copolymerize ethylene with a comonomer, or copolymerize ethylene and propylene. In another aspect, several comonomers may be polymerized with monomer in the same or different reactor zones to achieve the desired polymer properties.

Other useful comonomers can include polar vinyl, conjugated and non-conjugated dienes, acetylene and aldehyde monomers, which can be included for example in minor amounts in terpolymer compositions. For example, non-conjugated dienes useful as comonomers can be straight chain, hydrocarbon di-olefins or cycloalkenyl-substituted alkenes having from 6 to 15 carbon atoms. Suitable non-conjugated dienes can include, for example: (a) straight chain acyclic dienes, such as 1,4-hexadiene and 1,6-octadiene; (b) branched chain acyclic dienes, such as 5-methyl-1,4-hexadiene; 3,7-dimethyl-1,6-octadiene; and 3,7-dimethyl-1,7-octadiene; (c) single ring alicyclic dienes, such as 1,4-cyclohexadiene; 1,5-cyclo-octadiene and 1,7-cyclododecadiene; (d) multi-ring alicyclic fused and bridged ring dienes, such as tetrahydroindene; norbornadiene; methyl-tetrahydroindene; dicyclopentadiene (DCPD); bicyclo-(2.2.1)-hepta-2,5-diene; alkenyl, alkylidene, cycloalkenyl and cycloalkylidene norbornenes, such as 5-methylene-2-norbornene (MNB), 5-propenyl-2-norbornene, 5-isopropylidene-2-norbornene, 5-(4-cyclopentenyl)-2-norbornene, 5-cyclohexylidene-2-norbornene, and 5-vinyl-2-norbornene (VNB); and (e) cycloalkenyl-substituted alkenes, such as vinyl cyclohexene, allyl cyclohexane, vinyl cyclooctene, 4-vinyl cyclohexene, allyl cyclodecene, and vinyl cyclododecene. Particularly useful non-conjugated dienes include dicyclopentadiene, 1,4-hexadiene, 5-methylene-2-norbornene, 5-ethylidene-2-norbornene, and tetracyclo-(.Δ.-11,12)-5,8-dodecene. Particularly useful diolefins include 5-ethylidene-2-norbornene (ENB), 1,4-hexadiene, dicyclopentadiene (DCPD), norbornadiene, and 5-vinyl-2-norbornene (VNB). Note that throughout this description the terms "non-conjugated diene" and "diene" are used interchangeably.

The catalyst compositions can be used for polymerizing olefins to make oligomeric and polymeric materials having a wide range of densities, for example, in a range of from about 0.66 g/mL (also, g/cc) to about 0.96 g/mL, which are used in numerous applications. The catalyst compositions disclosed herein are particularly useful for the production of copolymers. For example, copolymer resins may have a density of 0.960 g/cc or less, preferably 0.952 g/cc or less, or more preferably 0.940 g/cc or less. In accordance with certain aspects of the present disclosure, it is possible to achieve densities of less than 0.91 g/cc and even as low as 0.860 g/cc. When describing a density as less than a specific density, one lower limit of such densities can be about 0.860 g/cc. Copolymer resins can contain at least about 65 wt. % (percent by weight) of ethylene units, that is, the weight percent of ethylene monomers actually incorporated into the copolymer resin. In another aspect, the copolymer resins of this disclosure can contain at least about 0.5 wt. %, for example, from 0.5 wt. % to 35 wt. % of an alpha-olefin (α-olefin), referring to the weight percent of alpha-olefin comonomers actually incorporated into the copolymer resin.

The catalyst compositions prepared according to the present disclosure are also useful for preparing: (a) ethylene/propylene copolymers, including "random copolymer" in which the commoner is distributed randomly along the polymer back-bone or chain; (b) "propylene random copolymer", in which a random copolymer of propylene and ethylene comprising about 60 wt. % of the polymer derived from propylene units; and (c) "impact copolymer" meaning two or more polymers in which one polymer is dispersed in the other polymer, typically one polymer comprising a matrix phase and the other polymer comprising an elastomer phase. The catalyst compositions described herein may further be used to prepare polyalphaolefins with monomers containing more than three carbons. Such oligomers and polymers are particularly useful, for example, as lubricants.

Any number of polymerization methods or processes can be used with the catalyst compositions of this disclosure. For example, slurry polymerization, gas phase polymerization, and solution polymerization and the like, including multi-reactor combinations thereof, can be used. Multi-reactor combinations can be configured in a serial or parallel configuration, or a combination thereof, depending upon the desired polymerization sequence. Examples of reactor systems and combinations can include, for example, dual slurry loops in series, multiple slurry tanks in series, or slurry loop combined with gas phase, or multiple combinations of these processes, in which polymerization of ethylene, propylene and alpha-olefins separately or together can be carried out. In another aspect, gas phase reactors can comprise fluidized bed reactors or tubular reactors, slurry reactors can comprise vertical loops or horizontal loops or stirred tanks, and solution reactors can comprise stirred tank or autoclave reactors. Thus, any polymerization zone known in the art which can produce polyolefins such as ethylene and alpha-olefin-containing polymers including polyethylene, polypropylene, ethylene alpha-olefin copolymers, as well as more generally to substituted olefins such as vinylcyclohexane, can be utilized. In an aspect, for example, a stirred reactor can be utilized for a batch process, and then the reaction can be carried out continuously in a loop reactor or in a continuous stirred reactor or in a gas phase reactor.

The catalyst compositions comprising the recited components can polymerize olefins in the presence of a diluent or liquid carrier, and these two terms are used interchangeably herein, even if a catalyst component is not soluble in the diluent or liquid carrier. Suitable diluents used in slurry and solution polymerization are known in the art and include hydrocarbons which are liquid under reaction conditions. Further, term "diluent" as used in this disclosure does not necessarily mean that the material is inert, as it is possible that a diluent can contribute to polymerization such as in bulk polymerizations with propylene.

Suitable hydrocarbon diluents can include, but are not limited to cyclohexane, isobutane, n-butane, propane, n-pentane, isopentane, neopentane, and n-hexane, and higher boiling solvents such as ISOPAR™ and the like. Isobutane works well as the diluent in a slurry polymerization. Examples of such slurry polymerization technologies can be found in U.S. Pat. Nos. 4,424,341; 4,501,885; 4,613,484; 4,737,280; and 5,597,892; the entire disclosures of which are incorporated herein by reference. When polymerizing propylene, or other alpha-olefins, the propylene or alpha-olefin itself can comprise the solvent, which are known in the art as bulk polymerizations.

In various aspects and embodiments, polymerization reactors suitable for use with the catalyst system can comprise at least one raw material feed system, at least one feed system for catalyst or catalyst components, at least one reactor system, at least one polymer recovery system or any suitable combination thereof. Suitable reactors can further comprise any, or combination of, a catalyst storage system, an extrusion system, a cooling system, a diluent recycling system, a monomer recycling system, and comonomer recycling system or a control system. Such reactors can comprise continuous take-off and direct recycling of the catalyst, diluent, monomer, comonomer, inert gases, and polymer as desired. In one aspect, continuous processes can comprise the continuous introduction of a monomer, a comonomer, a catalyst, a co-catalyst if desired, and a diluent into a polymerization reactor and the continuous removal from this reactor of a suspension comprising polymer particles and the diluent.

In one aspect, the polymerization methods can be carried out over a wide temperature range, for example, the polymerization temperatures may be in a range of from about 50° C. to about 280° C., and in another aspect, polymerization reaction temperatures may be in a range of from about 70° C. to about 110° C. The polymerization reaction pressure can be any pressure that does not terminate the polymerization reaction. In one aspect, polymerization pressures may be from about atmospheric pressure to about 30000 psig. In another aspect, polymerization pressures may be from about 50 psig to about 800 psig.

The polymerization reaction can be carried out in an inert atmosphere, that is, in an atmosphere substantially free of molecular oxygen and under substantially anhydrous conditions; thus, in the absence of water as the reaction begins. Therefore a dry, inert atmosphere, for example, dry nitrogen or dry argon, is typically employed in the polymerization reactor.

In an aspect, hydrogen can be used in a polymerization process to control polymer molecular weight. In another aspect a method of deactivating a catalyst, by adding carbon monoxide to the polymerization zone as described in U.S. Pat. No. 9,447,204, which is incorporated by reference herein, may be used to mitigate or stop an uncontrolled, or runaway polymerization.

For the catalyst systems of this disclosure, the polymerizations disclosed herein are commonly carried out using a slurry polymerization process in a loop reaction zone or a batch process, or a gas phase zone utilizing a fluidized bed or a stirrer bed.

Slurry loop. In one aspect, a typical polymerization method is a slurry polymerization process (also known as the "particle form process"), which is disclosed, for example in U.S. Pat. No. 3,248,179, which is incorporated herein by reference. Other polymerization methods for slurry processes can employ a loop reactor of the type disclosed in U.S. Pat. No. 3,248,179, and those utilized in a plurality of stirred reactors either in series, parallel, or combinations thereof.

The polymerization reactor system can comprise at least one loop slurry reactor, and can include vertical or horizontal loops or a combination, which can independently be selected from a single loop or a series of loops. Multiple loop reactors can comprise both vertical and horizontal loops. The slurry polymerization can be performed in an organic solvent as the carrier or diluent. Examples of suitable solvents include propane, hexane, cyclohexane, octane, isobutane, or combinations thereof. Olefin monomer, carrier, catalyst system components, and any comonomer can be continuously fed to a loop reactor where polymerization occurs. Reactor effluent can be flash evaporated to separate the solid polymer particles.

Gas phase. In one aspect, a method for producing polyolefin polymers according to the disclosure is a gas phase polymerization process, using for example a fluidized bed reactor. This type reactor, and means for operating the reactor, are described in, for example, U.S. Pat. Nos. 3,709, 853; 4,003,712; 4,011,382; 4,302,566; 4,543,399; 4,882, 400; 5,352,749; 5,541,270; EP-A-0 802 202, Belgian Patent No. 839,380, each of which is incorporated herein by reference. These patents disclose gas phase polymerization processes wherein the polymerization medium is either mechanically agitated or fluidized by the continuous flow of the gaseous monomer and diluent.

Gas phase polymerization systems can employ a continuous recycle stream containing one or more monomers continuously cycled through the fluidized bed in the presence of the catalyst under polymerization conditions. The recycle stream can be withdrawn from the fluidized bed and recycled back into the reactor. Simultaneously, polymer product can be withdrawn from the reactor and fresh monomer can be added to replace the polymerized monomer. Such gas phase reactors can comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone.

Other gas phase processes contemplated by the disclosed polymerization process include series or multistage polymerization processes. In an aspect, gas phase processes that can be used in accordance with the disclosure include those described in U.S. Pat. Nos. 5,627,242, 5,665,818 and 5,677,375, and European publications EP-A-0 794 200, EP-B1-0 649 992, EP-A-0 802 202, and EP-B-634 421 all of which are incorporated herein by reference.

In an aspect of the gas phase polymerizations according to this disclosure, the ethylene partial pressure may vary in a range suitable for providing practical polymerization conditions, for example, in a range of from 10 psi to 250 psi, for example, from 65 psi to 150 psi, from 75 psi to 140 psi, or from 90 psi to 120 psi. In another aspect, a molar ratio of comonomer to ethylene in the gas phase also may vary in a range suitable for providing practical polymerization conditions, for example, in a range of from 0.0 to 0.70, from 0.0001 to 0.25, more preferably from 0.005 to 0.025, or from 0.025 to 0.05. According to an aspect, the reactor pressure can be maintained in a range suitable for providing practical polymerization conditions, for example, in a range of from 100 psi to 500 psi, from 200 psi to 500 psi, or from 250 psi to 350 psi, and the like.

According to further aspects, in a fluidized gas bed process used for producing polymers, a gaseous stream containing one or more monomers can be continuously cycled through a fluidized bed in the presence of a catalyst under reactive conditions. The gaseous stream can be withdrawn from the fluidized bed and recycled back into the reactor, and simultaneously, polymer product can be withdrawn from the fluidized bed and withdrawn from the reactor, while fresh monomer can be added to replace the polymerized monomer. See, for example, U.S. Pat. Nos. 4,543,399; 4,588,790; 5,028,670; 5,317,036; 5,352,749; 5,405,922; 5,436,304; 5,543,471; 5,462,999; 5,616,661; and 5,668,228; each of which is incorporated herein by reference in its entirety.

In another aspect, antistatic compounds can be fed simultaneous with the finished catalyst into a polymerization zone. Alternatively, antistatic compounds such as those described in U.S. Pat. Nos. 7,919,569; 6,271,325; 6,281,306; 6,140,432 and 6,117,955, each of which is incorporated herein by reference in its entirety, can be used. For example, the the clay heteroadduct can be contacted with or impregnated with one or more antistatic compounds. Antistatic compounds may be added at any point, for example, they can be added any time after calcination such as up to and including the final post-contacted catalyst preparation.

In another aspect, so-called "self-limiting" compositions may be added to the clay heteroadduct to inhibit chunking, fouling, or uncontrolled or runaway reaction in the polymerization zone. For example, U.S. Pat. Nos. 6,632,769; 6,346,584; and 6,713,573, each of which is incorporated herein by reference, disclose additives that can release a catalyst poison above a threshold temperature. Typically, such compositions can be added at any time after calcination, in order to limit or stop polymerization activity above a desired temperature.

Solution. The polymerization reactor also can comprise a solution polymerization reactor, in which the monomer is contacted with the catalyst composition by suitable stirring or other means. Solution polymerizations can be effected in a batch manner, or in a continuous manner. A carrier comprising an inert organic diluent or excess monomer can be employed, and the polymerization zone is maintained at temperatures and pressures that will result in the formation of a solution of the polymer in the reaction medium. Agitation can be employed during polymerization to obtain better temperature control and to maintain uniform polymerization mixtures throughout the polymerization zone, and adequate means are utilized for dissipating the exothermic heat of polymerization. The reactor also can comprise a series of at least one separator that employs high pressure and low pressure to separate the desired polymer.

Tubular reactors and high pressure LDPE. In still another aspect, the polymerization reactor can comprise a tubular reactor, which can make polymers by free radical initiation or alternatively by employing the disclosed catalysts. Tubular reactors can have several zones where fresh monomer, initiators, or catalysts and cocatalysts are added. For example, monomer can be entrained in an inert gaseous stream and introduced at one zone of the reactor, and initiators, the catalysts composition and/or catalyst components can be entrained in a gaseous stream and introduced at another zone of the reactor. These gas streams can then be intermixed for polymerization, in which heat and pressure can be appropriately adjusted to obtain optimal polymerization reaction conditions.

Combined or multiple reactors. In a further aspect, the catalysts and processes of this disclosure are not limited by possible reactor types or combinations of reactor types. For example, the disclosed catalysts and processes can be used in multiple reactor systems which can comprise reactors combined or connected to perform polymerizations, or multiple reactors that are not connected. The polymer can be polymerized in one reactor under one set of conditions, and then the polymer can be transferred to a second reactor for polymerization under a different set of conditions.

In this aspect, the polymerization reactor system can comprise the combination of two or more reactors. Production of polymers in multiple reactors can include several stages in at least two separate polymerization reactors interconnected by a transfer device to transfer the polymers resulting from the first polymerization reactor into the second reactor, in which polymerization conditions are different in the individual reactors. Alternatively, polymerization in multiple reactors can include the manual transfer of polymer from one reactor to subsequent reactors for continued polymerization. Such reactors can include any combination including, but not limited to, multiple loop reactors, multiple gas reactors, a combination of loop and gas reactors, a combination of autoclave reactors or solution reactors with gas or loop reactors, multiple solution reactors, or multiple autoclave reactors, and the like.

Polymers produced using the disclosed catalysts and processes. The catalyst compositions used in this process can produce high quality polymer particles without substantially fouling the reactor. When the catalyst composition is used in a loop reactor zone under slurry polymerization conditions, the particle size of the calcined heterocoagulated product can be in a range of from about 10 microns (m) to about 1000 microns, from about 25 microns to about 500 microns, from about 50 microns to about 200 microns, or from about 30 microns to about 100 microns to provide good control of the polymer particle production during polymerization.

When the catalyst composition is used in a gas phase reactor zone, the particle size of the calcined heterocoagulated product can be in a range of from about 1 micron to about 1000 microns, from about 5 to about 500 microns, or from about 10 microns to about 200 microns, or from about 15 microns to about 60 microns, to provide good control of the polymer particle and polymerization reaction.

The suitable particle size in other polymerization reactor systems, whether single or multiple systems in series can be a function of the total productivity of the catalyst and the optimal particle size and particle size distribution of the final polymer-catalyst composite particle. For example, the optimal size and size distribution can be determined by the polymerization reactor system, such as whether the particles are easily fluidizable in a gas phase system but sufficiently large that they are not entrained in the fluidizing gas, which can result in plugging downstream filters. Likewise, the optimal size and size distribution in the polymerization system may be balanced against the ease with which they are conveyed or handled in storage silos or extrusion facilities when the catalyst-polymer composite particles are melted and extruded into pellets.

Polymers produced using the catalyst composition of this disclosure can be formed into various articles, such as, for example, household containers and utensils, film products, car bumper components, drums, fuel tanks, pipes, geomembranes, and liners. In an aspect, additives and modifiers can be added to the polymer in order to provide desired effects, such as a desired combination of physical, structural and flow properties. It is believed that by using the methods and materials described herein, articles can be produced at a lower cost, while maintaining desired polymer properties obtained for polymers produced using transition metal or metallocene catalyst compositions as disclosed herein.

Specific embodiments. In more specific embodiments of this disclosure, there is provided a process to produce a catalyst composition, the process comprising (optionally, "consisting essentially of", or "consisting of"):

(1) contacting a suitable dioctahedral phyllosilicate clay, with a heterocoagulation agent, to form a solid that is easily filtered and washed to a conductivity of less than 10 mS/cm, or less than 5 mS/cm, or between 1 mS/cm and 50 µS/cm, or between 500 µS/cm and 50 µS/cm;

(2) dehydrating and dehydroxylating the washed, clay heteroadduct at a temperature or temperatures within a range of from about −10° C. to about 500° C. to produce a calcined heterocoagulated clay-adduct composition exhibiting no, or substantially no d001 peak of 2 theta less than 8 degrees, and preferably exhibiting no, or substantially no d001 peak of 2 theta less than 10 degrees. If there are peaks in the region less than 10 degrees 2 theta, the major peak among them is not less than 4 degrees 2 theta, or a peak greater in intensity than that which would be exhibited by the clay mineral itself after calcination at 300° C., such as from 8 degrees 2 theta to 12 degrees 2 theta;

(3) combining the calcined heterocoagulated clay-adduct composition and a metallocene, for example, bis(1-butyl-3-methylcyclopentadienyl) zirconium dichloride, at a temperature in the range of from 15° C. to 100° C. to produce a mixture; and (4) after between 1 minute and 1 hour, combining the mixture in part (3) and a trialkylaluminum, for example, triethylaluminum, trioctylaluminum or tri-isobutylaluminum to produce the catalyst composition.

An alternative specific embodiment to that set out immediately above is to reverse the order of addition of the metallocene and the trialkylaluminum in steps (1) through (4) immediately above.

EXAMPLES

The foregoing description is intended to illustrate and not limit the scope of the present disclosure, which is further illustrated by the following examples. The examples are not to be construed as imposing limitations upon the scope of the disclosure. Rather, it is to be understood that recourse can be had to various other embodiments, aspects, modifications, and equivalents thereof which, in view of the written description, may suggest themselves to the person of ordinary skill in the art without departing from the spirit of the present invention or the scope of the appended claims. Therefore the following examples are put forth so as to provide those skilled in the art with a more detailed disclosure and description.

Reagents and General Procedures

Unless otherwise noted, all reagents used to prepare the clay-heteroadducts of this disclosure were obtained from the commercial sources indicated and used "as-is".

Volclay® HPM-20 bentonite aqueous dispersion (montmorillonite) manufactured by American Colloid Company was obtained from McCullough & Associates, and is also referred to as simply HPM-20 or HPM-20 clay. A 50% aluminum chlorhydrate aqueous solution (abbreviated "ACH") and UltraPAC® 290 (polyaluminum chloride, empirically $Al_2(OH)_{2.5}Cl_{3.5}$) were obtained from GEO Specialty Chemicals. Aluminum chlorhydrate powder (ALOXICOLL® 51P, empirically $Al_2Cl(OH)_5$) and aluminum sesquichlorohydrate solution (ALOXICOLL® 31L) were obtained from Parchem Fine and Specialty Chemicals. Fumed Silica (AEROSIL® 200) and fumed aluminum oxide aqueous dispersion (AERODISP® W400) were obtained from Evonik Industries AG. An aqueous dispersion of colloidal alumina (NYACOL® AL27) was obtained from Nano Technologies, Inc.

Unless noted otherwise, in the specification and examples, the clay dispersions, clay heteroadducts, pillared clays, and other compositions could be prepared using a dual-speed Conair™ Waring™ Commerical Lab Blender model 7010G, equipped with timer. Blender speeds may be referred to as "low" speed versus "high" speed blending as follows. The Model 7010G blender was connected to a Staco Energy Variable Transformer (Model number 3PN1010B), and the blender speed was adjusted by changing the setting on the Transformer. In the examples and specification, "low speed" blending was achieved by setting the Transformer between 0 to 50, while "high speed" blending was achieved by setting the Transformer between 50 to 100.

Conductivity was measured using a Eutech PCSTestr 35 or a Radiometer Analytical conductivity meter and measurements were according to the instrument instruction manual and the references provided with each instrument. The solution or slurry pH measurements were made using a Eutech PCSTestr 35 or Beckmann <265 laboratory pH meter.

Deionized water referred to herein as Milli-Q® water was obtained by initially pretreating water using a Prepak 1 Pretreatment Pack, and then further purifying the water using a Millipore Milli-Q® Advantage A10 Water Purification System. This water was typically used within 2 hours of collection.

Hexane, heptane, toluene and dichloromethane were dried over activated molecular sieves and degassed with nitrogen prior to use. Instrument grade isobutane, used as solvent for the ethylene homopolymerizations was purchased from Airgas and purified by passage through columns of activated charcoal, alumina, 13× molecular sieves, and finally an OxyClear™ gas purifier Model No. RGP-R1-500, from Diamond Tool and Die, Inc. Ultra-high purity grade ethylene and hydrogen were obtained from Airgas. The UHP (ultra-high purity) ethylene was further purified by passage through columns of activated charcoal, alumina, 13× molecular sieves, and an OxyClear™ gas purifier Model No. RGP-R1-500. The UHP hydrogen was purified by passage through an OxyClear™ gas purifier Model No. RGP-R1-500. Purified propylene was obtained as a slip stream from a commercial polypropylene plant.

All preparations involving the handling of organometallic compounds were carried out under a nitrogen ($N_2$) atmosphere using Schlenk techniques or in a glove box.

Zeta Potential Measurements

Zeta potentials of the colloidal suspensions disclosed herein were derived from measuring the electroacoustic effect upon application of electric field across the suspension. The apparatus used to perform these measurements was a Colloidal Dynamics Zetaprobe Analyzer™ For example, zeta potential measurements were used to determine the dispersed clay concentration in a 0.5 wt. % to 1 wt. % Volclay® HPM-20/water dispersion as follows. A 250 g to 300 g sample of the dispersion to be measured was transferred to the measurement vessel containing an axial bottom stirrer. The stirring speed was set fast enough to prevent settling or substantial settling of the dispersion but slow enough to allow the electroacoustic probe to be fully immersed in the mixture when fully lowered. Typically the stirring speed was set between 250 rpm and 350 rpm, most often 300 rpm.

The Colloidal Dynamic Zetaprobe Analyzer™ measurement parameters used were the following: 5 readings at 1 reading/minute; particle density of 2.6 g/cc; dielectric constant of 4.5. An initial estimated colloidal weight percentage of 0.7 wt. % to 1.0 wt. % (concestimate) was typically entered into the Zetaprobe Analyzer™ software. Measuring a 5 wt. % Volclay® HPM-20/water dispersion provided a zeta potential of −46 mV. If the final dispersed clay concentration is referred to as "conc" in the equation below, then the final dispersed clay concentration can be calculated from the initial estimated concentration according to the following formula.

$$conc = conc_{estimate} * (\text{measured zeta potential}/(-46))$$

The Zetaprobe Analyzer™ was also used to dynamically track evolving zeta potential during titrations of clay dispersions with either colloidal dispersions or non-colloidal solutions. Typically, the cationic polymetallate titrant (or other cationic titrant) was added to a 0.5 wt. % to 5.0 wt. % Volclay® HPM-20/water dispersion at 0.25 mL to 2.0 mL per titration point, with an equilibration delay of from 30 seconds to 120 seconds.

The Zetaprobe software calculates zeta potential using a colloidal particle weight percentage which does not factor in the colloidal titrant. Thus, in cases where the titrant is a colloidal species, the measured zeta potential was adjusted to reflect the extra colloidal content of the measured solution through the following method. Initially, both the weight of the titrand clay and the titrant cationic species were determined by the following equations (where * indicates multiplication, W is weight, V is volume).

$$W_{titrant} = V_{titrant} * density_{titrant} * solids\ \%_{titrant}$$

$$W_{clay} = V_{total} * density_{titrand} * particle\ concentration_{measured}$$

The density for 5% Volclay® HPM-20 aqueous dispersion (titrand) was determined to be approximately 1.03 g/mL. The titrant weight was scaled according to its particle density relative to the particle density of the titrand Volclay® HPM-20 (montmorillonite), to provide an effective titrant weight ($W_{efftitrant}$), which in this example was calculated as follows.

$$W_{efftitrant} = W_{titrant} * particle\ density_{titrant}/particle\ density_{titrand}$$

The effective colloidal particle weight percentage (wt. %$_{eff}$) was then calculated, to provide an estimate of the relative increase in colloidal content compared to an equivalent titration using a non-colloidal titrant. The inverse of this value was then multiplied by the measured zeta potential to determine an adjusted zeta potential as follows.

$$\text{wt. }\%_{eff} = (W_{efftitrant} + W_{clay})/V_t$$

$$A = \text{wt. }\%_{measured}/\text{wt. }\%_{eff}$$

$$ZP_{adjusted} = ZP_{measured} * A$$

During a zeta potential titrations of clay dispersions with a cationic polymetallate, such as the titration of Volclay® HPM-20 montmorillonite with aluminum chlorhydrate (ACH), the zeta potential was measured before and during the titration as a function of the titrant volume and the mmol Al/g clay. Samples of the solid material formed at various points during the titration were collected (for example, at 0 mmol Al/g clay, 1.17 mmol Al/g clay, 1.52 mmol Al/g clay, and so forth), and each sample was dried, calcined, and analyzed by powder XRD (x-ray diffraction). As an example of the zeta potential titrations, FIG. 3 plots the zeta potentials of the series of dispersions provided by the titration of Volclay® HPM-20 montmorillonite with aluminum chlorhydrate (ACH), plotting titrant volume versus zeta potential (mV) of the dispersion, and FIG. 4 plots the mmol Al/g clay versus zeta potential (mV) of the dispersion for the same titration. FIG. 2 provides a powder XRD pattern of a series of calcined products collected from during this zeta potential titration of HPM-20 clay with ACH.

Powder X-Ray Diffraction (XRD) Studies

Powder X-ray patterns of clays and clay heteroadducts were obtained using standard X-ray powder diffraction techniques on a Bruker D8 daVinci instrument, with a Bragg Brentano geometry with a "theta-theta" scan type, using a Back-loading holder with zero background Silicon chip. The detector used was a Linear Silicon Strip (LynxEYE) PSD detector. The test sample was placed in the sample holder of a two circle goniometer, enclosed in a radiation safety enclosure. The X-ray source was a 2.0 kW Cu X-ray tube, maintained at an operating current of 40 kV and 25 mA. The X-ray optics were the standard Bragg-Brentano para-focusing mode with the X-ray diverging from a DS slit (0.6 mm) at the tube to strike the sample and then converging at a position sensitive X-ray Detector (Lynx-Eye, Bruker-AXS). The two-circle 250 mm diameter goniometer was computer controlled with independent stepper motors and optical encoders. Flat compressed powder samples were scanned at 0.8° (2θ) per minute (2-30° 2θ over 35 minutes). The software suite for data collection and evaluation was Windows based. Data collection was automated using the COMMANDER program by employing a BSML file, and data was analyzed by the program DIFFRAC.EVA.

The XRD test method applied to the calcined clay heteroadducts disclosed herein for determining basal spacing is described in, for example, by McCauley in U.S. Pat. No. 5,202,295 (for example, at column 27, lines 22-43). Bragg's equation or law as applied to clays is $n\lambda = 2d \cdot \sin\theta$, wherein n is the repeat number, λ is 1.5418, d is d001 spacing and θ is the angle of incidence.

Pore Volume and Pore Volume Distribution

Pore volumes of the clay heteroadducts are reported as the cumulative volume in cc/g (cm³/g, cubic centimeters per gram) of all pores discernable by nitrogen desorption methods. For catalyst support or carrier particles such as alumina powder, and for the clays and clay heteroadducts of this disclosure, the pore diameter distribution and pore volumes were calculated with reference to nitrogen desorption isotherm (assuming cylindrical pores) by the B.E.T. (or BET) technique as described by S. Brunauer, P. Emmett, and E. Teller in the *J. Am. Chem. Soc.,* 1939, 60, 309; see also ASTM D 3037, which identifies the procedure for determining the surface area using the nitrogen BET method.

The pore volume distribution can be useful in understanding catalyst performance, and the pore volume (total pore volume), various attributes of pore volume distribution such as the percentage of pores in various size ranges, as well as "pore mode", which describes the pore diameters corresponding to local maxima in the dV(log D) vs. pore diameter distribution, were derived from nitrogen adsorption-desorption isotherms based on the method described by E. P. Barrett, L. G. Joyner and P. P. Halenda ("BJH"), in "The Determination of Pore Volume and Area Distributions in Porous Substances. I. Computations from Nitrogen Isotherms," *J. Am. Chem. Soc.,* 1951, 73 (1), pp 373-380.

Surface Area

Surface area was determined by nitrogen adsorption methods using the nitrogen adsorption-desorption isotherm using the B.E.T. (or BET) technique as described by S. Brunauer, P. Emmett, and E. Teller in the *J. Am. Chem. Soc.,* 1939, 60, 309; see also ASTM D 3037, which identifies the procedure for determining the surface area using the nitrogen BET method. All morphological properties involving weight, such as pore volume (PV) (cc/g, cubic centimeters per gram) or surface area (SA) (m²/g, meters squared per gram) were normalized to a "metals-free basis" in accordance with procedures well-known in the art. However, unless stated otherwise, the morphological properties reported herein are on an "as-measured" basis without correcting for metals content.

Polymerization Reactions

Homo-polymerization of ethylene was conducted in a dry, 2 L stainless steel Parr autoclave reactor using 1 L of isobutane diluent. Table 3A reports properties and polymerization data for comparative supports and inventive heterocoagulated clay supports, using (1-n-butyl-3-methyl-cyclopentadienyl)$_2$ZrCl$_2$ and triethylaluminum (AlEt$_3$) as metallocene and co-catalyst. The selected pressure and temperature in the reactor for calculating activities reported in Table 3A were 450 total psi and 90° C., which were maintained electronically by an ethylene mass flow controller, or alternatively, manually using a jacketed temperature controller. Table 3B reports surface area and porosity properties of comparative supports and inventive heterocoagulated clay supports.

Polymerization data using the support-activators of this disclosure along with polymerization data using comparative catalyst systems are presented in Table 3A. The polymerization runs are labelled P1 through P39, and the specific Example number of the support used in each polymerization run is listed.

When using hydrogen, a pre-mixed gas feed tank of purified hydrogen and ethylene were used to maintain the desired total reactor pressure, with a high enough pressure in the feed tank so as not to significantly change the ratio of ethylene-to-hydrogen in the feed to the reactor. The addition of hydrogen can affect the melt index of the polymer obtained with any given catalyst.

Prior to conducting a polymerization run, moisture was first removed from the reactor interior by pre-heating the reactor to at least 115° C. under a dry nitrogen flow, which was maintained for at least 15 minutes. Stirring was provided by an impellor and Magnadrive™ with a set point of, for example, 600 rpm. The metallocene catalyst for the polymerization runs of Table 3A was (1-n-butyl-3-methyl-cyclopentadienyl)$_2$ZrCl$_2$ and using triethylaluminum (AlEt$_3$ or TEA) as a co-catalyst or alkylating agent, with 1.8 mmol of AlEt$_3$ (3 mL of 0.6 M solution of TEA in hexanes) typically being used for the polymerization runs in this table. The post-contacted catalyst components, that is the composition containing all the listed catalyst system components that were previously contacted to form the composition, were prepared in an inert atmosphere glove box and transferred to a catalyst charge tube or vessel. The catalyst charge vessel contents were then charged to the reactor by flushing them in with 1 L of isobutane. The reactor temperature control system was then turned on and is allowed to reach a few degrees lower than the temperature set-point, which typically took about 7 minutes. The reactor was brought to run pressure by opening a manual feed valve for the ethylene, and polymerization runs were continued for the times reported in Table 3A, for example, for 30 minutes or 60 minutes.

TABLE 3A

Properties and polymerization data for comparative supports and inventive heterocoagulated clay supports. The polymerizations were performed at 450 psi reactor pressure and 90° C., using (1-n-butyl-3-methyl-cyclopentadienyl)$_2$ZrCl$_2$ and triethylaluminum (AlEt$_3$) as metallocene and co-catalyst.[A]

| Polymerization Run no. | Support Example No. | Recipe Ratio (mmol Al/ g day) | Effective zeta potential mV | Solid isolation method filtration or centrifugation (number) | Support-activator charge (mg) | MCN (mmol) | Polymerization time (min) | PE yield (g PE) | Activity (g/g/h) |
|---|---|---|---|---|---|---|---|---|---|
| P1 | 1 | 0.00 | −46 | None | 76 | 0.0046 | 30 | 4 | 116 |
| P2 | 2 | 0.00 | −46 | none | 75 | 0.0092 | 30 | 34 | 917 |
| P3 | 3 | 0.00 | −46 | none | 75 | 0.0092 | 30 | 17 | 453 |
| P4 | 5 | 6.40 | >80 | centrifuge (m) | 75 | 0.0092 | 30 | 126 | 3347 |
| P5 | 6 | 6.36 | >80 | centrifuge (m) | 50 | 0.0046 | 60 | 162 | 3240 |
| P6 | 7 | 6.40 | >80 | centrifuge (m) | 20 | 0.0046 | 60 | 70 | 3500 |
| P7 | 7 | 6.40 | >80 | centrifuge (m) | 76 | 0.0092 | 30 | 176 | 4650 |
| P8 | 7 | 6.40 | >80 | centrifuge (m) | 75 | 0.0092 | 30 | 170 | 4544 |
| P9 | 13 | 6.35 | | centrifuge (m) | 75 | 0.0092 | 30 | 184 | 4907 |

TABLE 3A-continued

Properties and polymerization data for comparative supports and inventive heterocoagulated clay supports.
The polymerizations were performed at 450 psi reactor pressure and 90° C., using
(1-n-butyl-3-methyl-cyclopentadienyl)$_2$ZrCl$_2$ and triethylaluminum (AlEt$_3$) as
metallocene and co-catalyst.[A]

| Polymerization Run no. | Support Example No. | Recipe Ratio (mmol Al/g day) | Effective zeta potential mV | Solid isolation method filtration or centrifugation (number) | Support-activator charge (mg) | MCN (mmol) | Polymerization time (min) | PE yield (g PE) | Activity (g/g/h) |
|---|---|---|---|---|---|---|---|---|---|
| | | | | Inventive | | | | | |
| P10 | 14 | 1.76 | 20 | none | 75 | 0.0092 | 30 | 0.9 | 24 |
| P11 | 15 | 1.76 | 20 | none | 75 | 0.0092 | 30 | 1.3 | 35 |
| P12 | 16 | 1.76 | 20 | filtration (3) | 75 | 0.0092 | 30 | 38 | 1013 |
| P13 | 16 | 1.76 | 20 | filtration (3) | 75 | 0.0092 | 30 | 50 | 1323 |
| P14 | 17 | 1.76 | 20 | filtration (1) | 75 | 0.0092 | 30 | 138 | 3680 |
| P15 | 18 | 1.76 | 20 | filtration (1) | 75 | 0.0092 | 30 | 177 | 4720 |
| | | | | Comparative | | | | | |
| P16 | 19 | 0.30 | −46 | filtration (1), centrifuge | 75 | 0.0092 | 30 | 11 | 293 |
| | | | | Inventive | | | | | |
| P17 | 20 | 1.17 | −20 | filtration (2) | 51 | 0.0046 | 60 | 193 | 3808 |
| P18 | 20 | 1.17 | −20 | filtration (2) | 35 | 0.0046 | 60 | 183 | 5225 |
| P19 | 21 | 1.52 | 0 | filtration (2) | 35 | 0.0046 | 60 | 240 | 6857 |
| | | | | Comparative | | | | | |
| P20 | 22 | 2.50 | 70 | filtration (1) | 75 | 0.0092 | 30 | 138 | 3688 |
| P21 | 23 | 2.50 | 70 | filtration (2) | 75 | 0.0092 | 30 | 156 | 4155 |
| P23 | 24 | 3.50 | 86 | filtration (1) | 75 | 0.0092 | 30 | 135 | 3581 |
| P24 | 25 | 3.50 | 86 | filtration (2) | 75 | 0.0092 | 30 | 133 | 3547 |
| P25 | 26 | 0.30 | −46 | filtration (1), centrifuge | 75 | 0.0092 | 30 | 8 | 213 |
| P26 | 27 | 0.60 | −38 | filtration (1) | 75 | 0.0092 | 30 | 44 | 1181 |
| | | | | Inventive | | | | | |
| P27 | 28 | 1.52 | 0 | filtration (3) | 75 | 0.0092 | 30 | 105 | 2808 |
| P28 | 29 | 1.52 | 0 | filtration (1) | 75 | 0.0092 | 30 | 114 | 3027 |
| P29 | 30 | 1.76 | 20 | filtration (1) | 75 | 0.0092 | 30 | 157 | 4173 |
| P30 | 31 | 1.52 | −9 | filtration (1) | 75 | 0.0092 | 30 | 114 | 3040 |
| | | | | Comparative | | | | | |
| P31 | 32 | 2.50 | 38 | filtration (1) | 75 | 0.0092 | 30 | 143 | 3813 |
| P32 | 33 | 0.50 | −34 | filtration (1) | 75 | 0.0092 | 30 | 99 | 2637 |
| | | | | Inventive | | | | | |
| P33 | 34 | 1.01 | 0 | filtration (1) | 75 | 0.0092 | 30 | 100 | 2653 |
| | | | | Comparative | | | | | |
| P34 | 35 | 1.46 | 68 | filtration (1) | 75 | 0.0092 | 30 | 108 | 2880 |
| | | | | Inventive | | | | | |
| P37 | 36 | 4.80 | −20 | filtration (1) | 75 | 0.0092 | 30 | 48 | 1288 |
| P39 | 39 | 3.31 | 20 | filtration (3) | 75 | 0.0092 | 30 | 52 | 1376 |

[A]Abbreviations: MCN, metallocene; PE, polyethylene.

TABLE 3B

Surface area and porosity properties of comparative supports and inventive heterocoagulated clay supports.[A]

| Polymerization Run no. | Support Example No. | Effective zeta potential mV | BET surface area (m$^2$/g) | BJH Porosity (cc/g) | Cumulative BJH porosity 3-10 nm (cc/g) | Cumulative BJH porosity 2-30 nm (cc/g) | % of total meso. porosity in 3-10 nm | V(10-30 nm)/ V(3-10 nm) | DVlogDmax 30-40 max/ DvlogD200-500 max <2 | dV(logD)max 200-500 max/ dV(logD)60-200 max >1 |
|---|---|---|---|---|---|---|---|---|---|---|
| P1 | 1 | −46 | 9 | 0.06 | 0.036 | 0.05 | 73 | 0.37 | 15.07 | 0.81 |
| P2 | 2 | −46 | 22 | 0.175 | 0.026 | 0.08 | 30 | 2.29 | 2.07 | 1.09 |
| P3 | 3 | −46 | 34.5 | 0.2 | 0.079 | 0.14 | 58 | 0.72 | — | — |
| P4 | 5 | >80 | 286 | 0.365 | 0.036 | 0.11 | 33 | 2.04 | 0.98 | 0.10 |
| P5 | 6 | >80 | 296 | 0.57 | 0.077 | 0.18 | 43 | 1.34 | — | — |
| P6 | 7 | >80 | 247 | 1.104 | 0.060 | 0.22 | 27 | 2.69 | 0.42 | 1.31 |
| P7 | 7 | >80 | 247 | 1.104 | 0.060 | 0.22 | 27 | 2.69 | 0.42 | 1.31 |

TABLE 3B-continued

Surface area and porosity properties of comparative supports and inventive heterocoagulated clay supports.[A]

| Polymerization Run no. | Support Example No. | Effective zeta potential mV | BET surface area (m$^2$/g) | BJH Porosity (cc/g) | Cumulative BJH porosity 3-10 nm (cc/g) | Cumulative BJH porosity 2-30 nm (cc/g) | % of total meso. porosity in 3-10 nm | V(10-30 nm)/ V(3-10 nm) | DVlogDmax 30-40 max/ DvlogD200-500 max <2 | dV(logD)max 200-500 max/ dV(logD)60-200 max >1 |
|---|---|---|---|---|---|---|---|---|---|---|
| P8 | 7 | >80 | 247 | 1.104 | 0.060 | 0.22 | 27 | 2.69 | 0.42 | 1.31 |
| P9 | 13 | | 239 | 0.812 | 0.054 | 0.21 | 26 | 2.85 | 0.49 | 2.24 |
| | | | | | Inventive | | | | | |
| P10 | 14 | 20 | 1 | 0.014 | 0.001 | 0.01 | 17 | 4.80 | 1.60 | 1.13 |
| P11 | 15 | 20 | 2.5 | 0.015 | 0.003 | 0.01 | 42 | 1.35 | — | — |
| P12 | 16 | 20 | NA | 0.112 | 0.078 | 0.09 | 83 | 0.21 | 19.62 | 0.85 |
| P13 | 16 | 20 | NA | 0.112 | 0.078 | 0.09 | 83 | 0.21 | 19.62 | 0.85 |
| P14 | 17 | 20 | 295 | 0.531 | 0.044 | 0.12 | 37 | 1.68 | 1.05 | 18.26 |
| P15 | 18 | 20 | 212 | 0.544 | 0.050 | 0.15 | 32 | 2.08 | 1.04 | 2.14 |
| | | | | | Comparative | | | | | |
| P16 | 19 | −46 | 56 | 0.472 | 0.042 | 0.24 | 18 | 4.71 | 0.54 | 2.02 |
| | | | | | Inventive | | | | | |
| P17 | 20 | −20 | 104 | 0.592 | 0.032 | 0.17 | 19 | 4.38 | 0.66 | 2.27 |
| P18 | 20 | −20 | 104 | 0.592 | 0.032 | 0.17 | 19 | 4.38 | 0.66 | 2.27 |
| P19 | 21 | 0 | 132 | 0.261 | 0.040 | 0.12 | 33 | 1.99 | 2.05 | 1.82 |
| | | | | | Comparative | | | | | |
| P20 | 22 | 70 | 224 | 0.661 | 0.042 | 0.14 | 30 | 2.29 | 0.83 | 1.85 |
| P21 | 23 | 70 | 275 | 0.722 | 0.047 | 0.16 | 29 | 2.45 | 0.88 | 1.99 |
| P23 | 24 | 86 | 289 | 1.457 | 0.054 | 0.21 | 25 | 2.96 | 0.45 | 2.12 |
| P24 | 25 | 86 | 280 | 0.724 | 0.043 | 0.16 | 26 | 2.79 | 0.80 | 2.29 |
| P25 | 26 | −46 | 27 | 0.169 | 0.107 | 0.15 | 73 | 0.37 | 9.68 | 0.79 |
| P26 | 27 | −38 | 41 | 0.351 | 0.051 | 0.13 | 40 | 1.49 | 2.22 | 1.68 |
| | | | | | Inventive | | | | | |
| P27 | 28 | 0 | 139 | 0.439 | 0.038 | 0.13 | 28 | 2.53 | 1.09 | 1.76 |
| P28 | 29 | 0 | 122 | 0.536 | 0.039 | 0.13 | 31 | 2.21 | 1.01 | 1.81 |
| P29 | 30 | 20 | 187 | 0.598 | 0.040 | 0.12 | 33 | 1.99 | 0.86 | 1.83 |
| P30 | 31 | −9 | 148 | 0.457 | 0.028 | 0.10 | 29 | 2.43 | 0.91 | 1.99 |
| | | | | | Comparative | | | | | |
| P31 | 32 | 38 | 219 | 0.45 | 0.055 | 0.12 | 46 | 1.19 | 1.67 | 1.68 |
| P32 | 33 | −34 | 28 | 0.383 | 0.046 | 0.12 | 38 | 1.63 | 0.85 | 1.92 |
| | | | | | Inventive | | | | | |
| P33 | 34 | 0 | 22 | 0.35 | 0.017 | 0.07 | 23 | 3.37 | 0.38 | 1.99 |
| | | | | | Comparative | | | | | |
| P34 | 35 | 68 | 44 | 0.432 | 0.022 | 0.08 | 29 | 2.46 | 0.94 | 1.82 |
| | | | | | Inventive | | | | | |
| P37 | 36 | −20 | NA | NA | 0.294 | 0.58 | 51 | 0.96 | 0.12 | 0.58 |
| P39 | 39 | 20 | 113 | 1.58 | 0.027 | 0.35 | 8 | 12.06 | 0.07 | 3.33 |

[A]Abbreviations: NA, not available; DVlogDmax30-40 max/DvlogD200-500 max, also abbreviated $D_{VM(30-40)}/D_{VM(200-500)}$, is the ratio of the maximum value of dV(log D) between 30 Å and 40 Å and the maximum value of dV(log D) between 200 Å and 500 Å; and DVlogDmax200-500 max/DvlogD60-200 max, also abbreviated $D_{VM(200-500)}/D_{VM(60-200)}$, is the ratio of the maximum value of dV(log D) between 200 Å and 500 Å and the maximum value of dV(log D) between 60 Å and 200 Å.

Alternatively, the contents of the catalyst charge tube can be pushed into the reaction vessel with ethylene at several degrees below the set point temperature of the run, for example, about 10 degrees centigrade below the set point temperature. In this method, two charge tubes were used. When the run pressure was reached, the reactor pressure was controlled by the mass flow controller. The consumption of ethylene and the temperature were monitored electronically. During the course of the polymerization, with the exception of the initial charge of catalyst during the first few minutes of the run, the reactor temperature was maintained at the set point temperature ±2° C. After 60 minutes or after the designated run time, the polymerization was stopped by shutting off the ethylene inlet valve and venting the isobutane. The reactor was returned to ambient temperature. The polymer produced in the reaction was then removed from the reactor and dried, and the polymer weight was used to calculate the activity of the particular polymerization. Polymer melt indices, specifically, melt index (MI) and high load melt index (HLMI), were obtained after stabilization of the polymer with butylated hydroxytoluene (BHT) according to ASTM procedures D618-05 and D1238-04C. Polymer density was measured according to ASTM D1505-03.

Catalyst and Polymer Characterization

The $^1$H NMR spectra of metallocene compounds were collected at room temperature by placing 20 mg of the metallocene sample into a 10 mm NMR tube, to which 3.0 mL of CDCl$_3$ were added. $^1$H NMR spectra were acquired on a Bruker AVANCE™ 400 NMR (400.13 MHz). Chemical shifts are reported in ppm (δ) relative to TMS, or referenced to the chemical shifts of residual solvent proton resonances. Coupling constants are reported in Hertz (Hz).

The NMR determination of isotactic pentads content in the polypropylene was obtained by place 400 mg of polymer sample into a 10 mm NMR tube, into which 1.7 g of tetracholoroethane-d2 and 1.7 g of o-dichlorobenzene were added. The $^{13}C$ NMR spectra were acquired on a Bruker AVANCE™ 400 NMR (100.61 MHz, 900 pulse, 12 s delay between pulse). About 5000 transients were stored for each spectrum, and the mmmm pentad peak (21.09 ppm) was used as reference. The microstructure analysis was carried out as described by Busico, et al., Macromolecules, 1994, 27, 4521-4524.

The polypropylene Melt Flow Rate (MFR) was determined at 230° C. under the load of 2.16 kg according to ASTM D-1238 procedure.

Polypropylene melting temperature Tm was obtained according to ASTM D-3417 procedure using DSC and TA Instrument, Inc. Model: DSC Q1000.

Nitrogen adsorption-desorption data for the support-activators and other materials were collected using an Anton Paar Autosorb iQ apparatus. A representative measurement was carried out as follows. A 50 mg to 150 mg calcined sample was weighed into a sample cell under an inert atmosphere and sealed with a stopper. The sample cell was inserted into the Autosorb iQ station and placed under vacuum. The sample was subsequently cooled using liquid nitrogen. The nitrogen adsorption-desorption isotherms were recorded at 77 K and from Relative Pressures $P/P_0=0.05$ to 1 ($P_0$=Atmospheric Pressure).

Example 1. Comparative Example of the Preparation of a Calcined Clay

A 700 mg sample of Volclay® HPM-20 clay in the form of the as-received powder was combined with 60 mL of deionized water. The mixture was agitated vigorously and was rotary evaporated for 20-30 minutes at 55° C. The resulting sample was then calcined for 6 hours at 300° C. to afford 620 mg of a grey powder. The nitrogen adsorption/desorption BJH pore volume analysis is plotted in FIG. 12.

Example 2. Comparative Example of the Preparation of an Azeotroped Clay

A 5.16 g sample of Volclay® HPM-20 clay powder was placed in a round-bottom flask and combined with 40 mL to 60 mL of n-butyl alcohol. This mixture was agitated vigorously and was then rotary evaporated at 45° C. to dry. This drying step was stopped shortly after the alcohol was visibly evaporated. The odor of n-butyl alcohol was typically noticeable from the sample after this process. A 5.39 g sample of wet clay was obtained, and 4.46 g of this material was then calcined for 6 hours at 300° C. to afford 3.3 g of a black powder.

Example 3. Comparative Example of the Preparation of a Sheared, then Azeotroped Clay A 133 g sample of a 5 wt. % HPM-20/water dispersion, prepared by slowly adding with stirring the HPM-20 clay to deionized water in a Waring® blender, was initially rotary evaporated at 45° C. to 55° C. to remove most of the water content, after which 50 mL of n-butanol was then added. Rotary evaporation at 45° C. was continued, and drying was stopped shortly after the alcohol had visibly evaporated. A 3.2 g sample of this material was then calcined for 6 hours at 300° C. to afford 2.6 g of a grey powder. The BJH pore volume analysis of this material is Provided in FIG. 11.

Example 4. Preparation of Colloidal Clay Dispersion

To a Waring® blender was charged 570 g of deionized water, and with stirring, 30.0 grams of HPM-20 was added portion-wise. This mixture was stirred at a high rate (revolutions per minute, rpm) to afford a substantially lump or clump-free dispersion 5 wt. % dispersion of HPM-20 suspension. When a 4.8 wt. % dispersion of Volclay® HPM-20 clay was prepared using 20 g of HPM-20 and 394 g of water and stirred using a Waring® blender at high rpm to afford a clump-free dispersion, the dispersion was characterized by a conductivity of 908 µS/cm and pH of 9.39.

Example 5. Comparative Example of the Preparation of Aluminum Chlorhydrate ($Al_{13}$ Keggin-Ion)-Pillared Clay Using Aluminum Chlorhydrate Solution (6.4 Mmol Al/g Clay)

A Waring® blender was charged with 100 g of the colloidal clay dispersion prepared according to Example 4, followed by, with stirring, 6.9 g of 50% GEO aluminum chlorhydrate solution with reported basicity of 83.47%. After addition of the aluminum chlorhydrate, the mixture was stirred at high a high rate (rpm) for an additional 3 minutes. The pH of the mixture was measured as pH 4.23. Attempts to filter the resulting mixture through Fisherbrand™ P8 filter paper were unsuccessful. Therefore, two aliquots of the mixture were transferred to 50 milliliter plastic centrifuge tubes, and the samples were centrifuged for a total of 140 minutes at 3600 rpm on a Beckmann Coulter Allegra 6 centrifuge. The resulting clear supernatant was decanted off each tube and replaced with deionized water. The samples were shaken to re-suspend the solids and centrifuged again. This process was repeated multiple times (typically 4 to 8 times) until the supernatant of one centrifuged sample afforded a conductivity of 67 µS/cm and a pH of 6.0. The supernatant was then decanted and a minimum of deionized water was used to transfer the solids to an Erlenmeyer flask along with approximately 70 mL of n-butanol. Rotary evaporation afforded 2.11 g of off-white powder. A 437 mg sample of this powder was charged to porcelain bowl and placed in an 300° C. oven for 6 hours to afford 0.301 grams of a dark grey powder.

Example 6. Reproducibility of the Preparation of Aluminum Chlorhydrate ($Al_{13}$ Keggin-Ion)-Pillared Clay Using Aluminum Chlorhydrate Solution (6.4 Mmol Al/g Clay)

With stirring, 30 g of HPM-20 clay was added slowly over the course of 1 to 2 minutes into a Waring® blender containing 570 g of deionized Milli-Q® water while stirring at low speed to afford a grey colloidal dispersion containing no, or substantially no visible lumps or clumps. After this addition was complete, the resulting dispersion was blended at high speed for 5 to 10 minutes to obtain a slightly viscous mixture of 5 wt. % aqueous dispersion of the HPM-20 clay.

A 150 g portion of this 5 wt. % aqueous dispersion of HPM-20 was transferred into a Waring® blender, and 9.35 g of GEO aluminum chlorhydrate 50 wt. % aqueous solution was pipetted into a vial and was added all at once to the dispersion. The mixture was blended at high speed for 5 minutes, then portioned into four 50 mL centrifuge tubes and centrifuged at 3000 rpm to 3500 rpm for 30 to 60 minutes. The supernatant pH and conductivity were measured (Eutech PCSTestr 35). The supernatant was decanted and the remaining wet solid was re-suspended in deionized Milli-Q® water. The centrifugation process (centrifuge, supernatant pH/conductivity measurement, supernatant removal, and re-suspension in deionized Milli-Q® water) was repeated until the conductivity of the supernatant reached 100 to 300 µS/cm. In total, six centrifugations were performed, at which point the supernatant was discarded for a final time. To the remaining wet solid was added 200 mL of 1-butanol, which after rotary evaporation at 45° C. yielded 9.75 g of wet solid. This wet solid was then ground with a pestle and mortar, 4.28 g of this solid were transferred to a porcelain crucible and were calcined for 6 hours at 300° C. to afford 1.65 g of a grey-black powder.

Example 7. Comparative Example of the Preparation of Aluminum Chlorhydrate ($Al_{13}$ Keggin-Ion)-Pillared Clay Using Powdered Aluminum Chlorhydrate (6.4 mg Al/g Clay)

With stirring, a 30 g sample of HPM-20 clay was added slowly over the course of 1 to 2 minutes into a Waring® blender containing 570 g of deionized Milli-Q® water, while stirring at low speed, which afforded a grey colloidal dispersion containing no, or substantially no visible lumps or clumps. After the addition was complete, the dispersion was blended at high speed for 5 to 10 minutes to obtain a slightly viscous mixture of 5 wt. % aqueous dispersion of the HPM-20 clay.

A 100 g sample of this 5 wt. % HPM-20 aqueous dispersion was transferred into a Waring® blender, and 3.42 g of Parchem ALOXICOLL® 51P powder was weighed into a vial and diluted with 35 to 40 g deionized Milli-Q® water and was then added all at once to the dispersion. The mixture was blended at high speed for 5 minutes, then portioned into four 50 mL centrifuge tubes and centrifuged at 3000 to 3500 rpm for 30 to 60 minutes. The supernatant pH and conductivity were measured (Eutech PCSTestr 35). The supernatant was decanted and the remaining wet solid was re-suspended in deionized Milli-Q® water. The centrifugation process (centrifuge, supernatant pH/conductivity measurement, supernatant removal, and re-suspension in deionized Milli-Q® water) was repeated until the conductivity of the supernatant reached 100 to 300 µS/cm (in total, six centrifugations were performed, with final supernatant pH of 4.25 and conductivity of 225 µS/cm), at which point the supernatant was discarded for a final time. The remaining wet solid was combined with 100 to 200 mL of 1-butanol in a round-bottom flask and rotary evaporated at 45° C. to afford 5.54 g of wet solid, which was then ground with a pestle and mortar. A 1.8 g portion of this solid was transferred to a porcelain crucible and calcined for 6 hours at 300° C. to afford 1.2 g of a grey-black powder.

Example 8. Gravimetric Determination of the Colloidal Clay Content of 1% Aqueous Volclay® HPM-20 Dispersions A 60 g sample of a 5 wt. % HPM-20 clay dispersion in water was combined with 240 g of Milli-Q® deionized water to give 300 g of a 1 wt. % HPM-20 aqueous dispersion. Upon standing for a time period of from 30 minutes to an hour, a significant amount of settled clay was observed in this diluted dispersion. The colloidal portion was decanted off, and the settled portion was collected, dried and weighed. This process provided 900 mg of HPM-20 clay which was collected, corresponding to a 0.7% colloidal content for the diluted dispersion. In repetitions of this experiment using between 280 to 290 g of this 1% HPM-20 dispersion, 630 mg and 910 mg of solid clay was isolated, respectively, resulting colloidal content values of 0.77 and 0.69 wt. % for the diluted dispersions.

Example 9. Zeta Potential Determination of Aluminum Chlorhydrate/Volclay® HPM-20 Ratio in a Clay Heteroadduct With stirring, 30 g of HPM-20 clay was added slowly over the course of a few minutes into a Waring® blender containing 570 g of Milli-Q® deionized water to afford a grey colloidal dispersion containing no, or substantially no, visible lumps or clumps. After the addition was complete, the dispersion was stirred at high speed for 5 to 10 minutes to obtain a slightly viscous mixture of 5 wt. % aqueous dispersion of HPM-20 clay. A 42 g portion of this 5 wt. % HPM-20 aqueous dispersion was combined with 258 g of Milli-Q® deionized water to give a 0.7 wt. % HPM-20 aqueous dispersion. Then, 280 g of this 0.7 wt. % colloidal dispersion was transferred to the measurement vessel of a Colloidal Dynamics Zetaprobe Analyzer™, containing an axial bottom stirrer. The stirring speed was set between 250 rpm and 350 rpm.

In accordance with the procedure outlined in the Colloidal Dynamics Zetaprobe Analyzer™ manual supplied with the instrument, a zeta potential measurement was performed on this diluted HPM-20 aqueous dispersion using an initial colloidal content estimate of 0.7 wt. % to determine the actual colloidal content of the clay dispersion. Measuring a 5 wt. % HPM-20 aqueous dispersion results in a zeta potential measurement of −46 mV (negative 46 millivolts). The initial colloidal content estimate was adjusted to match this zeta potential. In this instance, the HPM-20 colloidal content of the dispersion was determined to be 0.62%. Colloidal Dynamic Zetaprobe measurement parameters were as follows: 5 readings, 1 reading/minute; particle density of 2.6 g/cc; dielectric constant of 4.5.

A 2.5 wt. % aqueous solution of aluminum chlorhydrate (ACH) was obtained through dilution of a 50 wt. % aluminum chlorhydrate solution (GEO). A volumetric titration of this 2.5 wt. % ACH solution into the 0.7 wt. % HPM-20 aqueous dispersion was then performed. Titration settings were 0.5 mL per titration point, with an equilibration delay of 30 seconds, that is, following the addition of 0.5 mL of the aqueous ACH solution, a 30 second delay to allow for equilibration was taken prior to the zeta potential measurement.

FIG. 3 and Table 4 report the results of this zeta potential titration for the volumetric addition of the 2.5 wt. % aqueous solution of aluminum chlorhydrate (ACH) into the 0.7 wt. % HPM-20 aqueous dispersion, plotting the measured zeta potential versus the titrant volume (mL). The titrant volume indicates the cumulative volume of the aqueous aluminum chlorhydrate solution added. Based on the amount of ACH solution and the measured density of 1.075 g/mL for the ACH solution, and ACH molar aluminum/clay mass ratios used to achieve −20 mV, neutral, and +20 mV zeta potential are summarized in Table 4.

TABLE 4

Results for zeta potential titration of ACH into Volclay® HPM-20 aqueous dispersion

| Zeta potential | Cumulative volume of 2.5 wt. % ACH in aqueous solution (mL) | ACH Al molar content/g Volclay® HPM-20 |
|---|---|---|
| −20 mV | 9.3 | 1.17 mmol Al/g clay |
| 0 mV | 12.1 | 1.52 mmol Al/g clay |
| +20 mV | 14.05 | 1.73 mmol Al/g clay |

Example 10. Zeta Potential Determination of Polyaluminum Chloride UltraPAC® 290/Volclay® HPM-20 Ratio in a Clay Heteroadduct With stirring, 30 g of HPM-20 clay was added slowly over the course of 1 to 2 minutes into a Waring® blender containing 570 g of Milli-Q® deionized water while stirring at low speed to afford a grey colloidal dispersion containing no, or substantially no visible lumps or clumps. After the addition was complete, the dispersion was stirred by blending at high speed for 5 to 10 minutes to obtain a slightly viscous mixture of 5 wt. % aqueous dispersion of HPM-20 clay.

A 60 g portion of this 5 wt. % HPM-20 aqueous dispersion was combined with 240 g of Milli-Q® deionized water to give a 1 wt. % HPM-20 aqueous dispersion. Approximately 280 g of this 1 wt. % colloidal dispersion was transferred to the measurement vessel of a Colloidal Dynamics Zetaprobe Analyzer™, containing an axial bottom stirrer. The stirring speed was set as described above.

A zeta potential measurement was performed on this diluted HPM-20 aqueous dispersion using an initial colloidal content estimate of 1 wt. % to determine the actual colloidal content of the clay dispersion. Measuring a 5 wt. % HPM-20 aqueous dispersion results in a zeta potential of −46 mV. The initial colloidal content estimate is adjusted to match this zeta potential. In this instance, the HPM-20 clay colloidal content of the dispersion was estimated to be 0.67%. Colloidal Dynamic Zetaprobe Measurement parameters were the following: 5 readings, 1 reading/minute; particle density of 2.6 g/cc; dielectric constant of 4.5.

A 4.58 g sample of polyaluminum chloride (abbreviated "PAC") UltraPAC® 290 (17.1% $Al_2O_3$ content) was diluted into a 100 mL volumetric flask using Milli-Q® deionized water. A volumetric titration of this 4.58 wt. % UltraPAC® 290 solution into the aforementioned 1 wt. % HPM-20 clay dispersion was then performed. Titration settings were 1 mL per titration point, with an equilibration delay of 30 seconds.

Figure 5:
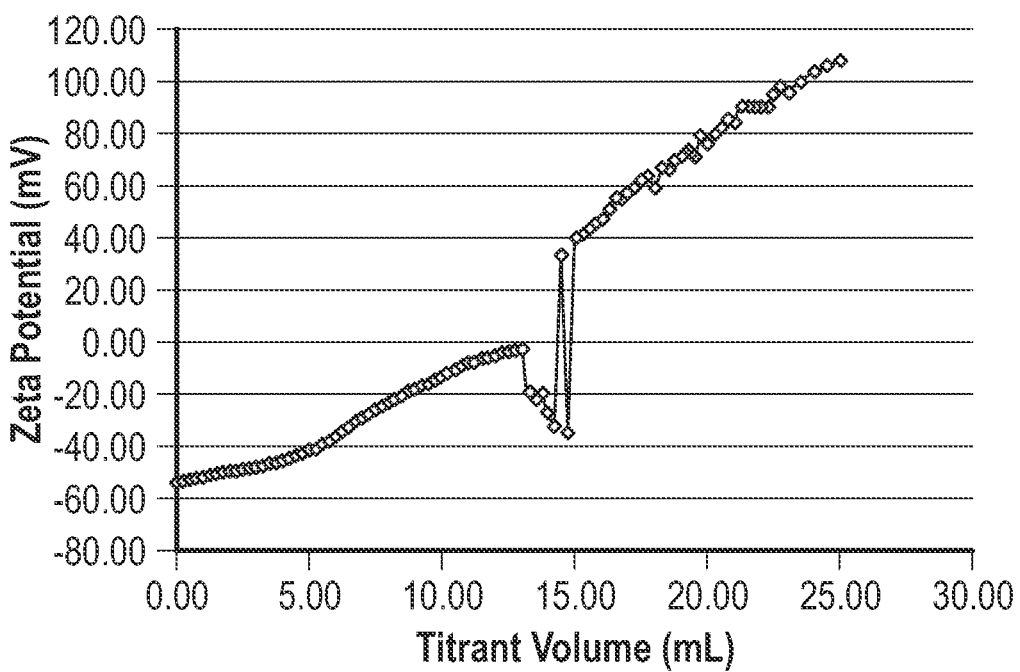
FIG. 5 illustrates a zeta potential titration for the volumetric addition of a 4.58 wt. % aqueous solution of UltraPAC® 290 polyaluminum chloride (empirically Al2(OH)2.5Cl3.5) into a 1 wt. % Volclay® HPM-20 bentonite aqueous dispersion, plotting the measured zeta potential versus the titrant volume (mL). The titration settings were 1 mL per titration point, followed by an equilibration delay of 30 seconds. The titrant volume indicates the cumulative volume of the aqueous UltraPAC® 290 polyaluminum chloride solution added. See also Table 5.

FIG. 5 and Table 5 report the results from these zeta potential measurements, where titrant volume indicates the cumulative volume of the 4.58 wt. % aqueous UltraPAC® 290 solution added, plotting the measured zeta potential versus the titrant volume (mL). The amount of UltraPAC® 290 dispersion used to achieve −20 mV, neutral, and +20 mV zeta potential is summarized in Table 5.

TABLE 5

Results for zeta potential titration of UltraPAC® 290 into Volclay® HPM-20 aqueous dispersion

| Zeta potential | Cumulative volume of UltraPAC® 290 (mL) | Amount of UltraPAC® 290 dispersion vs. Volclay® HPM-20 (g/g) | PAC Al molar content vs. Volclay® HPM-20 |
|---|---|---|---|
| −20 mV | 8.55 | 0.190 | 0.69 mmol Al/g clay |
| 0 mV | 13.1 | 0.291 | 1.06 mmol Al/g clay |
| +20 mV | 14.4 | 0.320 | 1.16 mmol Al/g clay |

Example 11. Zeta Potential Determination of NYACOL® AL27 Colloidal Alumina/Volclay® HPM-20 Ratio in a Clay Heteroadduct A 1 wt. % HPM-20 clay dispersion was prepared by addition of approximately 60 g of 5 wt. % HPM-20 aqueous dispersion into 240 g of Milli-Q® water. A 285 g to 300 g portion of the 1 wt. % dispersion was transferred to the measurement container of the Zetaprobe and an initial zeta potential measurement was taken to estimate the true particle wt. % of the solution. A zeta potential measurement was performed on this diluted HPM-20 aqueous dispersion to determine the actual colloidal content of the clay dispersion. Measuring a 5 wt. % HPM-20 aqueous dispersion results in a zeta potential of −44.2 mV. The initial colloidal content estimate is adjusted to match this zeta potential. In this instance, the HPM-20 clay colloidal content of the dispersion was determined to be 0.92%. Colloidal Dynamic Zetaprobe Measurement parameters were the following: 5 readings, 1 reading/minute; particle density of 2.6 g/cc; dielectric constant of 4.5.

A 100 g sample of commercial NYACOL® AL27 colloidal alumina dispersion (20 wt. % $Al_2O_3$) was combined with 100 g of Milli-Q® deionized water to afford a 10 wt. % $Al_2O_3$ dispersion of NYACOL® AL27. A volumetric titration of this 10 wt. % dispersion into the aforementioned 1 wt. % HPM-20 clay dispersion was then performed. (The concentration designation of 1 wt. % HPM-20 is based upon the recipe rather than a zeta potential estimate which was determined to be about 0.92 wt. %, because not all of the clay was colloidal upon dilution.) Titration settings were as follows: 1 mL per titration point from 0 mL to 27 mL, and 3 mL per titration point afterwards, with an equilibration delay of 60 seconds.

Figure 6:
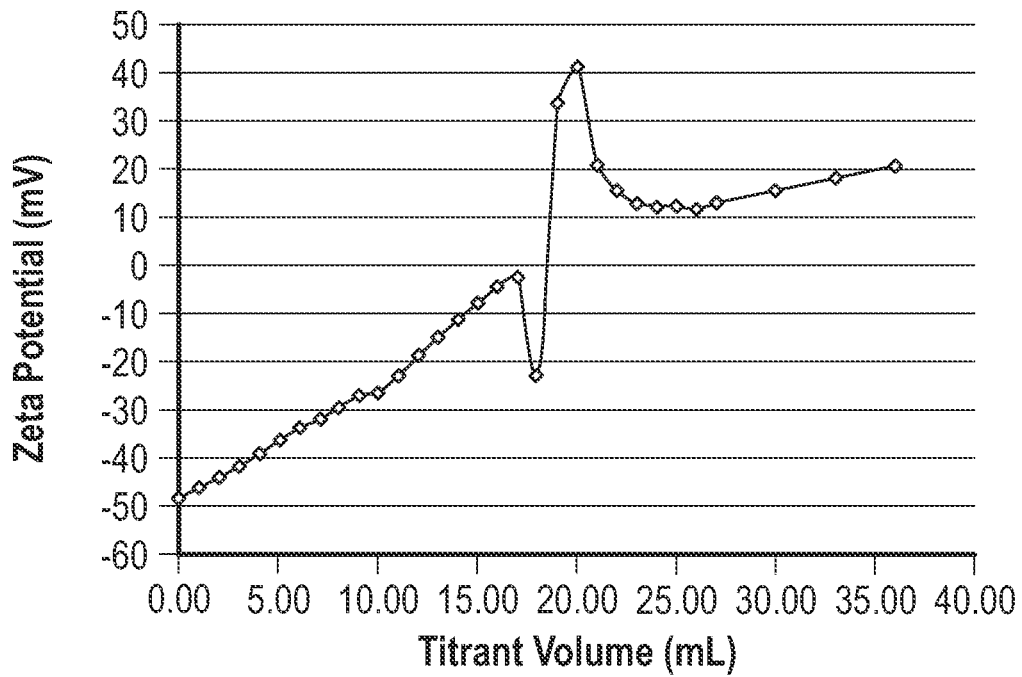
FIG. 6 provides a zeta potential titration (adjusted) for the volumetric addition of a 10 wt. % aqueous dispersion of NYACOL® AL27 colloidal alumina into a 0.75 wt. % Volclay® HPM-20 bentonite aqueous dispersion, plotting the measured zeta potential versus the titrant volume (mL). The titration settings were 1 mL per titration point from 0-27 mL and 3 mL per titration point afterwards, equilibration delay of 60 seconds. The titrant volume indicates the cumulative volume of the aqueous solution of NYACOL® AL27 colloidal alumina added. See Example 11 and Table 6.

FIG. 6 and Table 6 report the results from these measurements, where titrant volume indicates the cumulative volume of the NYACOL® AL27 alumina dispersion added. In this example, the titrant is also a colloidal species. The zeta potential is adjusted using the previously described method to provide the date in FIG. 6. The amount of NYACOL® AL27 dispersion used to achieve −20 mV, neutral, and +20 mV zeta potential is summarized in Table 6.

TABLE 6

Results for zeta potential titration of NYACOL ® AL27 colloidal alumina into Volclay ® HPM-20

| Zeta potential | Amount of titrant (10 wt. % Al$_2$O$_3$, mL) | Amount of Al$_2$O$_3$ vs. Volclay ® HPM-20 (g/g) | Al molar content vs. Volclay ® HPM-20 (mmol/g) | Amount of NYACOL ® AL27 dispersion vs. Volclay ® HPM-20 (g/g) |
|---|---|---|---|---|
| −20 mV | 11.5 | 0.486 | 4.8 | 2.43 |
| 0 mV | 18 | 0.76 | 7.5 | 3.8 |
| +20 mV | 35.25 | 1.49 | 14.6 | 7.45 |

Example 12. Preparation of Aluminum Chlorhydrate Clay Heteroadduct (1.76 Mmol Al/g Clay)

A Waring® Blender was charged with 475.22 grams of deionized water. With stirring, 25.09 grams of HPM-20 clay from American Colloid was added slowly. After the clay addition was completed, the mixture was stirred for 5 minutes on high to afford a homogeneous suspension with no lumps, after which 9.53 grams of aluminum chlorhydrate 50 wt. % aqueous solution (GEO) was added with stirring, and stirred continued for 9 minutes. The mixture was poured into a high density polyethylene bottle. The Waring® flask was rinsed with 42.5 grams of deionized Milli-Q® water, and the rinse water was transferred to the bottle. The bottle was shaken to thoroughly mix the contents, and the conductivity of the slurry was measured as 4.03 mS/cm, and the pH was 5.89.

A second batch of the aluminum chlorhydrate clay heteroadduct was prepared in the same fashion using 380.26 grams of deionized Milli-Q® water, 20.03 grams of HPM-20 clay, and 7.70 grams of aluminum chlorhydrate 50 wt. % aqueous solution (GEO). The conductivity of this batch was measured to be 3.64 mS/cm and the pH was 5.58. The contents of the second batch were transferred, along with 30 grams of deionized water to transfer residual slurry, to the bottle containing the first batch. The bottle was shaken to afford a grey slurry with no visible lumps. The final conductivity of the combined batches was 3.84 mS/cm and the final pH was 5.87.

Example 13. Comparative Example of the Preparation of an Aluminum Sesquichlorohydrate Clay Heteroadduct Using Powdered Aluminum Sesquichlorohydrate (ASCH, 6.4 Mmol Al/g Clay)

In this comparative example, the synthesis of an aluminum sesquichlorohydrate clay heteroadduct using powdered aluminum sesquichlorohydrate (ASCH), which demonstrates the need to use multiple washings and centrifugations in order to isolate the product, compared to the procedures and products of Examples 31 and 32.

With stirring, 30 g of HPM-20 clay was added slowly over the course of 1 to 2 minutes into a Waring® blender containing 570 g of deionized Milli-Q® water while stirring at low speed to afford a grey colloidal dispersion containing no, or substantially no visible lumps or clumps. After the addition was complete, the dispersion was blended at high speed for 5 to 10 minutes to obtain a slightly viscous mixture of 5 wt. % aqueous dispersion of HPM-20 clay.

A 100 g portion of this 5 wt. % aqueous dispersion of HPM-20 clay was transferred into a Waring® blender. To a separate vial were charged 3.53 g of ALOXICOLL® 31P powder and 35 to 40 mL of deionized Milli-Q® water, and this mixture was poured all at once into the stirred dispersion. The mixture was blended at high speed for 5 minutes, then portioned into four 50 mL centrifuge tubes and centrifuged at 3000 rpm to 3500 rpm for 30 to 60 minutes. The supernatant pH and conductivity were measured (Eutech PCSTestr 35), which provided a pH of 4.0 and a conductivity of 7300 µS/cm. The supernatant was decanted and the remaining wet solid was re-suspended in deionized Milli-Q® water. The centrifugation process (centrifuge, supernatant pH/conductivity measurement, supernatant removal, and re-suspension in deionized Milli-Q® water) was repeated until the conductivity of the supernatant reached 100 to 300 S/cm. Achieving this conductivity required, in total, six centrifugations to be performed, with the final supernatant pH measured to be 4.3 and the conductivity measured to be 286 µS/cm. At this point, the supernatant was discarded for a final time and the remaining wet solid was combined with 100 to 200 mL of 1-butanol in a round-bottom flask and rotary evaporated at 45° C. to afford 5.82 g of wet solid, which was then ground with a pestle and mortar. A 2.1 g sample of this solid was transferred to a porcelain crucible and calcined for 6 hours at 300° C., to afford 1.1 g of a grey-black powder.

Example 14. Spray Drying, Screening, and Calcining Unwashed Aluminum Chlorhydrate Clay Heteroadduct Retained on a 325 Mesh Screen (1.76 Mmol Al/g Clay)

A portion of the aluminum chlorhydrate clay heteroadduct (1.76 mmol Al/g clay) mixture (slurry) prepared according to Example 12 was spray dried using a Buchi B290 laboratory spray drier. Some of the spray-dried clay heteroadduct was screened through a 325 mesh screen. Two grams of the material retained on the 325 mesh screen were charged to a 300° C. oven and heated for 6 hours in air. While still hot, the material was transferred to a vacuum chamber and left to cool to room temperature under vacuum.

Example 15. Spray Drying, Screening, and Calcining Unwashed Aluminum Chlorhydrate Clay Heteroadduct Passing Through a 325 Mesh Screen (1.76 Mmol Al/g Clay)

A portion of the aluminum chlorhydrate clay heteroadduct (1.76 mmol Al/g clay) mixture (slurry) prepared according to Example 12 was spray dried using a Buchi B290 laboratory spray drier. Some of the spray-dried clay heteroadduct was screened through a 325 mesh screen. Two grams of through-screen material were charged to a 300° C. oven and heated for 6 hours in air. While still hot, the material was transferred to a vacuum chamber and left to cool to room temperature under vacuum.

Example 16. Spray Drying and Calcining Washed Aluminum Chlorhydrate Clay Heteroadduct (1.76 Mmol Al/g Clay)

A portion of the aluminum chlorhydrate clay heteroadduct (1.76 mmol Al/g clay) slurry prepared according to Example 12 was filtered through Fisherbrand™ P8 filter paper using a Buchner funnel and vacuum. The 158 gram filter cake was then transferred to a HDPE bottle and re-suspended in about 1.2 liter of deionized water by shaking. The conductivity of the thus-obtained slurry was 114 µS/cm and the pH was 6.25. This slurry was filtered again through Fisherbrand™ P8 filter paper and left on filter under vacuum overnight to afford 109.03 grams of a grey solid. A 97.07 gram sample of this solid was charged to a HDPE bottle along with 452 g of deionized water and shaken until no lumps were visible in the slurry. The conductivity of this slurry was 112 μS/cm and the pH was 6.33. A portion of this aluminum chlorhydrate clay heteroadduct slurry was spray dried using a Buchi B290 laboratory spray drier. A 1.77 gram sample of the spray dried material was charged to a 300° C. oven for 6 hours in air to calcine. While still hot, the material was then transferred to a vacuum chamber and left to cool to room temperature under vacuum.

Example 17. Single Filtration, Azeotroping, and Calcining an Aluminum Chlorhydrate Clay Heteroadduct (1.76 Mmol Al/g Clay)

A 543 gram portion of the aluminum chlorhydrate clay heteroadduct (1.76 mmol Al/g clay) slurry prepared according to Example 12 was vacuum filtered through Fisherbrand™ Brand P8 filter paper. The resulting filter cake was then re-suspended in approximately 1 L of deionized water to afford a slurry with a conductivity of 114 μS and a pH of 6.25. This slurry was then vacuum filtered through Fisherbrand™ Brand P8 paper, and 11.5 grams of the filter cake from the clay-heteroadduct retained on the filter paper were charged to an Erlenmeyer flask equipped with a stir bar. Then 200 mL of n-butanol was added and the mixture stirred until a slurry with no visible lumps or clumps was obtained. The stir bar was removed and the Erlenmeyer was rotary evaporated from a 45° C. bath. The off-white powder containing some flakes and chunks was very gently ground to a uniform powder and 1.04 grams were charged to a porcelain crucible that was calcined in air for 6 hours at 300° C. The calcined material was cooled down under vacuum and 0.867 grams were transferred to an inert atmosphere glove box.

Example 18. Reproducibility of Single Filtration, Azeotroping, and Calcining an Aluminum Chlorhydrate Clay Heteroadduct (1.76 Mmol Al/g Clay) According to Example 17

With stirring, 30 g of HPM-20 clay was added slowly over the course of 1 to 2 minutes into a Waring® blender containing 570 g of deionized Milli-Q® water while stirring at low speed to afford a grey colloidal dispersion containing no, or substantially no visible lumps or clumps. After the addition was complete, the dispersion was blended at high speed for 5 to 10 minutes to obtain a slightly viscous mixture of 5 wt. % aqueous dispersion of HPM-20 clay.

A 100 g portion of this 5 wt. % aqueous dispersion of HPM-20 clay was transferred into a Waring® blender, and 1.91 g of GEO aluminum chlorhydrate 50 wt. % aqueous solution was pipetted into a vial and was added all at once to the dispersion. The mixture coagulated rapidly, and 70 mL of deionized Milli-Q® water was added in order to facilitate stirring. The mixture was then blended at high speed for 5 minutes, and subsequently vacuum filtered through Fisher P8 Qualitative-Grade Filter Paper (coarse porosity). After allowing 15 to 30 minutes for the filtration, the filtrate pH and conductivity were measured (Eutech PCSTestr 35), to provide a pH of 6.1 and a conductivity of 1516 μS/cm. The filtrate was discarded, and the remaining wet solid was re-suspended in 50 to 100 mL of deionized Milli-Q® water. The filtration process (suspension of wet solid in deionized Milli-Q® water, vacuum filtration, and filtrate pH/conductivity measurement) was repeated once more. The remaining wet solid was re-suspended in 150 to 200 mL of 1-butanol and rotary evaporated at 45° C. The resulting solid was then ground with a pestle and mortar to obtain 5.18 g of a light grey powder. A 1.90 g portion of this solid was transferred to a porcelain crucible and calcined for 6 hours at 300° C. to afford 0.9 g of a grey-black powder. The powder XRD (x-ray diffraction) pattern of this sample appears in FIG. 2, and the BJH pore volume analysis of this sample is plotted in FIG. 10.

Example 19. Comparative Example of the Preparation of Aluminum Chlorhydrate (ACH) Ion-Exchanged Clay (0.3 Mmol Al/g Clay)

With stirring, 30 g of HPM-20 clay was added slowly over the course of 1 to 2 minutes into a Waring® blender containing 570 g of deionized Milli-Q® water while stirring at low speed to afford a grey colloidal dispersion containing no, or substantially no visible lumps or clumps. After the addition was complete, the dispersion was blended at high speed for 5 to 10 minutes to obtain a slightly viscous mixture of 5 wt. % aqueous dispersion of HPM-20 clay.

A 100 g portion of this 5 wt. % aqueous dispersion of HPM-20 clay was transferred into a Waring® blender. A 0.325 g sample of GEO ACH aqueous dispersion (50 wt. %) was pipetted into a vial and combined with 20 mL of deionized Milli-Q® water, which was then poured all at once into the clay dispersion. The resulting mixture was then blended at high speed for 5 minutes, then vacuum filtered through Fisher P8 Qualitative-Grade Filter Paper (coarse porosity). Filtration was slow (<1 drop/second). After allowing 15 to 30 minutes for the filtration to proceed, the filtrate pH and conductivity were measured (Eutech PCSTestr 35), which provided a pH of 7.3 and a conductivity of 487 μS/cm. The filtrate was discarded, and the remaining wet solid was re-suspended in 50 mL of deionized Milli-Q® water and centrifuged once at 3000 rpm to 3500 rpm for 30 to 60 minutes. After removing the supernatant (having a measured conductivity of 180 μS/cm), the remaining wet solid was re-suspended in 50 to 100 mL of 1-butanol and rotary evaporated at 45° C. The resulting solid was then ground with a pestle and mortar, 1.7 g of the ground solid was then transferred to a porcelain crucible and calcined for 6 hours at 300° C. to afford 0.8 g of grey-black powder.

Example 20. Preparation of Aluminum Chlorhydrate (ACH)-Clay Heteroadduct (1.17 Mmol Al/g Clay)

With stirring, 30 g of Volclay® HPM-20 clay was added slowly over the course of 1 to 2 minutes into a Waring® blender containing 570 g of deionized Milli-Q® water while stirring at low speed to afford a grey colloidal dispersion containing no, or substantially no visible lumps or clumps. After the addition was complete, the dispersion was blended at high speed for 5 to 10 minutes to obtain a slightly viscous mixture of 5 wt. % aqueous dispersion of HPM-20 clay.

A 100 g portion of this 5 wt. % aqueous dispersion of HPM-20 clay was transferred into a Waring® blender. Then, 1.27 g of GEO aluminum chlorhydrate 50 wt. % aqueous solution was pipetted into a vial and was added all at once to the dispersion. The mixture coagulated rapidly, and 70 mL of deionized Milli-Q® water was added in order to facilitate stirring. The mixture was then blended at high speed for 5 minutes, and subsequently vacuum filtered through Fisher P8 Qualitative-Grade Filter Paper (coarse porosity). After allowing 15 to 30 minutes for the filtration, the filtrate pH and conductivity were measured (Eutech PCSTestr 35), which provided a pH of 6.25 and a conductivity of 1166 µS/cm. The filtrate was discarded and the remaining wet solid was re-suspended in 50 to 100 mL of deionized Milli-Q® water.

The filtration process (suspension of wet solid in deionized Milli-Q® water, vacuum filtration, filtrate pH/conductivity measurement) was repeated until the conductivity of the re-suspended slurry reached 100 to 300 µS/cm. In this case, one additional filtration was performed to obtain a slurry with a pH of 6.2 and a conductivity of 188 µS/cm. The remaining wet solid was re-suspended in 150 to 200 mL of 1-butanol and rotary evaporated at 45° C. The solid was then ground with a pestle and mortar to obtain 2.97 g of a light grey powder. A 1.7 g portion of this solid was transferred to a porcelain crucible and calcined for 6 hours at 300° C. to afford 1.0 g of a grey-black powder. The powder XRD (x-ray diffraction) pattern of this sample appears in FIG. 2.

Example 21. Preparation of Aluminum Chlorhydrate (ACH)-Clay Heteroadduct (1.52 Mmol Al/g Clay)

With stirring, 30 g of Volclay® HPM-20 clay was added slowly over the course of 1 to 2 minutes into a Waring® blender containing 570 g of deionized Milli-Q® water while stirring at low speed to afford a grey colloidal dispersion containing no, or substantially no visible lumps or clumps. After the addition was complete, the dispersion was blended at high speed for 5 to 10 minutes to obtain a slightly viscous mixture of 5 wt. % aqueous dispersion of HPM-20 clay.

A 100 g portion of this 5 wt. % aqueous dispersion of HPM-20 clay was transferred into a Waring® blender. A 1.66 g sample of GEO aluminum chlorhydrate 50 wt. % aqueous solution was pipetted into a vial and was added all at once to the dispersion. The resulting mixture coagulated rapidly, and 80 mL of deionized Milli-Q® water was added in order to facilitate stirring. This mixture was then blended at high speed for 5 minutes, and subsequently vacuum filtered through Fisher P8 Qualitative-Grade Filter Paper (coarse porosity). After allowing 15 to 30 minutes for the filtration, the filtrate pH and conductivity were measured (Eutech PCSTestr 35) to provide a pH of 6.2 and a conductivity of 1518 µS/cm. The filtrate was discarded and the remaining wet solid was re-suspended in 50 to 100 mL of deionized Milli-Q® water.

This filtration process (suspension of wet solid in deionized Milli-Q® water, vacuum filtration, filtrate pH/conductivity measurement) was repeated until the conductivity of the re-suspended slurry reached 100 to 300 µS/cm. In this case, one additional filtration was performed to obtain a slurry with a pH of 6.1 and a conductivity 199 µS/cm. The remaining wet solid was re-suspended in 150 to 200 mL of 1-butanol and rotary evaporated at 45° C. The resulting solid was then ground with a pestle and mortar to obtain 3.19 g of a light grey powder. A 1.65 g sample of this solid was transferred to a porcelain crucible and calcined for 6 hours at 300° C. to afford 0.9 g of a grey-black powder. The powder XRD pattern of this sample appears in FIG. 2.

Example 22. Comparative Example of the Preparation and Single Filtration of Aluminum Chlorhydrate (ACH)-Clay Heteroadduct (2.5 Mmol Al/g Clay)

With stirring, 30 g of HPM-20 clay was added slowly over the course of 1 to 2 minutes into a Waring® blender containing 570 g of deionized Milli-Q® water while stirring at low speed to afford a grey colloidal dispersion containing no, or substantially no visible lumps or clumps. After the addition was complete, the dispersion was blended at high speed for 5 to 10 minutes to obtain a slightly viscous mixture of 5 wt. % aqueous dispersion of HPM-20 clay.

A 100 g portion of this 5 wt. % aqueous dispersion of HPM-20 clay was transferred into a Waring® blender. A 2.71 g sample of GEO aluminum chlorhydrate 50 wt. % aqueous solution was pipetted into a vial and was added all at once to the dispersion. The mixture became viscous quickly, and 100 mL of deionized Milli-Q® water was added in order to facilitate stirring. This mixture was then blended at high speed for 5 minutes, then vacuum filtered through Fisher P8 Qualitative-Grade Filter Paper (coarse porosity). After allowing 15 to 30 minutes for the filtration, the filtrate pH and conductivity were measured (Eutech PCSTestr 35) to provide a pH of 4.72 and a conductivity of 1988 µS/cm. A portion of the wet solid filter cake was re-suspended in 50 to 100 mL of 1-butanol and rotary evaporated at 45° C. The dried solid was then ground with a pestle and mortar to obtain 0.66 g of a light grey powder. A 0.64 g portion of this solid was transferred to a porcelain crucible and calcined for 6 hours at 300° C. to afford 0.5 g of a grey-black powder.

Example 23. Comparative Example of the Preparation and Additional Washing/Filtration of Aluminum Chlorhydrate (ACH)-Clay Heteroadduct, as Compared to Example 22 (2.5 Mmol Al/g Clay)

With stirring, 30 g of HPM-20 clay was added slowly over the course of 1 to 2 minutes into a Waring® blender containing 570 g of deionized Milli-Q® water while stirring at low speed to afford a grey colloidal dispersion containing no, or substantially no visible lumps or clumps. After the addition was complete, the dispersion was blended at high speed for 5 to 10 minutes to obtain a slightly viscous mixture of 5 wt. % aqueous dispersion of HPM-20 clay.

A 100 g portion of this 5 wt. % aqueous dispersion of HPM-20 clay was transferred into a Waring® blender. A 2.71 g sample of GEO aluminum chlorhydrate 50 wt. % aqueous solution was pipetted into a vial and was added all at once to the dispersion. The mixture became viscous quickly, and 100 mL of deionized Milli-Q® water was added in order to facilitate stirring. The mixture was then blended at high speed for 5 minutes, then vacuum filtered through Fisher P8 Qualitative-Grade Filter Paper (coarse porosity). After allowing 15 to 30 minutes for the filtration, the filtrate pH and conductivity were measured (Eutech PCSTestr 35). The filtrate was discarded and the remaining wet solid was re-suspended in 50 to 100 mL of deionized Milli-Q® water.

The filtration process (suspension of wet solid in deionized Milli-Q® water, vacuum filtration, filtrate pH/conductivity measurement) was repeated until the conductivity of the re-suspended slurry reached 100 to 300 µS/cm. In this case, one additional filtration was performed to obtain a slurry with a pH of 4.67 and a conductivity of 87 µS/cm. The remaining wet solid was re-suspended in 50 to 100 mL of 1-butanol and rotary evaporated at 45° C. The dried solid was then ground with a pestle and mortar to obtain 3.73 g of a light grey powder. A 1.37 g portion of this solid was transferred to a porcelain crucible and calcined for 6 hours at 300° C. to afford 0.6 g a grey-black powder. The powder XRD pattern of this sample appears in FIG. 2.

Example 24. Comparative Example of the Preparation and Single Filtration of Aluminum Chlorhydrate (ACH)-Clay Heteroadduct (3.5 Mmol Al/g Clay)

With stirring, 30 g of HPM-20 clay was added slowly over the course of 1 to 2 minutes into a Waring® blender containing 570 g of deionized Milli-Q® water while stirring at low speed to afford a grey colloidal dispersion containing no, or substantially no visible lumps or clumps. After the addition was complete, the dispersion was blended at high speed for 5 to 10 minutes to obtain a slightly viscous mixture of 5 wt. % aqueous dispersion of HPM-20 clay.

A 100 g portion of this 5 wt. % aqueous dispersion of HPM-20 clay was transferred into a Waring® blender. A 3.80 g sample of GEO aluminum chlorhydrate 50 wt. % aqueous solution was pipetted into a vial and was added all at once to the dispersion, and 20 mL of deionized Milli-Q® water was added in order to facilitate stirring. This mixture was then blended at high speed for 5 minutes, then vacuum filtered through Fisher P8 Qualitative-Grade Filter Paper (coarse porosity). After allowing 15 to 30 minutes for the filtration, the filtrate pH and conductivity were measured (Eutech PCSTestr 35) to provide a pH of 4.34 and a conductivity of 1500 µS/cm. A portion of the wet solid was re-suspended in 50 to 100 mL of 1-butanol and rotary evaporated at 45° C. The dried solid was then ground with a pestle and mortar to obtain 0.74 g of a light grey powder. A 0.62 g portion of this solid was transferred to a porcelain crucible and calcined for 6 hours at 300° C. to afford 0.5 g a grey-black powder.

Example 25. Comparative Example of the Preparation and Additional Washing/Filtration of Aluminum Chlorhydrate (ACH)-Clay Heteroadduct, as Compared to Example 24 (3.5 Mmol Al/g Clay)

With stirring, 30 g of HPM-20 clay was added slowly over the course of 1 to 2 minutes into a Waring® blender containing 570 g of deionized Milli-Q® water while stirring at low speed to afford a grey colloidal dispersion containing no, or substantially no visible lumps or clumps. After the addition was complete, the dispersion was blended at high speed for 5 to 10 minutes to obtain a slightly viscous mixture of 5 wt. % aqueous dispersion of HPM-20 clay.

A 100 g portion of this 5 wt. % aqueous dispersion of HPM-20 clay was transferred into a Waring® blender. A 3.80 g sample of GEO aluminum chlorhydrate 50 wt. % aqueous solution was pipetted into a vial and was added all at once to the dispersion. The mixture became viscous quickly, and 20 mL of deionized Milli-Q® water was added in order to facilitate stirring. The mixture was then blended at high speed for 5 minutes, then vacuum filtered through Fisher P8 Qualitative-Grade Filter Paper (coarse porosity). After allowing 15 to 30 minutes for the filtration, the filtrate pH and conductivity were measured (Eutech PCSTestr 35). The filtrate was discarded and the remaining wet solid was re-suspended in 50 to 100 mL of deionized Milli-Q® water.

The filtration process (suspension of the wet solid in deionized Milli-Q® water, vacuum filtration, filtrate pH/conductivity measurement) was repeated until the conductivity of the re-suspended slurry reached 100 to 300 µS/cm. In this case, one additional filtration was performed to obtain a slurry with pH of 4.5, and conductivity of 180 µS/cm. The remaining slurry was re-suspended in 50 to 100 mL of 1-butanol and rotary evaporated at 45° C. The dried solid was then ground with a pestle and mortar to obtain 4.33 g of a light grey powder. A 1.36 g portion of this solid was transferred to a porcelain crucible and calcined for 6 hours at 300° C. to afford 0.6 g a grey-black powder. The powder XRD pattern of this sample appears in FIG. 2.

Example 26. Comparative Example of the Preparation of Aluminum Chlorhydrate (ACH)-Clay Heteroadduct Using Powdered ACH Reagent (0.3 Mmol Al/g Clay)

With stirring, 30 g of HPM-20 clay was added slowly over the course of 1 to 2 minutes into a Waring® blender containing 570 g of deionized Milli-Q® water while stirring at low speed to afford a grey colloidal dispersion containing no, or substantially no visible lumps or clumps. After the addition was complete, the dispersion was blended at high speed for 5 to 10 minutes to obtain a slightly viscous mixture of 5 wt. % aqueous dispersion of HPM-20 clay.

A 100 g portion of this 5 wt. % aqueous dispersion of HPM-20 clay was transferred into a Waring® blender. To a separate vial was charged 0.160 g of ALOXICOLL® 51P powder and 20 mL of deionized Milli-Q® water. This mixture was poured all at once into the stirred dispersion, and 40 mL of deionized Milli-Q® water was added in order to facilitate stirring. The mixture was then blended at high speed for 5 minutes, then vacuum filtered through Fisherbrand™ P8 Qualitative-Grade Filter Paper (coarse porosity). Filtration was slow (<1 drop/second). After allowing 15 to 30 minutes for the filtration, the filtrate pH and conductivity were measured (Eutech PCSTestr 35) to provide a pH 6.5 and a conductivity of 780 µS/cm. The filtrate was discarded and the remaining wet solid was re-suspended in 50 mL of deionized Milli-Q® water and centrifuged once at 3000 rpm to 3500 rpm for 30 to 60 minutes. After removing the supernatant (having a conductivity of 180 µS/cm), the remaining wet solid was re-suspended in 50 to 100 mL of 1-butanol and rotary evaporated. The resulting solid was then ground with a pestle and mortar then transferred to a porcelain crucible and calcined for 6 hours at 300° C. to afford a grey-black powder.

Example 27. Comparative Example of the Preparation of Aluminum Chlorhydrate (ACH)-Clay Heteroadduct Using Powdered ACH Reagent (0.6 Mmol Al/g Clay)

With stirring, 30 g of HPM-20 clay was added slowly over the course of 1 to 2 minutes into a Waring® blender containing 570 g of deionized Milli-Q® water while stirring at low speed to afford a grey colloidal dispersion containing no, or substantially no visible lumps or clumps. After the addition was complete, the dispersion was blended at high speed for 5 to 10 minutes to obtain a slightly viscous mixture of 5 wt. % aqueous dispersion of HPM-20 clay.

A 100 g portion of this 5 wt. % aqueous dispersion of HPM-20 clay was transferred into a Waring® blender. To a separate vial was charged 0.4 g of ALOXICOLL® 51P powder and 20 mL of deionized Milli-Q® water. This mixture was poured all at once into the stirred dispersion. 40 mL of deionized Milli-Q® water was added in order to facilitate stirring. The mixture was then blended at high speed for 5 minutes, then vacuum filtered through Fisher P8 Qualitative-Grade Filter Paper (coarse porosity). After allowing 15 to 30 minutes for the filtration, the filtrate pH and conductivity were measured (Eutech PCSTestr 35) to provide a pH of 7.2 and a conductivity of 180 µS/cm. The filtrate was discarded and the remaining wet solid was re-suspended in 50 mL of deionized Milli-Q® water and centrifuged once at 3000 rpm to 3500 rpm for 30 to 60 minutes. After removing the supernatant (having a conductivity of 180 µS/cm), the remaining wet solid was re-suspended in 50 to 100 mL of 1-butanol and rotary evaporated at 45° C. The resulting solid was then ground with a pestle and mortar to afford 2 g of a grey powder, then transferred to a porcelain crucible and calcined for 6 hours at 300° C. to afford a grey-black powder.

Example 28. Preparation and Additional Washing of Aluminum Chlorhydrate (ACH)-Clay Heteroadduct Using Powdered ACH Reagent as Compared to Example 29 (1.52 Mmol Al/g Clay)

With stirring, 30 g of HPM-20 clay was added slowly over the course of 1 to 2 minutes into a Waring® blender containing 570 g of deionized Milli-Q® water while stirring at low speed to afford a grey colloidal dispersion containing no, or substantially no visible lumps or clumps. After the addition was complete, the dispersion was blended at high speed for 5 to 10 minutes to obtain a slightly viscous mixture of 5 wt. % aqueous dispersion of HPM-20 clay.

A 100 g portion of this 5 wt. % aqueous dispersion of HPM-20 clay was transferred into a Waring® blender. To a separate vial was charged 0.812 g of ALOXICOLL® 51P powder and 20 mL of deionized Milli-Q® water. This mixture was poured all at once into the stirred dispersion. 20-40 mL of deionized Milli-Q® water was added in order to facilitate stirring. The mixture was then blended at high speed for 5 minutes, then vacuum filtered through Fisher P8 Qualitative-Grade Filter Paper (coarse porosity). After allowing 15 to 30 minutes for the filtration, the filtrate pH and conductivity were measured (Eutech PCSTestr 35). The remaining wet solid was re-suspended in 50 to 100 mL of deionized Milli-Q® water.

The filtration process (suspension of wet solid in deionized Milli-Q® water, vacuum filtration, filtrate pH/conductivity measurement) was repeated until the conductivity of the supernatant reached 100 to 300 µS/cm. In this case, two filtrations were performed to yield a filtrate with pH of 6.3 and a conductivity of 169 µS/cm. The remaining wet solid was re-suspended in 150 to 200 mL of 1-butanol and rotary evaporated at 45° C. The solid was then ground with a pestle and mortar to obtain 3.44 g of a light grey powder. A 1.5 g portion of this solid was transferred to a clay crucible and calcined for 6 hours at 300° C. to afford 1.0 g of a grey-black powder.

Example 29. Preparation and Single Filtration of Aluminum Chlorhydrate (ACH)-Clay Heteroadduct Using Powdered ACH Reagent as Compared to Example 28 (1.52 Mmol Al/g Clay)

With stirring, 30 g of HPM-20 clay was added slowly over the course of 1 to 2 minutes into a Waring® blender containing 570 g of deionized Milli-Q® water while stirring at low speed to afford a grey colloidal dispersion containing no, or substantially no visible lumps or clumps. After the addition was complete, the dispersion was blended at high speed for 5 to 10 minutes to obtain a slightly viscous mixture of 5 wt. % aqueous dispersion of HPM-20 clay.

A 100 g portion of this 5 wt. % aqueous dispersion of HPM-20 clay was transferred into a Waring® blender. To a separate vial was charged 0.812 g of ALOXICOLL® 51P powder and 20 mL of deionized Milli-Q® water. This mixture was poured all at once into the stirred dispersion. 20-40 mL of deionized Milli-Q® water was added in order to facilitate stirring. The mixture was then blended at high speed for 5 minutes, then vacuum filtered through Fisherbrand™ P8 Qualitative-Grade Filter Paper. After allowing 15 to 30 minutes for the filtration, the filtrate pH and conductivity were measured (Eutech PCSTestr 35) to provide a pH of 5.8 and a conductivity of 1750 µS/cm. A portion of the remaining wet solid was re-suspended in 50 to 100 mL of 1-butanol and rotary evaporated at 45° C. The solid was then ground with a pestle and mortar to afford 1 g of a grey powder, which was then transferred to a porcelain crucible and calcined for 6 hours at 300° C. to afford 0.6 g of a grey-black powder.

Example 30. Preparation of Aluminum Chlorhydrate (ACH)-Clay Heteroadduct Using Powdered ACH Reagent (1.76 Mmol Al/g Clay)

With stirring, 30 g of HPM-20 clay was added slowly over the course of 1 to 2 minutes into a Waring® blender containing 570 g of deionized Milli-Q® water while stirring at low speed to afford a grey colloidal dispersion containing no, or substantially no visible lumps or clumps. After the addition was complete, the dispersion was blended at high speed for 5 to 10 minutes to obtain a slightly viscous mixture of 5 wt. % aqueous dispersion of HPM-20 clay.

A 100 g portion of this 5 wt. % aqueous dispersion of HPM-20 clay was transferred into a Waring® blender. To a separate vial was charged 0.940 g of ALOXICOLL® 51P powder and 20 mL of deionized Milli-Q® water. This mixture was poured all at once into the stirred dispersion. 20 to 40 mL of deionized Milli-Q® water was added in order to facilitate stirring. The mixture was then blended at high speed for 5 minutes, then vacuum filtered through Fisherbrand™ P8 Qualitative-Grade Filter Paper and washed with 100 mL of deionized Milli-Q® water. After allowing 15 to 30 minutes for the filtration, the filtrate pH and conductivity were measured (Eutech PCSTestr 35) to provide a pH of 6.1 and a conductivity of 1799 µS/cm. A portion of the remaining wet solid was re-suspended in 50 to 100 mL of 1-butanol and rotary evaporated at 45° C. The solid was then ground with a pestle and mortar to afford 1.07 g of a grey powder, which was then transferred to a porcelain crucible and calcined for 6 hours at 300° C. to afford 0.9 g of a grey-black powder.

Example 31. Preparation of Aluminum Sesquichlorohydrate-Clay Heteroadduct (1.52 Mmol Al/g Clay)

With stirring, 30 g of HPM-20 clay was added slowly over the course of 1 to 2 minutes into a Waring® blender containing 570 g of deionized Milli-Q® water while stirring at low speed to afford a grey colloidal dispersion containing no, or substantially no visible lumps or clumps. After the addition was complete, the dispersion was blended at high speed for 5 to 10 minutes to obtain a slightly viscous mixture of 5 wt. % aqueous dispersion of HPM-20 clay.

A 100 g portion of this 5 wt. % aqueous dispersion of HPM-20 clay was transferred into a Waring® blender. A 1.30 g sample of ALOXICOLL® 31L solution was weighed into a vial and added to the dispersion, along with enough deionized Milli-Q® water to facilitate stirring. The mixture was then blended at high speed for 5 minutes, and the conductivity was measured (Eutech PCSTestr 35) to provide a conductivity of 2600 µS/cm. The mixture was then vacuum filtered through Fisherbrand™ P8 Qualitative-Grade Filter Paper and washed briefly with 100 mL of deionized Milli-Q® water. After allowing 15 to 30 minutes for the filtration, a portion of the remaining wet solid was re-suspended in 50 to 100 mL water and the conductivity was once again measured, with typical conductivities ranging between 100 µS/cm and 500 µS/cm (in this case the conductivity was 70 µS/cm). The suspension was then combined with 100 to 200 mL of 1-butanol and rotary evaporated at 45° C. The solid was then ground with a pestle and mortar to afford 6.2 g of a grey powder, and 1.8 g of this solid was then transferred to a porcelain crucible and calcined for 6 hours at 300° C. to afford 0.9 g of a grey-black powder.

Example 32. Comparative Example of the Preparation of Aluminum Sesquichlorohydrate-Clay Heteroadduct (2.5 Mmol Al/g Clay)

With stirring, 30 g of HPM-20 clay was added slowly over the course of 1 to 2 minutes into a Waring® blender containing 570 g of deionized Milli-Q® water while stirring at low speed to afford a grey colloidal dispersion containing no, or substantially no visible lumps or clumps. After the addition was complete, the dispersion was blended at high speed for 5 to 10 minutes to obtain a slightly viscous mixture of 5 wt. % aqueous dispersion of HPM-20 clay.

A 100 g portion of this 5 wt. % aqueous dispersion of HPM-20 clay was transferred into a Waring® blender. A 2.79 g sample of ALOXICOLL® 31L solution was weighed into a vial and added to the dispersion, along with enough deionized Milli-Q® water to facilitate stirring. The mixture was then blended at high speed for 5 minutes, and the conductivity was measured (Eutech PCSTestr 35) to provide a conductivity of 2800 µS/cm. The mixture was then vacuum filtered through Fisherbrand™ P8 Qualitative-Grade Filter Paper and washed briefly with 100 mL of deionized Milli-Q® water. After allowing 15 to 30 minutes for the filtration, a portion of the remaining wet solid was re-suspended in 50 to 100 mL or water and the conductivity was once again measured (320 µS/cm), with typical conductivities ranging between 100 and 500 µS/cm. This suspension was then combined with 100 to 200 mL of 1-butanol and rotary evaporated at 45° C. The solid was then ground with a pestle and mortar to afford 5.57 g of a grey powder, and 1.7 g of this solid was then transferred to a porcelain crucible and calcined for 6 hours at 300° C. to afford 1 g of a grey-black powder.

Example 33. Comparative Example of the Preparation of Polyaluminum Chloride (PAC)-Clay Heteroadduct (0.5 Mmol Al/g Clay)

A 177.28 gram sample of a 5.0 wt. % Volclay® HPM-20 suspension prepared according to the procedure in Example 4 was charged to a Waring® Blender. With stirring, 1.32 g of UltraPAC® 290 solution (GEO) was added to the HPM-20 clay slurry, after which it was stirred on high for 9 minutes. The grey heteroadduct viscous mass was then transferred into a HDPE poly bottle along with 210 grams deionized water in 2 portions. The grey heteroadduct slurry was then shaken by hand for approximately 1 minute, affording a pH of 4.31 and a conductivity of 1672 µS/cm. Filtration of the slurry through Fisherbrand™ P8 coarse filter paper afforded 28.03 g of wet cake, which was transferred to a HDPE bottle, to which 308 g of deionized water was also charged. The bottle was shaken to afford no lumps in the slurry and a pH of 4.76 and conductivity of 200 µS/cm. The slurry was filtered through Fisherbrand™ P8 filter paper to give 22.30 g of wet cake, which was transferred to a stir-bar-equipped Erlenmeyer along with 200 mL of n-butanol and stirred until no clumps were visible. The stir bar was removed and the mixture rotary evaporated from a 45° C. bath to afford 9.49 g of an off-white powder which was lightly ground to a fine powder using a mortar and pestle. 1.10 grams of off-white powder was charged to porcelain crucible and then a 300° C. oven and calcined for 6 hours to yield 0.8960 grams of dark grey powder. This powder was cooled to ambient temperature under vacuum before being transferred to an inert atmosphere glove box.

Example 34. Preparation of Polyaluminum Chloride (PAC)-Clay Heteroadduct (1.01 Mmol Al/g Clay)

A 201.23 gram sample of a 5.0 wt. % HPM-20 clay suspension prepared as in Example 4 was charged to a Waring® Blender. With stirring, 3.036 g of UltraPAC® 290 solution (GEO) was added to the HPM-20 slurry. The resultant thick mass could not be stirred by the Waring® Blender and was transferred to a HDPE bottle with two triturations of deionized water totaling 185 g. The bottle was shaken by hand until no clumps or lumps were visible. The resultant slurry pH was 3.8 and the conductivity was 26 mS/cm. The slurry was filtered through Fisherbrand™ Coarse filter paper no. 8 and the clear filtrate afforded a conductivity of 5.2 mS/cm. A 61 g portion of the filter cake was then transferred to the original polymer bottle and re-suspended by shaking in 328 g of deionized water until no lumps were visible. The resultant conductivity was 1116 µS/cm and the pH was 3.93. This slurry was then filtered through Fisherbrand™ P8 filter paper. The clear filtrate had a conductivity of 1200 µS/cm. A 9.95 g sample of the filter cake was transferred to an Erlenmeyer flask. The remaining filter cake was re-suspended in a new HDPE bottle in 281 g of deionized water, with shaking, to provide a slurry having a pH of 4.11 and conductivity of 150 µS/cm. After sitting overnight, the slurry was filtered through Fisherbrand™ P8 paper and 18.25 g of filter cake transferred to an Erlenmeyer flask along with 100 mL of n-butanol. The flask was shaken to break up chunks and then rotary evaporated from a 40° C. bath, to afford 9.08 g of an off-white powder. A 2.384 g sample of the off-white powder was charged to a porcelain crucible and placed in a 300° C. oven for 6 hours, affording 1.72 g of grey powder which was placed under vacuum to cool down to ambient temperature and then placed in an inert atmosphere glove box.

Example 35. Comparative Example of the Preparation of Polyaluminum Chloride (PAC)-Clay Heteroadduct (1.46 Mmol Al/g Clay)

A 199.31 g sample of a 5.0 wt. % HPM-20 clay suspension prepared according to Example 4 was charged to a Waring® Blender. With stirring, 4.36 g of UltraPAC® 290 solution from GEO Specialty Chemicals was added to the HPM-20 clay slurry. The flask was removed from the blender and swirled until the viscous grey mass could be stirred using the blender, after which it was stirred on high for 9 minutes. The viscous mass was then poured into a HDPE polymer bottle along with 2 portions of deionized water totaling 85 grams giving a total of 275 g of grey heteroadduct slurry, which was then shaken by hand for approximately 1 minute, affording a slurry pH of 3.73 and a conductivity of 6.79 mS/cm. Filtration of the slurry through Fisherbrand™ P8 coarse filter paper, followed by re-suspension of the filter cake in approximately 200 mL of deionized water afforded a slurry conductivity of 1 mS/cm. This slurry was filtered and a 34 g portion of the filter cake was transfer to a stir-bar equipped 500 mL Erlenmeyer along with 200 mL of n-butanol. The mixture was stirred overnight to break up the solid chunks. The stir bar removed was then removed and the mixture rotary evaporated from a 45° C. bath to afford 10.78 g of an off-white powder, which was lightly ground to a fine powder using a mortar and pestle. A 1.07 gram portion of the off-white powder was charged to a porcelain crucible and then calcined at 300° C. for 6 hours to yield 0.8800 grams of dark grey powder. The powder was cooled to ambient temperature under vacuum before being transferred to an inert atmosphere glove box.

Example 36. Preparation of Nano-Alumina Clay-Heteroadduct (0.49 g Alumina/g Clay, 4.8 Mmol Al/g Clay)

With stirring, 30 g of HPM-20 clay was added slowly over the course of 1 to 2 minutes into a Waring® blender containing 570 g of deionized Milli-Q® water while stirring at low speed to afford a grey colloidal dispersion containing no, or substantially no visible lumps or clumps. After the addition was complete, the dispersion was blended at high speed for 5 to 10 minutes to obtain a slightly viscous mixture of 5 wt. % aqueous dispersion of HPM-20 clay.

A 80 g sample of 5 wt. % colloidal suspension of HPM-20 clay was added to a graduated addition funnel. A 9.7 g portion of NYACOL® AL-27 dispersion (20% $Al_2O_3$) was added to a separate addition funnel, and this suspension was diluted to the 80 mL volume level. The solutions were simultaneously added into a Waring® blender containing 137 g of Milli-Q® water at low blend speed. The resulting mixture was then blended at high speed for approximately 5 minutes, and subsequently vacuum filtered through Fisher P8 Qualitative-Grade Filter Paper. After allowing 15 to 30 minutes for the filtration, the filtrate pH and conductivity were measured (Eutech PCSTestr 35) to provide a pH of 9.1 and a conductivity of 451 µS/cm). A portion of the remaining wet solid was re-suspended in 50 to 100 mL of 1-butanol and rotary evaporated at 45° C. The resulting solid was then ground with a pestle and mortar to obtain 1.79 g of a light grey powder, and 0.65 g of this powder was transferred to a porcelain crucible and calcined at 6 hours at 300° C. to afford 0.53 g of a grey powder.

Example 37. Zeta Potential Titration of Fumed Silica with Aluminum Chlorhydrate

This and subsequent examples demonstrate that "stand-alone" cationic polymetallates such as ACH can be combined with fumed silica to generate a new cationic colloidal polymetallate system which can function as a heterocoagulation reagent, such that when contacting a colloidal clay, a heterocoagulated clay can form.

A 15 g sample of AEROSIL® 200 fumed silica is combined with 277 g of deionized Milli-Q® water in a beaker. The mixture is dispersed using an ULTRA-TURRAX® dispersing tool at 5400 rpm for 10 minutes and further dispersed at 7000 rpm for an additional 5 minutes to create a 5 wt. % (by silica) dispersion. A 270 g portion of this dispersion is transferred to the measurement vessel of a Colloidal Dynamics Zetaprobe Analyzer™, containing an axial bottom stirrer. The stirring speed is set fast enough to prevent substantial settling of the dispersion but slow enough to allow the electroacoustic probe to be fully immersed in the mixture when fully lowered. Typical stirring speeds are set between 250 and 350 rpm, most often 300 rpm.

A 2.5 wt. % solution of aluminum chlorhydrate is prepared by diluting 6.16 g of aqueous ACH (50 wt. % aluminum chlorhydrate; GEO Specialty Chemicals) into 117 g of water. A volumetric zeta potential titration of this 2.5 wt. % ACH solution into the aforementioned 5 wt. % AEROSIL® 200 dispersion is then performed. Titration settings are 1 mL per titration point, with an equilibration delay of 60 seconds. The resultant data is depicted in FIG. 7 for ACH-AEROSIL® 200.

Figure 7:
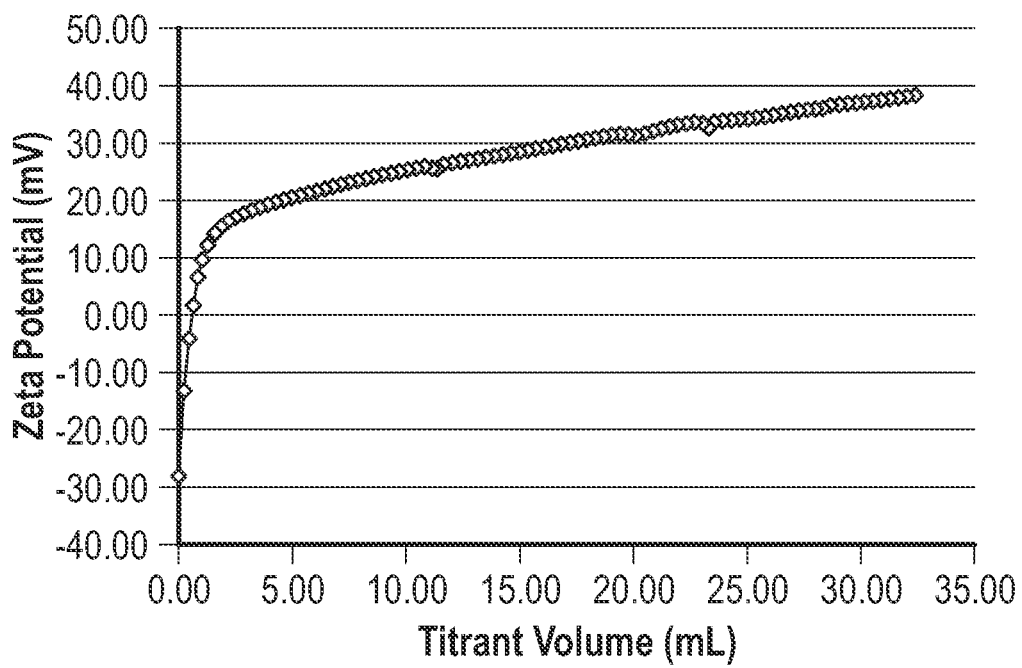
FIG. 7 illustrates a zeta potential titration for the volumetric addition of a 2.5 wt. % aqueous solution of aluminum chlorhydrate (ACH) into a 5 wt. % aqueous dispersion of AEROSIL® 200 fumed silica, plotting the measured zeta potential versus the titrant volume (mL). The titration settings were 1 mL per titration point, with an equilibration delay of 60 seconds. The titrant volume indicates the cumulative volume of the aqueous solution of ACH added. See Example 37.
Figure 8:
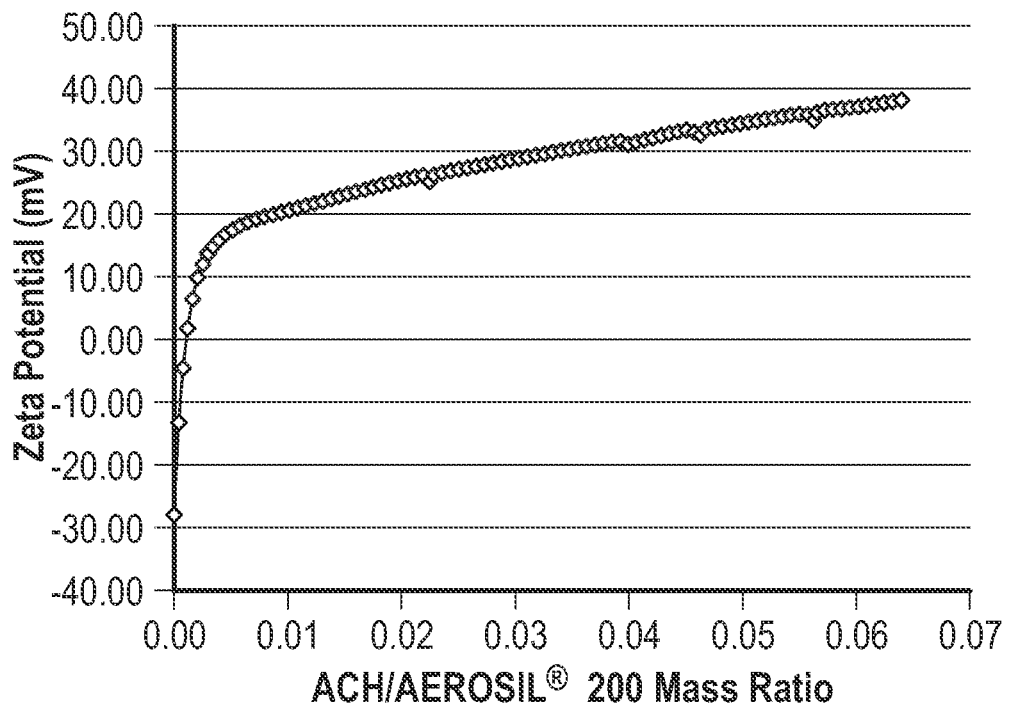
FIG. 8 shows the conversion of the FIG. 7 plot into a zeta potential versus a mass ratio of aluminum to clay. Specifically, FIG. 8 provides a zeta potential titration for the addition of a 2.5 wt. % aqueous solution of aluminum chlorohydrate (ACH) into a 5 wt. % aqueous dispersion of AEROSIL® 200 fumed silica, plotting the measured zeta potential versus the Al content (mmol Al/g clay). The titrant amount indicates the cumulative mmol of aluminum of the aqueous ACH solution added.

The zeta potential versus titrant volume data from FIG. 7 are converted into a zeta potential versus AEROSIL® 200 fumed silica mass ratio data, which is plotted in FIG. 8. From FIG. 8, an arbitrary point was selected at a ratio above 0.04 g ACH/g AEROSIL® 200, corresponding to a zeta potential of approximately +30 mV, and below the ratio of an approximate monolayer to prepare the heterocoagulation reagent. The ratio of heterocoagulation reagent to clay was then determined in the usual fashion as set out in Example 8 through Example 11, specifically, by zeta potential titration of the clay with this ACH-fumed silica heterocoagulation reagent.

Example 38. Zeta Potential Titration of Clay with ACH-Fumed Silica, and Determination of ACH-$SiO_2$/Clay Ratio A 15 g sample of AEROSIL® 200 fumed silica was combined with 277 g of deionized Milli-Q® water in a beaker. This mixture was dispersed using an ULTRA-TURRAX® dispersing tool at 6000 rpm to 7000 rpm for 10 minutes, after which 7.86 g of GEO aluminum chlorohydrate (ACH) solution was added. This mixture was then dispersed at 7000 rpm for an additional 5 minutes to create a 5 wt. % (by silica) ACH-AEROSIL® 200 fumed silica dispersion.

Separately, 30 g of HPM-20 clay was added slowly over the course of 1 to 2 minutes into a Waring® blender containing 570 g of deionized Milli-Q® water while stirring at low speed to afford a grey colloidal dispersion containing no, or substantially no visible lumps or clumps. After the addition was complete, the dispersion was stirred at high speed for 5 to 10 minutes to obtain a slightly viscous mixture of 5 wt. % aqueous dispersion of Volclay.

A 60 g sample of this 5 wt. % HPM-20 aqueous dispersion was combined with 240 g of deionized Milli-Q® water to give a 1 wt. % HPM-20 aqueous dispersion after shaking. Approximately 280 g of this colloidal dispersion was transferred to the measurement vessel of a Colloidal Dynamics Zetaprobe Analyzer™, containing an axial bottom stirrer. The stirring speed was set as described above. Per the Zetaprobe Analyzer™ manual, a zeta potential measurement was performed on this diluted HPM-20/water dispersion to determine the actual colloidal content of the clay dispersion. Measuring a 5 wt. % HPM-20 aqueous dispersion results in a zeta potential of −43 mV. The initial colloidal content estimate is adjusted to match this zeta potential. In this instance, the HPM-20 clay colloidal content of the dispersion was estimated to be 0.86%. The Colloidal Dynamic Zetaprobe Measurement parameters were the following: 5 readings, 1 reading/minute; particle density of 2.6 g/cc; dielectric constant of 4.5.

Figure 9:
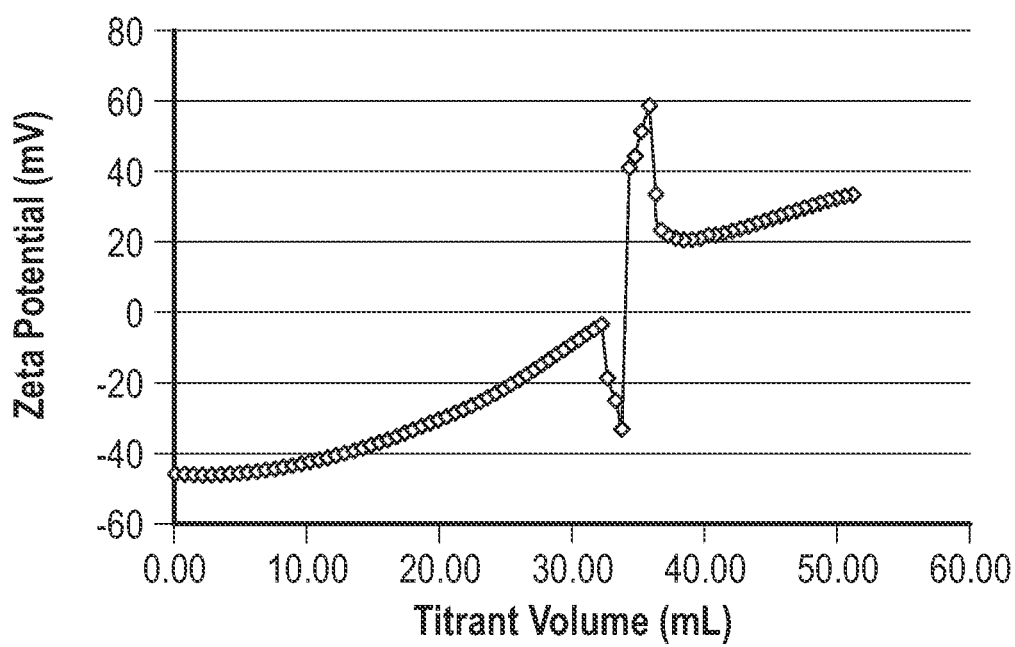
FIG. 9 provides a zeta potential titration (adjusted) for the volumetric addition of an aluminum chlorohydrate (ACH) solution-treated AEROSIL® 200 fumed silica dispersion, containing 5 wt. % by silica, into a 1 wt. % Volclay® HPM-20 bentonite aqueous dispersion. The titration settings were 0.2 mL per titration point from 0-1.2 mL and 0.5 mL per titration point onwards, with an equilibration delay of 30 seconds. The titrant is a colloidal species, therefore, the zeta potential was adjusted using the described method of Example 11 to provide the plot in FIG. 9. See Example 38.

A volumetric titration of the ACH-AEROSIL® 200 fumed silica dispersion into the clay dispersion was then performed. Titration settings were 0.2 mL per titration point from 0 to 1.2 mL and 0.5 mL per titration point onwards, with an equilibration delay of 30 seconds, thus providing the data illustrated in FIG. 9. In this example, the titrant is also a colloidal species. Thus the zeta potential was adjusted using the previously described method in Example 11 to provide the plot in FIG. 9. Thus, the amount of AEROSIL® 200 fumed silica in the ACH-AEROSIL® 200 fumed silica dispersions used to achieve −20 mV, neutral, and +20 mV zeta potential is summarized in Table 7.

TABLE 7

Results for zeta potential titration of AEROSIL ® 200 and ACH vs. HPM-20

| Zeta potential | Amount of titrant (mL) | Amount of AEROSIL ® 200 vs. Volclay ® HPM-20 (g/g) | ACH Al molar content vs. Volclay ® HPM-20 (mmol/g) |
|---|---|---|---|
| −20 mV | 25 | 0.45 | 2.07 |
| 0 mV | 33 | 0.59 | 2.72 |
| +20 mV | 40 | 0.71 | 3.31 |

Example 39. Preparation ACH-Fumed Silica/Clay Heteroadduct (3.31 Mmol Al/g Clay)

A 15 g sample of AEROSIL® 200 fumed silica was combined with 277 g of deionized Milli-Q® water in a beaker, and the mixture was dispersed using an ULTRA-TURRAX® dispersing tool at 6000-7000 rpm for 10 minutes. A 7.86 g sample of GEO aluminum chlorohydrate solution was then added, followed by dispersion at 7000 rpm for an additional 5 minutes.

With stirring, 30 g of HPM-20 clay was added slowly over the course of 1 to 2 minutes into a Waring® blender containing 570 g of deionized Milli-Q® water while stirring at low speed to afford a grey colloidal dispersion containing no, or substantially no visible lumps or clumps. After the addition was complete, the dispersion was blended at high speed for 5 to 10 minutes to obtain a slightly viscous mixture of 5 wt. % aqueous dispersion of HPM-20 clay.

A 57 mL sample of the AEROSIL® 200 dispersion was charged to a graduated addition funnel, and 80 g of the HPM-20 clay dispersion was transferred to a separate graduated additional funnel. To 135 g of deionized Milli-Q® water in a Waring® blender, the contents of the addition funnels were simultaneously added dropwise while stirring. Once addition was complete the mixture was blended on high speed for 5 to 10 minutes, then vacuum filtered through Fisherbrand™ P8 Qualitative-Grade Filter Paper. After allowing 15 to 30 minutes for the filtration, the filtrate pH and conductivity were measured (Eutech PCSTestr 35). The remaining wet solid was re-suspended in 50 to 100 mL of deionized Milli-Q® water.

The filtration process (suspension of wet solid in deionized Milli-Q® water, vacuum filtration, filtrate pH/conductivity measurement) was repeated until the conductivity of the filtrate reached 100 to 300 µS/cm. In this case, two additional filtrations were performed. The remaining wet solid was re-suspended in 150 to 200 mL of 1-butanol and rotary evaporated at 45° C. The solid was then ground with a pestle and mortar to obtain 6.60 g of a light grey powder. A 3.1 g portion of this solid was transferred to a porcelain crucible and calcined at 6 hours at 300° C. to afford 1.45 g of a grey-black powder.

Example 40. Preparation of HCl-Treated Clays (5.28 Mmol H+/g Clay)

With stirring, 30 g of HPM-20 clay was added slowly over the course of 1 to 2 minutes into a Waring® blender containing 570 g of deionized Milli-Q® water while stirring at low speed to afford a grey colloidal dispersion containing no, or substantially no visible lumps or clumps. After the addition was complete, the dispersion was blended at high speed for 5 to 10 minutes to obtain a slightly viscous mixture of 5 wt. % aqueous dispersion of HPM-20 clay.

An 80 g sample of this 5 wt. % aqueous dispersion of HPM-20 clay was transferred into a Waring® blender. A 42.2 mL aliquot of 0.5 M HCl aqueous solution was measured into a graduated cylinder and then added all at once to the clay dispersion. The mixture was then blended at high speed for 5 minutes and then vacuum filtered through Fisher P8 Qualitative-Grade Filter Paper (coarse porosity). After allowing 2 to 3 hours for the filtration, the filtrate was discarded and the remaining wet solid was re-suspended in 80 mL of deionized Milli-Q® water. The resulting suspension's pH and conductivity were measured (Eutech PCSTestr 35) to provide a pH of 2.27 and a conductivity of 1560 µS/cm.

This suspension was vacuum filtered again for 2 to 3 hours. Once again the filtrate was discarded and the remaining wet solid was re-suspended in 80 mL of deionized Milli-Q® water. The resulting suspension's pH and conductivity were measured (Eutech PCSTestr 35) to provide a pH of 3.09 and a conductivity of 217 µS/cm). The remaining wet solid was re-suspended in 150 to 200 mL of 1-butanol and rotary evaporated at 45° C. The solid was then ground with a pestle and mortar to obtain 0.58 g of light grey flakes. This solid was transferred to a clay Crucible and Calcined for 6 Hours at 300° C. to Afford 0.45 g of a Grey Powder.

Example 41. Preparation of HCl-Treated Clays (1.5 Mmol H+/g Clay)

With stirring, 30 g of HPM-20 clay was added slowly over the course of 1 to 2 minutes into a Waring® blender containing 570 g of deionized Milli-Q® water while stirring at low speed to afford a grey colloidal dispersion containing no, or substantially no visible lumps or clumps. After the addition was complete, the dispersion was blended at high speed for 5 to 10 minutes to obtain a slightly viscous mixture of 5 wt. % aqueous dispersion of HPM-20 clay.

An 80 g sample of this 5 wt. % aqueous dispersion of HPM-20 clay was transferred into a Waring® blender. A 12 mL aliquot of 0.5 M HCl aqueous solution was measured into a graduated cylinder and then added all at once to the clay dispersion, and 30 mL of deionized Milli-Q® water was added in order to facilitate stirring. This mixture was then blended at high speed for 5 minutes, then vacuum filtered through Fisher P8 Qualitative-Grade Filter Paper (coarse porosity). After allowing 2 to 3 hours for the filtration, the filtrate was discarded and the remaining wet solid was re-suspended in 80 mL of deionized Milli-Q® water. The resulting suspension's pH and conductivity were measured (Eutech PCSTestr 35) to provide a pH of 2.56 and a conductivity of 4100 µS/cm.

The suspension was vacuum filtered again for 2 to 3 hours. Once again the filtrate was discarded and the remaining wet solid was re-suspended in 80 mL of deionized Milli-Q® water. The resulting suspension's pH and conductivity were measured (Eutech PCSTestr 35) to provide a pH of 3.25 and a conductivity of 213 µS/cm. The remaining wet solid was re-suspended in 150 to 200 mL of 1-butanol and rotary evaporated at 45° C. The resulting solid was then ground with a pestle and mortar to obtain 1.73 g of light grey flakes. This solid was transferred to a clay crucible and calcined at 6 hours at 300° C. to afford 1.2 g of a grey powder.

Example 42. Slurry Settling Test for Heterocoagulated Clay (1.52 Mmol Al/g Clay)

With stirring, 40 g of HPM-20 clay was added slowly over the course of 1 to 2 minutes into a Waring® blender containing 760 g of deionized Milli-Q® water while stirring at low speed to afford a grey colloidal dispersion containing no, or substantially no visible lumps or clumps. After the addition was complete, the dispersion was blended at high speed for 5 to 10 minutes to obtain a slightly viscous mixture of 5 wt. % aqueous dispersion of HPM-20 clay.

A 100 g portion of this 5 wt. % aqueous dispersion of HPM-20 clay was transferred into a Waring® blender. Then, 1.66 g of GEO aluminum chlorohydrate 50 wt. % aqueous solution was pipetted into a vial and was added all at once to the dispersion. An additional 28 mL of deionized Milli-Q® water was added to the mixture in order to facilitate stirring. The mixture was blended at high speed for 5 minutes, and subsequently transferred to a bottle. The blender was washed with an additional 70 g of deionized Milli-Q® water, and 184 g of a slurry was obtained.

The slurry was added to a 250 mL KIMAX® graduated cylinder until it reached the 183 mL mark, and the slurry was left standing undisturbed. Over time, the slurry settled and formed a layer that was substantially clear of visible colloidal particles. The volume of this clear layer was recorded periodically, and after 95 h (hours) of settling time, the volume of the clear layer, referred to as the settling volume, was 15 mL.

Example 43. Comparative Example of a Slurry Settling Test for an ACH-Pillared Clay (5.7 Mmol Al/g Clay)

A 5 wt. % aqueous dispersion of HPM-20 clay is prepared by slowly adding 40 g of HPM-20 clay over the course of 1 to 2 minutes into a Waring® blender containing 760 g of deionized Milli-Q® water while stirring at low speed to afford a grey colloidal dispersion containing no, or substantially no visible lumps or clumps. After the addition was complete, the dispersion was blended at high speed for 5 to 10 minutes to obtain the slightly viscous 5 wt. % aqueous dispersion of HPM-20 clay.

A 100 g portion of this 5 wt. % aqueous dispersion of HPM-20 clay was transferred into a Waring® blender. A 6.18 g sample of GEO aluminum chlorohydrate 50 wt. % aqueous solution was pipetted into a vial and was added all at once to the dispersion. An additional 13.8 mL of deionized Milli-Q® water was added to the mixture, which was then blended at high speed for 5 minutes, and subsequently transferred to a bottle. The blender was washed with an additional 30 g of deionized Milli-Q® water. A 50 g portion of Milli-Q® deionized water was then added to the mixture to obtain 194 g of a slurry.

The slurry was added to a 250 mL KIMAX® graduated cylinder until it reached the 183 mL mark, and the slurry was left standing undisturbed. Over time, the slurry settled and formed a layer that was substantially clear of visible colloidal particles. The volume of this clear layer was recorded periodically, and after 95 h (hours) of settling time, the volume of the clear layer, referred to as the settling volume, was 3 mL.

Example 44. Filtrate Quantification Test for Heterocoagulated Clay (1.52 Mmol Al/g Clay)

A 5 wt. % aqueous dispersion of HPM-20 clay was prepared as described in Example 42.

A 100 g portion of this 5 wt. % aqueous dispersion of HPM-20 clay was transferred into a Waring® blender. Then, 1.66 g of GEO aluminum chlorohydrate 50 wt. % aqueous solution was pipetted into a vial and was added all at once to the dispersion. An additional 38 mL of deionized Milli-Q® water was added to the mixture in order to facilitate stirring. The mixture was blended at high speed for 5 minutes, and subsequently transferred to a bottle. A total of 110 g of deionized Milli-Q® water was then added to the mixture to obtain a slurry with total mass of 250 g.

The resulting mixture was then vacuum filtered through an 11 cm Fisher P8 Qualitative-Grade Filter Paper inside a 550 mL Buchner funnel, using a Welch 2034 DryFast™ diaphragm pump. After 10 minutes of filtration, 222 g of filtrate was obtained, with 24 g of wet cake remaining. The resulting filtrate was rotary evaporated at 55° C. to obtain 0.23 g in solid remains.

Example 45. Comparative Example of a Filtrate Quantification Test for an ACH-Pillared Clay (5.7 Mmol Al/g Clay)

A 5 wt. % aqueous dispersion of HPM-20 clay was prepared as described in Example 43. A 100 g portion of this 5 wt. % aqueous dispersion of HPM-20 clay was transferred into a Waring® blender. A 6.18 g sample of GEO aluminum chlorohydrate 50 wt. % aqueous solution was pipetted into a vial and was added all at once to the dispersion. An additional 44 g of deionized Milli-Q® water was added to the mixture, which was then blended at high speed for 5 minutes, subsequently transferred to a bottle, and 100 g of Milli-Q® deionized water was then added to the mixture to obtain a slurry with a total mass of 250 g.

The resulting mixture was then vacuum filtered through an 11 cm Fisher P8 Qualitative-Grade Filter Paper inside a 550 mL Buchner funnel, using a Welch 2034 DryFast™ diaphragm pump. After 20 minutes of filtration, 39 g of filtrate was obtained. The unfiltered mixture was allowed to settle for 96 hours, after which time vacuum filtered using the same filter paper grade and pump was applied, which yielded an additional 172 g of filtrate with 40 g of wet cake remaining. The resulting filtrate was rotary evaporated at 55° C. to obtain 1.4 g in solid remains.

Example 46. Preparation of 7-Phenyl-2-Methyl-Indene

Figure 13:
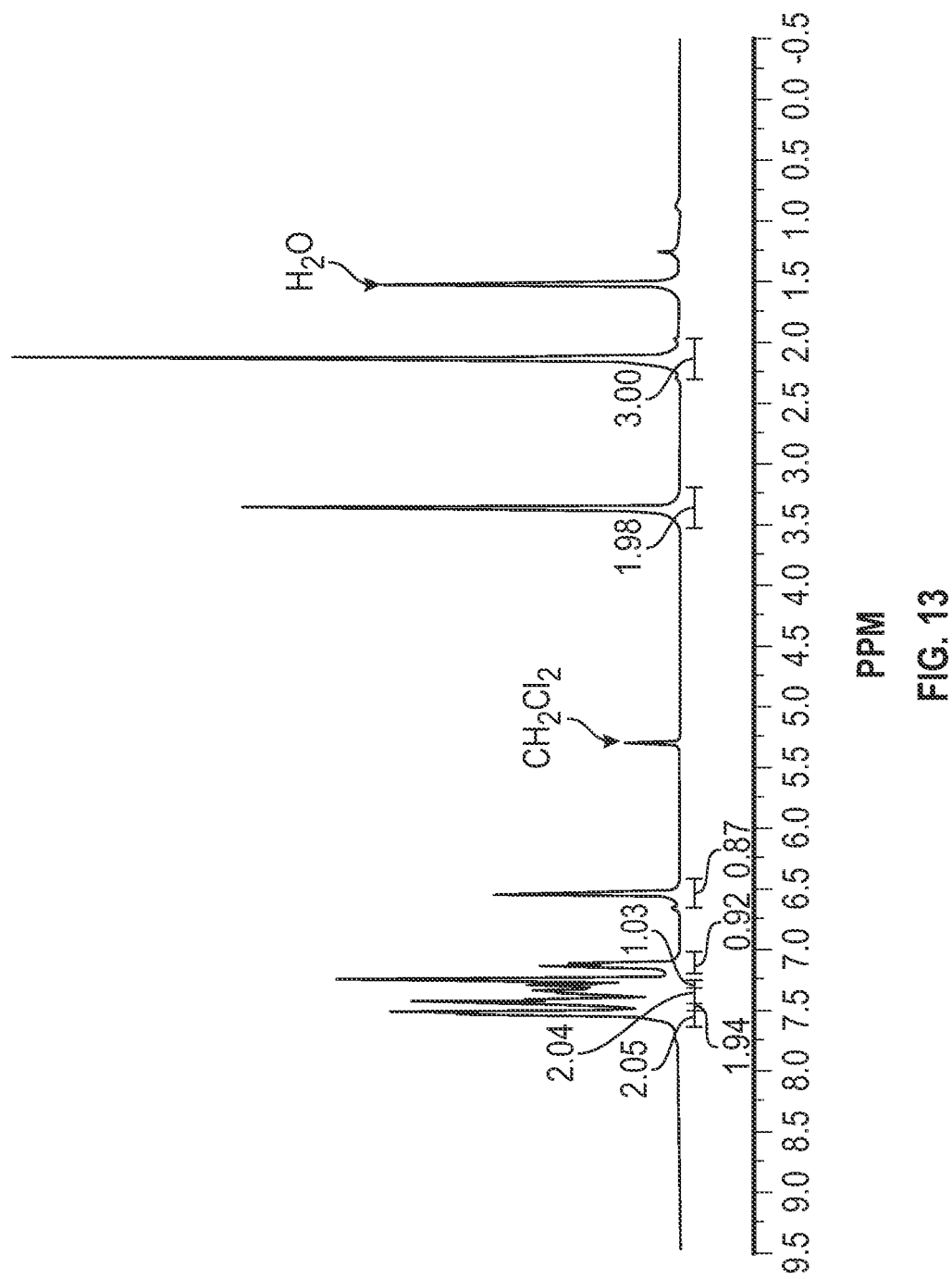
FIG. 13 is a $^1$H NMR spectrum of 7-phenyl-2-methylindene in CDCl3, with contaminant CH2Cl2 and water peaks identified, and showing the peak integration values.

Under a nitrogen atmosphere, to a solution of phenylboronic acid (3.05 g, 25.0 mmol), Pd$_2$(dba)$_3$ (229 mg, 0.25 mmo, dba is dibenzylideneacetone), and K$_3$PO$_4$ (15.9 g, 75.0 mmol) in toluene (50 mL) was added P(t-Bu)$_3$ (202 mg, 1.00 mmol) and 7-bromo-2-methyl-1H-indene (5.23 g, 25.0 mmol). This reaction mixture was stirred vigorously at 110° C. for approximately 18 hours, after which time the mixture was cooled to ambient temperature and the solution was passed through silica gel which was washed with dichloromethane. After removal of the volatiles from the filtrate via rotary evaporation, the resulting crude product of 7-phenyl-2-methyl-1H-indene was purified by column chromatography (hexane), providing a colorless oil (4.41 g, 86%). An NMR spectrum of the product in CDCl$_3$, containing a trace of dichloromethane and water, is shown in FIG. 13.

Example 47. Preparation of the Ansa-Metallocene Ligand Dimethylsilylene bis(2-methyl-4-phenylindenyl)

Under a N$_2$ atmosphere, n-BuLi (8.56 mL, 2.5 M in hexane, 21.4 mmol) was added to 60 mL of dry toluene, which was then added to a solution of 7-phenyl-2-methyl-1H-indene (4.41 g, 21.4 mmol) at room temperature with stirring. After stirring at room temperature for period of 6 h, the reaction mixture was cooled to −35° C. and a solution of dichlorodimethylsilane (1.29 mL, 10.7 mmol) in THF (5 mL) was added. This mixture was stirred and heated to 80° C. for approximately 18 hours. The resulting mixture was cooled to ambient temperature and the solution was passed through silica gel, washed with dichloromethane, and the volatiles were removed from the filtrate via rotary evaporation. The resulting crude product was purified by column chromatography (hexane to Et$_2$O ratio of 200:1 v:v), providing a yellow solid (2.65 g, 53% yield).

Example 48. Synthesis of Rac-Dimethylsilylene bis(2-methyl-4-phenylindenyl)zirconium Dichloride

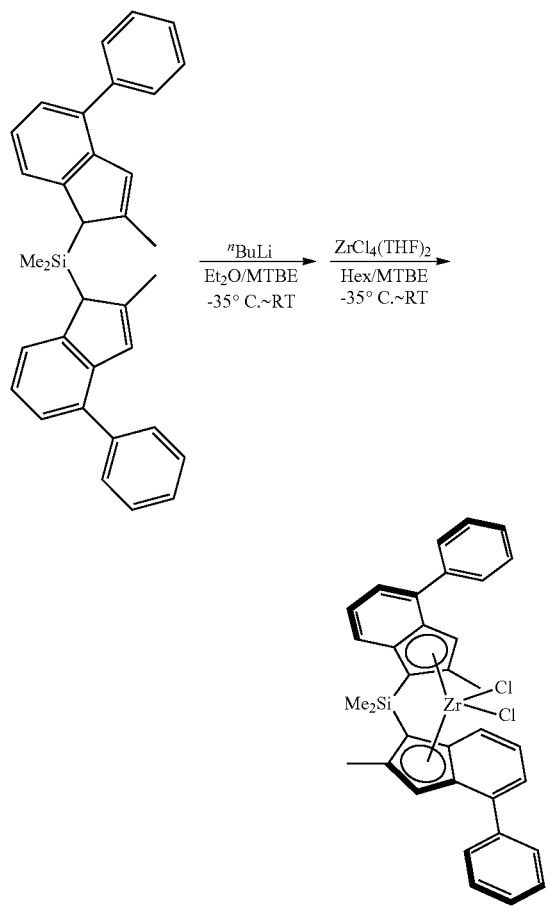

51% rac/meso
11% rac (fractional recrystallization)

Figure 14:
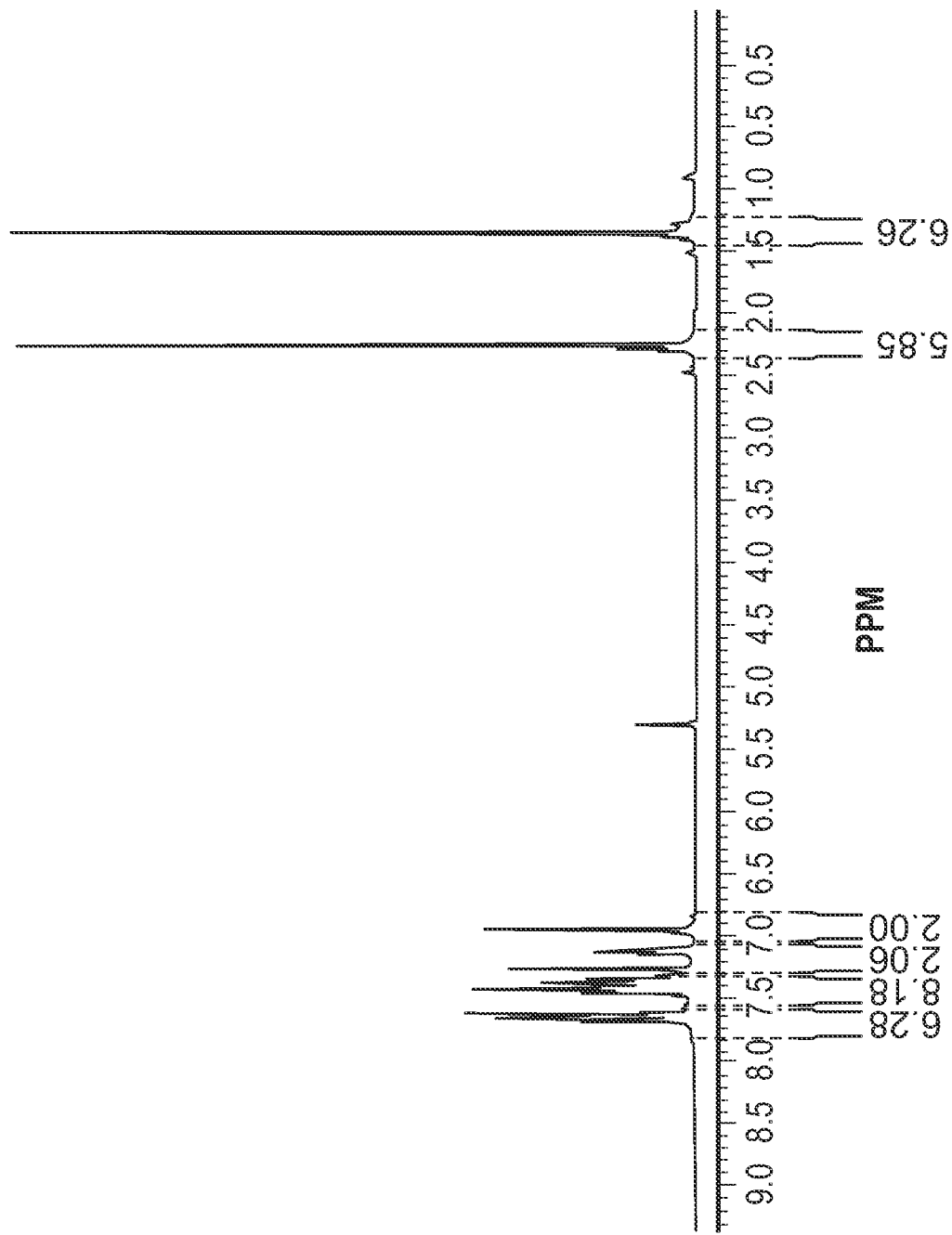
FIG. 14 is a 1H NMR spectrum of rac-dimethylsilylene bis(2-methyl-4-phenylindenyl)zirconium dichloride in CDCl$_3$, with the peak integration values shown.

A portion of the yellow solid dimethylsilylene bis(2-methyl-4-phenylindenyl) ligand from the prior example (410 mg, 0.875 mmol) was dissolved in methyl tert-butyl ether (2 mL) and diluted with diethyl ether (2 mL). The solution was cooled to −35° C., and a portion of n-BuLi (0.7 mL, 2.5 M in hexane) was added dropwise with stirring. The resulting red solution was allowed to warm to room temperature, stirred overnight, and cooled to −35° C. again. The cold ligand solution was then added to a slurry of ZrCl$_4$(THF)$_2$ (333 mg, 0.875 mmol) in hexane (10 mL), which was cooled to −35° C. in advance. The resulting orange slurry was allowed to warm to room temperature and stirred overnight, after which the volatile components were removed under vacuum, and the residual solid was extracted with dichloromethane (DCM). After passing the dichloromethane extract through a syringe filter, the solution was concentrated until orange crystals formed. Hexane was added to allow more product to precipitate. The crystalline solid was collected by filtration and dried under high vacuum (280 mg, 51% yield). The product was recrystallized in dichloromethane (DCM)/hexane (1/1, v:v) to afford 145 mg of crystals, which were recrystallized from DCM one additional time to give 60 mg of essentially isomerically pure, rac-dimethylsilylene bis(2-methyl-4-phenylindenyl) zirconium dichloride. The $^1$H NMR spectrum of the recrystallized product in CDCl$_3$, containing a trace amount of dichloromethane, is shown in FIG. 14.

Example 49. Propylene Polymerization Catalyzed by Rac-Dimethylsilylene bis(2-methyl-4-phenylindenyl)zirconium Dichloride, Calcined Clay Heteroadduct of Example 17, and Trialkylaluminum To a solution of 6.0 µmol of rac-dimethylsilylene bis(2-methyl-4-phenylindenyl)-zirconium dichloride from Example 45 in 2 mL of toluene was added 1.3 mL of tri-n-octyl aluminum (TnOA, 1.2 mmol). The resulting solution was mixed with 75 mg of the single filtration, azeotroped, and calcined aluminum chlorhydrate clay heteroadduct (1.76 mmol Al/g clay) according to Example 17. The resulting slurry was shaken for 2 minutes and maintained at room temperature for several hours before use.

Propylene polymerization was conducted in a bench scale 2-liter reactor per the following procedure. The reactor was first preheated to at least 100° C. with a nitrogen purge to remove residual moisture and oxygen, and was thereafter cooled to 50° C. Under nitrogen, 1 liter (L) of dry heptane was introduced into the reactor. When reactor temperature was about 50° C., 2.0 mL of tri-n-octylaluminum (0.92 M, in hexanes), and then catalyst slurry prepared as above were added to the reactor. The pressure of the reactor was raised to 28.5 psig at 50° C. by introducing nitrogen.

The reactor temperature was then raised to 70° C., and the total reactor pressure was raised to and controlled at 90 psig by continually introducing propylene into the reactor and the polymerization was allowed to proceed for 1 hour. After this time, the reactor was vented to reduce the pressure to 0 psig and the reactor temperature was cooled to 50° C. The reactor was opened, and 500 mL of methanol was added to the reactor contents, and the resulting mixture was stirred for 5 minutes and then filtered to obtain the polymer product. The obtained polymer was vacuum dried at 80° C. for 6 hours. The polymer was evaluated for melt flow rate (MFR) and isotacticity, and the activity of catalyst was also determined. Table 8 below summarizes the propylene polymerization results of this example.

TABLE 8

Propylene polymerization runs according Examples 46 and 47, catalyzed by rac-dimethylsilylene bis(2-methyl-4-phenylindenyl)zirconium dichloride, calcined clay heteroadduct, and trialkylaluminum

| Calcined Clay Heteroadduct (amount, mg) | T (° C.) | Polymerization Example | Polypropylene (PP) Yield (g) | Activity ($g_{PP}\, g_{cat}^{-1}\, h^{-1}$) |
|---|---|---|---|---|
| Example 17 (75 mg) | 70° C. | Example 49 | 11.7 | 156 |
| Example 16 (75 mg) | 80° C. | Example 50 | 21.6 | 288 |

Example 50. Propylene Polymerization Catalyzed by Rac-Dimethylsilylene bis(2-methyl-4-phenylindenyl)zirconium Dichloride, Calcined Clay Heteroadduct of Example 16, and Trialkylaluminum The procedure in Example 49 was repeated using the spray dried and calcined washed clay heteroadduct of Example 16, and carrying out the polymerization at a temperature 80° C. rather than 70° C. as in Example 49. Table 8 summarizes the propylene polymerization results of this example.

Example 51. Ethylene Homopolymerization Catalysis Inventive and Comparative Supports and Metallocene Catalysts Homopolymerization of ethylene was conducted at 450 total psi and 90° C. using the reaction procedure and conditions described previously. The results are provided in Table 3A.

Although the invention herein has been described with reference to particular aspects or embodiments, it is to be understood that these aspects and embodiments are merely illustrative of the principles and applications of the present invention. These and other descriptions according to the disclosure can further include the various embodiments and aspects presented below.

Additional Examples

Table 9 illustrates some actual and constructive examples of components that can be selected and used to prepare the heterocoagulated clay activator support, and additional components that can be selected and used in combination with the activator support to generate the olefin polymerization catalyst. Any one or more than one of the compounds or compositions set out in each component listing can be selected independently of any other compound or composition set our in any other component listing. For example, this table discloses that any one or more than one of Component 1, any one or more than one of Component 2, optionally any one or more than one of Component A, and optionally any one or more than one of Component B, can be selected independently of each other and combined or contacted in any order to provide the heterocoagulated clay activator support, as disclosed herein. Any one or more than one of Component 3 (metallocene), optionally any one or more than one of Component C, and optionally any one or more than one of Component D, can be selected independently of each other and combined or contacted in any order with each other and the heterocoagulated clay activator support to provide an olefin polymerization catalyst, as disclosed herein.

TABLE 9

Actual and constructive examples of components that can be selected independently and used to prepare a heterocoagulated clay activator support and an olefin polymerization catalyst.

| Component 1 Colloidal smectite clay | Component 2 Heterocoagulation reagent (cationic polymetallate) | Optional Component A Metal oxide | Optional Component B Surfactant |
|---|---|---|---|
| Montmorillonite Sauconite Nontronite Hectorite Beidellite Saponite Bentonite Combinations thereof | Aluminum chlorohydrate Aluminum sesquichlorohydrate Polyaluminum chloride Combinations thereof | Fumed silica Fumed alumina Fumed silica-alumina Metal oxide sols (silica, alumina, silica-alumina) Combinations thereof | Anionic surfactants (sulfates, phosphates) Cationic surfactants (alkyl ammonium compounds) Nonionic surfactants (polyglycol ethers, ethoxylates) Combinations thereof |

Component 1 + Component 2 + Optionally, Component A + Optionally, Component B
↓
Heterocoagulated Activator Support

| Heterocoagulated Activator Support | Component 3 Metallocene | Optional Component C Co-Catalyst | Optional Component D Co-Activator |
|---|---|---|---|
| From above | 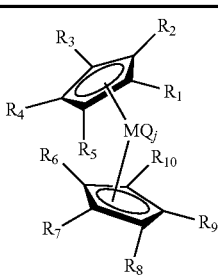 | Alkylaluminum compounds (TEA, TnOA, TiBA) Organozinc / organomagnesium compounds | Aluminoxanes (MAO, EAO) Alkylammonium tetrafluoroborates Solid oxides |

TABLE 9-continued

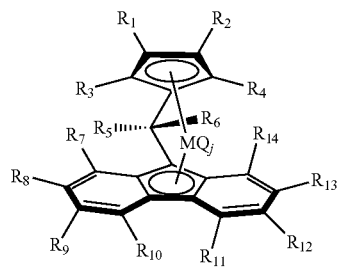

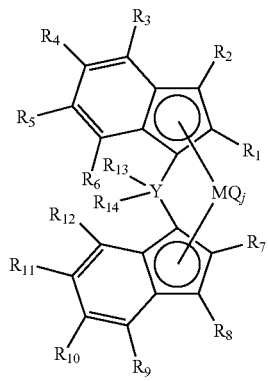

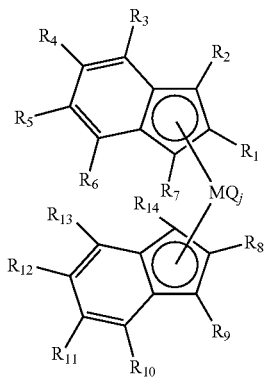

(and rac isomers)
R = H, hydrocarbyl group, Si-
  containing hydrocarbyl;
Y = carbon or silicon;
M = group 4 metal;
Q = halogen, hydrocarbyl, Si-
  containing hydrocarbyl
  with no β-hydrogens;
J = integer from 1 to 4,
  inclusive
Combinations thereof Organolithium compounds
Alkylboron compounds
Hydriding agents (LiAlH$_4$, NaBH$_4$)
Combinations thereof Organoborons (alkylborons, fluoroborate salts)
Fluorided/chloride/ sulfated aluminas
Fluorided/sulfated/chlorided silica-aluminas
Combinations thereof Heterocoagulated Activator Support + Component 3 + Optionally, Component C + Optionally, Component D
↓
Olefin Polymerization Catalyst In Table 9, certain abbreviations are used which will be understood by the person of ordinary skill, such as TEA (triethylaluminum), TnOA (tri-n-octylaluminum), TiBA (tri-isobutylaluminum), MAO (methylaluminoxane), EAO (ethylaluminoxane), and the like. Unless otherwise specified, groups such as "hydrocarbyl" or "Si-containing hydrocarbyl" groups may be considered to have from 1 to about 12 carbons, such as for example, methyl, n-propyl, phenyl, trimethylsilylmethyl, neopentyl, and the like. In Table 9, each group or substituent is selected independently of any other group of substituent. Therefore, each "R" substituent is selected independently of any other R substituent, each "Q" group is selected independently of any other Q group, and the like.

Also with respect to Table 9, the co-catalyst component is referred to as optional (Optional Component C), and includes alkylating agents, hydriding agents and the like. A co-catalyst component such as those listed is typically used in the formation of the polymerization catalyst because the metallocene is commonly halide-substituted and the co-catalyst can provide a polymerization-activatable/initiating ligand such as methyl or hydride.

Aspects of the Disclosure

Aspect 1. A catalyst composition for olefin polymerization, the catalyst composition comprising:
a) at least one metallocene compound;
b) optionally, at least one co-catalyst; and
c) at least one support-activator comprising a calcined smectite heteroadduct, the smectite heteroadduct comprising the contact product of [1] a colloidal smectite clay and [2] a heterocoagulation reagent comprising at least one cationic polymetallate in a liquid carrier and in an amount sufficient to provide a slurry of the smectite heteroadduct having a zeta potential in a range of from about positive 25 mV (millivolts) to about negative 25 mV.

Aspect 2. A process for polymerizing olefins comprising contacting at least one olefin monomer and a catalyst composition under polymerization conditions to form a polyolefin, wherein the catalyst composition comprises:
a) at least one metallocene compound;
b) optionally, at least one co-catalyst; and
c) at least one support-activator comprising a calcined smectite heteroadduct, the smectite heteroadduct comprising the contact product of [1] a colloidal smectite clay and [2] a heterocoagulation reagent comprising at least one cationic polymetallate in a liquid carrier and in an amount sufficient to provide a slurry of the smectite heteroadduct having a zeta potential in a range of from about positive 25 mV (millivolts) to about negative 25 mV.

Aspect 3. A method of making an olefin polymerization catalyst, the method comprising contacting in any order:
a) at least one metallocene compound;
b) optionally, at least one co-catalyst; and
c) at least one support-activator comprising a calcined smectite heteroadduct, the smectite heteroadduct comprising the contact product of [1] a colloidal smectite clay and [2] a heterocoagulation reagent comprising at least one cationic polymetallate in a liquid carrier and in an amount sufficient to provide a slurry of the smectite heteroadduct having a zeta potential in a range of from about positive 25 mV (millivolts) to about negative 25 mV.

Aspect 4. A support-activator comprising an isolated smectite heteroadduct, the smectite heteroadduct comprising the contact product in a liquid carrier of [1] a colloidal smectite clay and [2] a heterocoagulation reagent comprising at least one cationic polymetallate and in an amount sufficient to provide a slurry of the smectite heteroadduct having a zeta potential in a range of from about positive 25 mV (millivolts) to about negative 25 mV.

Aspect 5. A method of making a support-activator, the method comprising:
a) providing a colloidal smectite clay;
b) contacting in a liquid carrier the colloidal smectite clay with a heterocoagulation reagent comprising at least one cationic polymetallate and in an amount sufficient to provide a slurry of a smectite heteroadduct having a zeta potential in a range of from about positive 25 mV (millivolts) to about negative 25 mV; and
c) isolating the smectite heteroadduct from the slurry.

Aspect 6. A catalyst composition, a process for polymerizing olefins, a method of making an olefin polymerization catalyst, a support-activator, or a method of making a support-activator according to any one of Aspects 1-5, wherein the liquid carrier comprises, consists of, consists essentially of, or is selected from:
water; an alcohol such as methanol, ethanol, n-propanol, isopropanol, or n-butanol; an ether such as diethyl ether or di-n-butyl ether; a ketone such as acetone; an ester such as methyl acetate or ethyl acetate; or any combination thereof; and
optionally further includes a surfactant which comprises, consists of, consists essentially of, or is selected from:
an anionic surfactant such as a sulfate, a sulfonate, a phosphate, carboxylate, or other anionic surfactants, examples of which include but are not limited to dialkyl sulfocarboxylic acid esters, alkyl aryl sulfonic acid salts, alkyl sulfonic acid salts, sulfosuccinic acid esters, fatty acid alkali salts, polycarboxylic acid salts, polyoxyethylene alkyl ether phosphoric acid ester salts, alkylnaphthalene sulfonic acid salts, wherein the salts can be selected form salts of an alkali metal such as lithium, sodium or potassium, an alkaline earth metal such as calcium or magnesium, or ammonium or hydrocarbylammonium;
a cationic surfactant such as a primary, secondary, or tertiary amine or ammonium compound or a quaternary ammonium compound, and the like, examples of which include but are not limited to tetrabutylammonium bromide, dioctadecyldimethylammonium chloride, hexadecyltrimethylammonium chloride, octadecylammonium chloride, trimethylstearylammonium chloride, or cetyltrimethylammonium bromide;
a non-ionic surfactant such as ethoxylates, glycol ethers, fatty alcohol polyglycol ethers, combinations thereof, or other non-ionic surfactants, examples of which include but are not limited to octylphenol ethoxylate, polyethylene glycol tert-octylphenyl ether, ethylenediamine tetrakis(ethoxylate-block-propoxylate) tetrol, or ethylenediamine tetrakis(propoxylate-block-ethoxylate) tetrol; or
an amphoteric surfactant comprising an anionic surfactant moiety and a cationic surfactant in the same molecule.

Aspect 7. A support-activator or a method of making a support-activator according to any one of Aspects 4-5, wherein the isolated smectite heteroadduct is [1] washed with water, [2] heated, dried, and/or calcined, or [3] washed with water and heated, dried, and/or calcined.

Aspect 8. A support-activator or a method of making a support-activator according to any one of Aspects 4-5, wherein the smectite heteroadduct is:
a) isolated from the slurry by filtration or by an azeotroping process; and/or
b) isolated from the slurry without the use of ultrafiltration, centrifugation, or settling tanks.

Aspect 9. A support-activator or a method of making a support-activator according to any one of Aspects 4-5, wherein the smectite heteroadduct is isolated from the slurry by ultrafiltration, centrifugation, or settling tanks.

Aspect 10. A support-activator or a method of making a support-activator according to any one of Aspects 4-5 or 7-9, wherein the isolated smectite heteroadduct is further dried or calcined by heating in air, in an inert atmosphere, or under vacuum.

Aspect 11. A support-activator or a method of making a support-activator according to Aspect 10, wherein the heating is carried out to a temperature of at least about 100° C.

Aspect 12. A catalyst composition, a process for polymerizing olefins, a method of making an olefin polymerization catalyst, a support-activator, or a method of making a support-activator according to any one of Aspects 1-11, wherein the smectite clay is [1] natural or synthetic, and/or [2] a dioctahedral smectite clay.

Aspect 13. A catalyst composition, a process for polymerizing olefins, a method of making an olefin polymerization catalyst, a support-activator, or a method of making a support-activator according to any one of Aspects 1-12, wherein:
a) the smectite clay is colloidal; and/or
b) the smectite clay has an average particle size of less than about 10 m (microns), less than about 5 m, less than about 3 m, less than 2 m, or less than 1 m, wherein the average particle size is greater than about 15 nm, greater than about 25 nm, greater than about 50 nm, or greater than about 75 nm.

Aspect 14. A catalyst composition, a process for polymerizing olefins, a method of making an olefin polymerization catalyst, a support-activator, or a method of making a support-activator according to any one of Aspects 1-13, wherein the smectite clay comprises, consists of, consists essentially of, or is selected from montmorillonite, sauconite, nontronite, hectorite, beidellite, saponite, bentonite, or any combination thereof.

Aspect 15. A catalyst composition, a process for polymerizing olefins, a method of making an olefin polymerization catalyst, a support-activator, or a method of making a support-activator according to any one of the previous aspects such as Aspects 1-13, wherein the smectite clay comprises structural units characterized by the following formula:

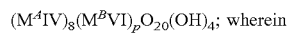

$(M^A IV)_8 (M^B VI)_p O_{20}(OH)_4$; wherein a) $M^A IV$ is a four-coordinate $Si^{4+}$, wherein the $Si^{4+}$ is optionally partially substituted by a four-coordinate cation that is not $Si^{4+}$;
b) $M^B VI$ is a six-coordinate $Al^{3+}$ or $Mg^{2+}$, wherein the $Al^{3+}$ or $Mg^{2+}$ is optionally partially substituted by a six-coordinate cation that is not $Al^{3+}$ or $Mg^{2+}$;
c) p is four for cations with a +3 formal charge, or p is 6 for cations with a +2 formal charge; and
d) any charge deficiency that is created by the partial substitution of a cation that is not $Si^{4+}$ at $M^A IV$ and/or any charge deficiency that is created by the partial substitution of a cation that is not $Al^{3+}$ or $Mg^{2+}$ at $M^B VI$ is balanced by cations intercalated between structural units.

Aspect 16. A catalyst composition, a process for polymerizing olefins, a method of making an olefin polymerization catalyst, a support-activator, or a method of making a support-activator according to Aspect 15, wherein:
a) in each occurrence, the cation that is not $Si^{4+}$ is independently selected from $Al^{3+}$, $Fe^{3+}$, $P^{5+}$, $B^{3+}$, $Ge^{4+}$, $Be^{2+}$, $Sn^{4+}$, and the like;
b) in each occurrence, the cation that is not $Al^{3+}$ or $Mg^{2+}$ is independently selected from $Fe^{3+}$, $Fe^{2+}$, $Ni^{2+}$, $Co^{2+}$, $Li^+$, $Zn^{2+}$, $Mn^{2+}$, $Ca^{2+}$, $Be^{2+}$, and the like; and/or
c) the cations intercalated between structural units are selected from monocations, dications, trications, other multications, or any combination thereof.

Aspect 17. A catalyst composition, a process for polymerizing olefins, a method of making an olefin polymerization catalyst, a support-activator, or a method of making a support-activator according to Aspect 15, wherein:
a) in each occurrence, the cation that is not $Si^{4+}$ is independently selected from $Al^{3+}$ or $Fe^{3+}$; and
b) in each occurrence, the cation that is not $Al^{3+}$ or $Mg^{2+}$ is independently selected from $Fe^{3+}$, $Fe^{2+}$, $Ni^{2+}$, or $Co^{2+}$.
c) the cations intercalated between structural units are selected from monocations.

Aspect 18. A catalyst composition, a process for polymerizing olefins, a method of making an olefin polymerization catalyst, a support-activator, or a method of making a support-activator according to any one of Aspects 1-17, wherein the smectite clay is monocation exchanged with at least one of lithium, sodium, or potassium.

Aspect 19. A catalyst composition, a process for polymerizing olefins, a method of making an olefin polymerization catalyst, a support-activator, or a method of making a support-activator according to any one of Aspects 1-18, wherein the cationic polymetallate comprises, consists of, consists essentially of, or is selected from a cationic oligomeric or cationic polymeric aluminum species.

Aspect 20. A catalyst composition, a process for polymerizing olefins, a method of making an olefin polymerization catalyst, a support-activator, or a method of making a support-activator according to any one of Aspects 1-18, wherein the cationic polymetallate comprises, consists of, consists essentially of, or is selected from polyaluminum chloride, aluminum chlorhydrate, aluminum sesquichlorohydrate, or polyaluminum oxyhydroxychloride.

Aspect 21. A catalyst composition, a process for polymerizing olefins, a method of making an olefin polymerization catalyst, a support-activator, or a method of making a support-activator according to Aspect 20, wherein the ratio of millimoles (mmol) of aluminum (Al) in the polyaluminum chloride, aluminum chlorhydrate, aluminum sesquichlorohydrate, or polyaluminum oxyhydroxychloride to grams (g) of colloidal smectite clay is in a range of from about 0.2 mmol Al/g clay to about 2.5 mmol Al/g clay, from about 0.5 mmol Al/g clay to about 2.2 mmol Al/g clay, from about 0.75 mmol Al/g clay to about 2.0 mmol Al/g clay, or from about 1.0 mmol Al/g clay to about 1.8 mmol Al/g clay.

Aspect 22. A catalyst composition, a process for polymerizing olefins, a method of making an olefin polymerization catalyst, a support-activator, or a method of making a support-activator according to Aspect 20, wherein the ratio of millimoles (mmol) of aluminum (Al) in the polyaluminum chloride, aluminum chlorhydrate, aluminum sesquichlorohydrate, or polyaluminum oxyhydroxychloride to grams (g) of colloidal smectite clay isolated or calcined smectite heteroadduct is about 70% or less, about 60% or less, about 50% or less, about 45% or less, about 40% or less, or about 35% or less of a comparative ratio of millimoles of aluminum to grams of colloidal clay used for the preparation of a pillared clay using the same colloidal smectite clay and heterocoagulation reagent.

Aspect 23. A catalyst composition, a process for polymerizing olefins, a method of making an olefin polymerization catalyst, a support-activator, or a method of making a support-activator according to any one of Aspects 1-18, wherein the cationic polymetallate comprises linear, cyclic or cluster aluminum compounds containing from 2-30 aluminum atoms.

Aspect 24. A catalyst composition, a process for polymerizing olefins, a method of making an olefin polymerization catalyst, a support-activator, or a method of making a support-activator according to any one of Aspects 1-19, wherein the cationic polymetallate comprises, consists of, consists essentially of, or is selected from a first metal oxide which is chemically-treated with a second metal oxide, a metal halide, a metal oxyhalide, or a combination thereof in an amount sufficient to provide a colloidal suspension of the chemically-treated first metal oxide having a zeta potential of greater than positive 20 mV (millivolts).

Aspect 25. A catalyst composition, a process for polymerizing olefins, a method of making an olefin polymerization catalyst, a support-activator, or a method of making a support-activator according to Aspect 24, wherein the first metal oxide comprises, consists of, consists essentially of, or is selected from fumed silica, fumed alumina, fumed silica-alumina, fumed magnesia, fumed zinc oxide, fumed titania, fumed zirconia, fumed ceria, or any combination thereof.

Aspect 26. A catalyst composition, a process for polymerizing olefins, a method of making an olefin polymerization catalyst, a support-activator, or a method of making a support-activator according to Aspect 24, wherein:
the first metal oxide comprises $SiO_2$ or $Al_2O_3$, and wherein the second metal oxide, the metal halide, or the metal oxyhalide is obtained from an aqueous solution or suspension of a metal oxide, hydroxide, oxyhalide, or halide, such as $ZrOCl_2$, ZnO, $NbOCl_3$, $B(OH)_3$, $AlCl_3$, or a combination thereof; or
the first metal oxide comprises $SiO_2$, and wherein the second metal oxide, the metal halide, or the metal oxyhalide comprises $Al_2O_3$, ZnO, $AlCl_3$, or a combination thereof.

Aspect 27. A catalyst composition, a process for polymerizing olefins, a method of making an olefin polymerization catalyst, a support-activator, or a method of making a support-activator according to any one of Aspects 1-18, wherein the cationic polymetallate composition comprises, consists of, consists essentially of, or is selected from: fumed silica, fumed alumina, fumed silica-alumina, fumed magnesia, fumed zinc oxide, fumed titania, fumed zirconia, fumed ceria, or any combination thereof; which is chemically-treated with polyaluminum chloride, aluminum chlorhydrate, aluminum sesquichlorohydrate, polyaluminum oxyhydroxychloride, or any combination thereof.

Aspect 28. A catalyst composition, a process for polymerizing olefins, a method of making an olefin polymerization catalyst, a support-activator, or a method of making a support-activator according to any one of Aspects 1-18, wherein:
a) the colloidal smectite clay comprises colloidal montmorillonite, such as HPM-20 Volclay; and
b) the heterocoagulation reagent comprises aluminum chlorhydrate, polyaluminum chloride, or aluminum sesquichlorohydrate.

Aspect 29. A catalyst composition, a process for polymerizing olefins, a method of making an olefin polymerization catalyst, a support-activator, or a method of making a support-activator according to any one of Aspects 1-18, wherein the cationic polymetallate comprises, consists of, consists essentially of, or is selected from boehmite, fumed silica-alumina, colloidal ceria, colloidal zirconia, magnetite, ferrihydrite, any positively charged colloidal metal oxide, or any combination thereof.

Aspect 30 A catalyst composition, a process for polymerizing olefins, a method of making an olefin polymerization catalyst, a support-activator, or a method of making a support-activator according to any one of Aspects 1-18, wherein the cationic polymetallate comprises, consists of, consists essentially of, or is selected from aluminum chlorhydrate-treated fumed silica, aluminum chlorhydrate-treated fumed alumina, aluminum chlorhydrate-treated fumed silica-alumina, or any combination thereof.

Aspect 31. A catalyst composition, a process for polymerizing olefins, a method of making an olefin polymerization catalyst, a support-activator, or a method of making a support-activator according to any one of Aspects 1-18, wherein the cationic polymetallate comprises, consists of, consists essentially of, or is selected from an aluminum species or any combinations of species having the empirical formula:

$$Al_2(OH)_nCl_m(H_2O)_x,$$

wherein n+m=6, and x is a number from 0 to about 4.

Aspect 32. A catalyst composition, a process for polymerizing olefins, a method of making an olefin polymerization catalyst, a support-activator, or a method of making a support-activator according to any one of Aspects 1-18, wherein the cationic polymetallate comprises, consists of, consists essentially of, or is selected from aluminum species having the empirical formula $0.5[Al_2(OH)_5Cl(H_2O)_2]$ or $[AlO_4(Al_{12}(OH)_{24}(H_2O)_{20}]^{7+}$ ("$Al_{13}$-mer") polycation.

Aspect 33. A catalyst composition, a process for polymerizing olefins, a method of making an olefin polymerization catalyst, a support-activator, or a method of making a support-activator according to any one of Aspects 1-18, wherein the cationic polymetallate comprises, consists of, consists essentially of, or is selected from an oligomer prepared by copolymerizing soluble rare earth salts with a cationic metal complex of at least one additional metal selected from aluminum, zirconium, chromium, iron, or a combination thereof, according to U.S. Pat. No. 5,059,568.

Aspect 34. A catalyst composition, a process for polymerizing olefins, a method of making an olefin polymerization catalyst, a support-activator, or a method of making a support-activator according to Aspect 33, wherein the at least one rare earth metal is selected from cerium, lanthanum, or a combination thereof.

Aspect 35. A catalyst composition, a process for polymerizing olefins, a method of making an olefin polymerization catalyst, a support-activator, or a method of making a support-activator according to any one of Aspects 1-18, wherein the cationic polymetallate comprises, consists of, consists essentially of, or is selected from a complex of Formula I or Formula II or any combination of complexes of Formula I or Formula II, according to the following formulas:

$$[M(II)_{1-x}M(III)_x(OH)_2]A_{x/n} \cdot m \, L \qquad (I)$$

$$[LiAl_2(OH)_6]A_{1/n} \cdot m \, L \qquad (II)$$

wherein:
M(II) is at least one divalent metal ion;
M(III) is at least one trivalent metal ion;
A is at least one inorganic anion;
L is an organic solvent or water;
n is the valence of the inorganic anion A or, in the case of a plurality of anions A, is their mean valence; and
x is a number from 0.1 to 1; and
m is a number from 0 to 10.

Aspect 36. A catalyst composition, a process for polymerizing olefins, a method of making an olefin polymerization catalyst, a support-activator, or a method of making a support-activator according to Aspect 35, wherein:
M(II) comprises, consists of, consists essentially of, or is selected from zinc, calcium, strontium, barium, iron, cobalt, nickel, cadmium, manganese, copper, or magnesium;

M(III) comprises, consists of, consists essentially of, or is selected from iron, chromium, manganese, bismuth, cerium, or aluminum;

A comprises, consists of, consists essentially of, or is selected from hydrogencarbonate (bicarbonate), sulfate, nitrate, nitrite, phosphate, chloride, bromide, fluoride, hydroxide, or carbonate.

n is a number from 1 to 3; and

L comprises, consists of, consists essentially of, or is selected from methanol, ethanol or isopropanol, or water.

Aspect 37. A catalyst composition, a process for polymerizing olefins, a method of making an olefin polymerization catalyst, a support-activator, or a method of making a support-activator according to Aspect 35, wherein the cationic polymetallate is selected from a complex of Formula I, wherein M(II) is magnesium, M(III) is aluminum, and A is carbonate.

Aspect 38. A catalyst composition, a process for polymerizing olefins, a method of making an olefin polymerization catalyst, a support-activator, or a method of making a support-activator according to any one of Aspects 1-18, wherein the cationic polymetallate comprises, consists of, consists essentially of, or is selected from a layered double hydroxide or a mixed metal layered hydroxide.

Aspect 39. A catalyst composition, a process for polymerizing olefins, a method of making an olefin polymerization catalyst, a support-activator, or a method of making a support-activator according to Aspect 38, wherein the mixed metal layered hydroxide is selected from a Ni—Al, Mg—Al, or Zn—Cr—Al type having a positive layer charge.

Aspect 40. A catalyst composition, a process for polymerizing olefins, a method of making an olefin polymerization catalyst, a support-activator, or a method of making a support-activator according to Aspect 39, wherein the layered double hydroxide or mixed metal layered hydroxide comprises, consists of, consists essentially of, or is selected from magnesium aluminum hydroxide nitrate, magnesium aluminum hydroxide sulfate, magnesium aluminum hydroxide chloride, $Mg_x(Mg,Fe)_3(Si,Al)_4O_{10}(OH)_2(H_2O)_4$ (x is a number from 0 to 1, for example, about 0.33 for ferrosaponite), $(Al,Mg)_2Si_4O_{10}(OH)_2(H_2O)_8$, synthetic hematite, hydrozincite (basic zinc carbonate) $Zn_5(OH)_6(CO_3)_2$, hydrotalcite $[Mg_6Al_2(OH)_{16}]CO_3 \cdot 4H_2O$, tacovite $[Ni_6Al_2(OH)_6]CO_3 \cdot 4H_2O$, hydrocalumite $[Ca_2Al(OH)_6]OH \cdot 6H_2O$, magaldrate $[Mg_{10}Al_5(OH)_{31}](SO_4)_2 \cdot mH_2O$, pyroaurite $[Mg_6Fe_2(OH)_{16}]CO_3 \cdot 4.5H_2O$, ettringite $[Ca_6Al_2(OH)_{12}](SO_4)_3 \cdot 26H_2O$, or any combination thereof.

Aspect 41. A catalyst composition, a process for polymerizing olefins, a method of making an olefin polymerization catalyst, a support-activator, or a method of making a support-activator according to any one of Aspects 1-18, wherein the cationic polymetallate comprises, consists of, consists essentially of, or is selected from an iron polycation having an empirical formula $FeO_x(OH)_y(H_2O)_z]^{n+}$, wherein 2x+y is less than (<) 3, z is a number from 0 to about 4, and n is a number from 1 to 3.

Aspect 42. A catalyst composition, a process for polymerizing olefins, a method of making an olefin polymerization catalyst, a support-activator, or a method of making a support-activator according to any one of Aspects 1-41, wherein the slurry of the smectite heteroadduct is characterized by a conductivity in a range of from about 20,000 μS/cm to about 100 μS/cm, from about 10,000 μS/cm to about 200 μS/cm, or from about 1000 μS/cm to about 300 μS/cm, when the concentration of the slurry is greater than or equal to about 1 wt. % or greater than or equal to about 2.5 wt. % solids, or when the concentration of the slurry is in a range of from about 1 wt. % to about 10 wt. % solids, from about 2.5 wt. % to about 10 wt. % solids, or from about 5 wt. % to about 10 wt. % solids.

Aspect 43. A catalyst composition, a process for polymerizing olefins, a method of making an olefin polymerization catalyst, a support-activator, or a method of making a support-activator according to any one of Aspects 1-41, wherein the slurry of the smectite heteroadduct is characterized by a conductivity of less than 10 mS/cm, less than 5 mS/cm, or less than 1 mS/cm, or wherein the slurry of the smectite heteroadduct is characterized by a conductivity in a range of from 2 mS/cm to 10 μS/cm, from 1 mS/cm to 50 μS/cm, or from 500 S/cm to 100 μS/cm, when the concentration of the slurry is greater than or equal to about 1 wt. % or greater than or equal to about 2.5 wt. % solids, or when the concentration of the slurry is in a range of from about 1 wt. % to about 10 wt. % solids, from about 2.5 wt. % to about 10 wt. % solids, or from about 5 wt. % to about 10 wt. % solids.

Aspect 44. A catalyst composition, a process for polymerizing olefins, a method of making an olefin polymerization catalyst, a support-activator, or a method of making a support-activator according to any one of Aspects 1-43, wherein the smectite heteroadduct is calcined using any one of the following conditions:
  a) a temperature ranging from about 110° C. to about 600° C. and for a time period ranging from about 1 hour to about 10 hours;
  b) a temperature ranging from about 150° C. to about 500° C. and for a time period ranging from about 1.5 hours to about 8 hours; or
  c) a temperature ranging from about 200° C. to about 450° C. and for a time period ranging from about 2 hours to about 7 hours.

Aspect 45. A catalyst composition, a process for polymerizing olefins, a method of making an olefin polymerization catalyst, a support-activator, or a method of making a support-activator according to any one of Aspects 1-43, wherein the smectite heteroadduct is calcined in air at a temperature in a range of from 200° C. to 750° C., from 225° C. to 700° C., from 250° C. to 650° C., from 225° C. to 600° C., from 250° C. to 500° C., from 225° C. to 450° C., or from 200° C. to 400° C.

Aspect 46. A catalyst composition, a process for polymerizing olefins, a method of making an olefin polymerization catalyst, a support-activator, or a method of making a support-activator according to any one of Aspects 1-45, wherein the smectite heteroadduct is calcined in an atmosphere comprising air or carbon monoxide or in an inert atmosphere such as nitrogen.

Aspect 47. A catalyst composition, a process for polymerizing olefins, a method of making an olefin polymerization catalyst, a support-activator, or a method of making a support-activator according to any one of Aspects 1-45, wherein the smectite heteroadduct is calcined in air or carbon monoxide in a fluidized bed.

Aspect 48. A catalyst composition, a process for polymerizing olefins, a method of making an olefin polymerization catalyst, a support-activator, or a method of making a support-activator according to any one of Aspects 1-43, wherein the smectite heteroadduct is calcined in an atmosphere of air or an atmosphere that comprises carbon monoxide in a fluidized bed at a temperature in a range of from 100° C. to 900° C., from 200° C. to 800° C., from 250° C. to 600° C., or from 300° C. to 500° C.

Aspect 49. A catalyst composition, a process for polymerizing olefins, a method of making an olefin polymerization catalyst, a support-activator, or a method of making a support-activator according to any one of Aspects 1-43, wherein the calcined smectite heteroadduct is calcined at a temperature of 250° C. or higher.

Aspect 50. A catalyst composition, a process for polymerizing olefins, a method of making an olefin polymerization catalyst, a support-activator, or a method of making a support-activator according to any one of Aspects 1-43, wherein the calcined smectite heteroadduct is calcined at a temperature of 300° C. or higher.

Aspect 51. A catalyst composition, a process for polymerizing olefins, a method of making an olefin polymerization catalyst, a support-activator, or a method of making a support-activator according to any one of Aspects 1-43, wherein the calcined smectite heteroadduct is calcined at a temperature of 350° C. or higher.

Aspect 52. A catalyst composition, a process for polymerizing olefins, a method of making an olefin polymerization catalyst, a support-activator, or a method of making a support-activator according to any one of Aspects 1-51, wherein the calcined smectite heteroadduct is absent or substantially absent ordered domains characterized by a powder X-ray diffraction (XRD) peak in a range of from 0 degrees 2θ (2 theta) to 13 degrees 2θ.

Aspect 53. A catalyst composition, a process for polymerizing olefins, a method of making an olefin polymerization catalyst, a support-activator, or a method of making a support-activator according to any one of Aspects 1-51, wherein the calcined smectite heteroadduct is characterized by any of the following features:
  a) the presence or the substantial absence of a uniform intercalated structure having a d001 basal spacing of greater than or equal to about 13 Å (Angstrom) in the powder X-Ray Diffraction (XRD);
  b) the presence or the substantial absence of a uniform intercalated structure having a d001 basal spacing in a range of from about 9 Å (Angstrom) to about 13 Å (Angstrom) in the powder X-Ray Diffraction (XRD), or alternatively, in a range of from about 10 Å (Angstrom) to about 13 Å (Angstrom), in the powder X-Ray Diffraction (XRD); or
  c) the combination of a) and b).

Aspect 54. A catalyst composition, a process for polymerizing olefins, a method of making an olefin polymerization catalyst, a support-activator, or a method of making a support-activator according to any one of Aspects 1-51, wherein the sample of calcined smectite heteroadduct is characterized by a non-smectite heteroadduct intercalated structure characterized by a powder X-ray diffraction (XRD) peak in a range of from about 4 degrees 2θ (2 theta) to about 5 degrees 2θ, wherein the non-smectite heteroadduct intercalated structure is present at a concentration of less than 60 wt. %, less than 50 wt. %, less than 40 wt. %, less than 30 wt. %, less than 20 wt. %, less than 10 wt. %, or less than 5 wt. % in the sample of calcined smectite heteroadduct.

Aspect 55. A catalyst composition, a process for polymerizing olefins, a method of making an olefin polymerization catalyst, a support-activator, or a method of making a support-activator according to any one of Aspects 1-54, wherein the calcined smectite heteroadduct exhibits a BJH porosity in a range of from about 0.2 cc/g to about 3.0 cc/g, from about 0.3 cc/g to about 2.5 cc/g, or from about 0.5 cc/g to about 1.8 cc/g.

Aspect 56. A catalyst composition, a process for polymerizing olefins, a method of making an olefin polymerization catalyst, a support-activator, or a method of making a support-activator according to any one of Aspects 1-55, wherein the calcined smectite heteroadduct exhibits a combined cumulative pore volume of pores between 3-10 nm diameter ($V_{3-10\ nm}$) which is less than 55%, less than 50%, less than 45%, or less than 40% of the combined cumulative pore volume of pores between 3-30 nm ($V_{3-30\ nm}$).

Aspect 57. A catalyst composition, a process for polymerizing olefins, a method of making an olefin polymerization catalyst, a support-activator, or a method of making a support-activator according to any one of Aspects 1-56, wherein the calcined smectite heteroadduct exhibits a logarithmic differential pore volume distribution (dV (log D) vs. pore diameter) having a local maximum in a range of from 30 Å (Angstroms) to 40 Å ($D_{VM(30-40)}$).

Aspect 58. A catalyst composition, a process for polymerizing olefins, a method of making an olefin polymerization catalyst, a support-activator, or a method of making a support-activator according to any one of Aspects 1-57, wherein the calcined smectite heteroadduct is characterized by a logarithmic differential pore volume distribution (dV (log D) vs. pore diameter) having a highest value ($D_M$, representing the most frequently appearing pore diameter) in a range of from 30 Å (Angstroms) to 40 Å ($D_{VM(30-40)}$) or in a range of from 200 Å (Angstroms) to 500 Å ($D_{VM(200-500)}$).

Aspect 59. A catalyst composition, a process for polymerizing olefins, a method of making an olefin polymerization catalyst, a support-activator, or a method of making a support-activator according to Aspect 58, wherein the local maximum $D_{VM(30-40)}$ is a global maximum.

Aspect 60. A catalyst composition, a process for polymerizing olefins, a method of making an olefin polymerization catalyst, a support-activator, or a method of making a support-activator according to Aspect 58, wherein the local maximum $D_{VM(30-40)}$ is less than 210%, less than 150%, less than 120%, or less than 100% of a local maximum between 200 Å and 500 Å ($D_{VM(200-500)}$).

Aspect 61. A catalyst composition, a process for polymerizing olefins, a method of making an olefin polymerization catalyst, a support-activator, or a method of making a support-activator according to Aspect 58, wherein the logarithmic differential pore volume distribution (dV (log D) vs. pore diameter) exhibits a local maximum between 200 Å (Angstroms) and 500 Å ($D_{VM(200-500)}$) which exceeds all values of dV (log D) between 30 Å (Angstroms) and 200 Å.

Aspect 62. A catalyst composition, a process for polymerizing olefins, a method of making an olefin polymerization catalyst, a support-activator, or a method of making a support-activator according to any one of Aspects 1-61, wherein the heterocoagulation reagent comprises an aluminum concentration in a range of:
  a) from about 1 wt. % to about 60 wt. % calculated on the basis of $Al_2O_3$;
  b) from about 5 wt. % to about 50 wt. % calculated on the basis of $Al_2O_3$;
  b) from about 10 wt. % to about 45 wt. % calculated on the basis of $Al_2O_3$; or
  c) from about 15 wt. % to about 35 wt. % calculated on the basis of $Al_2O_3$.

Aspect 63. A catalyst composition, a process for polymerizing olefins, a method of making an olefin polymerization catalyst, a support-activator, or a method of making a support-activator according to any one of Aspects 1-62, wherein [1] the colloidal smectite clay and the [2] heterocoagulation reagent are contacted in an amount sufficient to provide a slurry of the smectite heteroadduct having a zeta potential in a range of:
a) from about positive (+)22 mV (millivolts) to about negative (−)22 mV;
b) from about positive (+)20 mV (millivolts) to about negative (−)20 mV;
c) from about positive (+)18 mV (millivolts) to about negative (−)18 mV;
d) from about positive (+)15 mV (millivolts) to about negative (−)15 mV;
e) from about positive (+)12 mV (millivolts) to about negative (−)12 mV;
f) from about positive (+)10 mV (millivolts) to about negative (−)10 mV;
g) from about positive (+)8 mV (millivolts) to about negative (−)8 mV; or
h) from about positive (+)5 mV (millivolts) to about negative (−)5 mV.

Aspect 64. A catalyst composition, a process for polymerizing olefins, a method of making an olefin polymerization catalyst, a support-activator, or a method of making a support-activator according to any one of Aspects 1-63, wherein [1] the colloidal smectite clay and the [2] heterocoagulation reagent are contacted at 25° C.±5° C. for a time period of less than 1 hour, less than 45 minutes, less than 30 minutes, less than 20 minutes, less than 15 minutes, or less than 10 minutes.

Aspect 65. A catalyst composition, a process for polymerizing olefins, a method of making an olefin polymerization catalyst, a support-activator, or a method of making a support-activator according to any one of Aspects 1-64, wherein following contacting [1] the colloidal smectite clay and the [2] heterocoagulation reagent, the smectite heteroadduct is isolated from the slurry by filtration without the use of ultrafiltration, centrifugation, or settling tanks.

Aspect 66. A catalyst composition, a process for polymerizing olefins, a method of making an olefin polymerization catalyst, a support-activator, or a method of making a support-activator according to any one of Aspects 1-65, wherein the smectite heteroadduct is amorphous.

Aspect 67. A catalyst composition, a process for polymerizing olefins, a method of making an olefin polymerization catalyst, a support-activator, or a method of making a support-activator according to any one of Aspects 1-66, wherein the catalyst composition or the support-activator further comprises an ion-exchanged clay, a protic-acid-treated clay, a pillared clay, an aluminoxane, a borate co-activator, or any combination thereof.

Aspect 68. A catalyst composition, a process for polymerizing olefins, a method of making an olefin polymerization catalyst, a support-activator, or a method of making a support-activator according to any one of Aspects 1-66, wherein the catalyst composition or the support-activator is substantially absent an ion-exchanged clay, a protic-acid-treated clay, a pillared clay, an aluminoxane, a borate co-activator, or any combination thereof.

Aspect 69. A method of making a support-activator according to any one of Aspects 5-68, wherein the smectite heteroadduct is subsequently dried and/or calcined.

Aspect 70. A method of making a support-activator according to any one of Aspects 5-69, wherein the smectite heteroadduct is subsequently dried by heating, azeotropic drying, freeze drying, flash drying, fluidized bed drying, spray drying, or any combination thereof.

Aspect 71. A method of making a support-activator according to any one of Aspects 5-70, wherein after isolating the smectite heteroadduct, the smectite heteroadduct is wet milled or dry milled.

Aspect 72. A method of making a support-activator according to any one of Aspects 5-71, wherein the isolated smectite heteroadduct is dried to a constant weight to obtain a dry smectite heteroadduct.

Aspect 73. A method of making a support-activator according to any one of Aspects 5-71, wherein the smectite heteroadduct is calcined at a temperature in a range of from about 110° C. to about 900° C., for a time period in a range of from about 1 hour to about 12 hours.

Aspect 74. A method of making a support-activator according to any one of Aspects 5-71, wherein the smectite heteroadduct is calcined for a time and temperature sufficient to achieve a catalyst productivity of at least about 1,500 g polymer/g support-activator, or a catalyst productivity in a range of from about 1,500 g polymer/g support-activator to about 30,000 g polymer/g support-activator.

Aspect 75. A method of making a support-activator according to any one of Aspects 5-71, further comprising the step removing entrapped air from the dried or calcined smectite heteroadduct by [1] exposing the dried or calcined smectite heteroadduct to vacuum, followed by an inert atmosphere such as nitrogen or argon, and optionally repeating the vacuum and inert gas cycle one or more times; or [2] while calcining the smectite heteroadduct in a fluidizing gas of air or carbon monoxide, changing the fluidizing gas to an inert gas such as nitrogen or argon.

Aspect 76. A method of making a support-activator according to any one of Aspects 5-75, wherein the concentration of the smectite heteroadduct solids in the slurry is at least about 5 wt. %.

Aspect 77. A method of making a support-activator according to any one of Aspects 5-76, wherein the concentration of the smectite heteroadduct solids in the slurry is up to about 30 wt. %, up to about 25 wt. %, up to about 20 wt. %, up to about 15 wt. %, up to about 10 wt. %, up to about 5 wt. %, or wherein the concentration of the smectite heteroadduct solids in the slurry is in a range of from about 2 wt. % to about 30 wt. %, from about 3 wt. % to about 20 wt. %, or from about 5 wt. % to about 15 wt. %.

Aspect 78. A method of making a support-activator according to any one of Aspects 5-77, wherein the contacting step is conducted in the substantial absence of an ion-exchanged clay, a protic-acid-treated clay, an aluminoxane, a borate co-activator, or any combination thereof.

Aspect 79. A method of making a support-activator according to any one of Aspects 5-78, wherein the contacting step is conducted within a temperature range of from about 20° C. to about 100° C.

Aspect 80. A support-activator or a method of making a support-activator according to any one of Aspects 4-79, wherein the slurry of the smectite heteroadduct is characterized by the following filtration behavior:
[a] when the heteroadduct slurry, having a heteroadduct concentration of 2.0 wt. % in water, is filtered within a time period of 0 hours to 2 hours after the contacting step b), the proportion of a filtrate obtained at a filtration time of 10 minutes using either vacuum filtration or gravity filtration, based upon the weight of the liquid carrier in the slurry of the smectite heteroadduct is in a range of (1) from about 50% to about 100% by weight of the liquid carrier in the slurry before filtration, (2) from about 60% to about 100% by weight of the liquid carrier in the slurry before filtration, (3)

from about 70% to about 100% by weight of the liquid carrier in the slurry before filtration, or (4) from about 80% to about 100% by weight of the liquid carrier in the slurry before filtration; and

[b] the filtrate from the heteroadduct slurry, when evaporated, yields solids comprising less than 20%, less than 15%, or less than 10% of the initial combined weight of clay and heterocoagulation agent.

Aspect 81. A support-activator or a method of making a support-activator according to any one of Aspects 4-79, wherein the slurry of the smectite heteroadduct is characterized by the following filtration behavior:

[a] when the heteroadduct slurry, having a heteroadduct concentration of 2.0 wt. % in water, is filtered within a time period of 0 hours to 2 hours after the contacting step b) to provide a first filtrate, the weight ratio of a second filtrate to the first filtrate is less than 0.25, less than 0.20, less than 0.10, less than 0.15, less than 0.10, less than 0.5, or about 0.0, wherein the second filtrate is obtained from filtration of a 2.0 wt. % slurry of a pillared clay prepared using the colloidal smectite clay, the heterocoagulation reagent, and the liquid carrier, and wherein the weight of the first filtrate and the weight of the second filtrate are measured after identical filtration times of 5 minutes, 10 minutes or 15 minutes; and

[b] the filtrate from the heteroadduct slurry, when evaporated, yields solids comprising less than 20%, less than 15%, or less than 10% of the initial combined weight of clay and heterocoagulation agent.

Aspect 82. A support-activator or a method of making a support-activator according to any one of Aspects 4-79, wherein the slurry of the smectite heteroadduct is characterized by a settling rate of a 2.5 wt. % composition of an aqueous heteroadduct slurry that is 3 times, 3.5 times, 4 times, 4.5 times, 5 times, 6 times, 7 times, 8 times, 9 times, or 10 times greater than the settling rate of a 2.5 wt. % of the aqueous pillared clay slurry prepared using the colloidal smectite clay, the heterocoagulation reagent, and the liquid carrier, wherein the settling rates are compared at about 12 hours, about 18 hours, about 24 hours, about 30 hours, about 36 hours, about 48 hours, about 72 hours, about 95 hours, about 96 hours, or about 100 hours, or more from the start of the settling test.

Aspect 83. A catalyst composition, a process for polymerizing olefins, or a method of making an olefin polymerization catalyst according to any one of Aspects 1-3 and 6-68, wherein the metallocene compound is selected from at least one metallocene compound having olefin polymerization activity when activated by an ion-exchanged clay, a protic-acid-treated clay, a pillared clay, an aluminoxane, a borate co-activator, or any combination thereof.

Aspect 84. A catalyst composition, a process for polymerizing olefins, or a method of making an olefin polymerization catalyst according to any one of Aspects 1-3, 6-68, and 83 wherein the metallocene compound comprises, consists of, consists essentially of, or is selected from a non-bridged (non-ansa) metallocene compound or a bridged (ansa) metallocene compound.

Aspect 85. A catalyst composition, a process for polymerizing olefins, or a method of making an olefin polymerization catalyst, according to any one of Aspects 1-3, 6-68, and 83 wherein the metallocene compound comprises, consists of, consists essentially of, or is selected from a compound or a combination of compounds, each independently having the formula:

$(X^1)(X^2)(X^3)(X^4)M$, wherein a) M is selected from titanium, zirconium, or hafnium;

b) $X^1$ is selected from a substituted or an unsubstituted cyclopentadienyl, indenyl, fluorenyl, pentadienyl, allyl, boratabenzenyl, 1,2-azaborolyl, or 1,2-diaza-3,5-diborolyl, wherein any substituent is selected independently from a halide, a $C_1$-$C_{20}$ hydrocarbyl, a $C_1$-$C_{20}$ heterohydrocarbyl, a $C_1$-$C_{20}$ organoheteryl, a fused $C_4$-$C_{12}$ carbocyclic moiety, or a fused $C_4$-$C_{11}$ heterocyclic moiety having at least one heteroatom selected independently from nitrogen, oxygen, sulfur, or phosphorus;

c) $X^2$ is selected from: [1] a substituted or an unsubstituted cyclopentadienyl, indenyl, fluorenyl, pentadienyl, or allyl, wherein any substituent is selected independently from a halide, a $C_1$-$C_{20}$ hydrocarbyl, a $C_1$-$C_{20}$ heterohydrocarbyl, or a $C_1$-$C_{20}$ organoheteryl; or [2] a halide, a hydride, a $C_1$-$C_{20}$ hydrocarbyl, a $C_1$-$C_{20}$ heterohydrocarbyl, a $C_1$-$C_{20}$ organoheteryl, a fused $C_4$-$C_{12}$ carbocyclic moiety, or a fused $C_4$-$C_{11}$ heterocyclic moiety having at least one heteroatom selected independently from nitrogen, oxygen, sulfur, or phosphorus;

d) wherein $X^1$ and $X^2$ are optionally bridged by at least one linker substituent having from 2 to 4 bridging atoms selected independently from C, Si, N, P, or B, wherein each available non-bridging valence of each bridging atom is unsubstituted (bonded to H) or substituted, wherein any substituent is selected independently from, a halide, a $C_1$-$C_{20}$ hydrocarbyl, a $C_1$-$C_{20}$ heterohydrocarbyl, or a $C_1$-$C_{20}$ organoheteryl, and wherein any hydrocarbyl, heterohydrocarbyl, or organoheteryl substituent can form a saturated or unsaturated cyclic structure with a bridging atom or with $X^1$ or $X^2$;

e) [1] $X^3$ and $X^4$ are selected independently from a halide, a hydride, a $C_1$-$C_{20}$ hydrocarbyl, a $C_1$-$C_{20}$ heterohydrocarbyl, or a $C_1$-$C_{20}$ organoheteryl; [2] $[GX^A_k X^B_{4-k}]^-$, wherein G is B or Al, k is a number from 1 to 4, and $X^A$ in each occurrence is selected independently from H or a halide, and $X^B$ in each occurrence is selected independently from a $C_1$-$C_{12}$ hydrocarbyl, a $C_1$-$C_{12}$ heterohydrocarbyl, a $C_1$-$C_{12}$ organoheteryl; [3] $X^3$ and $X^4$ together are a $C_4$-$C_{20}$ polyene; or [4] $X^3$ and $X^4$ together with M form a substituted or an unsubstituted, saturated or unsaturated $C_3$-$C_6$ metallacycle moiety, wherein any substituent on the metallacycle moiety is selected independently from a halide, a $C_1$-$C_{20}$ hydrocarbyl, a $C_1$-$C_{20}$ heterohydrocarbyl, or a $C_1$-$C_{20}$ organoheteryl.

Aspect 86. A catalyst composition, a process for polymerizing olefins, or a method of making an olefin polymerization catalyst, according to Aspect 85, wherein $X^1$ and $X^2$ are bridged by a linker substituent selected from:

a) $>EX^5_2$, $-EX^5_2EX^5_2-$, $-EX^5_2EX^5EX^5_2-$, or $>C=CX^5_2$, wherein E in each occurrence is independently selected from C or Si;

b) $-BX^5-$, $-NX^5-$, or $-PX^5-$; or c) $[-SiX^5_2(1,2-C_6H_4)SiX^5_2-]$, $[-CX^5_2(1,2-C_6H_4)CX^5_2-]$, $[-SiX^5_2(1,2-C_6H_4)CX^5_2-]$, $[-SiX^5_2(1,2-C_2H_2)SiX^5_2-]$, $[-CX^5_2(1,2-C_6H_4)CX^5_2-]$, or $[-SiX^5_2(1,2-C_6H_4)CX^5_2-]$;

wherein $X^5$ in each occurrence is selected independently from H, a halide, a $C_1$-$C_{20}$ hydrocarbyl, a $C_1$-$C_{20}$ heterohydrocarbyl, or a $C_1$-$C_{20}$ organoheteryl;

and wherein any $X^5$ substituents selected from hydrocarbyl, heterohydrocarbyl, or organoheteryl substituent can form a saturated or unsaturated cyclic structure with a bridging atom, another $X^5$ substituent, $X^1$, or $X^2$.

Aspect 87. A catalyst composition, a process for polymerizing olefins, or a method of making an olefin polymerization catalyst, according to Aspect 85, wherein $X^1$ and $X^2$ are bridged by a linker substituent selected from a $C_1$-$C_{20}$ hydrocarbylene group, a $C_1$-$C_{20}$ hydrocarbylidene group, a $C_1$-$C_{20}$ heterohydrocarbyl group, a $C_1$-$C_{20}$ heterohydrocarbylidene group, a $C_1$-$C_{20}$ heterohydrocarbylene group, or a $C_1$-$C_{20}$ heterohydrocarbylidene group.

Aspect 88. A catalyst composition, a process for polymerizing olefins, or a method of making an olefin polymerization catalyst, according to Aspect 85, wherein $X^1$ and $X^2$ are bridged by at least one substituent having the formula >$EX^5_2$, -$EX^5_2EX^5_2$—, or —$BX^5$—, wherein E is independently C or Si, $X^5$ in each occurrence is selected independently from a halide, a $C_1$-$C_{20}$ aliphatic group, a $C_6$-$C_{20}$ aromatic group, a $C_1$-$C_{20}$ heteroaliphatic group, a $C_4$-$C_{20}$ heteroaromatic group, or a $C_1$-$C_{20}$ organoheteryl group.

Aspect 89. A catalyst composition, a process for polymerizing olefins, or a method of making an olefin polymerization catalyst, according to any one of Aspects 86-88, wherein $X^5$ in each occurrence is selected independently from a halide, a $C_1$-$C_{18}$ or $C_1$-$C_{12}$ alkyl group, a $C_2$-$C_{18}$ or $C_2$-$C_{12}$ alkenyl group, a $C_6$-$C_{18}$ or $C_6$-$C_{12}$ aromatic group, a $C_4$-$C_{18}$ or $C_4$-$C_{12}$ heteroaromatic group, a $C_1$-$C_{18}$ or $C_1$-$C_{12}$ heterohydrocarbyl group, a $C_1$-$C_{21}$ or $C_1$-$C_{15}$ organosilyl group, a $C_1$-$C_{18}$ or $C_1$-$C_{12}$ alkyl halide (haloalkyl) group, a $C_1$-$C_{18}$ or $C_1$-$C_{12}$ organophosphorus group, or a $C_1$-$C_{18}$ or $C_1$-$C_{12}$ organonitrogen group.

Aspect 90. A catalyst composition, a process for polymerizing olefins, or a method of making an olefin polymerization catalyst, according to Aspect 85, wherein $X^1$ and $X^2$ are bridged by a linker substituent selected from silylene, methylsilylene, dimethylsilylene, diisopropylsilylene, dibutylsilylene, methylbutylsilylene, methyl-t-butylsilylene, dicyclohexylsilylene, methylcyclohexylsilylene, methylphenylsilylene, diphenylsilylene, ditolylsilylene, methylnaphthylsilylene, dinaphthylsilylene, cyclodimethylenesilylene, cyclotrimethylenesilylene, cyclotetramethylenesilylene, cyclopentamethylenesilylene, cyclohexamethylenesilylene, or cycloheptamethylenesilylene.

Aspect 91. A catalyst composition, a process for polymerizing olefins, or a method of making an olefin polymerization catalyst, according to any one of Aspects 85-90, wherein $X^1$ is selected from a substituted or an unsubstituted cyclopentadienyl, indenyl, or fluorenyl, wherein any substituent is selected independently from a halide, a $C_1$-$C_{20}$ aliphatic group, a $C_6$-$C_{20}$ aromatic group, a $C_1$-$C_{20}$ heteroaliphatic group, a $C_4$-$C_{20}$ heteroaromatic group, or a $C_1$-$C_{20}$ organoheteryl group.

Aspect 92. A catalyst composition, a process for polymerizing olefins, or a method of making an olefin polymerization catalyst, according to any one of Aspects 85-90, wherein $X^1$ is selected from a substituted or an unsubstituted cyclopentadienyl, indenyl, or fluorenyl, wherein any substituent is selected independently from a halide, a $C_1$-$C_{18}$ or $C_1$-$C_{12}$ alkyl group, a $C_2$-$C_{18}$ or $C_2$-$C_{12}$ alkenyl group, a $C_6$-$C_{18}$ or $C_6$-$C_{12}$ aromatic group, a $C_4$-$C_{18}$ or $C_4$-$C_{12}$ heteroaromatic group, a $C_1$-$C_{21}$ or $C_1$-$C_{15}$ organosilyl group, a $C_1$-$C_{18}$ or $C_1$-$C_{12}$ alkyl halide (haloalkyl) group, a $C_1$-$C_{18}$ or $C_1$-$C_{12}$ organophosphorus group, or a $C_1$-$C_{18}$ or $C_1$-$C_{12}$ organonitrogen group.

Aspect 93. A catalyst composition, a process for polymerizing olefins, or a method of making an olefin polymerization catalyst, according to any one of Aspects 85-90, wherein $X^1$, $X^2$, or both $X^1$ and $X^2$ are selected independently from a substituted or an unsubstituted cyclopentadienyl, indenyl, or fluorenyl, wherein any substituent is selected independently from:
  a) a silicon group having the formula —$SiH_3$, —$SiH_2R$, —$SiHR_2$, —$SiR_3$, —$SiR_2(OR)$, —$SiR(OR)_2$, or —$Si(OR)_3$;
  b) a phosphorus group having the formula —$PHR$, —$PR_2$, —$P(O)R_2$, —$P(OR)_2$, —$P(O)(OR)_2$, —$P(NR_2)_2$, or —$P(O)(NR_2)_2$;
  c) a boron group having the formula —$BH_2$, —$BHR$, —$BR_2$, —$BR(OR)$, or —$B(OR)_2$;
  d) a germanium group having the formula —$GeH_3$, —$GeH_2R$, —$GeHR_2$, —$GeR_3$, —$GeR_2(OR)$, —$GeR(OR)_2$, or —$Ge(OR)_3$; or
  e) any combination thereof;
  wherein R in each occurrence is selected independently from a $C_1$-$C_{20}$ hydrocarbyl group.

Aspect 94. A catalyst composition, a process for polymerizing olefins, or a method of making an olefin polymerization catalyst, according to any one of Aspects 85-90, wherein $X^1$, $X^2$, or $X^1$ and $X^2$ are substituted with a fused carbocyclic or heterocyclic moiety selected from pyrrole, furan, thiophene, phosphole, imidazole, imidazoline, pyrazole, pyrazoline, oxazole, oxazoline, isoxazole, isoxazoline, thiazole, thiazoline, isothiozoline, or a partially saturated analogs thereof.

Aspect 95. A catalyst composition, a process for polymerizing olefins, or a method of making an olefin polymerization catalyst, according to any one of Aspects 85-92, wherein $X^2$ is selected from: [1] a substituted or an unsubstituted cyclopentadienyl, indenyl, or fluorenyl, wherein any substituent is selected independently from a halide, a $C_1$-$C_{20}$ aliphatic group, a $C_6$-$C_{20}$ aromatic group, a $C_1$-$C_{20}$ heteroaliphatic group, a $C_4$-$C_{20}$ heteroaromatic group, or a $C_1$-$C_{20}$ organoheteryl group; or [2] a halide, a $C_1$-$C_{20}$ aliphatic group, a $C_6$-$C_{20}$ aromatic group, a $C_1$-$C_{20}$ heteroaliphatic group, a $C_4$-$C_{20}$ heteroaromatic group, or a $C_1$-$C_{20}$ organoheteryl group.

Aspect 96. A catalyst composition, a process for polymerizing olefins, or a method of making an olefin polymerization catalyst, according to any one of Aspects 85-92, wherein $X^2$ is selected from: [1] a substituted or an unsubstituted cyclopentadienyl, indenyl, or fluorenyl, wherein any substituent is selected independently from a halide, a $C_1$-$C_{18}$ or $C_1$-$C_{12}$ alkyl group, a $C_2$-$C_{18}$ or $C_2$-$C_{12}$ alkenyl group, a $C_6$-$C_{18}$ or $C_6$-$C_{12}$ aromatic group, a $C_4$-$C_{18}$ or $C_4$-$C_{12}$ heteroaromatic group, a $C_1$-$C_{21}$ or $C_1$-$C_{15}$ organosilyl group, a $C_1$-$C_{18}$ or $C_1$-$C_{12}$ alkyl halide (haloalkyl) group, a $C_1$-$C_{18}$ or $C_1$-$C_{12}$ organophosphorus group, or a $C_1$-$C_{18}$ or $C_1$-$C_{12}$ organonitrogen group; or [2] a halide, a $C_1$-$C_{18}$ or $C_1$-$C_{12}$ alkyl group, a $C_2$-$C_{18}$ or $C_2$-$C_{12}$ alkenyl group, a $C_6$-$C_{18}$ or $C_6$-$C_{12}$ aromatic group, a $C_4$-$C_{18}$ or $C_4$-$C_{12}$ heteroaromatic group, a $C_1$-$C_{21}$ or $C_1$-$C_{15}$ organosilyl group, a $C_1$-$C_{18}$ or $C_1$-$C_{12}$ alkyl halide (haloalkyl) group, a $C_1$-$C_{18}$ or $C_1$-$C_{12}$ organophosphorus group, or a $C_1$-$C_{18}$ or $C_1$-$C_{12}$ organonitrogen group.

Aspect 97. A catalyst composition, a process for polymerizing olefins, or a method of making an olefin polymerization catalyst, according to any one of Aspects 85-96, wherein at least one of $X^1$, $X^2$, or the linking substituent between $X^1$ and $X^2$ is substituted with a $C_3$-$C_{12}$ olefinic group having the formula —$(CH_2)_nCH$=$CH_2$, wherein n is from 1-10.

Aspect 98. A catalyst composition, a process for polymerizing olefins, or a method of making an olefin polymerization catalyst, according to any one of Aspects 85-97, wherein: [1] $X^3$ and $X^4$ are selected independently from a halide, a hydride, a $C_1$-$C_{20}$ aliphatic group, a $C_6$-$C_{20}$ aromatic group, a $C_1$-$C_{20}$ heteroaliphatic group, a $C_4$-$C_{20}$ heteroaromatic group, or a $C_1$-$C_{20}$ organoheteryl group; [2] $X^3$ and $X^4$ together are a substituted or an unsubstituted 1,3-butadiene having from 4 to 20 carbon atoms; or [3] $X^3$ and $X^4$ together with M form a substituted or an unsubstituted, saturated or unsaturated $C_4$-$C_5$ metallacycle moiety, wherein any substituent on the metallacycle moiety is selected independently from a halide, a $C_1$-$C_{20}$ aliphatic group, a $C_6$-$C_{20}$ aromatic group, a $C_1$-$C_{20}$ heteroaliphatic group, a $C_4$-$C_{20}$ heteroaromatic group, or a $C_1$-$C_{20}$ organoheteryl group.

Aspect 99. A catalyst composition, a process for polymerizing olefins, or a method of making an olefin polymerization catalyst, according to any one of Aspects 85-97, wherein: [1] $X^3$ and $X^4$ are selected independently from a halide, a hydride, a $C_1$-$C_{18}$ or $C_1$-$C_{12}$ alkyl group, a $C_2$-$C_{18}$ or $C_2$-$C_{12}$ alkenyl group, a $C_6$-$C_{18}$ or $C_6$-$C_{12}$ aromatic group, a $C_4$-$C_{18}$ or $C_4$-$C_{12}$ heteroaromatic group, a $C_1$-$C_{21}$ or $C_1$-$C_{15}$ organosilyl group, a $C_1$-$C_{18}$ or $C_1$-$C_{12}$ alkyl halide (haloalkyl) group, a $C_1$-$C_{18}$ or $C_1$-$C_{12}$ organophosphorus group, or a $C_1$-$C_{18}$ or $C_1$-$C_{12}$ organonitrogen group; or [2] $X^3$ and $X^4$ together are a substituted or an unsubstituted 1,3-butadiene having from 4 to 18 carbon atoms; or [3] $X^3$ and $X^4$ together with M form a substituted or an unsubstituted, saturated or unsaturated $C_4$-$C_5$ metallacycle moiety, wherein any substituent on the metallacycle moiety is selected independently from a halide, a $C_1$-$C_{18}$ or $C_1$-$C_{12}$ alkyl group, a $C_2$-$C_{18}$ or $C_2$-$C_{12}$ alkenyl group, a $C_6$-$C_{18}$ or $C_6$-$C_{12}$ aromatic group, a $C_4$-$C_{18}$ or $C_4$-$C_{12}$ heteroaromatic group, a $C_1$-$C_{21}$ or $C_1$-$C_{15}$ organosilyl group, a $C_1$-$C_{18}$ or $C_1$-$C_{12}$ alkyl halide (haloalkyl) group, a $C_1$-$C_{18}$ or $C_1$-$C_{12}$ organophosphorus group, or a $C_1$-$C_{18}$ or $C_1$-$C_{12}$ organonitrogen group.

Aspect 100. A catalyst composition, a process for polymerizing olefins, or a method of making an olefin polymerization catalyst, according to any one of Aspects 85-97, wherein $X^3$ and $X^4$ are selected independently from [1] a halide, a hydride, a borohydride, an aluminum hydride; or [2] a substituted or an unsubstituted $C_1$-$C_{18}$ aliphatic group, $C_1$-$C_{12}$ alkoxide group, $C_6$-$C_{10}$ aryloxide group, $C_1$-$C_{12}$ alkylsulfide group, $C_6$-$C_{10}$ arylsulfide group, wherein any substituent is selected independently from a halide, a $C_1$-$C_{10}$ alkyl, or a $C_6$-$C_{10}$ aryl; or [3] an amido group or a phosphido group, wherein any substituent is selected independently from a $C_1$-$C_{10}$ alkyl or a $C_6$-$C_{10}$ aryl.

Aspect 101. A catalyst composition, a process for polymerizing olefins, or a method of making an olefin polymerization catalyst, according to any one of Aspects 1-3, 6-68, or 83, wherein the metallocene compound comprises, consists of, consists essentially of, or is selected from bis(cyclopentadienyl)zirconium dichloride, bis-(methylcyclopentadienyl)zirconium dichloride, bis(1,2-dimethylcyclopentadienyl)zirconium dichloride, bis(1,3-dimethylcyclopentadienyl)zirconium dichloride, bis(1-butyl-3-methylcyclopentadienyl)zirconium dichloride, bis(1,2,3-trimethylcyclopentadienyl)zirconium dichloride, bis(1,2,4-trimethylcyclopentadienyl)zirconium dichloride, bis-(1,2,3,4-tetramethylcyclopentadienyl)zirconium dichloride, bis(pentamethylcyclopentadienyl)zirconium dichloride, bis-(ethylcyclopentadienyl)zirconium dichloride, bis(1,2-diethylcyclopentadienyl)zirconium dichloride, bis(1,3-diethylcyclopentadienyl)zirconium dichloride, bis(isopropylcyclopentadienyl)zirconium dichloride, bis (phenylpropylcyclopentadienyl)zirconium dichloride, bis(t-butylcyclopentadienyl)zirconium dichloride, bis(indenyl)-zirconium dichloride, bis(4-methyl-1-indenyl)zirconium dichloride, bis(5-methyl-1-indenyl)zirconium)zirconium dichloride, bis(6-methyl-1-indenyl)zirconium dichloride, bis(7-methyl-1-indenyl)zirconium dichloride, bis(5-methoxy-1-indenyl)-zirconium dichloride, bis(2,3-dimethyl-1-indenyl)zirconium dichloride, bis(4,7-dimethyl-1-indenyl)zirconium dichloride, bis(4,7-dimethoxy-1-indenyl)zirconium dichloride, (indenyl)(fluorenyl)zirconium dichloride, bis(fluorenyl)zirconium dichloride, bis(trimethylsilylcyclopentadienyl)zirconium dichloride, bis(trimethylgermylcyclopentadienyl)zirconium dichloride, bis(trimethylstanylcyclopentadienyl)zirconium dichloride, bis (trifluoromethylcyclopentadienyl)zirconium dichloride, (cyclopentadienyl)-(methylcyclopentadienyl)zirconium dichloride, (cyclopentadienyl)(dimethylcyclopentadienyl) zirconium dichloride, (cyclopentadienyl)(trimethylcyclopentadienyl)zirconium dichloride, (cyclopentadienyl)(tetramethylcyclopentadienyl)zirconium dichloride, (cyclopentadienyl)(pentamethylcyclopentadienyl)zirconium dichloride, (cyclopentadienyl)(ethylcyclopentadienyl)zirconium dichloride, (cyclopentadienyl)(diethylcyclopentadienyl)zirconium dichloride, (cyclopentadienyl)(triethylcyclopentadienyl)zirconium dichloride, (cyclopentadienyl)(tetraethylcyclopentadienyl)zirconium dichloride, (cyclopentadienyl)(pentaethylcyclopentadienyl)-zirconium dichloride, (cyclopentadienyl)(fluorenyl)zirconium dichloride, (cyclopentadienyl)(2,7-di-t-butylfluorenyl)-zirconium dichloride, (cyclopentadienyl)(octahydrofluorenyl)zirconium dichloride, (cyclopentadienyl)(4-methoxyfluorenyl) zirconium dichloride, (methylcyclopentadienyl)-(t-butylcyclopentadienyl)zirconium dichloride, (methylcyclopentadienyl)(fluorenyl)zirconium dichloride, (methylcyclopentadienyl)(2,7-di-t-butylfluorenyl)zirconium dichloride, (methylcyclopentadienyl)(octahydrofluorenyl)zirconium dichloride, (methylcyclopentadienyl)(4-methoxyfluorenyl)-zirconium dichloride, (dimethylcyclopentadienyl)(fluorenyl)-zirconium dichloride, (dimethylcyclopentadienyl)(2,7-di-t-butylfluorenyl)zirconium dichloride, (dimethylcyclopentadienyl)(octahydrofluorenyl)zirconium dichloride, (dimethylcyclopentadienyl)(4-methoxyfluorenyl)zirconium dichloride, (ethylcyclopentadienyl)(fluorenyl)zirconium dichloride, (ethylcyclopentadienyl)(2,7-di-t-butylfluorenyl) zirconium dichloride, (ethylcyclopentadienyl)(octahydrofluorenyl)zirconium dichloride, (ethylcyclopentadienyl)(4-methoxyfluorenyl)zirconium dichloride, (diethylcyclopentadienyl)-(fluorenyl)zirconium dichloride, (diethylcyclopentadienyl)(2,7-di-t-butylfluorenyl)zirconium dichloride, (diethylcyclopentadienyl)(octahydrofluorenyl)zirconium dichloride, (diethylcyclopentadienyl)(4-methoxyfluorenyl) zirconium dichloride, or any combination thereof.

Aspect 102. A catalyst composition or a process for polymerizing olefins according to any one of Aspects 1-3, 6-68, or 83-101, wherein the catalyst composition further comprises a co-catalyst.

Aspect 103. A method of making an olefin polymerization catalyst according to any one of Aspects 1-3, 6-68, or 83-102, wherein the contacting step further comprises contacting, in any order, the metallocene compound and the support-activator with a co-catalyst.

Aspect 104. A catalyst composition, a process for polymerizing olefins, or a method of making an olefin polymerization catalyst according to any one of Aspects 1-3, 6-68, or 83-103, wherein the co-catalyst comprises an alkylating agent, a hydriding agent, or a silylating agent.

Aspect 105. A catalyst composition, a process for polymerizing olefins, or a method of making an olefin polymerization catalyst according to any one of Aspects 1-3, 6-68, or 83-104, wherein the co-catalyst comprises, consists of, consists essentially of, or is selected from an organoaluminum compound, an organoboron compound, an organozinc compound, an organomagnesium compound, an organolithium compound, or any combination thereof.

Aspect 106. A catalyst composition, a process for polymerizing olefins, or a method of making an olefin polymerization catalyst according to any one of Aspects 1-3, 6-68, or 83-104, wherein the co-catalyst comprises, consists of, consists essentially of, or is selected from an organoaluminum compound or a combination of organoaluminum compounds, each independently having the formula:

$Al(X^A)_n(X^B)_m$ or $M^x[AlX^A{}_4]$, wherein a) n+m=3, wherein n and m are not limited to integers;
b) $X^A$ is selected independently from: [1] a hydride, a $C_1$-$C_{20}$ hydrocarbyl, or a $C_1$-$C_{20}$ heterohydrocarbyl; [2] a hydride, a $C_1$-$C_{20}$ aliphatic group, a $C_6$-$C_{20}$ aromatic group, a $C_1$-$C_{20}$ heteroaliphatic group, or a $C_4$-$C_{20}$ heteroaromatic group; or [3] two $X^A$ together comprise a $C_4$-$C_5$ hydrocarbylene group and the remaining $X^A$ is/are selected independently from a hydride, a $C_1$-$C_{20}$ hydrocarbyl, or a $C_1$-$C_{20}$ heterohydrocarbyl;
c) $X^B$ is selected independently from: [1] a halide or a $C_1$-$C_{20}$ organoheteryl; or [2] a halide, a $C_1$-$C_{12}$ alkoxide group, or a $C_6$-$C_{10}$ aryloxide group; and
d) $M^x$ is selected from Li, Na, or K.

Aspect 107. A catalyst composition, a process for polymerizing olefins, or a method of making an olefin polymerization catalyst according to any one of Aspects 102-103, wherein the co-catalyst comprises, consists of, consists essentially of, or is selected from an organoaluminum compound or a combination of organoaluminum compounds, each independently having the formula:

$Al(X^C)_n(X^D)_{3-n}$ or $M^x[AlX^C{}_4]$, wherein a) n is a number from 1 to 3, inclusive;
b) $X^C$ is selected independently from a hydride or a $C_1$-$C_{20}$ hydrocarbyl;
c) $X^D$ is a formal anionic species selected independently from: fluoride; chloride; bromide; iodide; bromate; chlorate; perchlorate; hydrocarbylsulfate; hydrocarbylsulfite; sulfamate; hydrocarbylsulfide, hydrocarbylcarbonate; hydrogen-carbonate (bicarbonate); carbamate; nitrite; nitrate; hydrocarbyloxalate; dihydrocarbylphosphate; hydrocarbylselenite; sulfate; sulfite; carbonate; oxalate; phosphate; phosphite; selenite; selenide; sulfide; oxide; sulfamate; azide; alkoxide; amido; hydrocarbylamido; dihydrocarbylamido; $R^A[CON(R)]_q$; wherein $R^A$ in each occurrence is independently H or a substituted or unsubstituted $C_1$-$C_{20}$ hydrocarbyl group and q is an integer from 1 to 4, inclusive; and $R^B[CO_2]_r$, wherein $R^B$ in each occurrence is independently H or a substituted or unsubstituted $C_1$-$C_{20}$ hydrocarbyl group and r is an integer from 1 to 3, inclusive; and
d) $M^x$ is selected from Li, Na, or K.

Aspect 108. A catalyst composition, a process for polymerizing olefins, or a method of making an olefin polymerization catalyst according to any one of Aspects 1-3, 6-68, or 83-104, wherein the co-catalyst comprises, consists of, consists essentially of, or is selected from: [1] trimethylaluminum, triethylaluminum (TEA), tripropylaluminum, tributylaluminum, trihexylaluminum, trioctylaluminum, ethyl-(3-alkylcyclopentadiyl)aluminum, diethylaluminum ethoxide, diisobutylaluminum hydride, triisobutylaluminum (TIBAL), diethylaluminum chloride, or any combination or mixture thereof; or [2] ethyl-(3-alkylcyclopentadiyl)aluminum, triisobutylaluminum (TIBAL), trioctylaluminum, or any combination or mixture thereof; or [3] any combination of mixture of any one or more co-catalyst [1] and any one or more co-catalyst [2].

Aspect 109. A catalyst composition, a process for polymerizing olefins, or a method of making an olefin polymerization catalyst according to any one of Aspects 1-3, 6-68, or 83-104, wherein the co-catalyst or co-activator comprises, consists of, consists essentially of, or is selected from an organoboron compound or a combination of organoboron compounds, each independently having the formula:

$B(X^E)_q(X^F)_{3-q}$, $B(X^E)_3$, or $M^y[BX^E{}_4]$, wherein a) q is from 1 to 3, inclusive;
b) $X^E$ is selected independently from: [1] a hydride, a $C_1$-$C_{20}$ hydrocarbyl, or a $C_1$-$C_{20}$ heterohydrocarbyl; [2] a hydride, a $C_1$-$C_{20}$ aliphatic group, a $C_6$-$C_{20}$ aromatic group, a $C_1$-$C_{20}$ heteroaliphatic group, or a $C_4$-$C_{20}$ heteroaromatic group; [3] a fluorinated $C_1$-$C_{20}$ hydrocarbyl, or a fluorinated $C_1$-$C_{20}$ heterohydrocarbyl; or [4] a fluorinated $C_1$-$C_{20}$ aliphatic group, a fluorinated $C_6$-$C_{20}$ aromatic group, a fluorinated $C_1$-$C_{20}$ heteroaliphatic group, or a fluorinated $C_4$-$C_{20}$ heteroaromatic group;
c) $X^F$ is selected independently from: [1] a halide or a $C_1$-$C_{20}$ organoheteryl; or [2] a halide, a $C_1$-$C_{12}$ alkoxide group, or a $C_6$-$C_{10}$ aryloxide group; and
d) $M^y$ is selected from Li, Na, or K.

Aspect 110. A catalyst composition, a process for polymerizing olefins, or a method of making an olefin polymerization catalyst according to any one of Aspects 1-3, 6-68, or 83-104, wherein the co-catalyst or co-activator comprises, consists of, consists essentially of, or is selected from [1] trimethylboron, triethylboron, tripropylboron, tributylboron, trihexylboron, trioctylboron, diethylboron ethoxide, diisobutylboron hydride, triisobutylboron, diethylboron chloride, di-3-pinanylborane, pinacolborane, catecholborane, lithium borohydride, lithium triethylborohydride, a Lewis base adduct thereof, or any combination or mixture thereof; or
[2] tris(pentafluorophenyl)boron, tris[3,5-bis(trifluoromethyl)phenyl]boron, N,N-dimethylanilinium tetrakis(pentafluorophenyl)borate, triphenylcarbenium tetrakis(pentafluorophenyl)borate, lithium tetrakis-(pentafluorophenyl)borate, N,N-dimethylanilinium tetrakis [3,5-bis(trifluoromethyl)phenyl]borate, triphenylcarbenium tetrakis[3,5-bis(trifluoromethyl)-phenyl]borate, and any combination or mixture thereof.

Aspect 111. A catalyst composition, a process for polymerizing olefins, or a method of making an olefin polymerization catalyst according to any one of Aspects 1-3, 6-68, or 83-104, wherein the co-catalyst comprises, consists of, consists essentially of, or is selected from an organozinc or organomagnesium compound or a combination of organozinc and/or organomagnesium compounds, each independently having the formula:

$M^C(X^G)_r(X^H)_{2-r}$, wherein a) $M^C$ is zinc or magnesium;
a) r is a number from 1 to 2, inclusive;
b) $X^G$ is selected independently from: [1] a hydride, a $C_1$-$C_{20}$ hydrocarbyl, or a $C_1$-$C_{20}$ heterohydrocarbyl; or [2] a hydride, a $C_1$-$C_{20}$ aliphatic group, a $C_6$-$C_{20}$ aromatic group, a $C_1$-$C_{20}$ heteroaliphatic group, or a $C_4$-$C_{20}$ heteroaromatic group; and c) $X^H$ is selected independently from: [1] a halide or a $C_1$-$C_{20}$ organoheteryl; or [2] a halide, a $C_1$-$C_{12}$ alkoxide group, or a $C_6$-$C_{10}$ aryloxide group.

Aspect 112. A catalyst composition, a process for polymerizing olefins, or a method of making an olefin polymerization catalyst according to any one of Aspects 1-3, 6-68, or 83-104, wherein the co-catalyst comprises, consists of, consists essentially of, or is selected from: [1] dimethylzinc, diethylzinc, diisopropylzinc, dicyclohexylzinc, diphenylzinc, or any combination thereof; [2] butylethylmagnesium, dibutylmagnesium, n-butyl-sec-butylmagnesium, dicyclopentadienylmagnesium, or any combination thereof; or [3] any combination of any organozinc co-catalyst from group [1] and any organomagnesium co-catalyst from group [2].

Aspect 113. A catalyst composition, a process for polymerizing olefins, or a method of making an olefin polymerization catalyst according to any one of Aspects 1-3, 6-68, or 83-104, wherein the co-catalyst comprises, consists of, consists essentially of, or is selected from an organolithium compound having the formula:

Li($X^J$), wherein $X^J$ is selected independently from: [1] a hydride, a $C_1$-$C_{20}$ hydrocarbyl, or a $C_1$-$C_{20}$ heterohydrocarbyl; or [2] a hydride, a $C_1$-$C_{20}$ aliphatic group, a $C_6$-$C_{20}$ aromatic group, a $C_1$-$C_{20}$ heteroaliphatic group, or a $C_4$-$C_{20}$ heteroaromatic group.

Aspect 114. A catalyst composition, a process for polymerizing olefins, a method of making an olefin polymerization catalyst, according to any one of Aspects 1-3, 6-68, or 83-104, wherein the co-catalyst comprises, consists of, consists essentially of, or is selected from methyllithium, ethyllithium, propyllithium, butyllithium (including n-butyllithium and t-butyllithium), hexyllithium, iso-butyllithium, or any combination thereof.

Aspect 115. A catalyst composition, a process for polymerizing olefins, or a method of making an olefin polymerization catalyst according to any one of Aspects 1-3, 6-68, or 83-104, wherein the catalyst composition further comprises a co-activator selected from an ion-exchanged clay, a protic-acid-treated clay, a pillared clay, an aluminoxane, a borate co-activator, an aluminate co-activator, an ionizing ionic compound, a solid oxide treated with an electron withdrawing anion, or any combination thereof.

Aspect 116. A catalyst composition, a process for polymerizing olefins, or a method of making an olefin polymerization catalyst according to any one of Aspects 1-3, 6-68, or 83-104, wherein the catalyst composition further comprises an ionic ionizing compound.

Aspect 117. A catalyst composition, a process for polymerizing olefins, or a method of making an olefin polymerization catalyst according to Aspect 116, wherein the ionic ionizing compound comprises, consists of, consists essentially of, or is selected from tri(n-butyl)ammonium tetrakis(p-tolyl)borate, trimethylammonium tetraphenylborate, triethylammonium tetraphenylborate, tripropylammonium tetraphenylborate, tri(n-butyl)ammonium tetraphenylborate, tri(t-butyl)ammonium tetraphenylborate, N,N-dimethylanilinium tetraphenylborate, N,N-diethylanilinium tetraphenylborate, N,N-dimethyl-(2,4,6-trimethylanilinium) tetraphenylborate, tropillium tetraphenylborate, triphenylcarbenium tetraphenylborate, triphenylphosphonium tetraphenylborate triethylsilylium tetraphenylborate, benzene(diazonium)tetraphenylborate, trimethylammonium tetrakis(pentafluorophenyl)borate, triethylammonium tetrakis(pentafluorophenyl)borate, tripropylammonium tetrakis(pentafluorophenyl)borate, tri(n-butyl)ammonium tetrakis(pentafluorophenyl)borate, tri(sec-butyl)ammonium tetrakis(pentafluorophenyl)borate, N,N-dimethylanilinium tetrakis(pentafluorophenyl)borate, N,N-diethylanilinium tetrakis(pentafluorophenyl)borate, N,N-dimethyl-(2,4,6-trimethylanilinium) tetrakis(pentafluorophenyl)borate, tropillium tetrakis(pentafluorophenyl)borate, triphenylcarbenium tetrakis(pentafluorophenyl)borate, triphenylphosphonium tetrakis(pentafluorophenyl)borate, triethylsilylium tetrakis(pentafluorophenyl)borate, benzene(diazonium) tetrakis(pentafluorophenyl)borate, trimethylammonium tetrakis-(2,3,4,6-tetrafluorophenyl) borate, triethylammonium tetrakis-(2,3,4,6-tetrafluorophenyl)borate, tripropylammonium tetrakis-(2,3,4,6-tetrafluorophenyl)borate, tri(n-butyl)ammonium tetrakis-(2,3,4,6-tetrafluoro-phenyl)borate, dimethyl(t-butyl)ammonium tetrakis-(2,3,4,6-tetrafluorophenyl)borate, N,N-dimethylanilinium tetrakis-(2,3,4,6-tetrafluorophenyl)borate, N,N-diethylanilinium tetrakis-(2,3,4,6-tetrafluorophenyl)borate, N,N-dimethyl-(2,4,6-trimethylanilinium) tetrakis-(2,3,4,6-tetrafluorophenyl)borate, tropillium tetrakis-(2,3,4,6-tetrafluorophenyl)borate, triphenylcarbenium tetrakis-(2,3,4,6-tetrafluorophenyl)borate, triphenylphosphonium tetrakis-(2,3,4,6-tetrafluorophenyl)borate, triethylsilylium tetrakis-(2,3,4,6-tetrafluorophenyl)borate, benzene(diazonium) tetrakis-(2,3,4,6-tetrafluorophenyl)borate, trimethylammonium tetrakis(perfluoronapthyl)borate, triethylammonium tetrakis(perfluoronapthyl)borate, tripropylammonium tetrakis(perfluoronapthyl)borate, tri(n-butyl)ammonium tetrakis(perfluoronapthyl)borate, tri(t-butyl)ammonium tetrakis(perfluoronapthyl)borate, N,N-dimethylanilinium tetrakis(perfluoronapthyl)borate, N,N-diethylanilinium tetrakis(perfluoronapthyl)borate, N,N-dimethyl-(2,4,6-trimethylanilinium) tetrakis(perfluoronapthyl)borate, tropillium tetrakis(perfluoronapthyl)borate, triphenylcarbenium tetrakis(perfluoronapthyl)borate, triphenylphosphonium tetrakis(perfluoronapthyl)borate, triethylsilylium tetrakis(perfluoronapthyl)borate, benzene(diazonium) tetrakis(perfluoronapthyl)borate, trimethylammonium tetrakis(perfluorobiphenyl)borate, triethylammonium tetrakis(perfluorobiphenyl)borate, tripropylammonium tetrakis(perfluorobiphenyl)borate, tri(n-butyl)ammonium tetrakis(perfluorobiphenyl)borate, tri(t-butyl)ammonium tetrakis(perfluorobiphenyl)borate, N,N-dimethylanilinium tetrakis(perfluorobiphenyl)borate, N,N-diethylanilinium tetrakis(perfluorobiphenyl)borate, N,N-dimethyl-(2,4,6-trimethylanilinium) tetrakis(perfluorobiphenyl)borate, tropillium tetrakis(perfluorobiphenyl)borate, triphenylcarbenium tetrakis(perfluorobiphenyl)borate, triphenylphosphonium tetrakis(perfluorobiphenyl)borate, triethylsilylium tetrakis(perfluorobiphenyl)borate, benzene(diazonium) tetrakis(perfluorobiphenyl)borate, trimethylammonium tetrakis(3,5-bis(trifluoromethyl)phenyl)borate, triethylammonium tetrakis(3,5-bis(trifluoromethyl)phenyl)borate, tripropylammonium tetrakis(3,5-bis(trifluoromethyl)phenyl)borate, tri(n-butyl)ammonium tetrakis(3,5-bis(trifluoromethyl)phenyl)borate, tri(t-butyl)ammonium tetrakis(3,5-bis(trifluoromethyl)phenyl)borate, N,N-dimethylanilinium tetrakis(3,5-bis(trifluoromethyl)phenyl)borate, N,N-diethylanilinium tetrakis(3,5-bis(trifluoromethyl)phenyl)borate, N,N-dimethyl-(2,4,6-trimethylanilinium) tetrakis(3,5-bis(trifluoromethyl)phenyl)borate, tropillium tetrakis(3,5-bis(trifluoromethyl)phenyl)borate, triphenylcarbenium tetrakis (3,5-bis(trifluoromethyl)phenyl)borate, triphenylphosphonium tetrakis(3,5-bis(trifluoromethyl)phenyl)borate, triethylsilylium tetrakis(3,5-bis(trifluoromethyl)phenyl)borate, benzene(diazonium) tetrakis(3,5-bis(trifluoromethyl)phenyl)borate, and dialkyl ammonium salts such as: di-(i-propyl)ammonium tetrakis(pentafluorophenyl)borate, and dicyclohexylammonium tetrakis(pentafluorophenyl)borate; and additional tri-substituted phosphonium salts such as tri(o-tolyl)phosphonium tetrakis(pentafluorophenyl)borate, tri(2,6-dimethylphenyl)phosphonium tetrakis(pentafluorophenyl)borate, or any combination thereof.

Aspect 118. A catalyst composition, a process for polymerizing olefins, or a method of making an olefin polymerization catalyst according to any one of Aspects 1-3, 6-68, or 83-104, wherein catalyst composition further comprises a co-activator comprising a solid oxide treated with an electron withdrawing anion.

Aspect 119. A catalyst composition, a process for polymerizing olefins, or a method of making an olefin polymerization catalyst according to Aspect 118, wherein:
  a) the solid oxide comprises, consists of, consists essentially of, or is selected from silica, alumina, silica-alumina, silica-coated alumina, silica-zirconia, silica-titania, aluminum phosphate, heteropolytungstates, titania, zirconia, magnesia, boria, zinc oxide, mixed oxides thereof, or any combination thereof; and
  b) the electron-withdrawing anion comprises, consists of, consists essentially of, or is selected from fluoride, chloride, bromide, phosphate, triflate, bisulfate, sulfate, fluorophosphate, fluorosulfate, or any combination thereof.

Aspect 120. A catalyst composition, a process for polymerizing olefins, or a method of making an olefin polymerization catalyst according to Aspect 118, wherein the co-activator comprises, consists of, consists essentially of, or is selected from fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, or any combinations thereof.

Aspect 121. A catalyst composition, a process for polymerizing olefins, or a method of making an olefin polymerization catalyst according to any one of Aspects 1-3, 6-68, or 83-120, wherein the catalyst composition further comprises a carrier or diluent, or the contacting in any order occurs in a carrier or diluent.

Aspect 122. A catalyst composition, a process for polymerizing olefins, or a method of making an olefin polymerization catalyst according to Aspect 121, wherein the carrier or diluent comprises, consists of, consists essentially of, or is selected from a hydrocarbon, an ether, or a combination thereof, each of which has from 1 to 20 carbon atoms.

Aspect 123. A catalyst composition, a process for polymerizing olefins, or a method of making an olefin polymerization catalyst according to Aspect 121, wherein the carrier or diluent comprises, consists of, consists essentially of, or is selected from cyclohexane, isobutane, n-butane, propane, n-pentane, isopentane, neopentane, n-hexane, Isopar™, at least one olefin, or any combination thereof.

Aspect 124. A catalyst composition, a process for polymerizing olefins, or a method of making an olefin polymerization catalyst according to Aspect 121, wherein the carrier or diluent comprises, consists of, consists essentially of, or is selected from at least one olefin.

Aspect 125. A catalyst composition, a process for polymerizing olefins, or a method of making an olefin polymerization catalyst according to any one of Aspects 1-3, 6-68, or 83-124, wherein the activity of a catalyst is greater than or equal to about 300 grams of polyolefin per gram of the support-activator comprising a calcined smectite heteroadduct per hour (g/g/hr), under polymerization conditions comprising [1] a metallocene compound to calcined smectite heteroadduct ratio of about $7 \times 10^{-5}$ mmol metallocene compound/mg calcined smectite heteroadduct, and [2] other standard conditions as described in the specification.

Aspect 126. A catalyst composition, a process for polymerizing olefins, or a method of making an olefin polymerization catalyst according to any one of Aspects 1-3, 6-68, or 83-125, wherein the catalyst composition comprises the organoaluminum compound and the calcined smectite heteroadduct in a relative concentration expressed in moles of organoaluminum compound per gram of calcined smectite heteroadduct in a range of from about 0.5 to about 0.000005, from about 0.1 to about 0.00001, or from about 0.01 to about 0.0001.

Aspect 127. A process for polymerizing olefins according to any one of Aspects 1-3, 6-68, or 83-126, wherein the process comprises at least one slurry polymerization, at least one gas phase polymerization, at least one solution polymerization, or any multi-reactor combinations thereof.

Aspect 128. A process for polymerizing olefins according to any one of Aspects 1-3, 6-68, or 83-127, wherein the process comprises polymerization in a gas phase reactor, a slurry loop, dual slurry loops in series, multiple slurry tanks in series, a slurry loop combined with a gas phase reactor, a continuous stirred reactor in a batch process, or combinations thereof.

Aspect 129. A process for polymerizing olefins according to any one of Aspects 1-3, 6-68, or 83-128, wherein the polyolefin comprises, consists of, consists essentially of, or is selected from an olefin homopolymer or an olefin copolymer.

Aspect 130. A process for polymerizing olefins according to any one of Aspects 1-3, 6-68, or 83-129, wherein the polyolefin comprises, consists of, consists essentially of, or is selected from an olefin homopolymer, the homopolymer comprising olefin monomer residues having from 2 to about 20 carbon atoms per monomer molecule.

Aspect 131. A process for polymerizing olefins according to Aspect 130, wherein the olefin monomer is selected from ethylene, propylene, 1-butene, 3-methyl-1-butene, 1-pentene, 3-methyl-1-pentene, 4-methyl-1-pentene, 1-hexene, 3-ethyl-1-hexene, 1-heptene, 1-octene, 1-nonene, or 1-decene.

Aspect 132. A process for polymerizing olefins according to any one of Aspects 2, 6-68, or 83-129, wherein the polyolefin comprises, consists of, consists essentially of, or is selected from an ethylene-olefin comonomer copolymer, the copolymer comprising α-olefin comonomer residues having from 3 to about 20 carbon atoms per monomer molecule.

Aspect 133. A process for polymerizing olefins according to Aspect 132, wherein the olefin comonomer is selected from an aliphatic $C_3$ to $C_{20}$ olefin, a conjugated or nonconjugated $C_3$ to $C_{20}$ diolefin, or any mixture thereof.

Aspect 134. A process for polymerizing olefins according to Aspect 132, wherein the olefin comonomer is selected from propylene, 1-butene, 2-butene, 3-methyl-1-butene, 1-pentene, 2-pentene, 3-methyl-1-pentene, 4-methyl-1-pentene, 1-hexene, 3-ethyl-1-hexene, 1-heptene, 1-octene, 1-nonene, 1-decene, 1,3-butadiene, isoprene, piperylene, 2,3-dimethyl-1,3-butadiene, 1,4-pentadiene, 1,7-hexadiene, vinylcyclohexane, or any combination thereof.

Aspect 135. A method of making an olefin polymerization catalyst according to any one of Aspects 3, 6-68, or 83-126, wherein:

a) the metallocene compound and the co-catalyst are contacted [1] for a time period from about 1 minute to about 24 hours or from about 1 minute to about 1 hour and [2] at a temperature from about 10° C. to about 200° C. or from about 15° C. to about 80° C., to form a first mixture; followed by b) contacting the first mixture with the support-activator comprising a calcined smectite heteroadduct to form the catalyst composition.

Aspect 136. A method of making an olefin polymerization catalyst according to any one of Aspects 3, 6-68, or 83-126, wherein the metallocene compound, the co-catalyst, and the support-activator comprising a calcined smectite heteroadduct are contacted [1] for a time period from about 1 minute to about 6 months or from about 1 minute to about 1 week and [2] at a temperature from about 10° C. to about 200° C. or from about 15° C. to about 80° C., to form the olefin polymerization catalyst.

Aspect 137. A catalyst composition prepared according to any one of Aspects 3, 6-68, 83-126, or 135-136.

Aspect 138. A process for polymerizing olefins comprising contacting at least one olefin monomer and a catalyst composition under polymerization conditions to form a polyolefin, wherein the catalyst composition is prepared according to Aspect 137.

Aspect 139. A catalyst composition, a process for polymerizing olefins, a method of making an olefin polymerization catalyst, a support-activator, or a method of making a support-activator according to any one of Aspects 1-138, wherein the catalyst composition, processes, methods, and support-activators are any catalyst composition, processes, methods, and support-activators disclosed herein.

We claim:

1. A support-activator comprising an isolated smectite heteroadduct, the smectite heteroadduct comprising the contact product in a liquid carrier of [1] a colloidal smectite clay and [2] a heterocoagulation reagent comprising at least one cationic polymetallate and in an amount sufficient to provide a slurry of the smectite heteroadduct having a zeta potential in a range of from about positive (+)25 mV (millivolts) to about negative (−)25 mV, as quantified from the Electrokinetic Sonic Amplitude (ESA) Effect, wherein the cationic polymetallate comprises a first metal oxide which is chemically-treated with a second metal oxide, a metal halide, a metal oxyhalide, or a combination thereof.

2. The support-activator according to claim 1, wherein the first metal oxide comprises silica, alumina, zirconia, silica-alumina, fumed silica, fumed alumina, fumed silica-alumina, fumed magnesia, fumed zinc oxide, fumed titania, fumed zirconia, fumed ceria, or any combination thereof.

3. The support-activator according to claim 1, wherein the cationic polymetallate comprises the first metal oxide which is chemically-treated with a metal oxyhalide.

4. The support-activator according to claim 1, wherein the cationic polymetallate comprises the first metal oxide which is chemically-treated with a cationic polyaluminate.

5. The support-activator according to claim 1, wherein the second metal oxide, the metal halide, or the metal oxyhalide comprises polyaluminum chloride, aluminum chlorhydrate, aluminum sesquichlorohydrate, polyaluminum oxyhydroxychloride, or any combination thereof.

6. The support-activator according to claim 1, wherein the second metal oxide, the metal halide, the metal oxyhalide, or the combination thereof is formed from an aqueous solution or suspension of the second metal oxide, a metal hydroxide, the metal halide, the metal oxyhalide, or the combination thereof.

7. The support-activator according to claim 6, wherein the second metal oxide, the metal hydroxide, the metal halide, the metal oxyhalide, or the combination thereof comprises $ZrOCl_2$, $ZnO$, $NbOCl_3$, $B(OH)_3$, $AlCl_3$, or the combination thereof.

8. The support-activator according to claim 1, wherein the first metal oxide comprises silica, alumina, fumed silica, or fumed alumina, and the second metal oxide, the metal halide, or the metal oxyhalide is formed from an aqueous solution or suspension of the second metal oxide, a metal hydroxide, the metal halide, the metal oxyhalide, or the combination thereof.

9. The support-activator according to claim 1, wherein cationic polymetallate composition comprises:

silica, alumina, fumed silica, fumed alumina, fumed silica-alumina, fumed magnesia, fumed zinc oxide, fumed titania, fumed zirconia, fumed ceria, or any combination thereof;

which is chemically-treated with polyaluminum chloride, aluminum chlorhydrate, aluminum sesquichlorohydrate, polyaluminum oxyhydroxychloride, or any combination thereof.

10. The support-activator according to claim 1, wherein the cationic polymetallate comprises fumed silica, fumed alumina, or fumed silica-alumina, which is treated with an aluminum species or any combinations of species having the empirical formula:

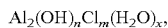

$$Al_2(OH)_nCl_m(H_2O)_x,$$

wherein n+m=6, and x is a number from 0 to about 4.

11. The support-activator according to claim 1, wherein the colloidal smectite clay comprises montmorillonite, sauconite, nontronite, hectorite, beidellite, saponite, bentonite, or any combination thereof.

12. The support-activator according to claim 1, wherein the colloidal smectite clay is monocation exchanged with at least one of lithium, sodium, or potassium.

13. The support-activator according to claim 1, wherein the colloidal smectite clay is monocation exchanged with at least one of sodium.

14. The support-activator according to claim 1, wherein
the colloidal smectite clay comprises colloidal montmorillonite, which is optionally monocation exchanged with sodium; and
the heterocoagulation reagent comprises silica, alumina, fumed silica, or fumed alumina which is chemically-treated with aluminum chlorhydrate, polyaluminum chloride, or aluminum sesquichlorohydrate.

15. The support-activator according to claim 1, wherein
the colloidal smectite clay comprises colloidal montmorillonite, which is optionally monocation exchanged with sodium; and
the cationic polymetallate comprises aluminum chlorhydrate-treated fumed silica, aluminum chlorhydrate-treated fumed alumina, aluminum chlorhydrate-treated fumed silica-alumina, or any combination thereof.

16. The support-activator according to claim 1, wherein the cationic polymetallate comprises the first metal oxide which is chemically-treated with polyaluminum chloride, aluminum chlorhydrate, aluminum sesquichlorohydrate, or polyaluminum oxyhydroxychloride, and wherein the ratio of millimoles (mmol) of aluminum (Al) in the polyaluminum chloride, aluminum chlorhydrate, aluminum sesquichlorohydrate, or polyaluminum oxyhydroxychloride to grams (g) of colloidal smectite clay is in a range of from about 2.0 mmol Al/g clay to about 3.3 mmol Al/g clay.

17. The support-activator according to claim 1, wherein the first metal oxide is chemically-treated with a second metal oxide, a metal halide, a metal oxyhalide, or a combination thereof in an amount sufficient to provide a colloidal suspension of the chemically-treated first metal oxide having a zeta potential of greater than positive (+)20 mV (millivolts), as quantified from the Electrokinetic Sonic Amplitude (ESA) Effect.

18. The support-activator according to claim 1, wherein the colloidal smectite clay and the heterocoagulation reagent are contacted in an amount sufficient to provide the slurry of the smectite heteroadduct with a zeta potential in a range of from about positive (+)22 mV (millivolts) to about negative (−)22 mV.

19. The support-activator according to claim 1, wherein the colloidal smectite clay and the heterocoagulation reagent are contacted in an amount sufficient to provide the slurry of the smectite heteroadduct with a zeta potential in a range of from about positive (+)20 mV (millivolts) to about negative (−)20 mV.

20. The support-activator according to claim 1, wherein the colloidal smectite clay and the heterocoagulation reagent are contacted in an amount sufficient to provide the slurry of the smectite heteroadduct with a zeta potential in a range of from about positive (+)18 mV (millivolts) to about negative (−)18 mV.

21. The support-activator according to claim 1, wherein the slurry of the smectite heteroadduct is characterized by a conductivity in a range of from about 20,000 μS/cm to about 100 μS/cm.

22. The support-activator according to claim 1, wherein the isolated smectite heteroadduct is calcined at a temperature ranging from about 110° C. to about 600° C. and for a time period ranging from about 1 hour to about 10 hours.

23. The support-activator according to claim 1, wherein:
the liquid carrier comprises water, an alcohol, an ether, a ketone, or an ester, or any combination thereof; and
the liquid carrier further comprises a surfactant selected from an anionic surfactant, a cationic surfactant, a non-ionic surfactant, or an amphoteric surfactant.

24. The support-activator according to claim 23, wherein the anionic surfactant is selected from a sulfate, a sulfonate, a phosphate, a carboxylate, a dialkyl sulfocarboxylic acid ester, an alkyl aryl sulfonic acid salt, an alkyl sulfonic acid salt, a sulfosuccinic acid ester, a fatty acid alkali metal salt, a polycarboxylic acid salt, a polyoxyethylene alkyl ether phosphoric acid ester salt, or an alkylnaphthalene sulfonic acid salt, wherein unless otherwise specified, each salt comprises a cation selected from an alkali metal, an alkaline earth metal, ammonium, or hydrocarbylammonium.

25. The support-activator according to claim 23, wherein the cationic surfactant is selected from:
a primary amine, a secondary amine, or a tertiary amine; or
a primary ammonium chloride or bromide, a secondary ammonium chloride or bromide, a tertiary ammonium chloride or bromide, or a quaternary ammonium chloride or bromide.

26. The support-activator according to claim 23, wherein the non-ionic surfactant is selected from an ethoxylate, a glycol ether, a fatty alcohol polyglycol ether, or a combination thereof.

27. A catalyst composition for olefin polymerization, the catalyst composition comprising:
a) at least one metallocene compound; and
b) a support-activator comprising an isolated smectite heteroadduct, the smectite heteroadduct comprising the contact product in a liquid carrier of [1] a colloidal smectite clay and [2] a heterocoagulation reagent comprising at least one cationic polymetallate and in an amount sufficient to provide a slurry of the smectite heteroadduct having a zeta potential in a range of from about positive (+)25 mV (millivolts) to about negative (−)25 mV, as quantified from the Electrokinetic Sonic Amplitude (ESA) Effect, wherein the cationic polymetallate comprises a first metal oxide which is chemically-treated with a second metal oxide, a metal halide, a metal oxyhalide, or a combination thereof.

28. The catalyst composition according to claim 27, wherein the catalyst composition further comprises at least one co-catalyst.

29. The catalyst composition according to claim 28, wherein the co-catalyst comprises an organoaluminum compound, an organoboron compound, an organozinc compound, an organomagnesium compound, an organolithium compound, or any combination thereof.

30. The catalyst composition according to claim 28, wherein the co-catalyst comprises trimethylaluminum, triethylaluminum (TEA), tripropylaluminum, tributylaluminum, trihexylaluminum, trioctylaluminum, ethyl-(3-alkylcyclopentadiyl)aluminum, diethylaluminum ethoxide, diisobutylaluminum hydride, triisobutylaluminum (TIBAL), diethylaluminum chloride, ethyl-(3-alkylcyclopentadiyl)aluminum, or any combination thereof.

31. The catalyst composition according to claim 27, wherein the catalyst composition further comprises a co-activator selected from an ion-exchanged clay, a protic-acid-treated clay, a pillared clay, an aluminoxane, a borate co-activator, an aluminate co-activator, an ionizing ionic compound, a solid oxide treated with an electron withdrawing anion, or any combination thereof.

32. The catalyst composition according to claim 31, wherein the co-activator comprises a solid oxide treated with an electron withdrawing anion, and wherein:
a) the solid oxide comprises silica, alumina, silica-alumina, silica-coated alumina, silica-zirconia, silica-titania, aluminum phosphate, heteropolytungstates, titania, zirconia, magnesia, boria, zinc oxide, mixed oxides thereof, or any combination thereof; and
b) the electron-withdrawing anion comprises fluoride, chloride, bromide, phosphate, triflate, bisulfate, sulfate, fluorophosphate, fluorosulfate, or any combination thereof.

33. The catalyst composition according to claim 32, wherein the co-activator comprises fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, or any combinations thereof.

34. The catalyst composition according to claim 27, wherein the at least one metallocene compound has the formula $(X^1)(X^2)(X^3)(X^4)M$, wherein:

M is zirconium or hafnium;
$X^1$ is a substituted or unsubstituted indenyl, fluorenyl, or cyclopentadienyl wherein any substituent is selected independently from a $C_1$-$C_{20}$ hydrocarbyl, a $C_1$-$C_{20}$ heterohydrocarbyl, or a fused $C_4$-$C_{12}$ carbocyclic moiety;

X² is a substituted or unsubstituted indenyl or cyclopentadienyl, wherein any substituent is selected independently from a $C_1$-$C_{20}$ hydrocarbyl or a $C_1$-$C_{20}$ heterohydrocarbyl;

X³ and X⁴ are selected independently from a halide, a $C_1$-$C_{20}$ hydrocarbyl, a $C_1$-$C_{20}$ heterohydrocarbyl, or a $C_1$-$C_{20}$ organoheteryl; and X¹ and X² are optionally bridged by a linking substituent >$EX^5_2$, wherein E is selected from C or Si, and each X⁵ is selected independently from a $C_1$-$C_{20}$ hydrocarbyl.

35. The catalyst composition according to claim 27, wherein the first metal oxide comprises silica, alumina, zirconia, silica-alumina, fumed silica, fumed alumina, fumed silica-alumina, fumed magnesia, fumed zinc oxide, fumed titania, fumed zirconia, fumed ceria, or any combination thereof.

36. The catalyst composition according to claim 27, wherein the cationic polymetallate comprises the first metal oxide which is chemically-treated with a metal oxyhalide.

37. The catalyst composition according to claim 27, wherein the cationic polymetallate comprises the first metal oxide which is chemically-treated with a cationic polyaluminate.

38. The catalyst composition according to claim 27, wherein the second metal oxide, the metal halide, or the metal oxyhalide comprises polyaluminum chloride, aluminum chlorhydrate, aluminum sesquichlorohydrate, polyaluminum oxyhydroxychloride, or any combination thereof.

39. The catalyst composition according to claim 27, wherein the second metal oxide, the metal halide, the metal oxyhalide, or the combination thereof is formed from an aqueous solution or suspension of the second metal oxide, a metal hydroxide, the metal halide, the metal oxyhalide, or the combination thereof.

40. The catalyst composition according to claim 39, wherein the second metal oxide, the metal hydroxide, the metal halide, the metal oxyhalide, or the combination thereof comprises $ZrOCl_2$, ZnO, $NbOCl_3$, $B(OH)_3$, $AlCl_3$, or the combination thereof.

41. The catalyst composition according to claim 27, wherein the first metal oxide comprises silica, alumina, fumed silica, or fumed alumina, and the second metal oxide, the metal halide, or the metal oxyhalide is formed from an aqueous solution or suspension of the second metal oxide, a metal hydroxide, the metal halide, the metal oxyhalide, or the combination thereof.

42. The catalyst composition according to claim 27, wherein cationic polymetallate composition comprises:
silica, alumina, fumed silica, fumed alumina, fumed silica-alumina, fumed magnesia, fumed zinc oxide, fumed titania, fumed zirconia, fumed ceria, or any combination thereof;
which is chemically-treated with polyaluminum chloride, aluminum chlorhydrate, aluminum sesquichlorohydrate, polyaluminum oxyhydroxychloride, or any combination thereof.

43. The catalyst composition according to claim 27, wherein the cationic polymetallate comprises fumed silica, fumed alumina, or fumed silica-alumina, which is treated with an aluminum species or any combinations of species having the empirical formula:

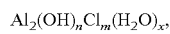

$Al_2(OH)_nCl_m(H_2O)_x$, wherein n+m=6, and x is a number from 0 to about 4.

44. The catalyst composition according to claim 27, wherein the colloidal smectite clay comprises montmorillonite, sauconite, nontronite, hectorite, beidellite, saponite, bentonite, or any combination thereof.

45. The catalyst composition according to claim 27, wherein the colloidal smectite clay is monocation exchanged with at least one of lithium, sodium, or potassium.

46. The catalyst composition according to claim 27, wherein the colloidal smectite clay is monocation exchanged with at least one of sodium.

47. The catalyst composition according to claim 27, wherein
the colloidal smectite clay comprises colloidal montmorillonite, which is optionally monocation exchanged with sodium; and
the heterocoagulation reagent comprises silica, alumina, fumed silica, or fumed alumina which is chemically-treated with aluminum chlorhydrate, polyaluminum chloride, or aluminum sesquichlorohydrate.

48. The catalyst composition according to claim 27, wherein
the colloidal smectite clay comprises colloidal montmorillonite, which is optionally monocation exchanged with sodium; and
the cationic polymetallate comprises aluminum chlorhydrate-treated fumed silica, aluminum chlorhydrate-treated fumed alumina, aluminum chlorhydrate-treated fumed silica-alumina, or any combination thereof.

49. The catalyst composition according to claim 27, wherein the cationic polymetallate comprises the first metal oxide which is chemically-treated with polyaluminum chloride, aluminum chlorhydrate, aluminum sesquichlorohydrate, or polyaluminum oxyhydroxychloride, and wherein the ratio of millimoles (mmol) of aluminum (Al) in the polyaluminum chloride, aluminum chlorhydrate, aluminum sesquichlorohydrate, or polyaluminum oxyhydroxychloride to grams (g) of colloidal smectite clay is in a range of from about 2.0 mmol Al/g clay to about 3.3 mmol Al/g clay.

50. The catalyst composition according to claim 27, wherein the first metal oxide is chemically-treated with a second metal oxide, a metal halide, a metal oxyhalide, or a combination thereof in an amount sufficient to provide a colloidal suspension of the chemically-treated first metal oxide having a zeta potential of greater than positive (+)20 mV (millivolts), as quantified from the Electrokinetic Sonic Amplitude (ESA) Effect.

51. The catalyst composition according to claim 27, wherein the colloidal smectite clay and the heterocoagulation reagent are contacted in an amount sufficient to provide the slurry of the smectite heteroadduct with a zeta potential in a range of from about positive (+)22 mV (millivolts) to about negative (−)22 mV.

52. The catalyst composition according to claim 27, wherein the colloidal smectite clay and the heterocoagulation reagent are contacted in an amount sufficient to provide the slurry of the smectite heteroadduct with a zeta potential in a range of from about positive (+)20 mV (millivolts) to about negative (−)20 mV.

53. The catalyst composition according to claim 27, wherein the colloidal smectite clay and the heterocoagulation reagent are contacted in an amount sufficient to provide the slurry of the smectite heteroadduct with a zeta potential in a range of from about positive (+)18 mV (millivolts) to about negative (−)18 mV.

54. The catalyst composition according to claim 27, wherein the slurry of the smectite heteroadduct is characterized by a conductivity in a range of from about 20,000 µS/cm to about 100 µS/cm.

55. The catalyst composition according to claim 27, wherein the isolated smectite heteroadduct is calcined at a temperature ranging from about 110° C. to about 600° C. and for a time period ranging from about 1 hour to about 10 hours.

56. The catalyst composition according to claim 27, wherein:
the liquid carrier comprises water, an alcohol, an ether, a ketone, or an ester, or any combination thereof; and
the liquid carrier further comprises a surfactant selected from an anionic surfactant, a cationic surfactant, a non-ionic surfactant, or an amphoteric surfactant.

57. The catalyst composition according to claim 56, wherein the anionic surfactant is selected from a sulfate, a sulfonate, a phosphate, a carboxylate, a dialkyl sulfocarboxylic acid ester, an alkyl aryl sulfonic acid salt, an alkyl sulfonic acid salt, a sulfosuccinic acid ester, a fatty acid alkali metal salt, a polycarboxylic acid salt, a polyoxyethylene alkyl ether phosphoric acid ester salt, or an alkylnaphthalene sulfonic acid salt, wherein unless otherwise specified, each salt comprises a cation selected from an alkali metal, an alkaline earth metal, ammonium, or hydrocarbylammonium.

58. The catalyst composition according to claim 56, wherein the cationic surfactant is selected from:
a primary amine, a secondary amine, or a tertiary amine; or
a primary ammonium chloride or bromide, a secondary ammonium chloride or bromide, a tertiary ammonium chloride or bromide, or a quaternary ammonium chloride or bromide.

59. The catalyst composition according to claim 56, wherein the non-ionic surfactant is selected from an ethoxylate, a glycol ether, a fatty alcohol polyglycol ether, or a combination thereof.

60. A process for polymerizing olefins comprising contacting at least one olefin monomer and a catalyst composition under polymerization conditions to form a polyolefin, wherein the catalyst composition comprises:
a) at least one metallocene compound; and
b) a support-activator comprising an isolated smectite heteroadduct, the smectite heteroadduct comprising the contact product in a liquid carrier of [1] a colloidal smectite clay and [2] a heterocoagulation reagent comprising at least one cationic polymetallate and in an amount sufficient to provide a slurry of the smectite heteroadduct having a zeta potential in a range of from about positive (+)25 mV (millivolts) to about negative (−)25 mV, as quantified from the Electrokinetic Sonic Amplitude (ESA) Effect, wherein the cationic polymetallate comprises a first metal oxide which is chemically-treated with a second metal oxide, a metal halide, a metal oxyhalide, or a combination thereof.

61. The process for polymerizing olefins according to claim 60, wherein cationic polymetallate composition comprises:
silica, alumina, fumed silica, fumed alumina, fumed silica-alumina, fumed magnesia, fumed zinc oxide, fumed titania, fumed zirconia, fumed ceria, or any combination thereof;
which is chemically-treated with polyaluminum chloride, aluminum chlorhydrate, aluminum sesquichlorohydrate, polyaluminum oxyhydroxychloride, or any combination thereof.

62. The process for polymerizing olefins according to claim 60, wherein the at least one olefin monomer is selected from [a] ethylene or propylene, or [b] ethylene in combination with at least one comonomer selected from propylene, 1-butene, 2-butene, 3-methyl-1-butene, 1-pentene, 2-pentene, 3-methyl-1-pentene, 4-methyl-1-pentene, 1-hexene, 3-ethyl-1-hexene, 1-heptene, 1-octene, 1-nonene, 1-decene, 1,3-butadiene, isoprene, piperylene, 2,3-dimethyl-1,3-butadiene, 1,4-pentadiene, 1,7-hexadiene, vinylcyclohexane, or any combination thereof.

63. The process for polymerizing olefins according to claim 60, wherein the process comprises polymerization in a gas phase reactor, a slurry loop, dual slurry loops in series, multiple slurry tanks in series, a slurry loop combined with a gas phase reactor, a continuous stirred reactor in a batch process, or combinations thereof.

\* \* \* \* \*